United States Patent [19]

Lotito et al.

[11] Patent Number: 4,625,081

[45] Date of Patent: Nov. 25, 1986

[54] AUTOMATED TELEPHONE VOICE SERVICE SYSTEM

[76] Inventors: Lawrence A. Lotito, 6625 Springpark Ave., Los Angeles, Calif. 90056; Teresa D. Huxford, 1822 Pandora Ave., #3, Los Angeles, Calif. 90025; Ann L. Donaldson, 2321 W. 232nd St., Torrance, Calif. 90501

[21] Appl. No.: 445,651

[22] Filed: Nov. 30, 1982

[51] Int. Cl.⁴ .................... H04M 3/38; H04M 3/50
[52] U.S. Cl. .................................. 379/88; 379/196; 379/211
[58] Field of Search ............ 179/18 B, 18 D, 18 DA, 179/5 P, 6.02, 6.17, 6.18, 6.09, 6.11; 360/32, 12; 364/513.5, 513; 381/36, 51; 370/60, 61, 62

[56] References Cited

U.S. PATENT DOCUMENTS

| | | | |
|---|---|---|---|
| Re. 30,903 | 4/1982 | Vicari et al. | 179/27 FH |
| 1,922,879 | 8/1933 | Burgener | 179/27 FH |
| 2,685,614 | 8/1954 | Curtin | 179/27 FH |
| 2,863,950 | 12/1958 | Dunning et al. | 179/27 FH |
| 2,892,038 | 6/1959 | Gatzert | 179/27 FH |
| 2,985,721 | 5/1961 | Gatzert | 179/27 FH |
| 2,998,489 | 8/1961 | Riesz | 179/6.02 |
| 3,141,931 | 7/1964 | Zarouni | 179/6.11 |
| 3,146,310 | 8/1964 | Jeffries et al. | 179/6.07 |
| 3,197,566 | 7/1965 | Sanders et al. | 179/18 BE |
| 3,273,260 | 9/1966 | Walker | 434/307 |
| 3,296,371 | 1/1967 | Fox | 381/51 |
| 3,510,598 | 5/1970 | Ballin et al. | 179/18 BE |
| 3,519,745 | 7/1970 | Colman | 179/5 P |
| 3,728,486 | 4/1973 | Kraus | 179/2 R |
| 3,733,440 | 5/1973 | Sipes | 179/18 B |
| 3,920,908 | 11/1975 | Kraus | 179/2 CA |
| 4,117,270 | 9/1978 | Lesea | 179/18 BE |
| 4,200,772 | 4/1980 | Vicari et al. | 179/27 FH |
| 4,210,783 | 7/1980 | Vicari et al. | 179/18 FC |
| 4,256,928 | 3/1981 | Lesea et al. | 179/18 BE |
| 4,272,810 | 6/1981 | Gates et al. | 364/900 |
| 4,302,632 | 11/1981 | Vicari et al. | 179/27 FH |
| 4,320,256 | 3/1982 | Freeman | 179/6.04 |
| 4,371,752 | 2/1983 | Matthews et al. | 179/7.1 TP |

OTHER PUBLICATIONS

"Store & Forward Voice Switching", International Resource Development, Inc., Report #145, pp. 45-56, Jan. 1980.
"A Design Model for a Real-Time Voice Storage System", Hattori et al., IEEE Trans. on Communications, vol. COM-30, No. 1, Jan. 1982, pp. 53-57.
Barish, Bernard T. and Slattery, Paul J., "BISCOM: Rx for Internal Communications", Bell Laboratories Record, vol. 42, No. 6, pp. 175-180 (Jun. 1974).
Watson, Jr., R. E. and S. B. Weinberg, "Telephone Answering Services," Bell Laboratories Record, vol. 43, No. 12, pp. 447-450 (Dec. 1965).
Liske, W., "Remote Controlled Switching of the Telephone Message Service of the Deutsche Bundespost," TN-Nachrichten vol. 70, pp. 13-16 (1970).
Probe Research, Inc., "ECS Telecommunications, Inc., " Proceedings of Voice Processing Seminar, Sep. 15, 1982.
Probe Research, Inc., "Voice Message Service," Proceedings of Voice Processing Seminar, Sep. 15, 1982.
Probe Research, Inc., "Logic Labs, Inc." Proceedings of Voice Processing Seminar, Sep. 15, 1982.

List Continued on next page.

Primary Examiner—Thomas W. Brown

[57] ABSTRACT

An automated telephone voice service system includes a data store having a plurality of addressable voice storage message baskets defined therein and a control system coupled between the store and a large plurality of telephone lines of a telephone network. An incoming cable may address a particular message basket by entering a code through the telephone keyboard or by a predetermined association with a particular call in line. Upon identification of the message basket the caller is greeted by a client's own voice and invited to leave a voice message which will be recorded in the message basket or given other client information. Upon entry of a personal identification code a caller is granted access to user account functions which include retrieval of voice messages, forwarding of messages to other message baskets or telephone lines, and administrative functions such as the changing of greetings or account operating criteria. Editing commands may be utilized during the recording of voice messages.

74 Claims, 27 Drawing Figures

OTHER PUBLICATIONS

Probe Research, Inc., "BBL Industries, Inc.," *Proceedings of Voice Processing Seminar*, Sep. 15, 1958.
Probe Research, Inc., "Wang Laboratories," *Proceedings of Voice Processing Seminar*, Sep. 16, 1982.
Probe Research, Inc., "American Telephone and Telegraph, Inc.," *Proceedings of Voice Processing Seminar*, Sep. 16, 1982.
Probe Research, Inc., "Commterm, Inc.," *Proceedings of Voice Processing Seminar*, Sep. 16, 1982.
Probe Research, Inc., "American Express Company," *Proceedings of Voice Processing Seminar*, Sep. 16, 1982.
Probe Research, Inc. "Equitable Life Assurance," *Proceedings of Voice Processing Seminar*, Sep. 16, 1982.
Probe Research, Inc., "Massachusetts General Hospital," *Proceedings of Voice Processing Seminar*, Sep. 16, 1982.
Seaman, John, "Electronic Mail Coming at You," *Computer Decisions*, pp. 129–160 (Oct. 1982).
"Voice Mail Update," *Electronic Mail & Message Systems*, vol. 4, No. 20 (Oct. 15, 1980).
Hanson, Bruce L., R. J. Nacon and D. P. Worrall, "Custom Calling Features Cater to Customers," *Telephony*, pp. 28–32 (Sep. 1980).
"Elect. Mail Pack Unveiled by DÉC." *Electronic News*, vol. 27, No. 1365 (Nov. 21, 1981).
ECS Telecommunications, Inc. Marketing Literature for their UMX System (Jan. 7, 1982).
Memo from C. W. Murphy to Jack Atkin Dated Jan. 30, 1981.
"ECS Unveils 1,000—User Digital Message Exchange," *Communications*.
Matthews, G. H., "The Pitfalls of Small Telecommunications Trunk Groups," *ECS Telecommunications, Inc*, (1981).
"New Product, Voice Message Systems," *Business Communications Review* pp. 37–40 (Jan.-Feb. 1981).
Dukes, A., "IBM Unveils Voice Mailbox; Seen as Step Toward PBX," *MIS Week*, vol. 2, No. 39 (Sep. 30, 1981).
"Speechfile—IBM's Secret Message System Weapon," *Electronic Mail & Message Systems*, vol. 5, No. 12 (Jun. 15, 1981).
"Introducing Voice Store & Forward," *Computer Decisions*, (Oct. 1981).
Out Voice Product Brochures, Voice and Data Systems, Inc.
Dukes, A., "Atlanta Firm Enters Voice-Message Arena," *Management Information Systems Week*, p. 6 (Nov. 18, 1981).
"New Local Net, Voice Store and Forward from Wang," *Computer Decisions* (Aug. 1981).
Delphi Delta 1 Telephone Operator's Training Manual (Apr. 1, 1981).
Delphi Delta 1 Voicebank Data Entry Reference Manual (Jul. 20, 1981).
Delphi Delta 1 Voicebank Marketing Literature.
Delphi Delta 1 Specification.
Delphi Delta 1 Standard Processor Module (SPM-1) Specification (Mar. 13, 1978).
Delphi Pascal Programmers Manual (May 22, 1981).

TELEPHONE VOICE SERVICE SYSTEM 100

STANDARD PROCESSOR MODULE 500

BUS CONTROLLER EXTENSION 922

REAL TIME SUBSYSTEM SOFTWARE ARCHITECTURE 1100

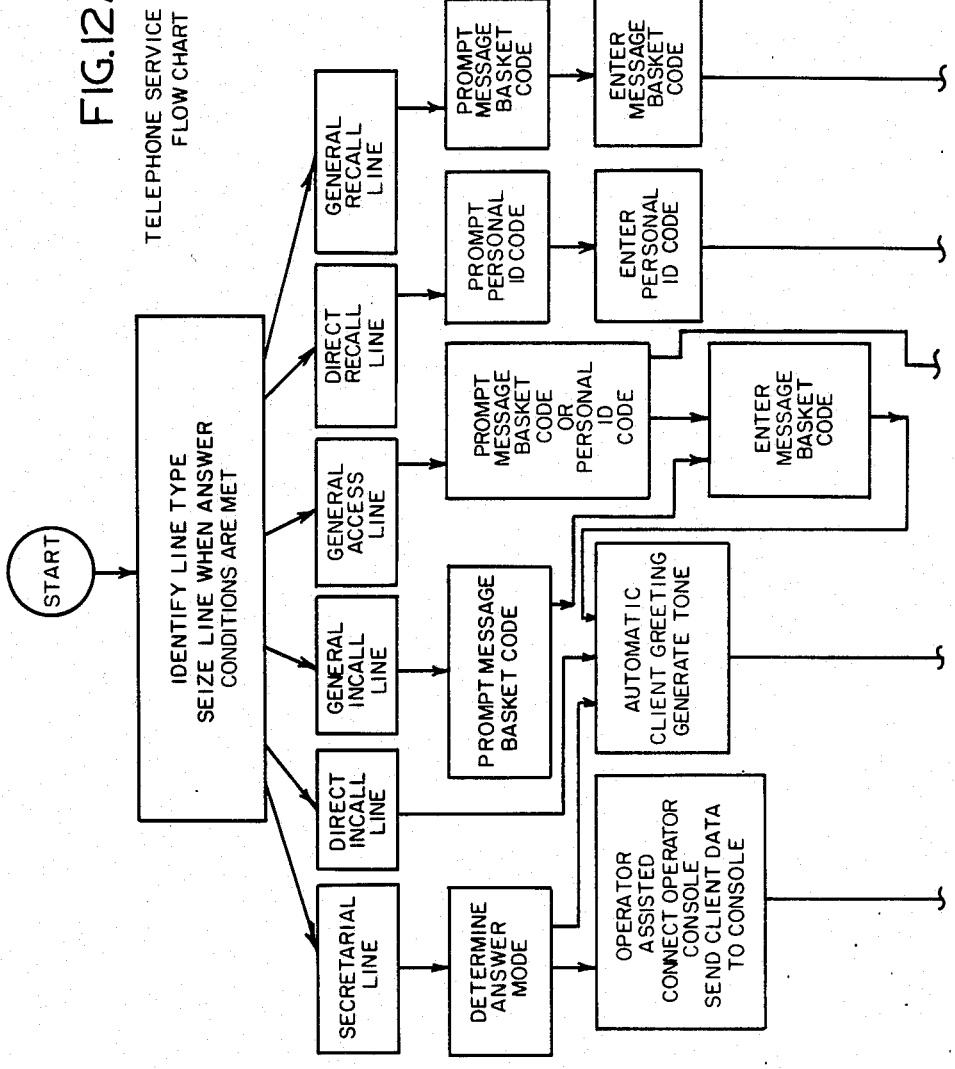

TELEPHONE SERVICE SYSTEM
FLOW CHART

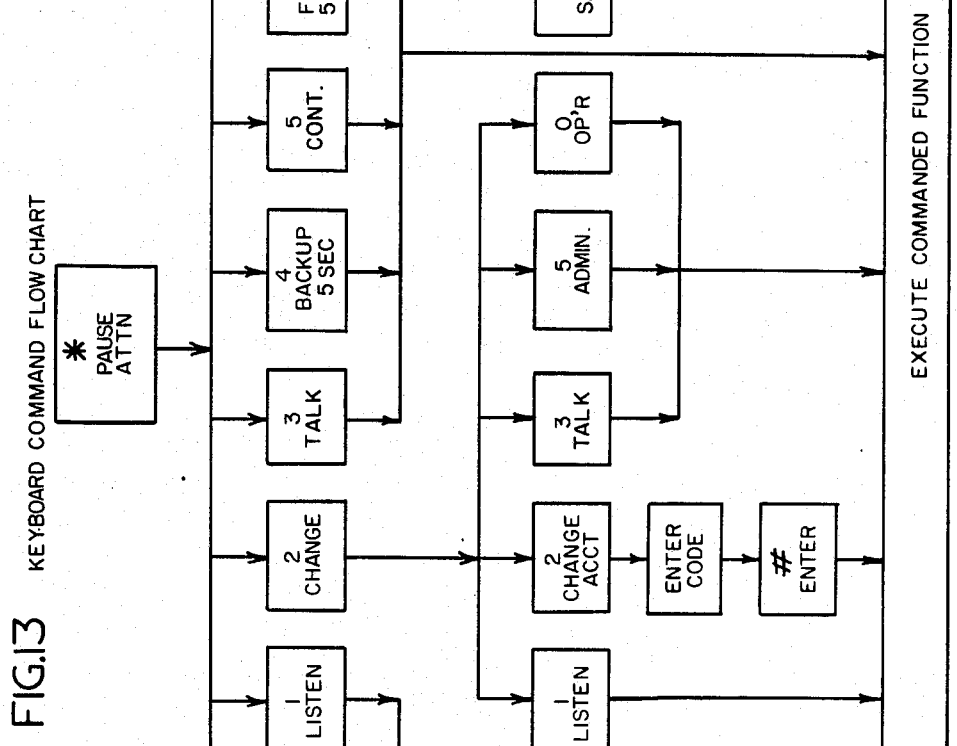
FIG.13 KEYBOARD COMMAND FLOW CHART

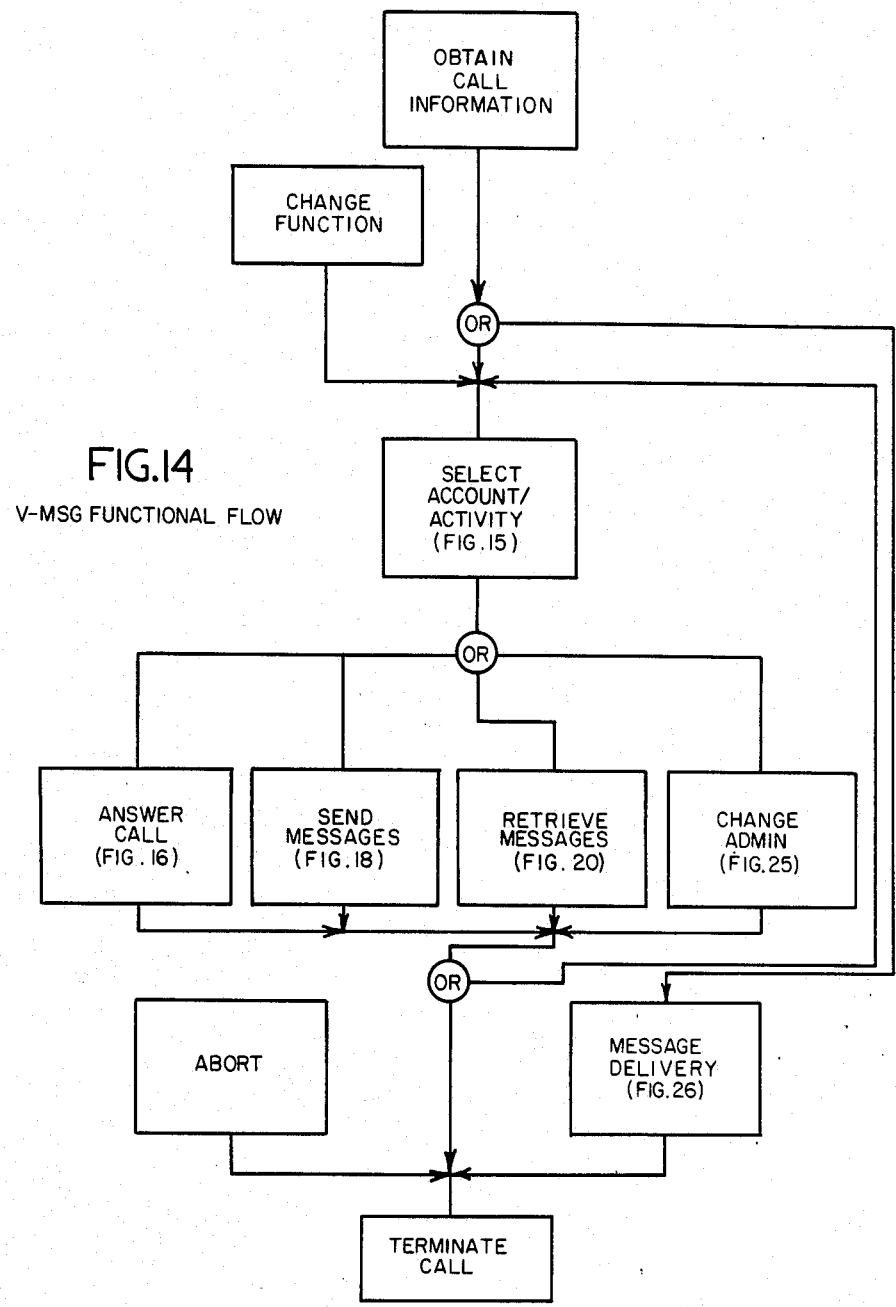

SELECT ACTIVITY FUNCTIONAL FLOW

FIG.16 ANSWER CALL FUNCTIONAL FLOW

EDIT MESSAGE FUNCTIONAL FLOW

SEND MESSAGES FUNCTIONAL FLOW

ACCEPT/EDIT DELIVERY INSTRUCTION FUNCTIONAL FLOW

RETRIEVE MESSAGES FUNCTIONAL FLOW

REVIEW INBASKET FUNCTIONAL FLOW

REPLY FUNCTIONAL FLOW

REVIEW OUTBASKET FUNCTIONAL FLOW

AMEND MESSAGE FUNCTIONAL FLOW

FIG. 25 ADMIN FUNCTIONAL FLOW

TELEPHONE DELIVERY FUNCTIONAL FLOW

AUTOMATED TELEPHONE VOICE SERVICE SYSTEM

BACKGROUND OF THE INVENTION

1. Field of the Invention

This invention relates to an automated telephone voice service system and more particularly to such a system which provides automatic recording and editing of voice messages as well as forwarding of recorded voice messages to other accounts and telephone numbers with or without operator assistance.

2. Discussion of the Prior Art

Voice responsive telephone service systems have traditionally meant either a telephone answering service or a forwarding service. Early telephone answering service systems connected individual secretarial lines to an operator plug board. Upon activation of one of 100 or more lines coming into an operator station an operator answered the call by making an appropriate plug connection between the active line and an operator headset. Upon identification of an active line the operator could access a corresponding client file to obtain a greeting for reading to the caller. The operator could then proceed to answer questions from information from the client file information or take a handwritten message for storage in a client pidgeon hole until the client called in to retrieve his messages.

Telephone answering systems have subsequently been improved by providing the service operator with a semi-automated terminal to which calls are automatically directed. The line to be answered is automatically identified and corresponding client data is presented to a visual display for use by the operator in answering the call. Any received messages may be keyed into the system for storage in association with the client's account until the client calls to retrieve his messages.

While such a system affords considerable improvement over the early plugboard answering systems, it remains limited to a basic telephone answering mode in which limited client information may be presented to a client and messages may be manually recorded for later retrieval by the client.

The forwarding services provide a somewhat different but still limited telephone service function. These services include store and forward services and call forwarding services. The store and forward services enable a client to record a message and designate a number of persons or telephone numbers for delivery of the message. Delivery instructions can specify dates and times for message delivery. The operator then proceeds to call the indicated persons or numbers in accordance with the delivery instructions and upon completing a call, play the prerecorded message. Such a system permits recording of a message at one time for delivery at another time, but still requires operator assistance.

Call forwarding on the other hand can be completely automated, but merely forwards an incoming call to a previously designated telephone line. Such a system cannot process the call if either the originally called line or the forwarded line are busy and cannot process a message at different times which are respectively convenient to the calling and called parties.

SUMMARY OF THE INVENTION

An automated telephone voice service system in accordance with the invention includes a data store coupled to store and retrieve voice messages at each of a plurality of individually addressable message baskets therein and a control system providing a selective coupling between the store and each of a plurality of telephone lines of a telephone network. The control system is responsive to different data signals received over a particular one of the telephone lines to associate the particular telephone line with a particular message basket, to store in the particular message basket a voice message received over the particular telephone line, to forward a voice message stored in the particular message basket to at least one other of the individually addressable message baskets, and to forward a voice message stored in the particular message basket to at least one telephone line.

The service system is implemented with a high reliability fail soft data processing system in which duplication of processing system components enables a function of a failed component to be transferred to another component to assure that no single failure disables the entire system. The major processor subsystems include a real-time subsystem providing interactive coupling to the analog telephone lines, an interactive services subsystem providing a coupling to input-output devices such as terminals, tape drives, and printers, a file services subsystem hosting a plurality of disk drives, an information processing subsystem providing a sophisticated general multiprocessor capability and an executive services subsystem providing communication and coordination between the other subsystems.

The real time subsystem provides the signal generating, signal detection and interface circuitry necessary for connection to several different physical and functional types of standard network telephone lines. The physically different types of lines include, two-wire lines, four-wire lines, pay telephone lines, operator lines and concentrator lines. The functionally different lines include secretarial lines which are usually coupled through a concentrator and function as jumped extensions of client telephone lines, and direct inward dial lines having virtual connections between an incoming line at a telephone switching office and a called telephone at a customer location (i.e. the telephone voice service system). Plural trunking connections to the service system concentrator and to the direct inward dial lines enable multiple calls to the same number to be processed simultaneously by the service system. Instead of a second or third caller to a given phone number receiving an irritating busy signal, the caller receives a prompt and efficient automatic response.

At the service system particular lines may be internally assigned predetermined designated functions. For example, some of the lines may be designated direct incall lines with each being assigned a predetermined association with a particular message basket. Such a line is controlled only in a telephone answering mode with a caller being greeted by a client selected voice message which may be in the client's own voice and changed at will and then invited to leave a voice message in the associated message basket upon the generation of a tone signal. Callers familiar with the system may edit the voice message using Touch Tone commands, but no editing prompts are provided. There is thus no confusion of callers who are unfamiliar with the system and who wish to simply record an unedited voice message upon the occurrence of the tone.

General incall lines are operated in a telephone answering mode in a manner similar to the direct incall lines except that the general incall lines do not have a unique, predetermined association with a particular message basket. A caller is prompted to enter through the telephone keyboard dual tone multiple frequency (DTMF) data signals defining commands which select a particular message basket code or address. A voice communication coupling between the calling telephone line and the selected particular message basket is then created by the telephone service system.

Other telephone lines may be assigned as direct or general recall lines which afford a client access to account ownership functions afforded by the system. As with the incall lines each direct recall line is associated with a single predetermined message basket while a general recall lines requires entry of a message basket code identifying a desired message basket. Security is maintained by enabling account ownership activities only after a personal identification code has been entered which corresponds to an associated message basket. Added security may be implemented for a direct recall line by requiring entry of a second field of a personal identification code before account ownership activities are enabled. The second field is separated from the first field by a number sign key center and may be changed at any time by the account owner. Account entry thus requires a caller to have knowledge of the direct recall telephone phone number, the first field of the personal identification code associated therewith, and if used, the second field of the personal identification code.

Account ownership activities include retrieval of messages, forwarding of messages, and administrative functions such as the recording of a new greeting, the changing of answering criteria for a secretarial line or the changing of the second field of the personal identification code. Each message basket is divided into two parts, an inbasket which stores messages from outside callers and an outbasket which stores messages for forwarding to other inbaskets or telephone lines. Data storage space is conceived by storing only a single copy of an outgoing voice message in the client's outbasket, even if the message is to be sent to many different parties.

If the message is to be sent to other message baskets a code is placed in the inbasket of each inbasket portion thereof identifying the particular voice message in the particular outbasket of the sending client. If the message is to be communicated over one or more telephone lines, the outbasket message is simply accessed as the calls are initiated. This arrangement also enables a client to retain ownership of a message so that a message can be changed or deleted until it has actually been delivered.

As a message is delivered to another service client the recipient can direct that the message be stored in the recipient's inbasket for future reference and can automatically direct a voice message reply back to the sender with or without the original message attached.

A general access line affords a caller access to all voice service system functions. Any message basket may be selected for leaving a message therein by entering the message basket number code therefor and entry of a personal identification number code enables access to account ownership activities. To minimize errors and enable the service system to readily distinguish between different types of data sets, different data sets are required to have mutually exclusive code ranges. For example, one digit defines a delivery code selecting a predetermined set of voice message delivery instructions, two digits define a predetermined distribution list, three to nine digits define a message basket number and ten or more digits define a telephone number including the area code even for a local number. A personal identification number code must be preceded by an asterisk (*) and may have any reasonable number of digits within predetermined limits for the system, for example 3-15. All data sets are terminated by an # (enter) key or a 5 second time out.

In the event a system user requires assistance, more detailed voice message prompts are initiated by keying *0 and communication with a voice message operator can be commanded by keying *20. In the event that a client calls the system from a dial telephone, the service system detects a telephone company signal identifying a dial telephone line as the source of the call and automatically connects a service system operator to the line. The telephone service system in accordance with the invention thus provides a sophisticated user controlled system for the receipt and delivery of voice messages with an operator being required only for exceptional circumstances.

BRIEF DESCRIPTION OF THE DRAWINGS

A better understanding of the invention may be had from a consideration of the following Detailed Description taken in conjunction with the accompanying drawings in which:

FIG. 13 is a flow diagram of telephone keyboard command operations.

FIG. 14 is a voice messaging functional flow diagram for the service system shown in FIG. 1;

DETAILED DESCRIPTION GENERAL BACKGROUND

Figure 1:
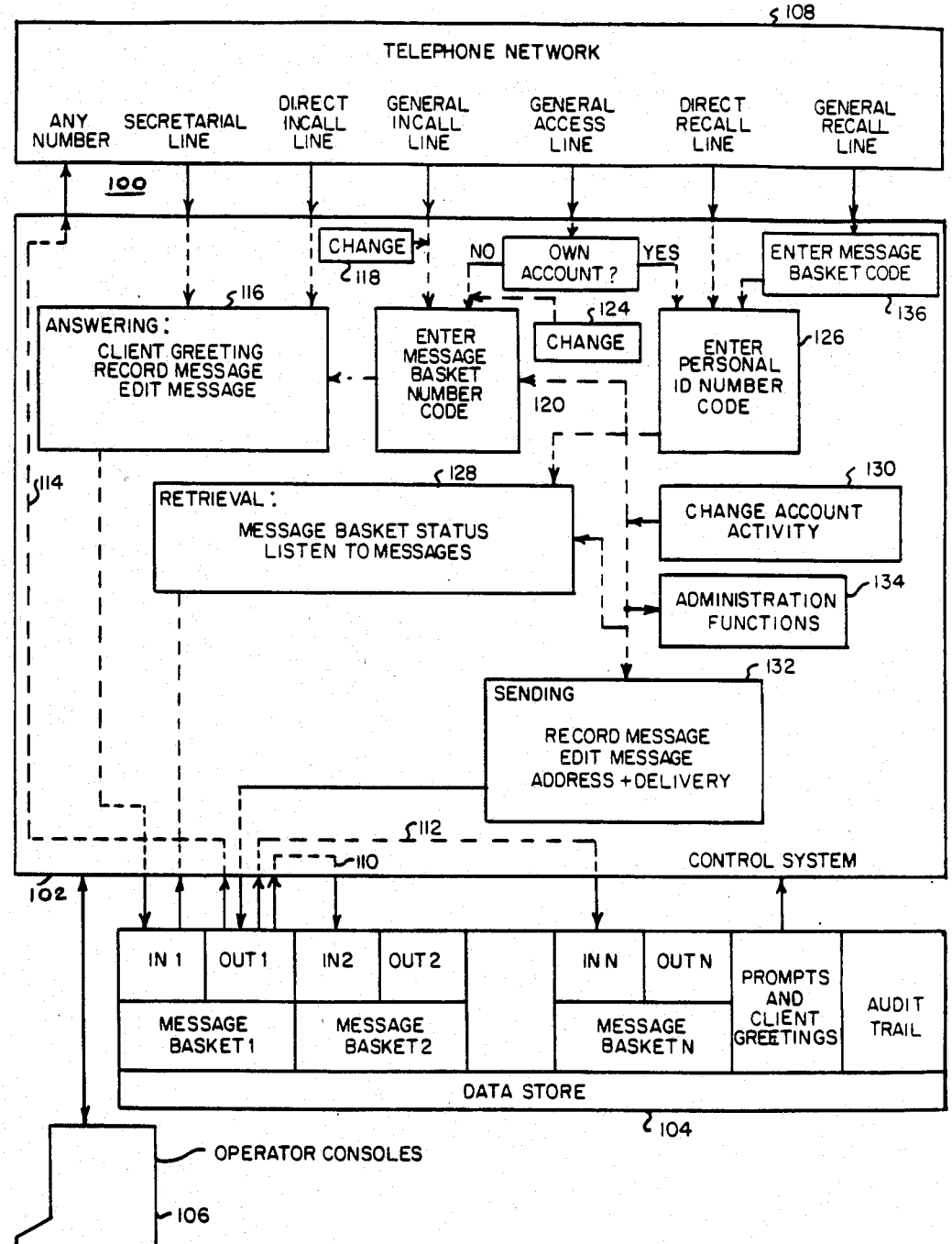
FIG. 1 is a functional block diagram representation of an automated telephone voice service system in accordance with the invention.

Referring now to FIG. 1, an automated telephone voice service system 100 according to the invention includes a control system 102 coupling a data store 104 and one or more operator consoles 106 to a standard telephone network 108 which may represent all of the interconnectable telephones throughout the United States and the world. The data store 104 is shown as a single functional block divided into a plurality of addressable units. However, as is conventional the data store 104 may be physically implemented as one or more magnetic or electronic storage devices and may be distributed throughout a data processing system. Data store 104 provides storage for a plurality of addressable message baskets designated message basket 1 through message basket N, a plurality of individually addressable voice message prompts and client greetings, and an audit trail for each client accessing the system 100.

Each message basket provides storage for a plurality of voice messages and is segregated into an inbasket section and an outbasket section. Each inbasket section stores voice messages and message forwarding notices directed by system users to client owners of the associated message basket. The inbasket of each message basket functions in a manner analogous to a recording mechanism for a telephone answering machine.

The outbasket portion of each message basket receives voice messages generated by the message basket account order for forwarding to selected other message baskets or to telephone network 108 users at indicated telephone numbers. The forwarding of a message from an outbasket to an inbasket as represented by arrows 110, 112 is accomplished automatically without human intervention while the forwarding of a message from an outbasket to a telephone network 108 user at a selected telephone number as indicated by arrow 114 may be accomplished either automatically or semiautomatically with operator assistance as required for compliance with the instructions of the client account and applicable state law. For example, in a fully automatic mode, the control system 102 can operate to call the indicated telephone number and upon its being answered, communicate an appropriate recorded voice message prompt, communicate the voice message being sent, and then terminate the call. As an example, the voice message prompt might inform the person answering the telephone at the indicated number that the person is about to receive a prerecorded message from John Doe, the account owner. This mode of operation enables the account owner to record a single message in his outbasket and have the message broadcast to one or thousands of designated recipients without any further effort by the account owner. The account owner, when setting up, or modifying his account, establishes predetermined distribution lists and sets of delivery instructions, each having a different selection code number. The delivery instructions can cover such features as days of the week and time intervals during which delivery may be made, number of retries, and whether the forwarding of the message is to be accomplished automatically or semiautomatically with operator assistance.

In the semiautomatic mode, the control system 102 waits for delivery conditions to be met, and then obtains ownership of an active operator console including a terminal having a keyboard and a video display unit and an operator headset. The control system 102 informs the operator through the console 106 that a semiautomated message forwarding operation is to be undertaken and displays a prompting message for the operator to read. Upon command, the control system 102 generates the Touch Tone signals corresponding to the recipient's telephone number and connects the operator console 106 to the line when it is answered. The operator informs the answering party of the call, asks to talk to a particular person at the called telephone number if appropriate, and secures the permission of the called party to forward the voice message. The operator then commands the control system 102 to communicate the voice message stored in the outbasket to the called telephone line as indicated by arrow 114.

For voice messages forwarded to another inbasket rather than to a telephone number, the voice message is not actually recorded in duplicate in each of the designated inbaskets. Instead, a notification is merely stored in the inbasket which indicates that a forwarded message is stored by the system for delivery to the owner of the forwarding message basket. The notification indicates the particular outbasket and the particular message within the outbasket which is being forwarded. This enables the person sending the message to retain ownership of the message in his own outbasket and selectively change or delete the message until it has actually been delivered. Depending upon the delivery instructions of the sender and the preselected instructions of the recipient, a forwarded message might simply wait for delivery until the recipient retrieves the messages stored in his inbasket at some point in time. Alternatively, the recipient might be informed of the receipt of a message in his inbasket by a paging signal communicated over a paging system (not shown), by the illumination of an indicator light at the recipient's telephone, or by a telephone call to the recipient's telephone number informing the recipient by a prerecorded message that a message has been received in the recipient's inbasket.

The prompts and client greeting section of data store 104 stores a plurality of individually addressable voice message prompts explaining how to operate the voice message service system 100 and a client greeting for each inbasket. A voice message prompt is prerecorded for each anticipated state at which a caller might access the voice service system 100. These prompts provide an explanation as to how the user should proceed from the particular point of use and are accessed by the control system 102 and communicated to the user as appropriate. At any point, a knowledgeable user may override the prompt by inserting a command without taking the time to listen to a complete prompt message. The client greetings are provided as an answer mode for message storage accesses to each of the system inbaskets. Each client may record and change his own personal greeting at will. This enables the greeting to include current information such as telephone numbers at which the client can be reached for a given period of time, indications that the client is on vacation for a given period of time, indications as to when the client will return to his office and so forth. In the event that a client fails to have recorded a preestablished client greeting, a general system greeting is provided in its place. The system greeting invites the caller to leave a message but does not identify the specific owner of the inbasket which has been accessed by the call.

The audit trail portion of data store 104 stores a record for each caller accessing the system 100 of the command signals which have been given to the system 100 by the caller. This record enables the control system 102 to select particular voice message prompts in accordance with the current state of the calling line. In addition, in the event that a calling party requests operator assistance, the audit trail record is displayed on the video display unit of a selected operator console 102 so that the operator selected to give assistance can see immediately the state of the calling line, and what attempts have been made by the calling party to control the system 100. This enables the operator to more readily determine what mistakes have been made by the calling party and what needs to be done to place the system in the state desired by the calling party.

The major functions which are performed by control system 102 are indicated by a plurality of functional blocks shown within the outline of control system 102. The particular functions executed by control system 102 depend upon by which one of the functionally different types of telephone lines the control system 102 is accessed and upon which keyboard commands are entered by a person accessing the voice messaging system 100.

A secretarial line is effectively an extension of a client's normal use telephone line. The client's line may be utilized for receiving and placing telephone calls in a normal manner. The control system 102 responds to an incoming call on a secretarial line by waiting for a predetermined number of rings which may be preselected by the client in accordance with the day of the week, and time of day, and then answering the telephone.

Upon answering the telephone as indicated by answering function 116 the client greeting is accessed in data store 104 and communicated to the caller. The caller is invited to leave a recorded message which is then recorded and stored in the client's inbasket if a message is generated. Because the caller could quite possibly be a person who is not a client of the voice message service system 100 and is totally unfamiliar with its operation, no prompts are provided to the caller with respect to the editing of any message which is left in the client's inbasket. Such prompts might prove to be bewildering and confusing to any nonclient caller. However, a sophisticated caller who is familiar with the voice service system 100 is free to use normal system editing commands which enable the caller to edit the voice message. Upon completion of the message or upon the occurrence of a client selected timeout duration, the call is terminated and the message remains in the client's inbasket until retrieved by the client.

Another type of line upon which a call might come into the voice answering system 100 is a direct incall line. A direct incall line is responded to by control system 102 with answering function 116 in a manner similar to a response to a call on a secretarial line. The principal difference between the secretarial line and direct incall line is that a direct incall line is dedicated to the particular inbasket of the client and is not available for general use by the client. Typically there is no reason for waiting for a specified number of rings before answering a direct incall line and such a line is answered as soon as it becomes active.

A general incall line is similar in nature to a direct incall line except that the general incall line is not associated with any particular message basket or inbasket thereof. Upon accessing the system 100 through a general incall line, a caller is prompted to enter a message basket number which number associates the incall line with a particular inbasket and causes control system 102 to transfer control of the call to answering function 116. Operation then becomes functionally equivalent to the secretarial line and direct incall line except that at any time the caller may command a change function 118 which enables the caller to enter a new message basket number code and thereby associate the general incall line with a different message basket and enable the caller to leave a message with the newly selected inbasket in accordance with answering function 116.

A general access line is intended primarily for clients of the voice service system 100 and affords the broadest range of system functions. Upon calling in on a general access line, a caller is prompted to either enter a message basket number if he desires to leave a message in another's inbasket or to enter his own personal ID number if he desires to have access to the ownership privileges of his own account as indicated by own account function 120. If the caller elects the enter message basket number code function 120, operation of the system is functionally equivalent to the response to a general incall line. Execution of a change function 124 enables the caller to select a new system inbasket in a manner functionally equivalent to change function 118.

If the caller on a general access line selects the enter personal ID number code function 126 instead of the message basket number code function number 120, the caller is granted immediate access to a message retrieval function 128 for the inbasket portion of his own message basket. The message retrieval function 128 informs the caller whether or not there are any messages within his inbasket and, if there are, begins communicating the voice messages over the connected telephone line on a last in first out basis. Before each message is retrieved, the caller is informed of the age of the message on a lapsed time basis. For example, the system might inform the caller that the message was recorded fifteen minutes ago and then begin relaying the message. This lapsed time indication avoids any uncertainties which might arise from different time zones and the caller may obtain the exact time for receipt of a message with operator assistance. As a caller retrieves his messages, he may utilize the editing commands to rapidly scan through the messages before listening to the messages more carefully a second time or may on an individual basis command that each message be saved or cleared. After each message is relayed the caller may also direct, at the caller's option, a reply to the sender, a forwarding of the message to one or more other parties. The caller may also simply go on to the next message, with the present message being saved or cleared at the option of the caller. After reviewing the incoming messages, the caller is informed of the status of any outgoing messages in the caller's outbasket which are awaiting delivery. At any time during this process the caller may execute a change function 124 to leave a message at another's inbasket or an account activity change function 130 which enables the caller to select one of the ownership functions. The control system 102 retains the originally entered personal ID number code and does not require reentry of this code. Upon executing an account activity change function 130 the client may selectively return to the retrieval function 128 or may command a sending function 132. In response to selection of the sending function 132 the control system 102 prompts the caller to record a voice message in the caller's outbasket by initiating a talk command. During the recording of such a message all of the edit functions are available to the caller. Upon completion of the message the caller enters a save command and is then prompted to enter an address code. The address code is a two digit code which identifies a preestablished list of up to 99 addressees for the voice message. Each of the 99 entries on the address list or distribution list may in turn be another list of up to 99 addresses, thus permitting a distribution list of almost 10,000 addresses in total. Upon selection of a distribution list, the caller is prompted to enter a one digit code selecting a preestablished set of delivery instructions for the message. For example, the instructions may specify that delivery be made only during certain designated days or times such as normal business hours in the calling party's time zone or a different time zone. Upon completion of the sending function the calling party may again execute a change command 124 or 130 to execute other voice messaging functions. For example, the caller may wish to access one or more of the administration functions which are available to an account owner. These functions include changing the greeting for the inbasket message, changing the conditions under which a secretarial line is answered and so forth.

The control system 102 also provides connection to a direct recall line which is the counterpart of a direct incall line in that it is associated with a particular message basket but enables the account ownership function instead of the answering functions. Upon answering a direct recall line, control system 102 executes the enter personal ID number code function 126 and functional execution, then proceeds in the same manner as if a caller on a general access line had elected the enter personal ID code function 126. A general recall line is the counterpart to the general incall line and requires execution of an enter message basket code function 136 before advancing system control to the enter personal ID number code function 126 as with a direct recall line.

The direct recall line is of advantage in that it provides a higher security for access to the system because the caller must know both the telephone number of the direct recall line and the personal ID number code associated therewith. Each personal ID number code must be preceded by an asterisk symbol to identify it as such. Even further security may be provided by requiring a two field personal ID number code with the two fields being separated by a number sign (enter) key. The second field, if elected, may be changed at will by the client owner as one of the administration functions 134.

Figure 2:
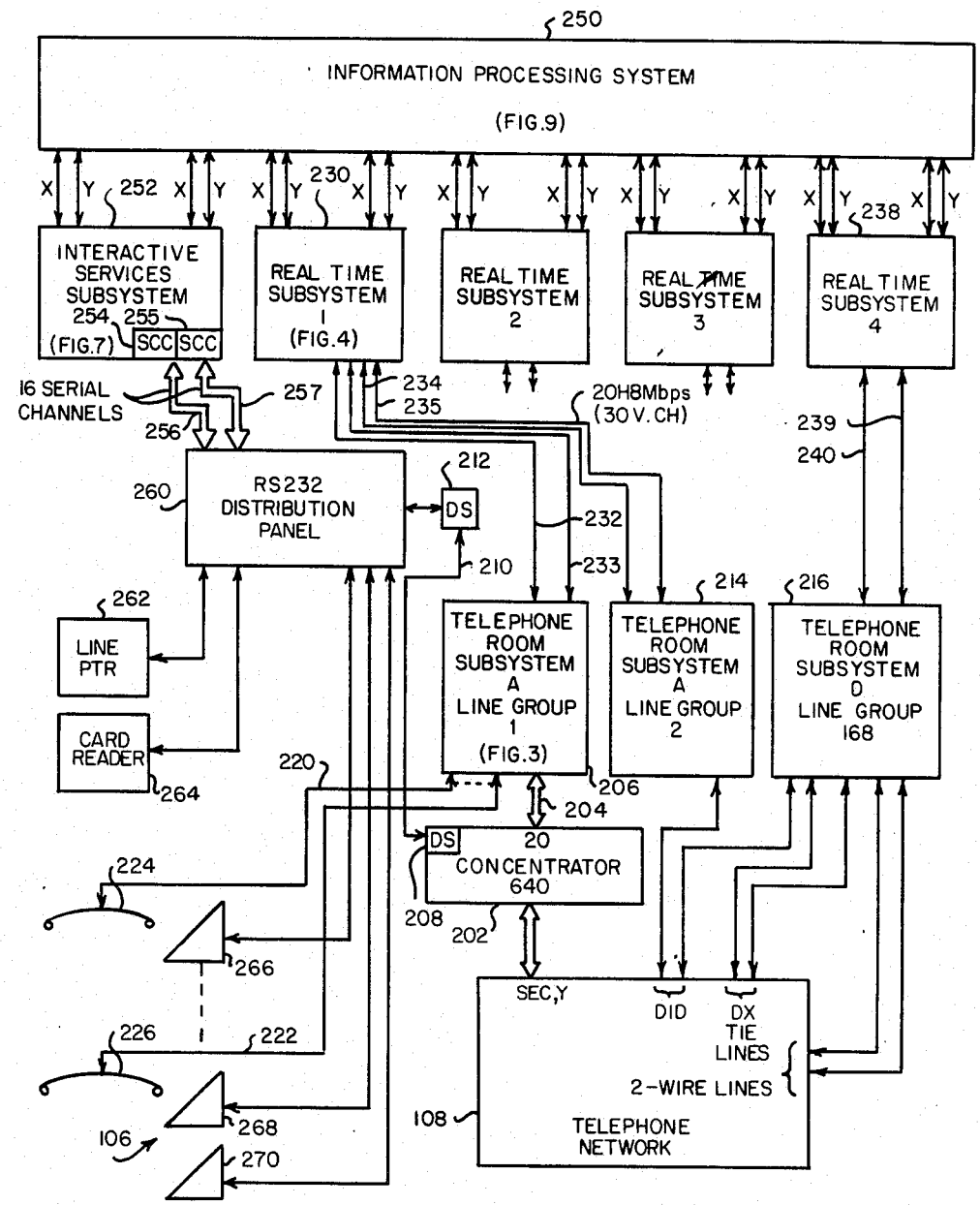
FIG. 2 is a block diagram representation of the system architecture for voice service system shown in FIG. 1.

The system architecture of the telephone voice service system 100 is shown in block diagram form in FIG. 2 to which reference is now made. The telephone network 108 provides a number of physically different types of telephone lines to which connections must be made by the service system 100. By way of example, these different types are shown as including secretarial lines, direct inward dial lines, DX tie lines, and 2-wire lines. Connections are also provided for six wire operator stations. In the present example the different lines are shown to be connected rather arbitrarily to illustrate the maximum size of the system.

Up to 640 secretarial lines are connected to a concentrator 202 which selectively connects the voice information carried by these 640 secretary lines through 20 trunk lines 204 to a telephone room subsystem line group 1 processing circuit 206. Only analog voice information is carried by the trunk lines 204. Control commands and data such as trunk and line identification information, ringing signal indications, connection commands, and execution confirmation signals are communicated through a data set 208 within concentrator 202 over a serial data line 210 extending between data set 208 and a data set 212.

A telephone room subsystem A, line group 2 processing circuit 214 is illustrated as connecting to a direct inward dial line while a telephone room subsystem D, line group 168 processing circuit 216 is shown as being coupled to one direct inward dial line, two DX tie lines, and two 2-wire lines. Each represented telephone line is assumed to be a bidirectional full duplex line.

The concentrator 202 and each of the telephone room subsystem line groups 206, 214, 216 are physically located at one or more telephone company central offices or client PABX centers. The system can accommodate up to four telephone room subsystems with up to 42 line groups being associated with each telephone room subsystem. Each line group can in turn accommodate up to 8 operator telephone lines and up to 22 telephone trunks or lines of another type. It is thus possible for each telephone room subsystem to connect to up to 1260 voice grade circuit terminations with the maximum of 4 telephone room subsystems providing in total connection to 5040 voice grade circuit terminations. Multiple lines may be assigned to a given data source to provide a capability of higher bandwidth than the single voice grade line. In the present example, the telephone room subsystem A line group 1 206 is coupled through the 20 trunks 204 to concentrator 202 and also through a maximum of 8 operator lines 220, 222 to operator headsets 224, 226 at a plurality of operator consoles 106.

The telephone room subsystems operate as interfaces between the digital portion of the telephone voice service system 100 and the analog telephone lines and trunks. They provide analog-to-digital conversion of the voice signals, detect and generate DTMF data and command signals, detect and generate dial pulses, and communicate the telephone line information to an associated real time subsystem over one of two redundant 2.048 megabit per second time division multiplex serial data channels. The 30 lines to which a line group processing circuit may connect are each assigned to a different voice channel while the control information for all of the lines as well as the line group is carried by a single channel. A 32nd channel is utilized to synchronize the serial data links.

In the present example telephone room subsystem 206 is coupled to real time system 1 230 by a pair of redundant serial data links 232, 233. Similarly, line group 2 214 is coupled to real time subsystem 1 230 by a pair of redundant serial data links 234, 235 and line group 168 216 is coupled to real time subsystem 4 238 by a pair of redundant serial data links 239, 240.

Up to 4 real time subsystems receive the voice and control data from the 4 telephone room subsystems, provide selected switching connections between channels, and communicate with an information processing system 250 for storage and retrieval of voice messages and system control. The real time subsystems also perform any signal processing such as silence compression upon the voice signals.

An interactive service subsystem 252 provides a communication connection between the information processing system 215 and input/output devices for the voice service system 100. Interactive service subsystem 252 is illustrated as being coupled through two serial channel controllers 254, 255 and two sets of 16 serial data channels each 256, 257 to an RS 232 serial distribution panel 260. Distribution panel 260 provides serial data connection to up to 32 different devices. It is representatively shown as connecting to a line printer 262, a card reader 264, to the keyboard display terminals 266, 268 and 270 within operator consoles 106 and to the data set 212. It will be recalled that the data set 212 carries the control and data information between concentrator 202 and the information processing system 250.

Figure 3:
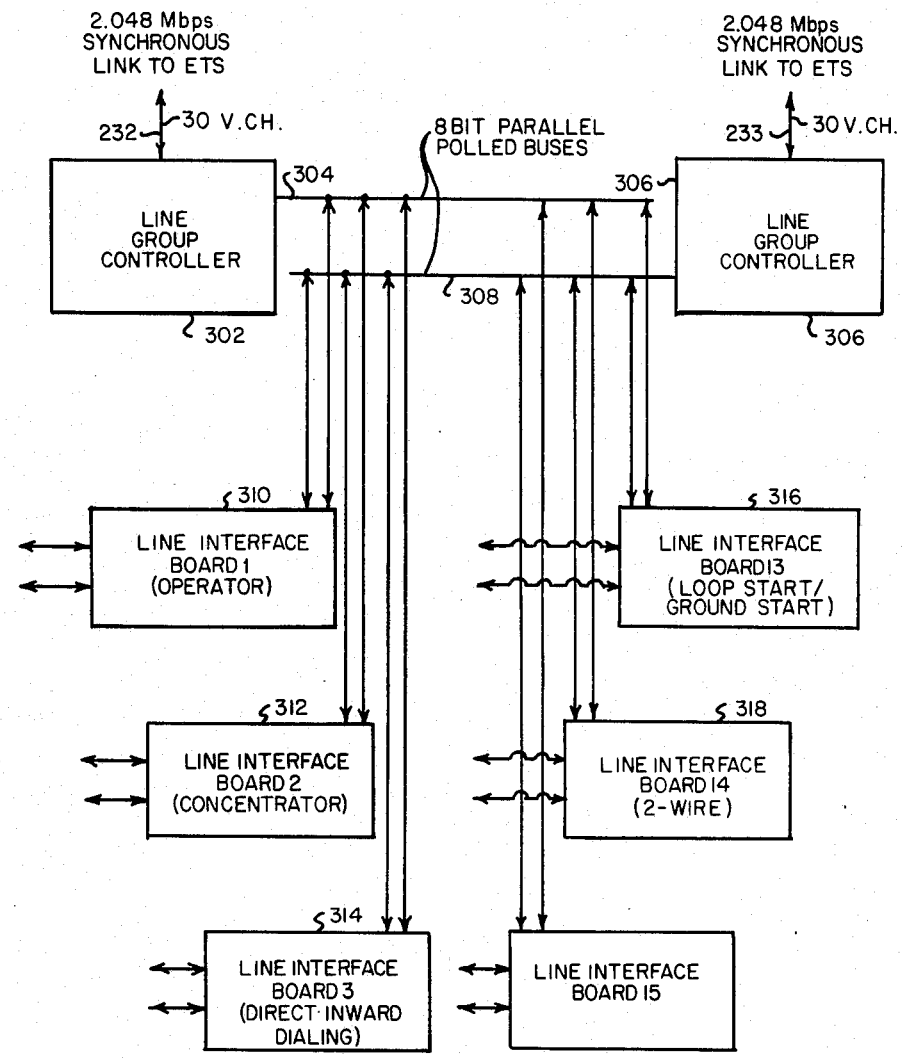
FIG. 3 is a block diagram representation of a telephone room subsystem line group used in the telephone voice service system shown in FIG. 2.

As shown in FIG. 3, the telephone room subsystem A line group 1 206 includes a line group controller 302 connected between the 2.048 MBPS 30 channel synchronous data link 232 and an 8 bit parallel poled bus 304 and a second line group controller 306 connected between the 2.048 MBPS 30 channel synchronous data link 233 and an 8 bit parallel poled bus 308. Only one of the line group controllers 302, 306 provides active communication with the real time subsystem 1 230 at any one time. In the event that the active line group controller fails, the other immediately assumes the duties thereof to continue uninterrupted communication between the connected telephone lines and the information processing system 250. The active line group controller poles the line interface boards connected to the associated bus for voice channel data and upon receiving data, inserts the data into a preassigned one of the 30 time division multiplex voice channel data slots on the synchronous data link 232 or 233.

Each line group provides bus 304, 308 connection to up to 15 line interface boards, each of which may couple to two different analog telephone lines. Each of the line interface boards is generally similar in construction except that certain variations are required in order to interface with the different kinds of telephone lines to which a line interface board may connect. A variety of different line interface board types have been illustrated in FIG. 3 to demonstrate the different types of boards which might be included in a voice for service system. For example, line interface board 1 310 is an operator type of line interface board and is somewhat simpler than other types of boards in that it need carry no signaling functions since these are accommodated through the keyboard display terminals such as terminal 266.

The line interface board 310 interfaces two separate operator positions to the real time subsystem 230. Line interface board 310 provides battery feed circuits for powering two operator headset microphones at each position and amplifier circuitry for driving two sets of headset earpieces at each position. Functional circuits located on line interface board 310 include redundant power supply inputs, two separate current limited −48 volt battery feeds per circuit, a circuit providing a side tone fixed at −26 db for each headset circuit, a circuit providing audio mixing of headset microphone inputs, a circuit providing 4-wire operation separate receive and transmit voice paths, and an onboard MU-LAW codec. The MU-LAW codec provides conversion between the 13 bit digital sample of an analog voice signal and an 8 bit byte representation thereof to enable a single byte of sampled data to have a greater effective range and resolution than would be possible with 255 equal magnitude increments. MU-LAW codecs are well known to those skilled in the art and are not further described herein. Each of the 6-wire interface connections of the line interface board 310 provides headset A transmit tip, headset A transmit ring, headset B transmit tip, headset B transmit ring, headset A and B receive tip and headset A and B receive ring. Two low impedance microphone inputs per circuit (600 ohms or less) will drive two 300 ohm low impedance headsets per circuit.

A concentrator line interface board 2 312 provides connection to two concentrator trunk circuits 204. Concentrator line interface board 312 terminates to "dry" (no line voltage) 2-wire links from concentrator 202. Because system control signals are communicated through the serial data link 210, the line interface board 312 carries no supervisory or control signals except DTMF signals which are communicated through the telephone line. Line interface board 312 includes DTMF signal generating and detecting circuits which respond to or generate the required DTMF signals. These signals are separated from the voice channel information and are communicated to the appropriate line controller during a separate control time slot on the buses 304, 308 and are communicated by the active line group controller to the associated real time system during a separate control information time slot which occupies a 31st channel position on the synchronous data links. The line interface board 312 includes the redundant power supplies and MU-LAW codecs which are found on the operator line interface board 310.

A direct inward dial line interface board 3 314 terminates two 2-wire DII trunks, handles all DTMF signals associated therewith, detects supervisory and control signals and incoming dialed digits. The two incoming lines may be either CO WINK-START or immediate start lines. The direct inward dial line interface board 314 hosts DTMF detection and generation, dial pulse detection, tone and voice envelope detection, and audio switches for call progress tone insertion. Line interface board 314 further includes 48 volt battery feed circuits, redundant power supply input, secondary voltage hazard protection, MU-LAW codecs, 2-wire to 4-wire conversion, and 600 ohm or 900 ohm line impedance selected by a strapping option. Also included on each DID line interface board 314 is a fixed compromise network, a loop current indicator light emitting diode, a wink and immediate start strap option, a reverse battery indicator light emitting diode, a reverse battery front panel switch and test jacks for 2-wire testing. CO tip and CO ring wires are interfaced for 2-wire circuits. A loop start/ground start line interface board 316 terminates two pay station telephone number conventional lines. It can accept incoming calls as well as seize a line to dial outgoing calls and handle all DTMF, supervisory and control signals. A 2-wire line interface board 318 interfaces two CO loop-start or ground-start trunk lines. The 2-wire interfaces provide CO tip and CO ring. The onboard functions include DTMF detection, tone and voice envelope detection, 2-wire to 4-wire conversion, loop disconnect dialer, a loop-start or ground-start operation which is DIPSWITCH SELECTABLE, a 600 ohm or 900 ohm strap selectable line interface, a fixed compromise network, a loop current indicator light emitting diode, test jacks for 2-wire testing, redundant power supply inputs, secondary voltage hazard protection, and onboard MU-LAW codecs.

Figure 4:
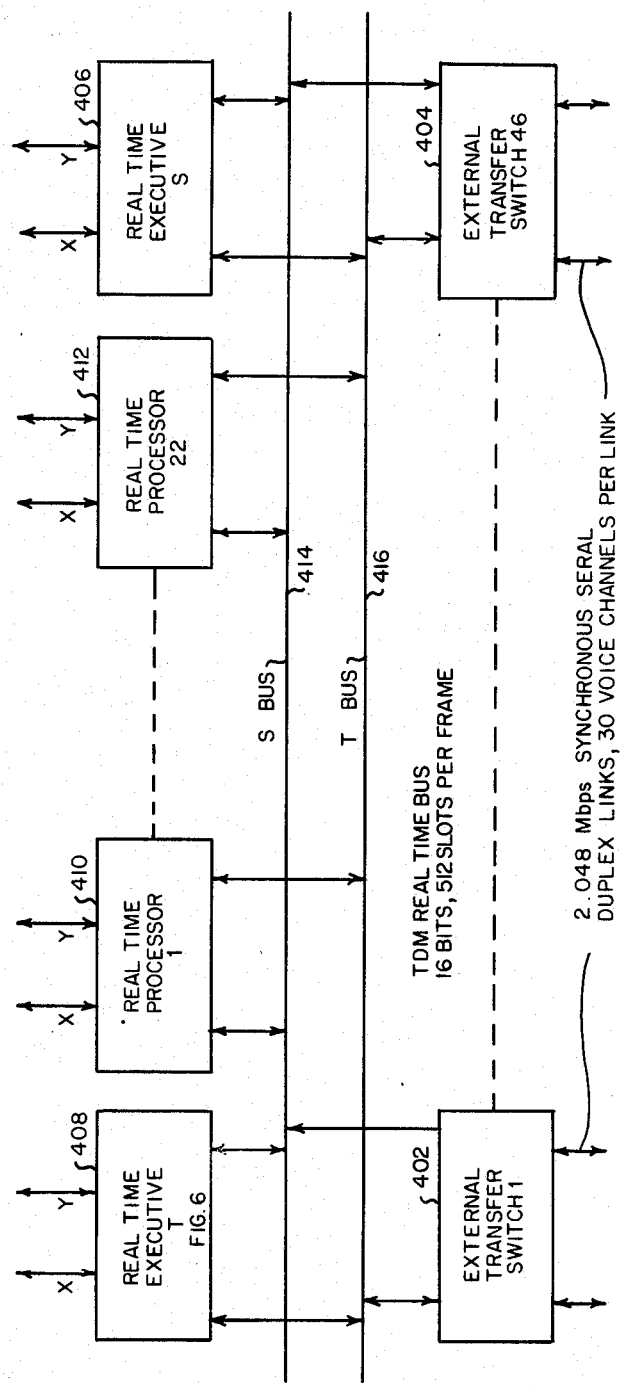
FIG. 4 is a block diagram representation of a real time subsystem used in the telephone voice service system shown in FIG. 2.

The real time subsystem 230 is representative of each of the real time subsystems and is shown in FIG. 4 as including a minimum of two and a maximum of 46 external transfer switches 402, 404. Each of the external transfer switches is coupled to both an S bus which is controlled by a real time executive S 406 and a T bus which is controlled by a real time executive T 408. At least two and not more than 22 real time processors 410, 412 are also coupled to the S and T buses. The real time processors 410, 412 are identical to the real time executives 406, 408 except that the bus control functions are not implemented on the real time processors 410, 412. The S and T buses are each time division multiplex real time buses which are 16 data bits wide and operate in repetitive frames with 512 slots per frame. Only one of the buses is operative at any given time with the other being available as a hot standby in the event of a failure on the first bus.

The external transfer switches 402, 404 provide an interface between the 2.048 MBPS serial data links and the S and T buses 414, 416. Each external transfer switch 402, 404 may connect to two high speed data links, each of which carries 30 bidirectional voice channels and one bidirectional control data channel on a time division multiplex basis. In response to system commands the external transfer switches can connect any incoming or outgoing voice channel to any one or more time slots on the S bus 414 or T bus 416.

An any channel to any channel connection scheme thus becomes possible. For example, certain incoming voice channels can be connected to a bus time slot allocated for voice message recording or selected outgoing channels can be connected to a bus time slot allocated to voice message retrieval. An operator line simply appears as one of the voice channels so that an operator can be selectively included in a set of voice connections. A multiparty conference call can be established by simply creating a bus channel for each incoming line and then connecting each outgoing line to all of the corresponding bus time slots for the incoming lines of the other parties. It will be appreciated that a "connection" does not imply a continuous physical connection but only the transfer of voice sample data bytes between select serial data link time slots and select S or T bus time slots.

The real time processors 410, 412 are each comprised of a standard processor module with a real time extension board connected thereto to provide additional processing and data storage capacity. In the voice messaging environment the real time processors provide data compaction by converting PCM encoded bytes of data to run length in coding format and by detecting periods of silence and encoding such periods in a run length encoding format. Data corresponding to periods of silence in excess of one second may be discarded if desired.

As with the real time processors 410, 412, each processor connected to the X and Y executive buses is comprised of a standard processor module and an extension module which extends the processor module and adapts it to a particular function to which the processor is to be dedicated.

Figure 5:
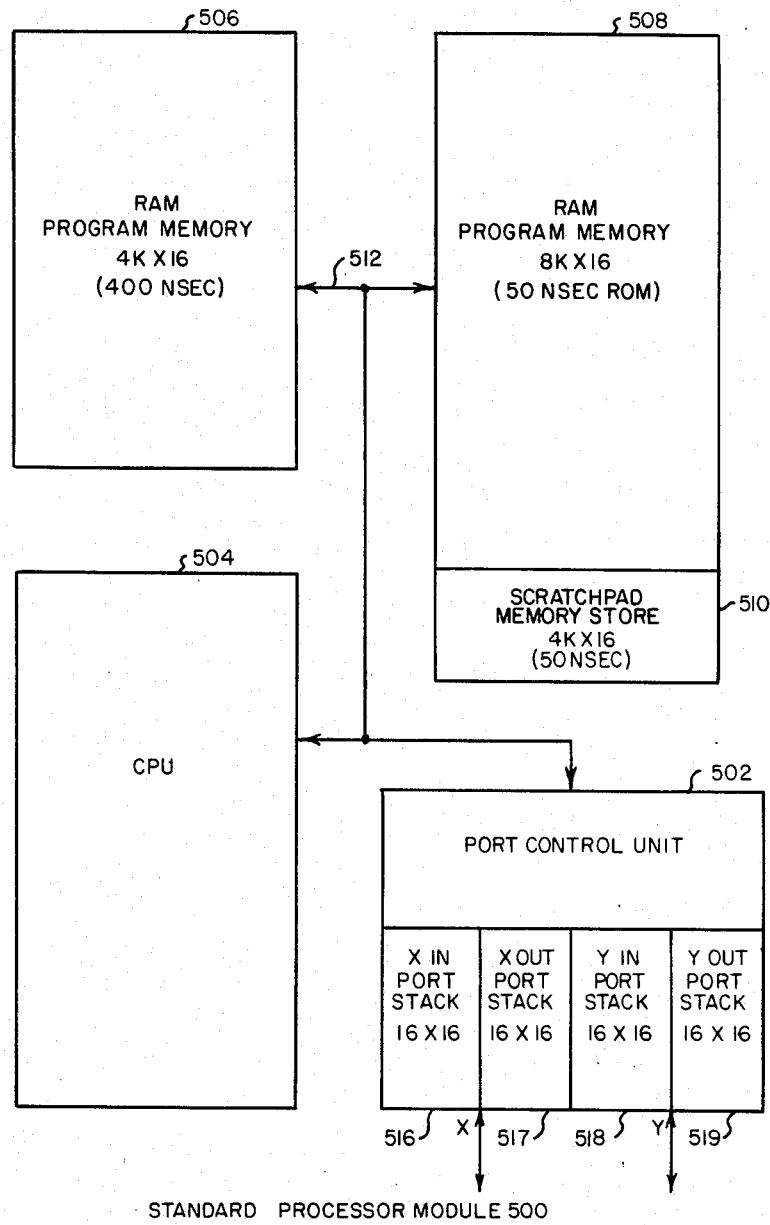
FIG. 5 is a block diagram representation of a standard processor module used in the voice service system shown in FIG. 1.

A standard processor module 500 is illustrated in FIG. 5, by way of example as including a port control unit 502, a CPU 504, a 4k×16 RAM program memory 506, an 8K×16 resident executive ROM program memory 508, and a 4K×16 scratch pad memory store 510 all interconnected by a 16 bit internal data bus 512. The port control unit 502 provides connection to the X bus through a 16 word X inport stack 516 and an X outport stack 517. Connection to the Y bus is through a 16 word Y inport stack 518 and a 16 word Y outport stack 519. The inport stacks 516, 518 each buffer a 16 word data packet as a packet is transferred from the bus to the port control unit while the two outport stacks 517, 519 buffer a 16 word data packet as the packet is being transferred from the port control unit to one of the executive buses.

The CPU 504 provides a basic data processing capability and may have its instruction set extended for special data processing functions by an extension module which connects to the standard processor module 500 and dedicates the standard processor module 500 to a particular processor type.

The 4K scratch pad memory store 510 provides storage for a large number of system variables and permits different sections or pages thereof to be dedicated to particular processes or programs. This eliminates the need for much of the time consuming process of storing process variables for one process or program whenever it is interrupted by another process or program. A basic REX program memory 508 is implemented in ROM to provide on the standard processor module 500 basic executive service functions such as a bootstrap startup program functions, diagnostic analysis, and communication over the executive buses. The 4K×16 RAM program memory 506 permits the standard processor module 500 to receive and store additional program data from other sources such as disk files on an overlay basis.

The standard processor module 500 is a complete computer constructed on a single board. When augmented by one of the several extension unit types, it operates as a processor on the X and Y executive buses. The standard processor module 500 serves as a self-contained functional node in an array of such units inter-linked via the two independent, very high speed bidirectional X and Y data buses. The X and Y buffered data ports operate asynchronously relative to the standard processor module 500 itself. With some exceptions, a full instruction cycle of CPU 504 is 133 nanoseconds, including all accesses to program memory, working registers, port input/output buffers stacks and scratch pad memory.

All standard processor modules connected to the main X and Y buses are logically isolated therefrom by the logic of the port control unit 502. Interprocessor transfers are effected in packets of 16 16-bit words, moved between respective output and input stacks at the instantaneous rate of one word per instruction cycle. Including all overhead, each X or Y main bus in the standard processor module array can maintain an average data rate of about 40 million bits per second. The physical identity of a standard processor module is determined by a 7-bit code permanently wired into each connector (permitting a maximum of 128 boards of all types on the main bus). For communications between processors, a logical bus identification (BID) is used within packets and subsequently translated to the appropriate physical BID immediately prior to packet transfer.

Figure 6:
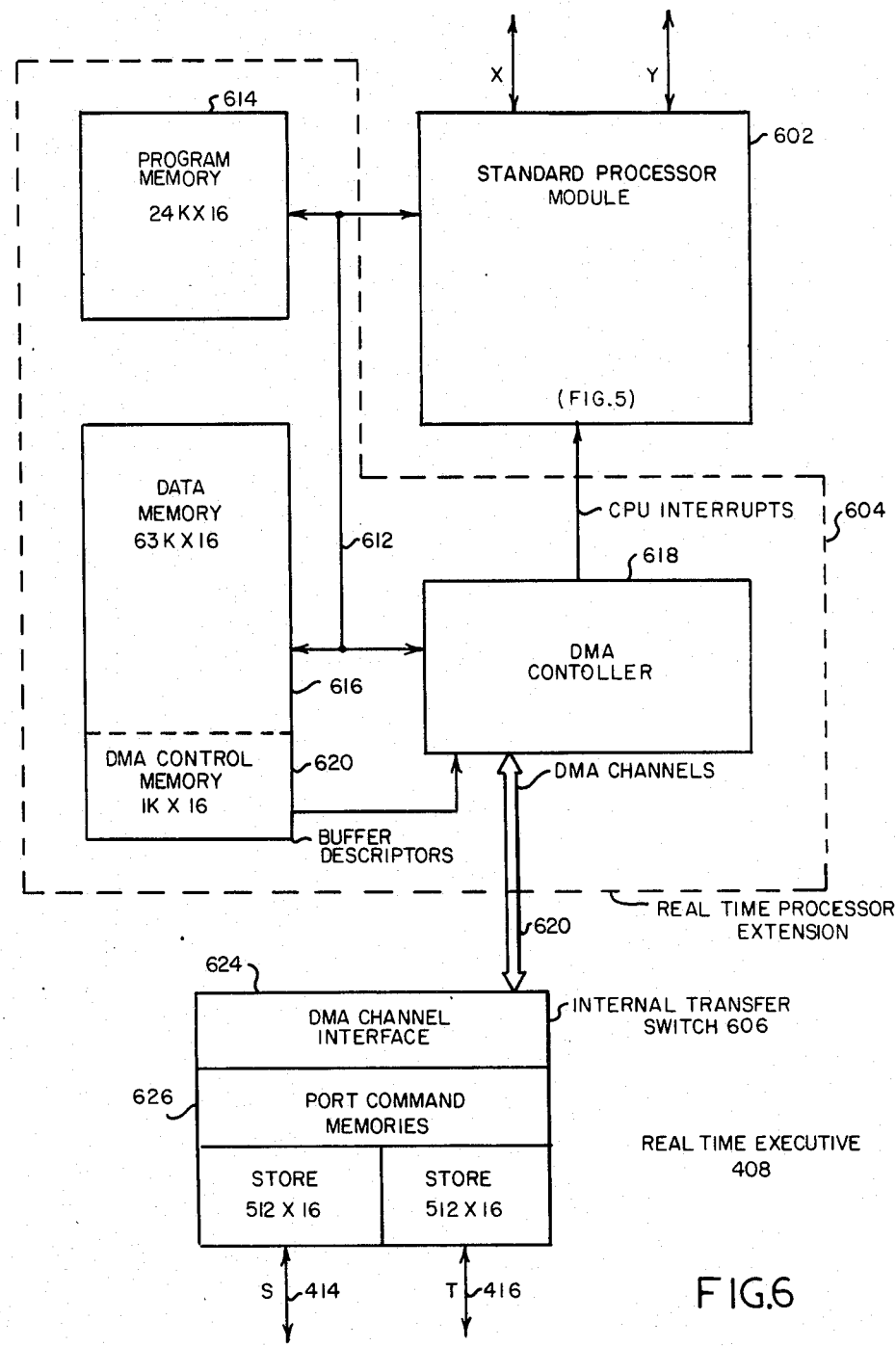
FIG. 6 is a block diagram representation of a real time executive used in the real time subsystem shown in FIG. 4.

The real time executive 408 for the T bus 416 shown in FIG. 4 is illustrated in greater detail in FIG. 6. The real time executives 408 and 406 are essentially the same except that by a strap selection option one is designated to control the T bus 416 and the other the S bus 414. Furthermore, except for the addition of a small amount of bus control circuitry such as synchronizing crystal clock signal generators, the real time executives 406, 408 are the same as the real time processors 410, 412.

Referring now to FIG. 6, the real time executive 408 includes a standard processor module 602, a real time processor extension unit 604, and an internal transfer switch 606. The real time processor extension 604 connects to the standard processor module 602 by the 16-bit internal data bus 612 of standard processor module 602 and includes 24K words of additional program memory 614, 64K words of additional data memory 616, and a direct memory access (DMA) controller 618. The data memory 616 includes a 1K word section 620 which is dedicated as a DMA control memory for the DMA controller 618. This section 620 stores buffer descriptors for use of DMA controller 618 in executing data transfer operations.

The DMA controller 618 operates on a stand-alone basis to transfer data between selected channels of the S and T buses and selected system storage locations such as records within magnetic disk files. The DMA controller 618 is coupled to the internal data bus 612 and by DMA channels 620 to the internal transfer switch 606. DMA controller 618 is also coupled to communicate CPU interrupts to the standard processor module 602 in order to selectively interrupt the CPU of the standard processor module 602 as necessary to obtain communication over the X and Y executive buses.

The internal transfer switch 606 includes a DMA channel interface 624, port command memories 626 and 512 word × 16 bit S and T bus buffer stores 628, 630. The internal transfer switch 606 is similar to the external transfer switches 402, 404 (FIG. 4) and operates to transfer data between selected frame slots on the X time division multiplexed S and T buses 414, 416 and selected DMA channels 620.

Figure 7:
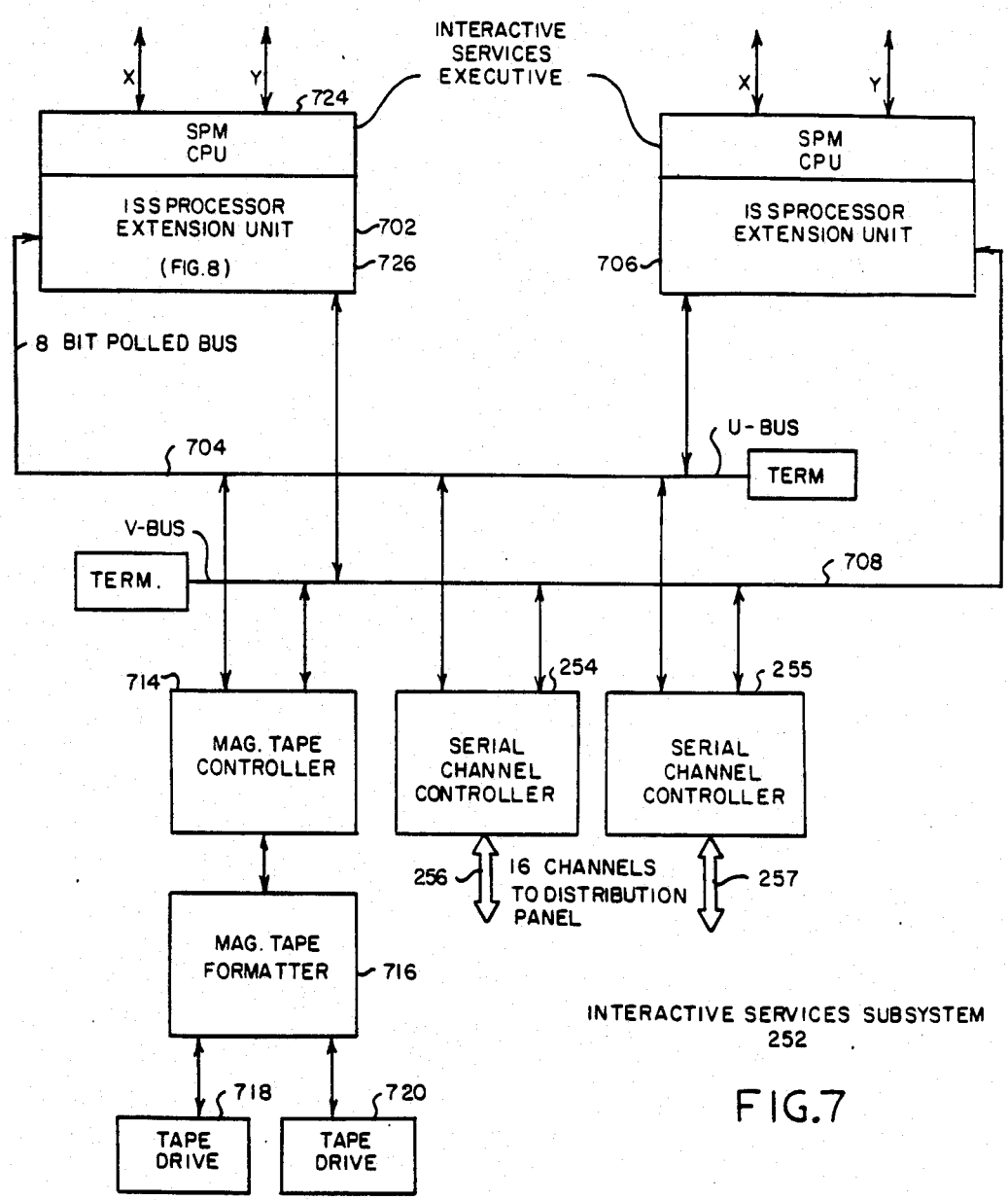
FIG. 7 is a block diagram representation of an interactive services subsystem used in the telephone voice service system shown in FIG. 2.

Referring now to FIG. 7, the interactive services subsystem 252 includes an interactive services executive 702 coupled to control an 8 bit parallel poled bus designated U bus 704 and an interactive services executive 706 coupled to control an 8 bit parallel poled bus designated V bus 708. The two interactive services executives 702, 706 and their respective buses 704, 708 provide redundant coupling of data information between the X and Y executive buses and the various input/output devices of the interactive services subsystem 252. By way of example, these devices are shown to include the serial channel controllers 254, 255 which interface the U and V buses to the 16 channels 256 and the 16 channels 257 respectively. As shown in FIG. 2, these channels connect in turn to the RS 232 distribution channel 260.

The U and V buses are also shown as providing a redundant coupling to a magnetic tape controller 714 which in turn couples through a magnetic tape formatter 716 to two magnetic tape drives 718, 720. The I/O devices connected to the interactive services subsystem 252 have been illustrated by way of example and particular I/O devices can be added to the subsystem or deleted in accordance with the objectives and requirements of a particular configuration of a telephone voice service system 100 in accordance with the invention.

The interactive services executive 702 includes a standard processor module 724 and an interactive services subsystem bus extension unit 726.

Figure 8:
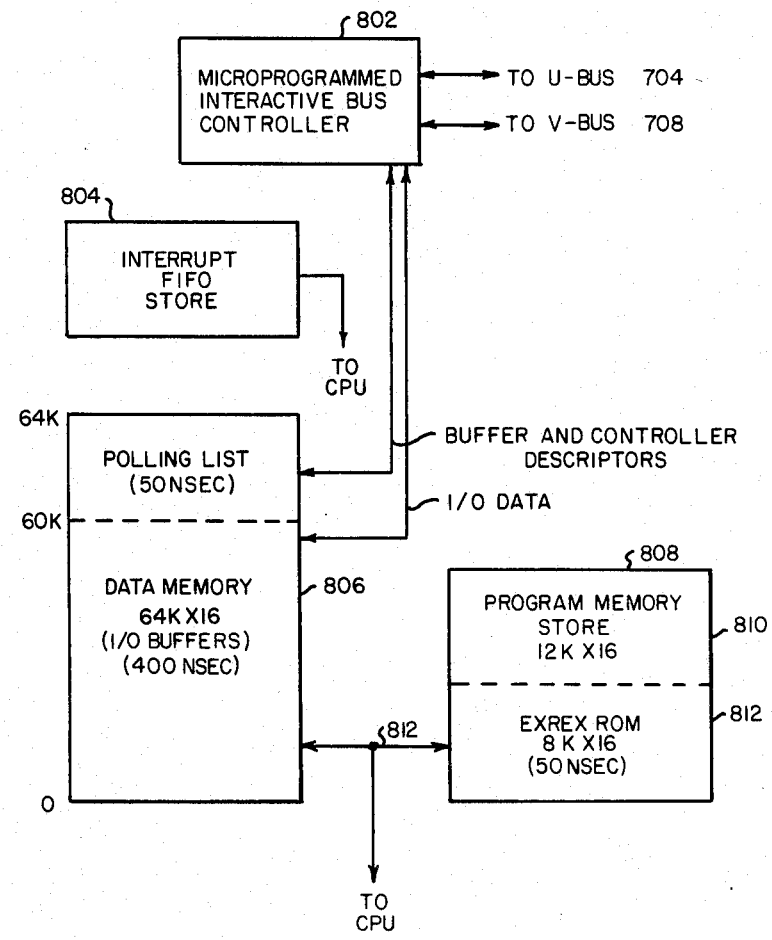
FIG. 8 is a block diagram representation of an interactive services subsystem processor extension unit shown in FIG. 7.

Referring now to FIG. 8, the interactive services subsystem processor extension unit 726 includes a microprogrammed interactive bus controller 802 which couples to the U bus 704 and V bus 708 and is selectively operable to control the U bus 704. The interactive bus controller 802 couples to an interrupt FIFO store 804 which in turn couples interrupt requests to the CPU of standard processor module 724 to control the transfer of data between a 64K × 16 data memory 806 and the executive X, Y buses. The data memory 806 is partitioned to include a 4K poling list which is coupled for communication of buffer and controller descriptors with the interactive bus controller 802 and a 60K data memory section which is coupled for communication of I/O data with the interactive bus controller 802. Data memory 806 is further coupled along wth a 20K × 16 program memory 808 to the internal data bus 812 of the standard processor module 724 to which the extension unit 726 connects. The program memory 808 includes a 12K × 16 program memory store 810 composed of random access memory for receiving overlay programs and an 8K × 16 extended resident executive ROM 812 storing process programs which are specifically related to the interactive services subsystem.

Figure 9:
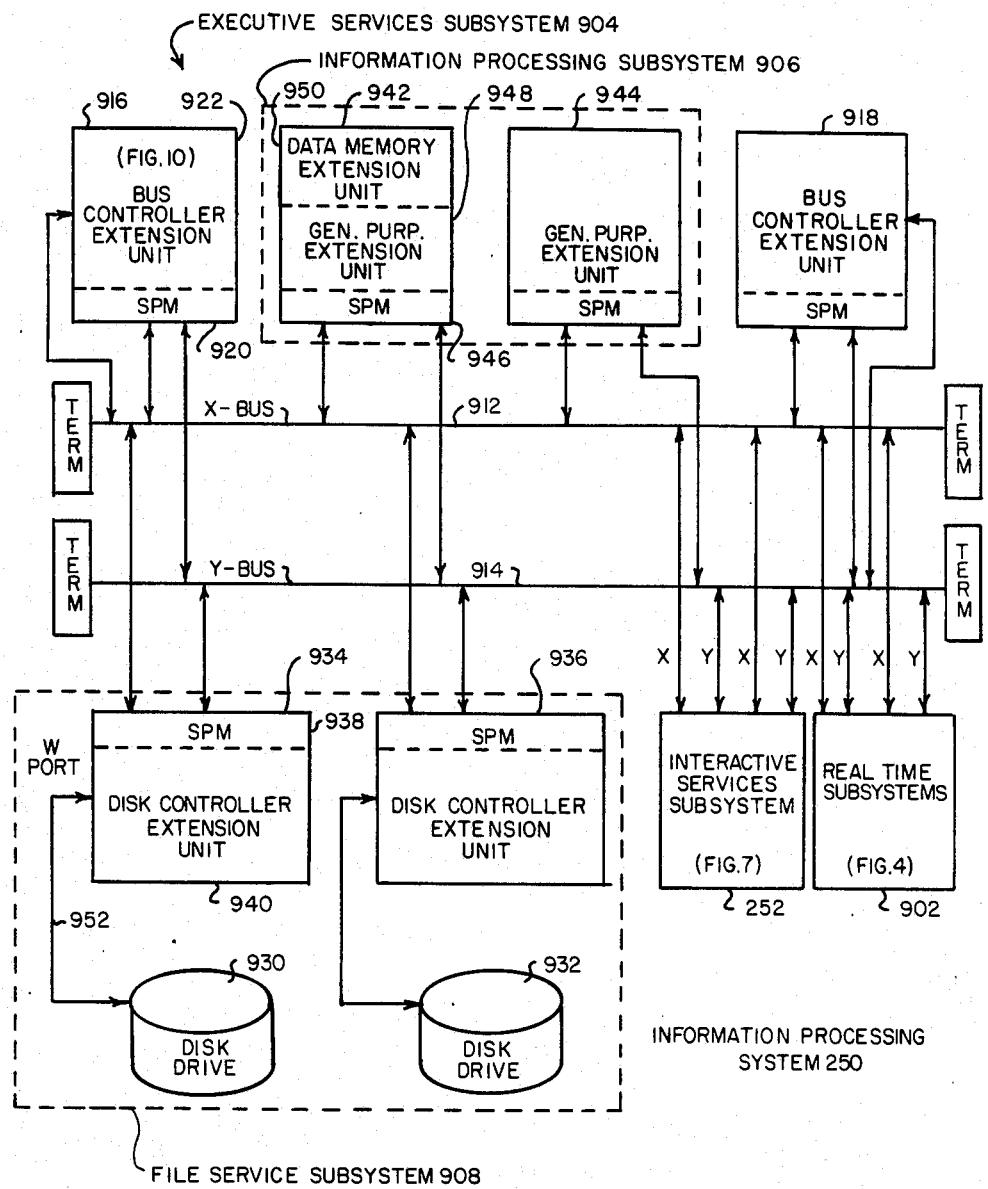
FIG. 9 is a block diagram representation of an information processing system shown in FIG. 2.

Referring now to FIG. 9, the information processing system 250 includes in addition to the interactive services subsystem 252, the real time subsystems 1–4 902, an executive services subsystem 904, an information processing subsystem 906, and a file services subsystem 908. The executive services subsystem 904 includes the two 16-bit parallel executive services main X and Y buses 912, 914 respectively, an executive services processor 916 coupled to control communications over the X bus 912 and an executive services processor 918 coupled to control communication over the Y bus 914. The executive services processor 916, which is substantially identical to processor 918 except for connection to control X bus 912 instead of Y bus 914, includes a standard processor module 920 and a bus controller extension 922. The dual X and Y bus arrangement provides redundancy in the event of a failure associated with one of the two buses 912, 914. However, the two buses are operated independently of each other and carry separate, not redundant data. However, in the event of a failure of one of the buses 912, 914, the other connects to all of the subsystems of the information processing system 250 and can carry the data associated therewith.

The executive services subsystem 904 manages the interprocessor communications and that part of the system software that is responsible for systemwide resource and activity management.

Figure 10:
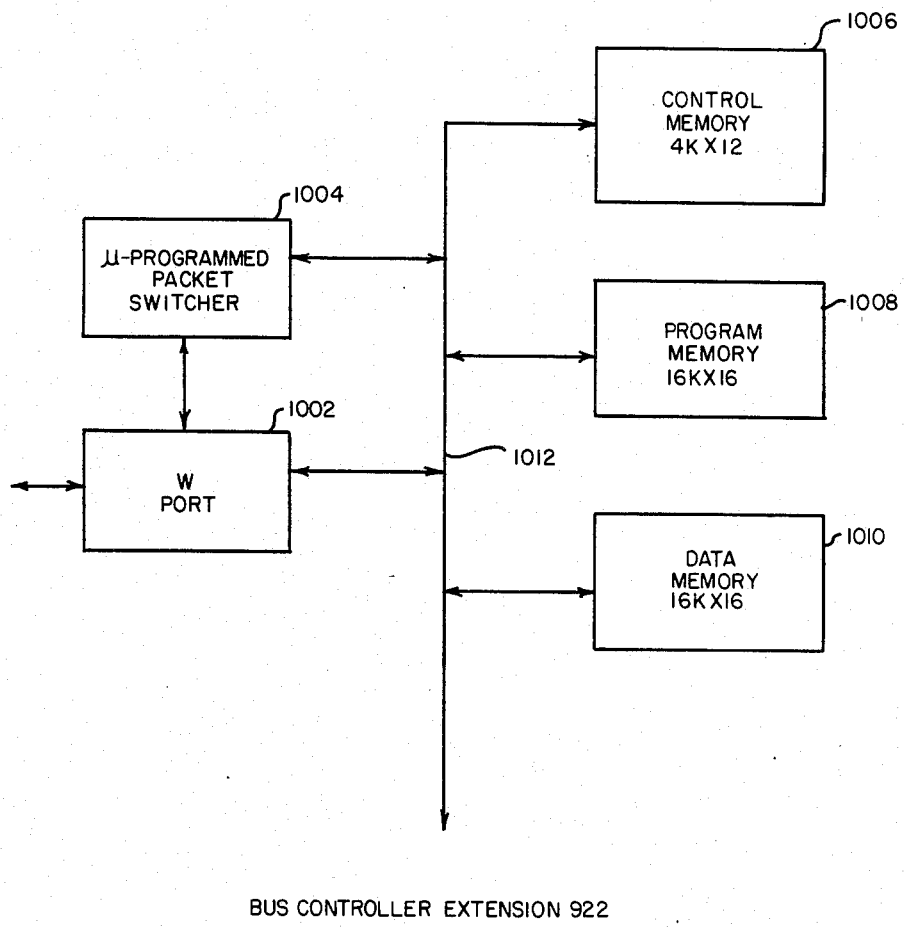
FIG. 10 is a block diagram representation of a bus controller extension unit shown in FIG. 9.

Referring now to FIG. 10, the bus controller extension 922 includes a W port 1002 which connects to the particular X or Y bus which is being controlled. W port 1002 is controlled by a microprogrammed packet switcher 1004 which poles the data output ports connected to the controlled executive bus and upon finding a port with a 16-bit packet stored therein awaiting delivery, receives the logical address stored in the first 7 bits thereof and uses the logical address to access a 4K×12 control memory 1006 which stores a table converting the logical address to a physical address corresponding thereto. The microprogram packet switcher 1004 then tests the indicated physical address input port for availability to receive the packet of data. If available, the packet is transferred. If not available, the packet to be transferred is queued in a queue of processors attempting to transmit to the busy recipient. If the processor will not accept any packets, the job services and management program (JSAM) determines whether a failure has occurred and if so invalidates the symbolic and logical identities of the processors stored in control memory 1006. This has the effect of logically removing that processor from the system.

The bus controller extension 922 also extends the storage capacity of the executive services processor 916 by the addition of a 16K×16 program memory 1008 and a 16K×16 data memory 1010. A 16 bit internal data bus 1012 interconnects the components of the bus controller extension 922 and to each other and with the standard processor module 920.

Referring now to FIG. 9, the file services subsystem 908 provides the primary high capacity permanent storage media in the form of one or more disk drives 930, 932. The file services subsystem 902 includes at least two disk data processors 934, 936 which interface the disk drives 930, 932 to the X and Y executive buses 912, 914. The disk data processors 934, 936 receive data access requests for transfers of data over the executive buses and satisfy those requests by transfers of data packets between the disk drives 930, 932 and requesting processes over the executive service buses 912, 914. Each of the disk data processors 934, 936 includes a standard processor module 938 and a disk controller extension unit 940.

Although not separately shown, the disk controller extension unit 940 provides a 4K×16 PROM for program memory for physical initialization of the disk data processor 934, wakeup processing, and the disk controller microprogram. An additional 12K×16 words of RAM program memory are made available to augment the RAM program memory on the standard processor module 938. The RAM program memory of the disk data processor 934 is used for transient programs (infrequently used disk logical I/O routines), file management programs, and special purpose disk data processing programs such as the message basket maintenance programs, the SYSDISK programs, the system file maintenance programs. Any unused RAM program memory is available for general purpose programs that can run in any delta processor with sufficient program memory, scratch pad, and data memory resources.

The disk controller extension unit 940 further includes 64K×16 words of data memory, all of which is acceptable by programs executing in the disk data processor 934. The disk controller extension unit 940 and the data memory therein provides a direct memory access DMA interface for the disk drive control logic. The disk data processor 934 provides standard data memory management routines and deals with blocks of data memories of up to 4K words in length. Disk data blocks longer than 4K words are supported by the data-chaining features of the DMA interface and of the REX I/O service routines of the disk data processor 934. A buffer controlled block within the data memory lists the areas allocated to buffer the disk data blocks. Disk data buffers are maintained as a transparent "cache" memory for the data accessible on the disk drives attached to the disk data processor 934. Disk data process buffer management routines return unused buffer space to the data memory master only when the data in the buffer is no longer valid or when available data memory is not sufficient for current demand. Unused buffers are maintained in a queue, the first entry of which is the least recently used buffer for cache management purposes.

A physical record is a minimum unit of data accessed by the disk data processor 936. A physical record contains either two or three fields for identification and information storage, namely a count field, a key field (optional), and a data field. A gap between fields allows the disk data processor 934 to operate on the key or data fields after verifying the identity of the physical record. The data available for processing by the disk data processor 934 programs other than the disk controller microprogram is called a block, and is contained either in the data field alone or in the combined key and data fields. A block may be in one physical record or may be written across track boundaries in two or more physical records. A third unit of data is the logical record, which may be either part or all of a block or may be a series of blocks chained together by pointers. Programs outside the disk data processor 934 can act as only logical records, but all such accesses are translated into references to blocks within a specified area of the recording medium. On any initialized storage medium, the label record contains access information for a pack directory. The contents of the pack directory are records that describe the unused area of the pack (available tracks) and the separately allocated areas, which are referred to as data sets. The record in the pack directory that describes a data set is called the "data set label". It defines the characteristics of the data set and gives the location of two separate areas. The main area is the data area and contains the data blocks. An optional control area contains access and resource information that is automatically maintained by the disk data processor 934 programs and is only indirectly available during logical process of the data set. Each area is described in terms of the physical and logical organization of information in it and its location on the storage medium. Locations are defined in terms of extents, each of which is a continuous set of tracks. Access requests are always by block or track number relative to the start of the data set. Disk data processor programs translate the relative requests to the proper track and the proper extent.

The information processing system 906 includes at least two general purpose processors 942, 944 which provide a general multiprocessor data processing capability. For example, system accounting and administrative processing tasks would be assigned to the general purpose processors 942, 944. The general purpose processor 942 is exemplary of these processors and includes a standard processor module 946 with a general purpose extension 948 coupled thereto. The general purpose processors 942, 944 provide program and data memory for executing system utilities that may be executed in any processor with sufficient memory resources. In addition, each general purpose processor defines one or two virtual machine types for execution of high level source language programs under a virtual machine interpreter (VMI). A kernel of standard processor module programs supplements the virtual machine interpreter to provide proper interfaces between the virtual machines and the actual information processing system 250

The general purpose extension unit 948 provides additional program memory and a standard as well as an extended data memory interface. The general purpose extension unit 948 executes the standard data memory access instructions for the first 64K words of attached data memory. Data memory access registers and error detection and correction logic are provided as for other extension boards. Data memory itself is on separate data memory extension units 950. Access to the whole of the attached data memory is provided by extended data memory extension instructions. These allow 22 bit word addressing via the standard processor module address registers. The general purpose pocessor 942 provides standard data memory resource management routines for the first 64K words and special routines for the rest of the data memory. Each general purpose processor may include up to 8 megabytes of data memory.

SYSTEM ARCHITECTURE

A. System Summary

The system 100 is a general purpose, multi-media computer system that uses fail-safe architecture to provide very high levels of availability and uninterrupted processing. Continuous operation for extended periods is assured, with no down time normally required for failures, maintenance or system modifications. The system 100 is a tightly-coupled, distributed network of multiple high speed processors, interconnected by a high speed packet switching network, and a fully distributed fault tolerant operating system that together provide a flexible processing system. The system 100 can be used in environments which mix real-time, computational communications, interactive and transaction processing with large numbers of peripheral devices and storage units. The system 100 provides for a flexible growth path which is independent of the initial system configuration.

B. System Architecture

A Delta system consists of five functionally unique subsystems; executive services, information processing, file services, interactive services and real-time. Each subsystem contains at least two identical processors, with the capability to expand individual subsystems as required up to a maximum of 32 processors per system 100. This unique architecture provides maximum flexibility in supporting multiple concurrent applications.

There are three different perspectives in viewing the architecture of the Delta System. The physical system has a hierarchical structure composed of subsystems, plus their devices, each incorporating specialized processors, functional characteristics and organizations. The functional organization includes a hierarchical network of system processes that provide an open-ended environment for large numbers of concurrent and simultaneous application processes.

The user system designer's structure provides a network consisting of a multi-processor host system that executes the machine code of the hardware processors and a number of idealized virtual machines that execute a higher level source-language oriented instruction set.

The following sections describe these aspects of the system.

C. The Physical System

The system 100 consists of from eight to 32 processors, together with a range of controllers, peripherals and storage modules. Each processor is a fully independent, high-speed 16-bit machine having a non-microcoded architecture and high-speed program memory. A maximum of 7.5 million instructions per second can be executed with an instruction cycle time of 133 nanoseconds. The instruction set contains over 340 instructions.

Each of the five subsystems within the system 100 consists of customized processors suited especially for the functions of that subsystem. Each processor type consists of a common processor to which are added the following extensions: extra memory, microprocessor based device controllers, interfaces to other system bus structures, and extensions to the basic processor architecture. Although the type of processors varies by function, basic elements of the architecture are common to all processors.

The management services needed to run a processor are common to all processors and are hard-wired into the processor. Each processor also has a firmware-resident executive system (REX) which organizes and manages the resources of the processor on behalf of both the system and the active processes within the system. The resident executive provides a wide range of functions ranging from wake-up diagnostics, interrupt handling, timer management, to input/output services. In addition, each processor type has a customized extension to the executive, which manages the individual nature of the various processor types.

To be able to communicate with other processors in the system 100, each processor has a pair of input/output ports that interface it to the packet-switched main interprocessor bus structure. Both buses 912, 914 of the pair are active, providing dynamic load sharing, thereby increasing system 100 utilization and throughput. Each provides a peak transfer rate of 120 Mbps and a sustainable rate of 40 Mbps.

To eliminate contention problems that can exist in multiprocessor systems based on global memory resources, each processor contains its own memory. Processors within the Information Processing Subsystem 906 can have from 500K-Bytes up to 8 M-Bytes of memory. All other proecessors may contain 500K-Bytes of memory. Independent processor upgrades can take place unrestricted by arbitrary system considerations. The total amount of memory available in a Delta System can be extremely large.

A similar philosophy exists within the processor architecture. Rather than have a small set of machine registers shared between the various activities and events contending for the use of the processor, with wasteful saving and restoring operations between every change, each processor is provided with over 4000 scratchpad registers to be allocated among multiple resident tasks.

Each of the five subsystems has sufficient resources to ensure survival of any single-point failure within itself, as well as many multiple-point failures. The system 100 as a whole is able to survive such occurrences.

The executive services subsystem 904 (ESS) manages the inter-process communication (IPC) network and that part of the system software responsivle for system-wide resource and activity management. Executive services subsystem 904 consists of two executive services processors 916, 918. Each executive services processors 916, 918 controls one of the two interprocessor buscs 912, 914. A bus controller extension 922 in each executive service processor 916, 918 includes a high-speed microprogrammed switch controller 1004 that transfers packets directly between the ports of the various attached processors. This intelligent packet-switcher 1004 translates logical packet addresses to physical destinations in the system, reports transfer failures to higher levels in the system, and optimizes traffic flow between system components. In addition to the two executive services processors 916, 918, executive services subsystem 904 consists of the two interprocessor buses, the dual double-buffered ports in each processor, and the packet transfer service provided by the resident executive in each processor.

The executive services subsystem 904 bus controllers 916, 918 use adaptive high-speed polling techniques to achieve high sustainable data transfer rates. This mechanization enables the system 100 processes to communicate via logical physical-location independent addresses.

The information processing subsystem 906 (IPS) is the physical host to the ideal machines used for most application software within the system 100. It is physically composed of at least two, and as many as 26, general purpose processors 942, 944.

The information processing subsystem 906 provides the hardware and software capabilities needed by the application software to customize the system 100 to the user's requirements. The information processing subsystem 906 supports execution of programs written in Pascal.

Each general purpose processor 942, 944 in the information processing subsystem 906 can have up to 8 Megabytes of memory and host up to 255 ideal machines, each of which is allocated real memory and other resources as required by an application program. If a processor fails, programs can be rescheduled automatically in alternate hardware resources. This service, provided by the executive services subsystem 904 applies to all other software processes running in other system 100 processors.

The file services subsystem 908 (FSS) is responsible for the management of the disk storage media and is composed of at least two and up to 26 disk data processors 934, 936 (FSPs) and their associated disk drives 930, 932. At least two of the storage volumes attached to the file services subsystem 908 contain the system database, which is automatically maintained in duplicate. (This security service is also available to any disk or magnetic tape file.) The disk data processors 934, 936 contain microprogrammed disk drive controllers and a high-speed data channel 952 to manage traffic to and from the disks. Software in the disk data processors 934, 936 includes the physical input and output disk handlers, as well as the logical input and output processes that interface with the rest of a system 100.

The disk data processors 934, 936 support any Control Data Corporation SMD or equivalent storage module. Certain modules permit dual-port attachment to two controllers.

The interactive services subsystem 252 (ISS) manages the transfer of data between processes and various peripheral devices that may be attached to a Delta System. The two dedicated processors of an interactive services subsystem 252, the interactive services executives 702, 706 (ISXs), each manage a separate interactive bus 704, 708. Attachable devices include magnetic tape drives 718, 720, communication data channels, terminals, and printers. Many devices can be attached to the interactive services subsystem 252. For example, up to 992 data terminals can be configured. Furthermore, multiple interactive services subsystems can be configured in a system 100, each using its own processor paid and interactive bus pair, allowing nearly 4000 devices to be configured.

As mentioned, each interactive services subsystem 252 controls a separate interactive services bus pair, to which is attached dual-ported fully-buffered controllers for the various peripheral devices. Due to the sporadic nature of the data transfers between interactive devices, the interactive services executives 902, 906 use an adaptive polling technique and a multiplexed DMA channel controlled by a separate, independent microprocessor in the interactive services executive extension 726. The microprocessor transfers data between memory buffers and devices at a rate determined by the individual demands of the various attached devices.

The real time subsystem 230 (RTS) provides the user with the unique capability to both switch and process real-time continuous data streams. Each real time subsystem is comprised of a pair of dedicated processors, the real time executives 406, 408 (RTX); a pair of synchronous time division multiplexed (TDM) parallel buses 414, 416 (each controlled and managed by a real time executive); a set of external transfer switches 402, 404 (ETSs) which map pulse-coded modulation (PCM) audio and high-speed synchronous data channels to the buses; and two or more real time processors 410, 412 (RTPs) which provide the capability to process data and effect data transfer between the external channels and other processes within the system 100.

Up to 1260 channels can be connected to each real time subsystem 230 of which 480 can be active simultaneously. Data on such channels is normally PCM voice or similar, and bandwidth through the switch can be dynamically allocated to channels with higher requirements, allowing up to 60 MHz if necessary. Each external transfer switch 402, 404 permits the summing of output channels, permitting conferencing of multiple voice channels.

Real time information can be acquired or generated by the system 100 through the real time processors 410, 412 to perform tasks such as signal compression/decompression.

Up to four cross-connected real time subsystems 230, 238 can be configured in a system 100 to match applications requiring over 5000 real time attachments.

D. System Functional Organization

Functionally, the different processor types, memory, and peripherals may be viewed as a "pool" of manageable resources to which can be allocated various software processes that together support an application.

The software processors are grouped into five levels in a hierarchical structure where each level supports the higher levels. The five levels are defined as follows: Level 0, primitive functions provide basic machine functions and interprocess communications. Level 1, utility processes, provides file services, device handlers, and transient functions. Level 2, system functions, provides operating system functions such as job scheduling, file management, etc. Level 3, user applications, represents application programs developed by users. Level 4, subordinate processes, provides subroutines and subordinate processes used by application jobs.

Levels 0, 1 and 2 collectively are referred to as the kernel system. Levels 3 and 4 are associated with application software. Within the kernel, and responsible for managing each processor, is the resident executive (REX). Each processor in the system has its own REX. Also provided at this functional level is a method of communication between logically identified software processes which may reside anywhere in the system. Communications between all processes is through discrete packets on the high-speed packet switching network. Each pack or set of packets is logically addressed to a destination process. A transmitting process may request a response/acknowledge packet to be returned.

These process levels are ach described in greater detail in the following paragraphs.

Level 0, the primitive function level of the system 100 is composed of the following: (1) basic hardware capabilities of the system 100 processors, including the controllers, interfaces and memory extensions provided by the various extensions types; (2) functional enhancements and management services provided by REX in each system 100 processor; and (3) the interprocess communications services accessed via REX in each processor, and managed system-wide by the executive services subsystem 904.

Level 0 supports the set of software processes that constitute both the kernel system software and whatever application systems are running in the system 100. To the system designer, the logical environment provided by Level 0 is in many ways similar to that provided by the system executive of a more traditional single-processor machine, in that it provides the ability to run a set of inter-communicating processes that can be built into various operational layers.

Level 1 processes include such functions as device handlers, file services, specific device controllers, and transient processes invoked and controlled in the same manner as device controllers. They provide logical interfaces and handlers to specific hardware attachments, and therefore their location is fixed in the system with access controlled by higher-level system software. If a new device type is attached to the system a process at this level must be written to logically interface the new device into the system. Communications access to Level 1 is granted only by Level 2 processes; once granted, packet transfers are direct until the communications link is terminated.

The major processes of Level 2 system functions form the operating system of the system 100 to which applications and other system processes make requests for services such as ownership of devices, opening and closing of channels, and file management. The logical addresses of these processes are known globally to all users so that Level 2 functions provide the resource and activity management on a system-wide basis, together with access control for Level 1 functions. Level 2 functions include the following: job scheduling and allocation, device management, system directory and volume management, system event processing, and system management.

An application from Level 3, applications job supervisors, may consist of a single process or a complete network of concurrent processes. Each job and job supervisor is created as a result of an external or timer-generated stimulus, and is terminated when all processing requirements have been met or prove impossible to meet. Whether simple or complex, each invocation of a job is given a unique identifier called a job number. For each job number there is typically a unique Level 3 process invoked, termed the "primary process". The Level 3 job supervisor is the mechanism which tailors the system 100 to a particular job and is the main environment in which the systems designer work. The Level 3 job could invoke the existence of (Level 1) transient processes during its lifetime to provide special services. A job could also invoke another Level 3 process, for example where complex checkpointing and fast response to failure are required.

In some instances it is possible for a Level 3 applications process to act as a host for subordinate processes. For example, if the Level 3 task is the program development system (PDS), the invocation of the editor or compiler, which runs under the program development system, is an example of a Level 4 process. The Level 4 process communicates directly with its supervisor without recourse to the interprocess communication network as it exists in the machine space allocated to the supervisor process.

At a given time, a Delta System may be supporting a large number of application jobs resident in multiple application processors and/or co-resident within the same applications processor. In this multi-process, simultaneous processing environment, each job is a systemwide network of level 3 and 4 processes, identified by a unique job number, making use of level 2 and level 1 system services as required. In a command and control application, for example, initiation of a single job process network could link a terminal with a voice line and a set of files to provide a single operator with a dedicated command console. If the system supported 20 such consoles, 20 similar concurrent job process networks could exist. (Note that common program code would be shared by the job processes wherever possible for efficient use of memory resources.)

Another example will help to illustrate some system components involved in the management and support of applications. Mixed with the main tasks of the system 100 can be terminals configured as program development stations for ongoing system development. An operator on one of these terminals can invoke a program development system to be attached to the terminal, providing interactive editing and program source file compilation, plus a full range of utility functions.

A sequence of events that might occur during the operator's interface with a program development system terminal is as follows:

1. The "RESET" character from the unassigned terminal is sent to the terminal handler (Level 1) as a message.

2. The terminal handler, recognizing that the terminal is currently "un-owned" by any job, sends message to the terminal prompting the operator for the initial log-on sequence.

3. Upon receipt, the terminal handler sends the identity of the terminal and the operator-entered log-on sequence to the system device log-on process (Level 2).

4. The system device log-on process consults its file and finds that this terminal permits log-on to the requested application system by a qualified user.

5. System log-on sends a "Create Job Request" to the system job scheduler (Level 2), including the terminal identity and the entered identifier of the desired application system, in this case program development system.

6. The job scheduler locates the program development system (Level 3) descriptor in the system program library and finds within the system 100 a location that provides the appropriate resources for the program development system process to execute (if possible, using an existing copy of the program development system program code). An idealized machine is created, allocating unique memory to the job and access to the program code. Then the program development system job is initiated with its own unique job identity. The terminal ID is passed to the program development system job as part of its start-up parameters.

7. The program development system then requests ownership of the terminal from the system device manager (Level 2) which is responsible for management of all attached devices (including read-time channels).

8. The system device manager records the owner of the terminal in its tables, and informs the terminal handler of the job number of the program development system that now owns the terminal.

9. A logical channel is thus established between the program development system and the terminal via the terminal handler (see FIG. 9). The system device manager is no longer involved until the terminal is terminated and released by the program development system.

10. Via interactive commands from the user, the program development system can initiate utility programs to run within its allocated resources, for example screen editors, compilers, assemblers, and linkers.

Two important principles should be noted from these examples, (1) The physical location of a process within the system 100 multiprocessor environment is not critical to the operation of the system and (a) all communications between system and user processes is by means of packet exchanges, even if processes happen to be co-resident in the same processor. Most of the Level 0 system functions and services are performed by a resident executive (REX) within the standard processor module of each system processor. A ROM copy exists in each processor to provide basic services to effectively manage the processor within which it is resident. The services include: interrupt handling, event management, timer management, memory management, process management, status monitoring, I/O service functions, list processing, inter-process communications, traps, wake-up and diagnostics.

These services together with the hardware provide the primitive functions available to the privileged processes in each processor. Note that REX provides access to the executive services subsystem 904 which mechanizes the dual inter-processor buses 912, 914 that connect the multiple processes of the system 100. There is also a unique extended resident executive (EXREX) for each type of processor. EXREX extends the services functions of REX to include features peculiar to each of the processor types. These include: physical initialization, process type model and version indications, management of extended memory, mechanization of processor peculiar functions, and interface with any auxiliary microprocessor.

At Level 1 the device handlers effect the logical and physical I/O and control of the various devices that can be attached to the system 100, including: disk drives, magnetic tape units, line printers, smart terminals, dumb terminals, voice channels, operator stations, remote line concentrators, and discrete signal controllers. Device handler processes are intimately connected with the hardware they control and reside in the subsystem to which the devices are attached. Initial contact with a device handler by an application is via a Level 2 system process.

The Level 1 system functions also include utilities and transients which control various system and user processes such as voice compression and record; voice decompression and playback; spooler, etc. These processes may reside within either the host space or ideal space of the system 100. Transient processes are created on demand and are dedicated to a particular job. Resident processes are shared. Creation, if appropriate, and access rights, are effected via Level 2 processes.

Among the Level 2 system functions job scheduling, allocation and monitor (JSAM) is a major system process that manages the allocation of processes to available processor resources. JSAM is responsible for creating jobs, monitoring the status of resources, recovering jobs when resource failure occurs, and removing jobs from the system when they terminate. System device manager (SYSDEV) receives requests to ownership of any attached device by a job. SYSDEV manages the allocation and overall configuration of the system devices. Once the allocation has been made, the job owning the device or channel communicates directly with the level device handler. System directory manager (SYSDIR) performs the management of all permanent storage resources including the maintenance of user data sets on both magnetic tape and disk, either on mounted volumes or off-line. Once linkage to a data set is made by a job, communications are between the job and the Level 1 logical I/O handler of the particular file service processor responsible for the volume. Access and control protocols for both datasets and devices are common at the user level (Level 3). System device log-on manager (SYSDLO) receives any activity on devices not owned by a particular job from the handler for that device. By consulting its tables, SYSDLO can decide what action should be initiated when a given combination of external, unsolicited stimuli occur. This may result in a request to JSAM to start up a job in response to the event. Various start-up parameters are passed to the job to link it to the external events which it has been created to service.

System monitor (SYSMON) provides the normal system management functions, including general system monitoring, reporting, and housekeeping. SYSMON has many privileges available to it that are not available to Level 3 supervisors. As such, a stricter log-on procedure is used to gain access to this system. SYSMON maintains a dynamic short-term database of recent system activities. SYSMON permits activation of Level 3 supervisors to provide qualified terminals with access to all or part of the dynamic database. Such Level 3 programs conform to the requirements of the application system being supervised. Still another Level 2 system function, system event logger (SYSLOG), maintains a database of all logged events in the system 100. This log can be used to generate application and system related information. SYSLOG dates and time stamps each event and stores the event record on a disk dataset.

Level 3 provides the system application programs. A developed application, when scheduled by JSAM, is given a unique job identification during the lifetime of its invocation. A large number of identical jobs can coexist to service multiple users and a variety of terminal devices. A job can consist of single or multiple processes (all bearing the same job ID) and a job can dynamically create and destroy processes during its lifetime (typically, transients at Level 1). The individual processes of which a job is composed (minimum of one) can be distributed across the system 100. The program development system (PDS) is an example of a Level 3 program and provides a complete interactive program development system that provides a single-user environment for the development and testing of application programs. Multiple program development systems can be run concurrently on the system 100, alongside the main application jobs of the system. Included in the program development system are several Level 4 processes which support the program. These include a screen editor, a Pascal compiler, an SPM assembler, a linker, a debugger, and various utilities.

E. System Program Architecture

Some Level 1 and 2 processes can exist in any subsystem processor. When any process is to be initiated by the kernel system, its resource requirements are first analyzed, and the system initiates the process in whatever resource is available and appropriate.

Level 3 job supervisors, however, represent the major processes of applications. As such they normally reside only in the general purpose processors 942, 944 of the information processing subsystem 906. A consideration of the program architecture of the system 100 explains why this occurs.

Processors comprising the system 100 are designed to be task specific. The system 100 processors have a common instruction set as well as a type dependent superset. The individual functions may include access to a special set of control registers, a small set of extra instructions related to a direct memory access (DMA) channel, or a set of special functions. In brief, the programming environment within all processors controls a main core of identical capabilities with subsets of special capabilities unique to each processor type.

The instruction set of the system 100 processors optimize execution speed by using a 16-bit instruction. This instruction is both a macro-instruction and a micro-instruction, in that a machine cycle and an instruction cycle are nearly always equal. A very close relationship exists between each bit in the instruction and the actions within the processor hardware, although there is a layer of translation. This results in assembler generated code producing very fast programs, which are ideal for processes responsible for real-time control and management functions such as exist in the real-time subsystems 902, interactive services subsystems 252 and file services subsystem 908. The system 100 instruction sets provide hardware control for both processors and various attached devices.

Wherever possible, Level 3 processes in the system 100 are written in a high-level systems programming language both for ease in the implementation and maintenance of complex applications, and excellent runtime integrity. However, to compile high-level programs into low-level instructions codes which will run alongside Level 0, 1 and 2 processes in an unprotected machine environment requires careful implementation by a skilled user.

The system 100 provides the user with a fault tolerant environment in which to run applications. In a typical system, program development occurs along side the use of the system for its prime and, presumably, high-availability tasks. New applications programs often incur run-time errors. Active jobs have to be both protected from having their code or data destroyed by other concurrent jobs, and prevented from inadvertently modifying other processes. Application program protection is assured with the system 100.

Two features which satisfy the above requirements in the general purpose processors 942, 944 are:

1. A large memory space of up to 8 Megabytes per general purpose processor is provided for loading program and data segments of processes, togehter with a mapping system that allows the memory space to be assigned to processes in protected, controllable spaces. This real memory space has a contiguous address range, as viewed from the process to which it is assigned, but, through the mapping scheme, physically comprises demand-allocated, noncontiguous blocks of 4096 bytes.

2. Enhancements to the basic log of the standard processor module (SPM) architecture allow normal high-speed program memory (50 nsec access time) to be used as a writeable control store (WCS), with the basic standard processor module order codes executing like microinstructions. This function is supported by the addition of a hardware instruction decode table, additional instructions in the standard processor module instruction set, and a number of extra machine registers.

These two enhancements have a beneficial effect. Non-native instructions set can be executed in the general purpose processors 942, 944 by loading micro-code emulation sequences into the writable control store. An example of a non-native instruction set is a transportable P-Code set which may be produced by a higher level language such as Pascal or FORTRAN. The general purpose processors 942, 944 and their nature instruction set act as a host for the "ideal" machine which implements the higher level language through an "ideal" machine instruction set. Due to the very high speed of the host machine, the "ideal" machine instruction cycle time is generally faster than similar 16-bit micro-coded CPUs. In addition, the writable control store retains flexibility for future incorporation of other non-native (ideal) instruction sets, optimized to different task environments. As a system 100 can incorporate a number of general purpose processors (up to 26), it is conceivable that different general purpose processors could be dedicated to different applications each with a different "tailored" high-level instruction set.

Programs encoded in the ideal machine instruction set reside in the extended memory of a general purpose processor. Each process assigned to a general purpose processor is initially given a scparate memory space to operate in. The ideal machine instruction set of which the program is comprised will not allow addressing outside the range of the process' allocated ideal address space. Thus the process is both protected from programs in other ideal spaces and prohibited from modifying any other process' space. It can use only the instruction set of the ideal machine, which, for non-privileged uses, contains no method of accessing either the basic support hardware, or other processrs in the system 100 except by restricted access to a limited set of the primitive functions at Level 0.

The ideal machine instruction set and the ideal memory space collectively form an ideal machine (IM). An ideal machine provides a single user a uni-processor environment for programs written in high-level languages, with logical separation and protection for multiple concurrent processes running in other ideal machines co-resident in the same general purpose processor. From the programmer's view, the application task is written to run in a stand-alone machine with a formalized procedural interface to communicate with and use system 100 resources resident in separate, distinct machine spaces whether in other ideal machines or other system 100 processors. This meets the need to provide an efficient, protected environment for application processes.

The ideal machine instruction set is a pseudomachine code (or P-Code) derived from the P-Code originally defined by Wirth (Institute for Informatik, Zurich). The P-Code set is an idealized instruction set for stack-based machines, which are in turn the ideal target machines for block-structured languages such as Algol, Pascal, ADA, etc. These language types are the most efficient and productive languages for implementing complex systems.

Extended Pascal is the language supported on the system 100. This is a superset of the ISO Pascal language with an extension that interfaces to the system 100 kernel software. These extensions also enable multiple Pascal processes to communicate with each other.

A single general purpose processor 942, 944 can support a large number of ideal machines, each one created dynamically to implement a Level 3 job. Thus if the system 100 is being used in a multi-terminal, single-function application, each terminal would be owned by a single-user job residing in its own ideal machine, with each job responsible for one terminal. As program code sharing occurs, and as jobs can dynamically acquire more data space, the actual number of ideal machines that can be accommodated per general purpose processor is application and time dependent, but 30 and 60 ideal machines, respectively, are typically low and high figures for one general purpose processor. Thus a system comprised of one hundred terminals using just three general purpose processors (to provide redundancy) is perfectly feasible.

The relationships between the program, the system 100 architecture and the system functions are such that:

1. The host program spaces of the standard processor modules (File Services, Interactive Services, Real-Time) are considered privileged, and designing processes to run in these machines requires a careful consideration of the standard processor module and REX architectures to ensure that system processes co-resident in this space are not affected.

2. It is feasible to write a major system task to run in the host space at Level 3 in critical real-time jobs, as the system software makes no specific distinction between jobs and their relative hierarchical responsibility as outlined in the preceding descriptions. The system 100 requires only those parameters related to the resources the various job processes need (that is, an IM or a host machine, and if a host machine, what type, if type-critical).

3. All of a general purpose processor's host programming space is taken up by the ideal machine monitor (IMM), which includes the P-code emulation microcode sequences, extension memory resource management, IM process management, and interface to REX basic services. The IMM, together with REX and the standard processor module hardware, for the ideal machine. The IM, in turn, is shared among the resident P-code processes and their data spaces to form multiple ideal machines.

Functionally, the system 100 is independent of the relative physical location of processes, as all interprocess communication is via logically addressed packets. Processes not requiring specific hardware environments offered by particular processor types can reside either in the host or the ideal machine space. In particular, processes that form the Level 2 system jobs are divided between these areas. Processes in the ideal space are written in extended Pascal, and each process, encoded in P-code, resides in an individual ideal machine in a general purpose processor 942, 944. System processes that are critical to the overall dynamic performance of the system 100 are encoded directly to standard processor module machine code to gain extra efficiency. The job scheduling and allocation monitor (JSAM) task is an example of this type, and it is normally resident in an executive services processor 916, 918. This processor contains the inter-process communications controller and, as JSAM is co-resident with the executive services subsystem 904 device manager when hosted in this processor, the reduced communication line between the two produces an increase in efficiency.

FAULT TOLERANCE

A. Introduction

The rapidly growing volume and importance of information data requiring processed by computer systems and the attendant sensitivity of users to system downtime was a major consideration in the system 100 design. Failsafe hardware with a highly fault-tolerant software system was a design requirement. Added emphasis for system availability comes from real-time (non-interruptable) operations with the always present need for data integrity.

As the focal point for large volumes of independent real-time information processing and transfers the system 100 assumes a central role in the dynamic interchange of information among users. It must be continuously available with no down-time for processor failure, maintenance or reconfiguration. To this end, the system 100 has an up-time design goal of 99.997%, operating 24-hours a day, 365 days per year.

However intrinsically reliable hardware or software elements are, failures will occur. Such failures can take many forms, from component failure due to natural aging, to sofware failure due to unforeseen transient situations. Fundamental to the design of the system 100 is the ability to continue operation in spite of such failures. The system 100 achieves uncompromising levels of system availability through its unique, designed-in capacity to survive failure. This is not achieved through the expensive and inefficient expedient of a fully redundant "hot-standby". The distributed nature of system 100 hardware and software architecture allows the system to automatically adapt around failed areas, while being able to employ all resources still available.

Neither removal of failed components, nor the addition of serviceable hardware, whose serviceability is directly verified by the system, requires system downtime. Failed processors and peripherals can be removed from and replaced into system 100 without affecting its ongoing operation. Replaced processors are automatically integrated into the system's pool of available resources. In a similar way new, improved or corrected software can be introduced into an operating system 100 without requiring system downtime. In brief, a system 100 can be reconfigured and extended in both hardware and software without any affect on its ongoing operation.

All application software can make use of the system 100's failure recovery mechanisms and redundant hardware to achieve whatever level of failure response is dictated by the applications.

B. Failure Characteristics and Effects

No system can provide 100% availability. Regardless of the approach to fault detection, endurance and recovery, a set of circumstances may arise that the system cannot survive. For example, a common method of increasing operational availability is to have a duplicated hot-standby system, that is, a system kept up-to-date by tghe active system so it can quickly take over in the event of failure. However, during the time required for takeover, normally in the range of seconds or minutes, neither system is operational. Moreover, if the standby system itself fails before the main system is again operational, total failure occurs. The probability of both systems failing may be remote, but is always real.

A system fails when one or more components fail in such a way that the system operational capacity falls below designed minima. A system has not failed, that is, it remains available, so long as design minima are exceeded. For so long as this condition exists, the total system has not failed, whether or not one or more component failures have occurred. System availability can be improved by the following:

(1) Reducing the frequency of failures in system components.

(2) Increasing the number of concurrent failures for which the system can compensate.

(3) Reducing the time required to repair or replace a failed component.

In the system 100, all three approaches have been used. First, system availability is increased by increasing the mean-time-between-failure (MTBF) of the system hardware and software components. The use of proven technology, automatic testing, burn-in procedures and stringent quality control contributes toward low hardware failure rates in the system 100. Typically, after burn-in, hardware component MTBF remains very low for an extended period of time, with a rise ultimately occurring due to natural aging processes. Software components on the other hand, become more reliable with use, as all of the various states the program can enter are exercised and any incipient errors are detected, isolated and corrected.

It is generally true that if system software components are resident and extensively used this insures high software reliability, whereas new or infrequently used application components typically have a higher failure rate. To protect thr system 100 against such failures, the "ideal" machines in which the application processes execute are hardware protected environments, which confine the effects of failure to the processes in the "ideal" machines. Applications for the system 100 are written in a structured, high-level, self-checking systems programming language that generates code limited in scope to the ideal machine in which it will execute with hardware "fences" rigidly prescribing the execution arena for the software.

As a further aid in reducing application software errors, a large number of frequently exercised functions are embedded in the system 100 software to minimize the amount of application code required. This combination of features aids in achieving high system software reliability and materially eliminates the possibility of application software corrupting the system.

Second, availability of the system can be further increased by designing it to be tolerant of certain sets of faults. In the system 100 any singular hardware or software failure can be survived by the system. Also, most combinations of double failures and many sets of multiple failures can be tolerated, depending on the relative sites of the failures within the system.

Third, system susceptibility to failure can be lessened by reducing the time during which any single failure remains undetected in the system. In the system 100 extensive and frequency hardware and software checking provides assurance that the occurrence of a failure is detected quickly. Once detected, failures are immediately isolated to replaceable modules, reported, and diagnostic tasks are initiated. If the fault proves to be hardware, the offending element is logically removed from the system. The nature of the fault is displayed, and maintenance personnel can effect removal and replacement without disturbing other system operations. If a transient or software fault occurs, all pertinent data is recorded for subsequent disgnostic analysis. The failed element is automatically returned to service subsequent to passing diagnostic tests. In either case, actual repair (replacement or return to service) seldom requires more than a few minutes, and never requires system shutdown.

The meaning of the term "system failure" must be carefully defined when considering the Delta System and the concept of fault tolerance. Normally, large numbers of peripheral devices and channels are attached to the system 100. If a device, channel, line to the processor, or interface fails, the user of the malfunctioning device perceives that the system has failed. What has happened, more precisely, is that overall system capability has been reduced although the system as a whole is still available to the surviving users. Various capabilities within the system 100 facilitate isolation of and switching around such failures.

If a failure occurs in a processor, memory, bus, or disk within the system 100, the system as a whole will continue to operate. A degree of performance degradation may occur, depending upon the particular failure, the system configuration, and the level of activity at the time of failure. For example, if the system 100 has four general purpose processors 942, 944, each of which is 50% loaded, and a single general purpose processor fails, the processes that were running in the failed processor will be rescheduled in the three survivors. Thus the three remaining general purpose processors will be 66% loaded. This may change slightly the characteristics and response times of the system during the time the failed general purpose processor is being replaced. However, if the general purpose processors had been 75% loaded, the survivors would end up with 100% loads. This would certainly be noticeable in the resulting queue sizes and response times.

As the system 100 is configured into distinct subsystems, each containing multiple processors, it is possible that more than one processor may fail, either in different subsystems, or in the same subsystem. The performance of the system under these multiple-failure situations (the probability of which is small) would be a complex function of processor type and loading levels.

Although the system 100 uses redundant capacity to survive failure, the utilization of that capacity fars exceeds simple hot-standby systems. Moreover, in the event of a system 100 component failure, the processes on the surviving processors are not interrupted. In contrast, for hot-standby schemes, all processes are suspended when the failure is detected, and remain suspended until takeover has been completed.

C. Fault Tolerance Capacity

Referring now to FIG. 9, there are a minimum of two processors in any given subsystem with sufficient capacity for the survivor(s) to take on the load of any one failed processor at the designed peak system load. Each intelligent bus 912, 914 is separately managed and both are active (that is, are used for interprocessor communication). In the event of failure of a bus 912, 914, or its controlling processor 916, 918, the survivor provides a single bus service adequate for the design-specified peak system capacity.

As shown in FIG. 7, within the interactive services subsystem 252 peripheral devices attach through dual-port controllers to each U and V bus 704, 708. The primary bus for each device is preassigned by system software. In the event of either bus or ISS executive processor 702, 706 failing, the surviving bus and bus processor take over and provide a single bus service. If the device controllers fails, all devices attached to the device controller are lost to the system. However, the failed controller can be removed and replaced without interrupting operation of other controllers on the bus.

Referring to FIG. 4, allocation of slots on each real-time TDM bus 414, 416, is performed dynamically so as to share the load. The allocated capacity of two buses never exceeds the slot capacity of a single bus. Real-time channels operate over an independent TDM bus pair. Each bus is identical so that if one fails, the real-time subsystem 230 (RTS) can operate using the survivor. The real-time subsystem 230 will re-route data past failed external transfer switches 402, 404 (ETS) and internal transfer switches 606 (ITS).

Failure of a disk controller (that is, a file services processor 934, 936 (FSP)), a disk drive unit, or the volume mounted on it, can be survived. Critical datasets are automatically maintained in duplicate on two volumes controlled from two different file services processors 934, 936. With dual-port disk drive units, a single data set can be accessed if the file services processor controlling the volume fails. After a period in which a duplicated dataset pair loses data synchronization due to failure of one of the pair, the "lagging" dataset is automatically resynchronized by the survivor when either a replacement or repaired unit is returned to the system.

D. Failure Detection and Recovery

The Delta System does not use a single, all-purpose failure recovery mechanism. This would be as inefficient as trying to use a single processor type in all of the various subsystems of the system 100. A variety of methods are used for the detection of, and recovery from, failure. Each technique is best suited to the type of failure expected, and the form of recovery required. However, a set of characteristics common to all techniques can be identified to illustrate the general approach to fault tolerance adopted in the system 100. This approach stresses two key elements: insurance against failure and an appropriate sequence of events to be triggered in case of failure.

The system 100 is configured with sufficient redundant capacity to survive failure. How that capacity is utilized depends upon the processes that use it. For example, when an application process is initiated by the system, it can be declared as recoverable or nonrecoverable. If the processor in which it resides fails, and it has been declared as nonrecoverable, no attempt will be made by the system to relocate and restart that process in alternative resources. However, if it has been declared as recoverable by restart, it will be rescheduled into suitable resources and restarted at a specified recovery entry point. (It might be illogical, in some instances, to restart a process. For example, if the process' function were only to manage a device attached to the processor that failed, there would be no point in restarting that process somewhere else). Alternately, a recoverable critical process can invoke a hot-standby process which will automatically take over if the primary process fails.

To merely restart a process in the event of failure is of no real help unless the new process can take over from the point at which the failed process terminated. What may be required in the restarted process is the overall operating context of the failed process; the values of variables, tables etc., that existed in the original process prior to failure. These values are unavailable, of course, once the processor hosting the process fails. This dictates that a process requiring extensive contextual data in order to restart must, periodically, checkpoint information regarding its current state. The action of checkpointing is similar to paying insurance. A process that wants to survive failure must accept the checkpointing task overhead. The more often the checkpointing occurs, the more transparent will be the takeover in the event of failure, but the less time is left for the original process to perform its mainline task. It is a matter of degree, determined by the relative importance of the task and the size of its variable set. If, as is frequently the case, the quantity of checkpointed data required is on the order of that required originally to initiate the process, the system itself is capable of holding each successive context set. Then, if failure occures, a newly-created successor process is passed the last checkpoint data by the system as its startup parameters. This allows the new process to take over the functions of the deceased process in a logical manner.

The basic checkpoint service provided by the system 100 is limited to retention of 16 bytes of a single checkpoint packet on behalf of a recoverable process. Each checkpoint packet sent to the system, that is, to the job scheduling and monitor (JSAM) subsystem, overwrites the previous checkpoint. The last checkpoint sent is available to the recovered process. Note that when a process is restarted in an alternative resource, the recovered process has the same job number as the failed process and therefore still owns any devices or datasets owned and used by the failed process, together with any nodes created by the failed process. Dispatched from the restart entry point, the recovered process can use the last checkpoint packet to determine a logical restart sequence.

In a job that is recognized as a network of distributed processes dedicated to the job, automatic recovery is available only to the primary node of the network. Failure of a subordinate node is reported to the node that initiated it, which can then determine what action is required (that is, request that it be restarted, or withhold such request if restart is illogical).

Automatic restart and system checkpoint are the typical mechanisms used by application processes running in ideal machines. For example, a general purpose processor might be hosting a number of program development systems (PDS). To the terminal user of a program development system, processor failure in this instance would result in the loss of the current operation, a return to the command level of the program development system, and the generation of a system message explaining the change. At this time the user can restart his program on alternate resources. This assumes that the necessary resources are available for assignment to the re-started job. These recovery mechanisms represent a minimum overhead method for recovering from processor failure.

In critical processes, a checkpointed restart may not be acceptable if the failure of the critical process must result in a takeover by a replacement that is transparent to the rest of the system. The system software processes themselves are the prime examples of such critical processes. The replacement process must be fully informed as to the last current state of the failed process. It would be totally inefficient to attempt to checkpoint to the system the current state of a complexc process—the amount of data space required for checkpointing by the job scheduling allocation and monitoring system (JSAM) would be prohibitive. A suitable approach is dual cooperating processing. (Non-critical processes can make use of a disk dataset as a link between failed and recovered processes for large checkpoint passing.)

For critical processes, the alternative to checkpointed restart is the use of dual cooperating processes. In this approach, the critical process invokes an active backup in a separate processor. If one processor fails, the survivor takes over on behalf of the failed process. During their common lifetime, the cooperating processes maintain identical tables by various methods of communication. When one fails, takeover by the survivor is fast. The system informs the survivor of the failure and automatically reroutes all relevant packets. Within this approach, a number of different implementation schemes are possible, each with its own attributes. These schemes are as follows: (1) master/slave hot-standby, (2) hot-standby pair, (3) load-shared primary and secondary, and (4) dual parallel processes.

The characteristics and use of each mode of implementation are outlined in Section E below. Each is applied where most appropriate in the Delta System.

Cooperating processes require far more self-management by the members involved. The various schemes are set up and maintained by the processes themselves, using basic system mamangement and communication services. This high "insurance overhead" has to be traded off against the requirement for uninterrupted availability and integrity of the process within the system.

When failure occurs, the action of the system follows a defined set of steps, namely;
1. Detect that a failure has occurred.
2. Protect the rest of the system from failure.
3. Endure the failure until repaired.
4. Isolate the failed component or element.
5. Repair or replace the failed component or element.
6. Recover the system to its state before failure.

An undetected failure within the system could rapidly cause loss of overall system integraity and eventual logical system failure. For example, an undetected bad bit in a file services processor's buffer memory could cause corruption of data being passed to the disk, leading to catastrophic results some time in the future. Whenever possible in the system 100, hardware error detection is used to immediately invoke action.

The following hardware error checks and indicators are provided in the system 100:

For each processor:
(1) Program memory parity error.
(2) Scratchpad memory parity error.
(3) Data memory error correction occurrence.
(4) Data memory double (uncorrectable) error.
(5) Watchdog timer error.
(6) Link stack overflow or underflow.
(7) Power-fail/restart.
(8) Interactive bus parity error.
(9) Executive bus parity error.
(10) Failure to accept a packet.
(11) Physical removal of a processor.

For extensions, where applicable:
(1) Failure of real time bus synchronization.
(2) Real-time bus parity error.
(3) Transfer switch failure.
(4) Real-time serial link failure.
(5) Disk read/write cyclic redundancy check (CRC) error.
(6) Disk read positioning error.

For peripherals:
(1) Reports of errors in peripheral operations.
(2) Telephone subsystem line group controllers and line interface boards.
(3) Magnetic tape controller.
(4) Loss of synchronization on a data link.
(5) Protocol timeouts.

Software errors are potentially the most dangerous to the system. A straightforward corruption of code will quickly cause a process trap. If the software (or REX) detects any illogical condition not directly attributable to an external source, or that an automatically detected failure has occurred, the host processor is forced to trap. Failed software can be indirectly detected either by the watchdog timer firing, indicating an unserviced event, or by other processes externally detecting illogical or illegal operations. What is difficult to detect is a transient, but not fatal, malfunction of a process, or a seemingly correct process behaving illogically. JSAM, via responses to its frequent status requests, monitors these transient invalid occurrences and traps the offending process if the frequency of such occurrences exceeds established system thresholds. It must be emphasized that failures of this type contribute to the learning curve effect on software reliability, in that once the cause is identified and ocrrected it can no longer contribute to system glitches. Additional protectors against invalid transient occurences exist as a part of built-in system checks, and periodically involved diagnostic utilities which reduce the probability of propogating transient errors.

If a processor fails totally, it cannot contribute to the error-detection mechanism except by failing to respond to external stimuli. Frequently, at regular intervals, JSAM polls each attached processor for a status report. Failure to acknowledge indicates an inoperative processor. Similarly, failure of a processor to accept or respond to packets from any source indicates malfunction. Either condition forces JSAM to logically remove the processor from the system and re-route all packets to baskup processes if such backup processes are available.

Relative to a given processor, a hierarchical detection system exists. A processor is responsible for its resident processes and the hardware and peripherals associated with it. The processor itself is indirectly tested as other processors in the system attempt to send packets to it. All processors, in turn, are monitored by the primary JSAM. At the same time, a duplicated slave JSAM monitors the actions of primary JSAM. Its own host processor is itself tested by the primary JSAM. Failure of any processor is reported to or directly detected by the primary JSAM. If the primary fails the processor hosting the primary JSAM switches control to the slave (backup) JSAM. Failure of the backup is endured by the primary until the executive service processor 916, 918 hosting the backup is replaced.

Following a processor-detected fault a hardware trap is forced. This logically removes the processor from the system, thereby protecting the system from any harm that could be generated from a suspect processor. Depending on the nature of the faulty conditions which forced the hardware trap, the sytem can:

1. Alert maintenance personnel to physucally remove and replace or repair the trapped processor.
2. Run diagnostics in the faulty processor which, if successfully executed, permits JSAM to reincorporate the processor into the system.

Not all faults cause traps. For example, if the real-time subsystems 902 (RTS) detects a failed external transfer switch 402 (ETS), the real-time subsystem 902 processors logically remove the external transfer switch 402 from the system and rearrange the circuits and channels through another external transfer switch. However, if a real-time executive 406, 408 detects that the TDM bus it controls has filed, the real-time executive (together with its bus) traps.

When a processor enters the trapped state, the following sequence of events occur:

1. Normal processing is halted. All memory is preserved and only the trap handler is permitted to execute.
2. All communication with other processors is broken, except for transfer of status and diagnostic packets.
3. The CPU's registers and subroutine linkage stack are saved in scrachpad memory.
4. JSAM is informed that the processor has entered a trapped state and logically removed it from the system.
5. Copies of the Resident Executive's area of scratchpad memory and table associated with that processor are logged to SYSMON and SYSLOG.
6. If a system programmer's terminal is attached and the processor has been reset to test mode, the processor enters an interruptable idle loop, allowing the system programmer to examine the processor. Otherwise the processor automatically self-initiates power-up thereby effecting a restart beginning with physical initialization and start-up diagnostics.

If a trapped processor passes start-up diagnostics, it can be assumed that the cause of failure was either a software or hardware transient fault. JSAM notes the time of restart so that, if the failure rate of a processor exceeds a pre-determined threshold, JSAM will logically remove the processor from the system.

A totally failed processor is logically deleted from the system and reported to the system monitor for removal. A processor with no power can reside on a bus without affecting bus traffic. Physical addition or removal of a processor is reported to JSAM by the executive services subsystem 904 (ESS). Removal is equivalent to failure. Addition increases the resources known to JSAM.

A process that generates illogical or incorrect packets, but whose host processor responds correctly to JSAM status requests and does not trap, is a rogue process. The system has the following protection and detection methods to survive such occurrences.

(1) A packet has a highly structured address format. An attempt to send a packet with an incorrectly formatted address will be unsuccessful, and the originating process will be reported to JSAM by the executive services subsystem 704.

(2) An attempt to send a packet to a non-existing address or job will also be rejected and reported.

(3) If a correctly address packet contains illogical data (for example, a wrong function code or data field), it is rejected by the receiving process. Processes use a table-decode to act upon incoming packets. A basic rule is that if it does not decode, it is rejected.

(4) The executive services subsystem 904 eventually rejects packets from a process that sends a stream of identical packets, and the executive services subsystem 904 reports the process to the System Monitor. This is behavior indicative of a process that has entered an endless loop. In such cases, JSAM will attempt to trap the host of the offending process and, failing that, will logically remove the host from the system.

A rogue process may result from insufficient implementations, testing, or intermittant hardware malfunction.

A trapped or failed processor removes from the system the processes that were hosted by it. Whatever insurance schemes were adopted by the failed processes then come into effect.

As previously described, JSAM maintains a list of processes active in each processor. When a processor failure is reported, it inspects the associated list. Any subordinate node processes wholly owned by a job are reported by JSAM as failed to each originating process. In this situation it is the responsibility of the original process to request of JSAM that they be recovered and to supply any startup parameters. The list entry for any primary node process (that is, a process initiated in response to an original create job request), is inspected to determine if the node is flagged as a non-recoverable, recoverable, or cooperating process.

If the process is recoverable, an attempt is made to find a new host with sufficient resources to accept an invocation of a replacement process. If this cannot be achieved, (of if the process is designated as non-recoverable), the job is killed and reported. Normally, however, the replacement process is initiated in a different processor and passed the last checkpoint data as its startup parameters. The new process will have the same job number as the failed process, but a different Logical Bus ID, as it has moved to a new location. A startup task is to communicate this new ID to associated prfocesses (especially device handlers of owned devices).

Examples of processes that adopt this recovery method are the program development system running in an ideal machine, and the data switch and event notification (DSEN) process that is part of the real-time subsystem 902. DSEN is a singular process that resides in one of the real-time executive 406, 408 (RTEs) and handles the supervisory control channels to the Telephone Room Subsystem 206. It does not maintain any tables, and as such can be automatically recovered if its host RTE fails. It would be restarted in the surviving RTE by JSAM.

If the JSAM process list indicates that a process in a failed host was a cooperating process, the recovery schemes are supported by the system, both when both processes are present together, and also after one has failed. This is accomplished in the following way:

(1) Each process in the system is identified by a Process ID (PID), a 20-bit identification in the system. Seven bits of the PID identify the processor that is hosting the process. This is referred to as the Logical Bus ID(LBID) of the processor, and is a number in the range 64 to 127. The LBID is assigned to the processor when it is integrated into the system at power-up. When a processors traps, its LBID is removed from the system. This eliminates the possibility of continuing to route packets to a trapped processor. The processor is assigned a new LBID when it is put back into system operation. This also makes clear that a process ID is variable, depending upon which processor is assigned to when initiated.

(2) Major software components require invariant global addresses in the system, irrespective of the processor in which they reside. A processor that hosts a critical process (for example, the System Directory Manager) is also assigned a Bus ID (in the range 0-63) that is fixed for the particular software process it is hosting. This means that any process wishing to communicate with, say, SYSDIR will always use the same 7-bit Bux ID, irrespective of the actual processor in which SYSDIR resides. Such an ID is termed a System Bus ID (SBID). The sender uses the SBID or LBID in the packet header, and the executive services subsystem 904 maps SBIDs and LBIDs to Physical Bus Ids (PBIDs) during packet transfer. If a processor hosts more than one system process, then more than one SBID may map to the same processor.

(3) Processes that use cooperating process recovery schemes are also major software components, as they are critical to system performance. SBIDs are therefore normally assigned in sequential pairs, with the first SBID relating to the processor that hosts the first of the cooperating process pair, and the subsequent SBID pointing to the processor hosting the second.

(4) JSAM and the executive services subsystem 904 use the SBID pair to advantage when handling packets for duplicated processes. A "Use Code" associated with the SBID pair tells the interprocess communication subsystem how to translate an SBID to a PBID when one of the pair fails.

On failure of one of a cooperating pair, the following sequence of events occur:

1. The surviving process, if originally primary, remains primary and packets continue to be assigned to it.

2. If the surviving process is the backup process it is now designated as primary and packets are rerouted to it.

3. If the cooperating process is designated as recoverable and resources are available, a new process is invoked and designated as the new backup. The surviving primary then transfers its tables to the new backup and and normal operation continues.

4. If adequate resources are not available, operations continues with the surviving primary until the failed procdssor is replaced and reports itself to the system. Action is then as in (3). This is the normal sequence for failed executive processors (that is, processors controlling one of a bus pair) as only two of each exist in the system, each one hosting a member of a cooperating pair.

Note that this scheme works equally well in maintaining duplicated datasets as well as duplicate processes. When a duplicated dataset is opened, the two file services processors 934, 936 which are attached to the volumes containing the two copies are assigned an SBID pair for the purpose of subsequent record transfers. This allows the SBID use code handling to be taken advantage of in the event of failure.

A failed processor which cannot communicate or which has been logically isolated by JSAM must obviously be removed to a test station for repair. However, for any failure, including processors which subsequently pass diagnostics and are reassimilated, trap information is available in the system log and system monitor. This trap information contains the memory and register dumps sent from the processor coincident with the failure, and the log packets from it and from other processors reporting operation, status and problems before and during failure.

A trapped processor offers considerable scope for both passive and active diagnostics to isolate the cause of the failure. Following a trap, a dump of selected portions of memory is made to the log, which is then available for analysis. The processor can be flagged to inhibit automatic restart, thus the condition of the processor's registers and link stack are available for inspection, either directly by requests from a console or terminal to the trapped processor or indirectly from the dump. The processor's ports and connection to the bus can be tested by special diagnostics initiated from a console or terminal.

When the processor is restarted, either automatically after the trap, or if flagged, after completion of diagnostics, the restart sequence is essentially identical to that of a processor newly-added to a Delta System:

(1) Physical Initialization—Checks the various memories in the processor and reinitializes all of the processor variables, flags, ports and scratchpad registers. The extension board of the standard processor module also performs a physical initialization to quiesce any attached bus or devices.

(2) Start-Up Diagnostics—At the end of a physical initialization the processor reports to JSAM. JSAM then normally requests that REX load and execute the startup diagnostic programs. These diagnostics verify the operation of various processor functions, registers, and self-checks such as parity and ECC. A detected failure causes the processor to be inhibited from reassimilation into the system.

(3) Logical Initialization—After the processor reports successful completion of diagnostics, JSAM requests that a processor type-dependent initialization program be run in the processor. Upon notification of completion JSAM inspects its system resource file to determine if this processor is currently required to host any system processes. If so, REX is notified to load and initiate the processes. This could include a backup process to reform a pair of cooperating processes after a period when the surviving primary has been operating alone. When the new backup is running, the primary is informed and proceeds to bring the backup up-to-date by table transfers (or record transfers if a duplicated dataset). The system is then in a position identical to that which existed before the initial fault occurred.

E. Cooperating Processes

In adopting a dual cooperating process approach to sustained system functioning, several implementation schemes have been used. Each has specific advantages when used in the various subsystems and functional areas of the Delta System. All system software processes and some utilizies and handlers use dual processes to guarantee uninterrupted system operation in the face of processor or bus failure. The following sections describe four specific schemes used in the system 100. The two aspects which characterize each particular scheme are: (1) the relationship between each process during normal system operation (that is, when both processes exist) and (2) the reaction to failure to one of the process pair.

During normal operation of a master slave hot-standby pair of processes the user communicates only with the master process. The master is responsible for updating the slave's tables to maintain its takeover capability. If the master fails, the slave becomes the new master and all subsequent interaction is between the new master and the user. If either the master or the slave fails it is reported. When the failed process is restored, it becomes the slave to the surviving process.

This scheme is used for JSAM. One of the two executive services processors 916, 918 hosts the prime (master) copy and the other hosts the backup (slave) copy. The fully redundant master/slave hot-standby is used because JSAM is the major fault-recovery mechanism for the rest of the system, and must have a fast response backup to recover.

During normal operation of a hog-stanby pair, the user communicates with the prime process which acts upon the request. The backup maintains the same information as the prime, but does not act upon requests. If the prime fails, JSAM notifies the backup that is is now prime and it takes over the process to complete the request.

This scheme is used mainly by system processes resident in ideal machines (Pascal-sourced processes running in a general purpose processor). Although the backup is fully redundant, it is tying up only an ideal machine, not a whole processor. As each general purpose processor can host a large number of ideal machines, this scheme is not inefficient in machine usage terms, but is highly efficient in terms of the reduction of interprocessor data-exchange traffic. Due to the large amounts of memory available in each general purpose processor (up to 8 Mbytes), system processes tend to build up large memory-resident data bases, which are faster and more easily maintained than disk-resident datasets. It would be very inefficient to have to pass this data between a prime and a backup as in the master/-slave scheme. It is far more efficient to let both the prime and backup processes dynamically maintain them by parallel processing.

Examples of system processes using hot-standby pairs are SYSDEV (System Device Manager) and SYSDLO (System Device Long-on Process).

A load-shared primary and secondary scheme is used where dynamic load sharing is required between the two processors. Each is assigned work by the prime, based upon some specific load-sharing algorithm. When one of the team fails, the survivor takes on the load of the failed member. Obviously, the load assumed by either member can be no more than 50% of total capacity so that in the event of failure adequate capacity exists for takeover, but the two lightly loaded members, during normal operation, can provide better response time than if a hog-standby scheme had been used. If the pair is also driving duplicated hardware resources, this scheme also shares the load on the hardware, thus improving overall system performance.

This scheme is used in the real-time executives 406, 408 of the real-time subsystem 230 for the processes that control circuit switching and supervision of the real-time bus pair. This results in equal loading of time slot assignments on the bus pair such that the task of reconstituting a failed bus interconnect is not biased depending on which bus fails. To speed the response of takeover, each real-time executive 406, 408 can directly monitor the bus activity of the other real-time executive, and can immediately detect if the other has failed (by detecting loss of the bus clock). In this event, the survivor immediately begins the takeover sequence, which must be completed very quickly in a real-time environment.

A scheme using dual parallel processes can be used when there is a static assignment of requests to copies of the same process in different processors. The user is directed to talk to one or another of the processes, depending upon his particular request and how the request maps onto the preassigned responsibilities of each process in the pair. If one fails, however, the survivor takes on the load. During normal operation, each member of the pair ensures that the other's tables are up-to-date such that a takeover can occur.

This scheme is used with device handlers in the two interactive service executives 702, 706 (SXs). During normal operation each interactive services executive is responsible for a subset of the devices attached to the U-V bus pair 704, 708. Each is host to copies of the various device handlers required. When a user wishes to communicate with a specific device, he passes a request to SYSDEV. SYSDEV acquires the requested device (if free) from either the primary or secondary interactive services processor, depending upon a predefined load-sharing plan. It is possible for a user to be talking simultaneously to one interactive services processor for one device and the other interactive services processor for a physically different, but same type, device.

The comments on loading and response time for load sharing discussed previously apply equally as well to this scheme (that is, 50% loading at maximum, but faster response and better hardware utilization).

The various techniques for achieving high integrity with datasets are summarized below. A dataset can be created as a duplicated dataset. This allows a prime copy of the dataset to exist on a disk drive attached to one file services processor 934 (FSP) and a backup on a drive attached to a different file services processor 936. During the sequence for control records, the record is sent to the prime file services processor 934 which updates one copy of the file. The prime file services processor 934 passes the record to the backup file services processor 936, which updates the second copy, and responds to the user. In this way the user is assured of successful updating of both copies. If one file services processor 934, 938 fails, or the drive it controls falls, or the vcolume containing the dataset is scratched, subsequent records are sent to the surviving dataset, (which is automatically prime) and changes to the dataset are marked. When the failed dataset comes back on-line, the two datasets are automatically resynchronized by copying changed records from the survivor to the lagging dataset.

PRINCIPLES OF OPERATION

A. Operational Principles

Underlying the functional organization of software components of the system 100 is a general operational structure that is consistent in any processor of the system 100 and applies to all levels of software functionality. Major system components, applications, utilities and ideal machine monitors are all implemented using the same set of basic techniques thus enforcing a rational method of building both the system and the application tasks.

Three major concepts are fundamental to all system 100 software. These are:

1. The Process—An identifiable separate element consisting of a prgram which is resident and confined to a single processor in the system. Every processor in the system 100 can host a large number of processes, where each process can be an element of some larger functional component.

2. The Job—A unit of work composed of a logical group of processes created expressly for a purpose. The component processes of a job can individually reside in any of the processors of system 100, their allocation to a processor determined by their resource requirements and availability rather than any "a priori" assignment. The system 100 supports a large number of concurrent jobs. Jobs are created and terminated dynamically in response to internal and external events.

3. The Packet—Each job is a cooperating set of system-wide processes that intercommunicate by way of discrete packets. A packet is a 16-word data structure that any process can send to any other process, provided the identification of the destination process is known. The transfer of packets between processes is supported at the basic hardware and firmware level by the buses, processors and resident executive of the system 100.

The use of discrete packets to communicate between the elements of a job formalizes cooperation and ensures high job reliability. Processes, jobs and packets are described in detail in the following sections.

Referring now to the real-time executive 408 shown in FIGS. 45 and 6 by way of example, each processor comprises a CPU 504, scratchpad 510, program memory 506, 508, 614 and data memory 616, a firmware resident executive 508 and dual port access to the interprocessor bus through a port control unit 502. Each processor type can be extended with one of five normal extension boards (NEBs) that can extend the amount of program and data memory, provide interfaces and channels to attached devices or buses, and extend the instruction set of the CPU.

A process is the basic component of all user and system activities in the system 100. Each process resides in a single hardware processor and performs work in the system by using the resources of the processor that hosts it. Associated with each process is some executable program code resident in the processor, together with a set of data uniquely associated with the process, called its "context", and a control data structure called a process control block. Each process requests of the processor hosting it the computational and other resources required for execution. At any one time, a large number of processes may be competing to use the processor. Others may be dormant awaiting occurrence of some internal or external event. One function of the processor's resident executive (REX) is to manage the allocation of its processing resources to each process as the process become eligible for execution.

At any one given time, a processor is performing work on behalf of only one specific process. When a process is initiated, the processor's internal registers are loaded with data describing the initial state of the process, and the machine proceeds to execute the program code associated with that process. The processor remains dedicated to executing that program until control is either voluntarily relinquished back to REX or some external hardware interrupt occurs. The state of the process when suspended, as described by the internal machine registers, is saved in the process control block (PCB). The process control block is enqueued to either await an event or to complete once again for processor resources. A certain area of the processor's scratchpad memory that was assigned to the process when it was created (its scratchpad context), and used by the process when it ran, is also left untouched until the process is allowed to execute again. The processor is assigned by REX to the "context" of the next priority process (by loading its desired register values, and pointing to its private area of scratchpad). In this way, a previously suspended process resumes execution, or a newly created process begins its execution.

In uniprocessor (i.e., single cpu) machines, this technique of sharing the processing resources of the machine among a number of processes is termed concurrent process operation or multi-processing, although processes actually execute in a one-at-a-time sequence. Concurrent process operation refers to a number of processes resident in the machine which are all concurrently at some point of progress, with each one being singularly advanced through its lifetime as it is allowed to use the machine's resources. In the system 100, simultaneous processing does occur as processes in physically different processors execute in parallel.

The difference between a process and a program must be emphasized. A program is a static set of code that is loaded into a processor, and used when executing a process. A program is still a program even when it is resident in a library on a disk. A process is a dynamic entity that exists only in the processor with a processor control block and a data context allocation. A process uses a program to achieve its objectives. It is possible for a number of like processes to use the same loaded copy of program code in the same processor. When one process suspends running at some point in a program, another process may begin operating at a different point in the same set of program code. What distinguishes one process from another is its unique scratchpad memory, data context and process control block which collectively describe the process and its current state.

Every process that exists (i.e., has been created) in the system 100 has two important identities.

Firat, each process is uniquely identified by Process Identification (PID). This is a 20-bit code that locates a specific process in the system (including both processor and context). When individual processes communicate with each other, the Process Identifications are used to locate the destinations. Although the system 100 is constructed from a number of separate hardware processors, it is transparent at the individual process level. A process can identify and communicate with any other process, whether resident in the same or a different processor location, with equal ease by way of the Process Identification.

A second identity that a process has in the system 100 is the job number with which it is associated. This is an organizational identity that is given to the initial process when the job was created and further extended to apply to any other processes created for the express purpose of completing the job. A job is a complete, individual functional entity created to perform a specific task. To perform its task, more than one process may be created in the various processors of the system 100 to work together to implement the job. Each job is assigned a unique 16-bit job number, and each constituent process is identified as being a member of the job by the same 16-bit number.

Processes communicate via packets of 16 words each. Packets are of two basic types—process and data. Process packets are used to synchronize operations, invoke functions, request services, report status and respond to any of these. Data packets are used to transfer blocks of data from one process to another.

The sending process is responsible for packet construction and format. Each packet begins with a header consisting of the Process Identification of the target processor and sendin process plus function codes defined and used by the target process and sending process.

In data packets, the header is followed by one or more bytes of control information and up to 28 bytes of data.

In process packets, the header is expanded to include the Process Identification of the source, thus facilitating a reply from the target to the sending process. Most process packets also include a job number or other validation number, plus additional information as required by the receiving or subsequent processes.

A process sends a packet by invoking a REX function, directly for privileged processes and via an ideal machine function or procedure for restricted processes. When a packet arrives for a process, either as an expected reply to a previously sent packet, or unsolicited, an "event" is defined to have occurred. A suspended process waiting for the packet is activated by the event and can queue with other dispatchable processes to use the processor in order to receive and interpret the packet. A packet arriving unsolicited for a running process is placed on its list of events awaiting action that is maintained on its behalf by REX.

To ease the problem of decoding incoming packets, a process can build a 16-entry branch table of alternative start addresses. Each packet header includes a 4-bit function code which can be used to index to a specific routine within the process.

Packet transfers are handled on behalf of a process by the REX in the host processor and by the Inter-Processor Communications Subsystem. The multiple REX utilities in each of Delta's processors and the executive services subsystem 904 form a location independent inter-process communications network. At the request of the sending process, REX enqueues the packet or block transmission request until either of the output ports are available. When available, REX places the packet in an output port of the processor and transfers control of the port to inter-process communications.

Inter-process communications transfers the packet out of the source host, over the high-speed executive bus 912 or 914 to the port in the processor hosting the destination process. (This could be the same processor from which it was sent.) The arrival of the packet is posted to the destination process as an event.

A job is an organization of one or more processes invoked to perform a specific task. A job is a system-wide entity that can be created or terminated by a single request, and uniquely identified during its existence from other jobs in the system by a job number. The system 100 can concurrently host a large number of different jobs.

A job consists of a set of processes, each resident in a system 100 processor, and having a tree-structured hierarchical relationship to each other. This structure is referred to as a process network with each component process termed a node of the network. Each job's process network has a single process called a primary node that is created as the initial response to a request for a job to be created.

As the primary node proces executes, it can request that other processes be created. For example, this can occur when the primary node requires the services of other system 100 resources not available in the processor in which the primary node resides, or it can occur purely as an organization expedient. Each process created by the primary node is subordinate to the primary node. Thus, if the primary node is destroyed or terminated and not restored, any nodes it created (i.e., any processes it started in a different or the same processor) are also terminated. As each process is created, its process identification is passed back to the creator; and the process identification of the creator is passed to the new process. This allows the primary node process and its subordinate node processes to communicate with each other by packet transfers. By this mechanism, a simple star network of processes can be formed.

To extend the network further, it is possible for each subordinate node to itself create further sets of subordinate nodes. The relationship between the node and its created set of subordinate nodes is the same as that which exists between the initial primary node and the first set of subordinate nodes i.e., if a node is removed then any nodes it creates are also removed. Each node can communicate with the processes of the nodes it creates or its own creator, but not with processes of other nodes, or nodes below its own subordinates (unless explicitly given their process identification numbers). Thus the initial star-structure of the job's process network is transformed into a general tree-structure. The creation of subordinate processes can be carried to anh depth, and nodes and sub-nodes can be dynamically added or removed during the lifetime of the job. The job's tree-structure is not a static organization, but can expand and contract as required. If a node is removed, all of the tree-structure below that point disappears. To terminate a completed job, all that is required is to terminate the primary node. Every process created is allocated the job number of its creating process. Thus all processes in a process network have the same job number.

A process network can be likened to the structure of a block-structured program. The main body of the program (the primary node) can declare (create) and use (send packet to) a number of procedures (subordinate processes). Each of these procedures can themselves be structured by internally declaring to it further procedures (create a second level of subordinate processes) that it can use, but which are not within the scope of the main body of the program (the primary node only knows the process identifications of the processes it creates, not those of processes created below them.)

As a process is a processor-level entity, a job is a system-level entity. The primary node and subsequent subordinate nodes are created in any processor that has sufficient resources available to host the nodes. The inter-node links are set up by exchanging process identification numbers.

In many cases, a single primary node is all that is required to realize a job. This is a specific instance of the general structure.

Jobs are initiated and processor resources are allocated by a set of processes referred to as the job scheduling and allocation monitoring (JSAM) subsystem. JSAM itself is an example of a job, and is bootstrapped into existence when the system 100 is first powered-up. One of JSAM's first actions is to initiate all of the required system jobs bringing the system 100 up to operational readiness. JSAM can then accept requests to create new jobs.

JSAM receives a request to creat a job as a single packet. As JSAM's process identification is fixed and known globally, this can be sent from any process. (Note: All level 2 system processes have fixed process identification numbers and fixed job numbers so that they can be addressed from anywhere in the system.) Included in the request is a function identification that defines the program required to be run as the primary node, a function mode, and a set of start-up parameters for the primary node. JSAM's job management routines note the existence of a new job by creating a job control block (JCB) that contains all relevant details relating to the job and is periodically updated to reflect the current job status. As the process control block is to a process, the job control block is to a job.

Job management passes the function ID to an area in JSAM referred to as node management, which uses the function ID to obtain from the system directory manager the resource requirements of the program or programs capable of fulfilling the function requirements. For each program, this includes the processor type required, the processor-specific resources required (DMA channels, for example), and any external devices required. Node management attempts to find a processor with sufficient resources to match the needs of the program. If it can find a processor not only with sufficient resources available but also with the actual required program code already loaded, that processor is the first choice. Otherwise, the first processor found that is able to host the node process is selected. Node management sends a create process request packet to the REX of that processor, which loads the program (if not already resident) and creates the process. A separate function of JSAM is to monitor and update the status and loading of all processors. Thus, JSAM can efficiently search for an acceptable host processor by internally inspecting its own processor status tables.

For any desired function, there may be more than one program or program versions capable of fulfilling the functional requirement under the following circumstances:

1. Functionally equivalent programs which must be adapted in order to conform to differences in the instruction repertoires to permit execution on different processor types.

2. More than one mode or version of a processor type or of REX may co-exist in a single system, particularly during an upgrade or retrofit. Different program versions may be necessary to properly utilize the different hardware versions.

3. A new version of a program may be introduced into a system for limited operational testing alongside the current version.

4. A new conditional version of a program can be tentatively introduced in such a way that any subsequent processor failure causes the new program to be removed from availability and replaced by the predecessor version.

Where case one or two exists, a given function ID will reference a list of one or more programs for each processor type, model or version. Normally, each list will include an operational version of the program to be utilized with the associated hardware. In case four, if the entire system is operating in the "conditional state", then a conditional version of a program will always be selected in lieu of an operational version. (The conditional state must be set manually from a system console and is automatically reset in the event of any processor failure). In case three, the create job request can designate a mode (2 through 255). If a test version corresponding to the mode exists, then it is to be used. Otherwise, the current operational (or conditional) version is to be used. The mode designation is applied to any subsequent node requests initiated under that job number.

If node management cannot successfully initiate a job's primary node, job management returns a negative acknowledgement to the requesting process. This process is responsible for effecting any subsequent retries.

Once a job's primary node is running, it can send requests directly to JSAM's node management to create subordinate nodes. Node management acts upon these requests identically to an initial request from job management for a primary node. To reduce the burden in setting up a large number of subordinate nodes, a single request can specify up to three function IDs in one request, each one for a different subordinate node. Alternatively, a single value called a node ID can be supplied that references a node descriptor table in JSAM with each entry containing up to five function IDs for subordinate nodes. If all of these nodes can be successfully initiated, node management responds to the requestor with the process identification numbers of each node process created. This can be repeated to an arbitrary depth of sub-node creations.

Apart from providing node creation services while a job is running, JSAM can provide failure recovery services in the event a processor fails. JSAM is able to do this since it is responsible for both monitoring the status of each processor attached to the executive bus 912, 914 and managing the intelligent controllers of the executive bus 912, 914 which perform all packet transfers.

If JSAM detects, or learns, that a processor has failed or trapped, it inspects its tables to identify what node processes were resident in it. If any subordinate nodes were hosted in the failed processor, the failure is reported by sending an alert packet to the highest level surviving control node which is responsible for restarting the failed node, if this is the logically correct course of action. If a primary node is detected to have failed, and it is flagged as recoverable, JSAM will attempt to reinitiate it in an alternative processor, restarting the new primary node at a predefined restart address. JSAM will pass to the reinitialized primary node the last 16 bytes of checkpoint data stored by the processor prior to the failure.

JSAM can also assist Level 1 and 2 system processes to efficiently implement one of a number of prime/backup recovery schemes through its ability to control the routing of packets. Packets addressed to the prime version of globally-known paired system processes are automatically rerouted to the surviving member of the pair if failure occurs.

A process that originally sponsors a job request to JSAM is not ignored once a job is underway. When a process originally sends a job request to JSAM, it also provides a reference number. When the job is successfully running (or rejected if it can't be started), JSAM reports back to the requestor, quoting the reference number, the process identification and status of the primary node, together with the job number that JSAM assigned.

A job can terminate in one of three ways. It can run to completion and request the deletion of its own primary node it can fail to start after waiting its maximum delay on a schedule queue. Or, it can be forcibly terminated by a privileged process.

At the individual process level, within each processor, the time management services of REX can be used to manipulate an arbitrary number of programmed timers. With these, time-dependent operations can be organized in the processor. At the system-wide level, it is also possible to organize complete jobs on a periodic basis. A request for JSAM to create a job can be made on a time-scheduled basis rather than immediately. A scheduled job request supplies, in addition to the usual program ID and reference values, a time at which the job request is to be acted upon. The time can be scheduled in six minute intervals for a given day of the week, date and month or Julian date, and the same job can be repeatedly rescheduled according to a variety of regimes. Once the schedule time matures, the job request is handled as if just received for immediate action. For finer time control than six minutes, the primary node can use its host REX to provide timer functions.

JSAM also allows individual packets to be stored and then mailed to a specified proces at a predetermined future time (again, at intervals of minutes and reschedulable). Rather than send a packet directly to a process, a scheduled activity packet can be sent to JSAM containing a packet header, a scheduled delivery time, reschedule criteria, and up to 16 bytes of data. When the time matures, JSAM constructs a packet using the header provided (which contains sending and recieving process identification numbers) inserts the user-supplied data, and posts it to the destination.

Each system 100 process or supports two process types, main processes and subprocesses. In operation, both types are treated identically by the scheduling and dispatching functions of REX. The difference between the two is related to the hierarchy of their creation and the use of a processor's scratchpad memory.

To achieve very high speed multi-process operation, processors in the system 100 have a large, 4096-word set of working registers referred to as scratchpad memory. Each word of this memory has a read/write time compatible with the other major registers in the processor's CPU. At any point in time, the state of a process is reflected by both the contents of the CPU's internal registers, and the content of a set of working registers in scratchpad memory that the process is using. If a process is to be suspended in favor of another process, the current values of all of these locations must be preserved until the suspended process can execute again. After saving a suspended processes' "context", new values reflecting the startup state of the replacement process must be supplied. This register-swapping is an overhead in multi-process environments and has to be reduced to a minimum.

To achieve this in a system 100 processor, a processes' scratchpad register set is left untouched while it is suspended. This is achieved by assigning each main process its own private area of scratchpad memory, called its context. During the lifetime of a process, its context in scratchpad memory remains assigned for its use only. Thus, when a main process is suspended, only a small number of internal CPU registers need be saved, as the contents of its context in scratchpad will be preserved until the process runs again. This reduces the process swapping overhead to exchanging six SPU and processor extension unit registers together with a selectable depth of the subroutine link stack between the process control blocks of the processes, where they are saved while a process is suspended.

Scratchpad memory is divided into 32 pages of up to 128 registers each (128 registers equals 1 page). A context consists of a part or all of a page. Page zero of scratchpad is reserved for global use, page one is REX's own context, and pages 2–31 are available for allocation to other main processes. Each context must start on a page boundary, therefore, 30 main processes can exist, each with a context identification (CXID) equal to the page number.

A page is further divided into eight packets of 16 words each. When a main process is created, the context can consist of any number of packets from a minimum of two to a maximum of eight. By convention, the context is as small as is reasonable. All unassigned packets of scratchpad are retained by REX and are allocated dynamically to existing processes (main or subprocesses) as required. The approach to the use of the scratchpad resource is thus to initiate processes with the minimum packet allocation of context, and then request more as requires.

As JSAM continously monitors the status of all system 100 processors, it knows if a processor has any free contexts available. This is taken into account by node management when attempting to find an eligible host processor.

Before a main process can be initiated, the code of the program specified in the create process request must be resident in the processor's program memory. It it is not, REX sends a request to the system loader (part of the system directory manager SYSDIR) to load the program before creating the main process.

An initiated main process therefore consists of an allocated context in scratchpad memory, a process control block constructed in data memory, and a program in program memory. A new process is immediately placed on the list of dispatched processes to compete for use of the processor's resources. This allows it to perform its own logical initialization which could perhaps include requesting JSAM to create a set of subordinate nodes which will be allocated under the same job number.

Within each separate context allocated in scratchpad for main processes, more than one subprocess can operate. Each main process can create subprocesses all of which share the same context. These subprocesses themselves can also create further subprocesses. Up to 255 subprocesses can share the same context as a single main process. Each subprocess has a subprocess control block identical in format to a main process control block and can compete on equal terms with a main process for use of the machines resources. Subprocesses can queue events in a manner similar to that of a main process.

Main and subprocesses introduce a hierarchical structure into process organization. Only main processes can be initiated by JSAM in response to a create node request, specifying a function ID. Once running, a main process can then create any number (to 255) of concurrent subprocesses to implement the function of the node. The program code used by the subprocess must be loaded before the subprocess is created, and is usually part of the program loaded when the main process is created.

In addition to the context ID (CXID), a subprocess has an identifier called a subprocess ID (SPID) in the range 1-255. A main process has a subprocess ID of zero. Thus any process can be uniquely referred to by its processor ID, CXID, or subprocess ID.

An example of the use of a subprocess can be found in the file service subsystem 908 (ESS) which has a main process resident in each file services processor 934, 936. Once a dataset has been opened by a user, a READ or WRITE access request is sent to prepare buffers for a subsequent GET or PUT operation. In response to an access request, the file services subsystem 908 creates a specific subprocess to handle subsequent communications for all GET/PUT operations. Using this scheme, it is possible for a user to specify multiple READ/WRITE access requests, and perform concurrent GETs and PUTs, each one being handled by a separate subprocess in the file services subsystem 908. Each individual access subprocess is uniquely identified by the different subprocess ID returned to the user in response to each READ/WRITE access request.

The shared main context of scratchpad is a useful means by which main and subprocesses can communicate. To provide a non-conflicting private context area for each process any combination of the eight packets that make up a context can be defined to preserve and restore the context each time the subprocess is suspended or dispatched. In each process control block, and 8-bit field is used as a map of the context packets to be swapped in from data memory when the process executes. A related field in the process control block points to a save area in data memory to which the same packets are swapped when the process suspends. The swapped packets are referred to as the subprocesses' shadow context.

A variation of a main process exists called a bypass main process. When a main process is created it can be designated to not only receive all packets addressed to itself (i.e., subprocess ID=0), but also all packets addressed to the context regardless of the subprocess ID (i.e., subprocess ID 1 to 255). This can be used where a main process needs to monitor packets being sent to its own subprocesses.

Processes (main or sub) that are not suspended awaiting some internal or external event are maintained on a queue of dispatchable processes competing for the use of the CPU. Each processes' process control block contains a bi-level dispatching priority, consisting of a 5-level class, and within each class, a ranking from zero to 255. Therefore class zero, rank zero is the lowest possible priority in the system, and class 4, rank 255 is the highest.

REX always selects from the queue the highest priority disoatchable process for execution. Once given control, the process is allowed to execute until it voluntarily relinquishes control or is interrupted by a hardware interrupt. Typically, a process can give control back to REX when it WAITS or QUITS, or attempts to perform an operation via some unavailable resource. The process is then either terminated (i.e., after a QUIT) or placed on one of a number of event queues, each queue related to the reason the process was suspended. When the appropriate event occurs, it can then return to the dispatch queue to compete for use of the CPU.

The dynamic activation and suspension of processes is determined by the occurrence of events. An event is any change of state, either hardware or software, that can be recognized and communicated to a process.

An external hardware event can cause an interrupt to occur, causing an interrupt handling program to be entered. All interrupt handling is managed by REX and is transparent to the user's process. Dispatched processes run at the noninterrupt level 3, with REX's interrupt handlers being able to run at interrupt levels 0, 1 and 2.

Processes can manage their activity by way of software events. Typical software events include:

(1) Receipt of an input packet via REX.
(2) Expiration of a time interval.
(3) Completion of an I/O operation.
(4) Termination of a subprocess.
(5) Availability of a resource.
(6) A signal from a coresident process.
(7) A user-defined event.
(8) Availability of a previously unavailable resource.

An event and its relationship to a process is defined by a data structure called an event control block (ECB). When an event occurs, an event control block describing the event is linked to the processes' process control block. If the process is executing, the event control block can be actively checked by the process for occurrence. Alternatively, a process can wait for a specified event to occur, or for any event related to that process to occur. Until the event occurs, the process can be suspended and other processes can use the machine.

Events can be either unsolicited or solicited. An unsolicited event typically occurs when a packet arrives unexpectedly for a process. This will be picked up by the process either next time it checks its list of event control blcoks, or the next time it "waits" for any event. A solicited event is one which is expected by the process. For example, in a packet exchange, a confirmation packet is often sent back from a destination process to the sender. In this case, the sending process can set a timer associated with the event, and when the event actually occurs (in this example, the receipt of the return packet), the process can check to see if the event occurred before or after the timer expired.

Packets are classified by each process into 16 function code types, corresponding to the function code in the packets addressed to the process. The process defines a function code table that contains a program entry point for each permissible function code. The table entry is used as a vectored return address for the process when the event is either actively or passively detected. The function code in each packet header relates directly to this vector table. Each acceptable function code causes a hump to a specific handling area of the process when the "packet received" event control block is checked or waited upon. Packets containing function codes not posted in the table are rejected by REX and discarded.

Also associated with the function code is the function mask. This is a 16-bit mask that designates a function code as an unsolicited event-type if the corresponding bit in the mask is set. This allows packets with incorrect pack function codes to be rejected and not be treated as significant events. This provides a degree of protection against ill-formed packets. Both the function mask and a pointer to the function table are kept in the process control block. For further decoding of unsolicited packet-related events, word 4 of the packet is normally reserved for further packet function identification. For solicited events, the process can provide a 16-bit reference value to identify which event is which when multiple events are expected.

Processes can explicitly generate future events by setting timers. Timers are set up by a call to REX from a process, which generates a timer event control block and places it on a list of similar timed events that REX manages. The process can continue execution, checking for the occurrence of the timer expiration event directly, or can suspend until the time specified in the call to REX matures. The timer period can be specified in increments of 34 microseconds, 1 millisecond or 1 second intervals, with a 16-bit value giving 65,536 increments.

Each processor in the system 100 uses its own hardware clock to generate the basic 34 microsecond time interval. The absolute clock values of all of the processors is regularly synchronized by JSAM, whose host processor clock contains the system's "master clock".

A further class of user-defined events relates to the cooperative use of resources by a number of processes and the synchronization of process activity related to the use of a resource. For example, access to a common stored data memory area by a number of processes, each of which references and updates values in the area, must be controlled such that only one process is performing an update at any one time. This can be achieved by the use of a named binary semaphore managed by REX that can be enqueued upon by processes wishing to access the single-use resource. A process successfully requesting the use of the resource sets the semaphore. Any other process requiring to access the resource first tests the semaphore. If it is set, the process is suspended until the semaphore is reset by the process currently using the resource. The next enqueued process is then dispatched and the semaphore is reset. The binary semaphore acts as a one-process "gate" to the resource. An individual semaphore is referenced by a user-supplied 16-bit number.

For access to limited multiple resources, a general semaphore service is provided by REX. This is used in a similar way to a binary semaphore except that it has an associated counter, rather than a simple go/nogo binary value. When the general semaphore is first set up by a call to REX, an initial count is provided that reflects the amount of resource available. Every access to the resource is preceded by a call to the general semaphore, which decrements the value. If any process decrements it to zero (indicating exhaustion of the resource), the calling process is suspended until another process finishes using one of the available resources and increments the value from zero. The suspended process is then dispatched. Use of general semaphores permits a number of processes to share a pool of devices (at some higher level than provided by the system device manager).

C. Inter-Process Packet Communications

Processes communicate with each other via packets. A packet can be sent from any process in the system 100 to any other process in any processor. To send a packet, a process constructs the 16-word packet in either data memory or in the processes scratchpad context and then calls a REX routine to send the packet. REX queues the packet on the executive bus output ports of the processor, and loads the packet into the first free port (X or Y bus ports). When the bus polling microprocessor (part of the main interprocessor executive) polls the part, the port responds that a packet is ready. The microprocessor reads the first word of the packet out of the port. This first word contains a field which identifies the logical address of the processor hosting the destination process to which the packet is being sent. This logical address is transformed (via a table look-up) to the physical address of the destination processor. The in-port of that processor is checked. If it is busy (still unloading a previously sent packet), the transfer request is queued by the microprocessor which continues polling other processor's out-ports.

When the destination in-port becomes free, the packet transfer is completed between the out-port of the sending processor and the in-port of the receiving processor. The parity of each word is checked during transfer. The REX of the receiving processor then transfers the packet to data memory, places the pointer to the packet in an event control block (having constructed an event control block if the packet is unsolicited) and posts the event control block to the receiving process. The receiving process can then pick up the event control block (and hence the pointer to the packet) when it next checks its list of event control blocks or "waits". The function code in the packet header is used to vector the receiving process to a service area for that packet type, using the predeclared function code table.

During a transfer, the process that sent the packet has a number of options. The simplest is to send the packet and continue. However, for security, most interprocess packet eschanges are in pairs, with the sending process expecting some form of response from the receiver, usually either a reply to the packet or an acknowledgement of receipt. To facilitate this during the send operation, the sender can specify a return event control block by which it can be informed if a return packet related to this send operation is received, together with a time-out value defining a maximum response time. At the receiving end, the destination process can use the REX "RESPOND" facility to return a response packet to a sender with minimum overhead.

The sequence of events for transferring a packet requires the sending process to build and store the packet, call send in REX and then await the return packet until a post matching solicited ECB in REX activates a wake-up sending process. The sending REX, upon the occurrence of call send, places the packet on the bus out queue, waits for a bus output port, and then passes control to the outstack handler. Upon receipt of the return packet the sending REX activates the post matching solicited ECB. The executive services subsystem 904 polls the processor outstacks until the packet is detected. It then decodes the logical address to obtain the physical address, polls the receiving processor instack, and when available transfers the packet. The return packet is handled in the same manner by the executive services subsystem 904.

Upon transfer of the packet to the instack, the receiving REX executes an instack interrupt handler and posts an unsolicited ECB. The return packet is output in a manner similar to the sending REX procedure. The receiving process checks the ECB's and upon finding the packet, generates and sends the return packet.

A sending process can also define an event that informs it as to when the packet actually leaves the host processor which could be some period after it requested the packet transfer due to a queue to use the executive bus ports 517, 519.

A method of sending a packet directly to a coresident process is provided by REX. This avoids having to queue for use of the I/O ports, and is obviously much quicker. However, no system-level check of this packet transfer is possible as the executive services subsystem 904 is not involved. Also, in the system 100 processes can "float" from processor to processor as system configuration changes, and general use of this method is not encouraged.

The first three words of the 16-word data structure of a standard packet contain the routing information needed to identify the destination and the sending process. The two 20-bit process identification codes are packed into three words, each field having the following meaning:

| Word 0 | FCODE | Bits 15–12 |
|---|---|---|
|  | CXID | Bits 11–8 |
|  | LBID | Bits 7–0 |
| Word 1 | ASPID | Bits 15–8 |
|  | SPID | Bits 7–0 |
| Word 2 | RFCODE | Bits 15–12 |
|  | RCXID | Bits 11–8 |
|  | RLBID | Bits 7–0 |

1. Process Identification of Destination—This consists of two fiels in Word 0 and one field in Word 1. Word 0 contains:

LBID—The logical address of the destination processor (range 64–128) or the fixed address of a major system jobs' primary node, in which case this field is termed the System Bus ID. A single physical procssor can host as many System Bus ID's as it hosts system processes. System Bus ID's are in the range 2–63. Inter-Process Communication replaces either LBID or System Bus ID with the Physical Bus ID (PBID) after consulting its polling tables prior to completing a packet transfer. PBID range equals 0–31.

CXID—Context ID of destination process (0–31). Word 1 contains the Subprocess ID (SPID) of the destination process within the main context (equals zero if destination is the context main process).

2. Process Identification of Sending Process—This is contained in the upper byte of word 1 and word 2. Note that to "turn" a packet header around requires only swapping words 0 and 2, and swapping the bytes of word 1.

The four-bit function codes (FCODE) relate to the sending and receiving (RFCODE) processes' function table and provides a first-level filter for up to 16 classes of packets that a process might receive.

Word 3 usually contains the Job Number of the sending process, and enables the receiving process to validate the packet's source. Word 4 can contain further fields identifying the exact identity of the packet, and Word 5 is often used for control, status and error flags.

Note that, apart from the header, the definition of the meaning of the fields in a packet is the responsibility of the sending and receiving processes.

Large amounts of data need to be moved through the system when input/output operations occur. For example, if the system 100 were being used to record voice, voice data is moved from the RECORD process in a real-time processor 410, 412 along the inter-processor executive bus 912 o4 914 and to the specific ACCESS subprocess handling the transfer in a file services processor 934, 936. Packets are still used to effect the transfer, but these packets are built, sent and controlled by the REX's of the two processors involved; these functions are invoked by calling REX input/output service routines (IOSRs). Once REX has set up a multiple-packet data transaction, it can use more efficient packet formats than the standard format, reducing the 3-word header to two words for the majority of packets. Further, REX includes a sequence number in each packet so that the order of data can always be preserved. Packets used in mass data transfer are referred to as immediate packets as they are addressed to REX's process (i.e., Context 1, Subprocess ID 0). Other processes can make use of immediate packet formats to implement their own data buffer transfers, via REX's transaction management functions.

D. System Operation and Control

The time between power initially being applied to a system 100 and it reaching operational readiness is termed the system wake-up period. During this period, the system processes required to realize the particular functional configuration of the system 100 are initiated in suitable host processors. System wake-up is an automatic sequence, guided by the job scheduling and allocation monitor (JSAM), using the contents of the system requirements file (SRF) as a guide to the software components required.

Wake-up takes place at two distinct levels. First, each individual processor sequences through its own wake-up cycle moving from physical initialization through to diagnostic testing to logical initialization. This occurs whenever power is applied to a processor, or when a processor is attempting to recover from a trapped condition caused by a software or hardware error. When the processor has successfully reached the operational status, it is available for JSAM to allocate processes to it via create process requests.

The second wake-up sequence occurs at the system-wide level. This is controlled by the primary JSAM, resident in one of the two executive services processors 916, 918. The JSAM wake-up process itself is bootstrapped into existence as one of the functions of the physical initialization program which is ROM resident in the bus control extension unit 922 of the primary executive services processor 916, 918. Which one of the two executive services processors 916, 918 hosts prime JSAM is determined by which one completes physical initialization first.

The sequence of events comprising system wakeup from this point onward are as follows:

1. JSAM allows five seconds for other processors in the system to initialize and report their operational status to JSAM. JSAM then assigns logical bus ID's to each live processor.

2. JSAM selects a File Services Processor 934, 936 (FSP) that has attached to it a disk drive 930, 932 with a system volume mounted (this is reported to JSAM as part of the file. services processor's wake-up status message). The selected file services processor 934, 938 is instructed by JSAM to continue initialization by loading and running the System Directory Manager (SYSDIR). SYSDIR, as part of its wake-up sequence, initializes the other related processrs in the file services processor 941, 946 of the file services subsystem 908 (a possible maximum of 26).

3. JSAM requests from SYSDIR a copy of the system requirements file (SRF).

The system requirements file fonctains a list of the processrs required to form an operational system. JSAM inspects its list of operational processors and sends create process requests to each processor that provides a resource sufficient to host an entry in the system requirements file. Major system components are started first, and system bus ID's are assigned to them. JSAM sets itself a time-out for this operation and any unsatisfied system requirements file entries at the end of this period are reported to the operator console for consideration. This can occur if a necessary processor fails to wake up.

The system requirements file is maintained by JSAM after wake-up during the normal operation of the system. If a new processor reports to JSAM at any time, the system requirements file is inspected to see if any outstanding processes need the resources provided by the new processor. For example, if the processor hosting the back-up copy of JSAM fails, the absence of a back-up JSAM is noted in the system requirement file. When a replaced of repaired processor capable of hosting JSAM or executive services processor 916, 918 reports itself operational, JSAM will automatically create a back-up JSAM in it.

Due to the very high availability of the system 100, wake-up occurs at very irregular, infrequent intervals. During normal system operation, re-configuration is accomplished by editing records in the requirement and configuration files from a system terminal 270, JSAM can then dynamically adjust the system to reflect the new configuration.

Specifically, the Systems Programmer can:
  (1) Create and send a packet to any process.
  (2) Display scratchpad, program and data memory.
  (3) Alter scratchpad, program and data memory.
  (4) Load a program into a processor.
  (5) Jump a processor to a program memory location.

Human control and interaction with a system 100 is via system terminals, such as system terminal 270. A number of different types of system terminal are supported, each providing varying degrees of access to the system. Physically, each terminal consists of an intelligent visual display unit (vdu) and keyboard with a multipartitioned screen that allows for a number of simultaneous display/interaction areas. After providing a log-on iser ID and password, a system log-on menu is displayed. The choice selection of the user is checked against his usage rights. Providing ID, password and usage request agree, a system terminal 270 with a selected level of access and control is presented. Four types of system terminals are supported:

1. Systems Programmers Terminal—The system programmer's terminal gives the user full access to all of the functions and utilities available at a system operator's terminal. In addition to the normal operations-oriented functions, a System Programmer's Terminal can be used to interact directly with any of the Delta's processors, providing a software front-panel control.

2. System Operator's Terminal—Table 1 shows the function and utilities available via this terminal. The System Operator's Terminal is used for day-to-day control of the Delta by the System Manager. The functions include:
   (1) Set Time-of-Day, Date
   (2) Remote Card Reader Interface
   (3) Program Librarian Interface
   (4) Program Loader Interface
   (5) Change Logpac Parameters
   (6) Change Alarm Message Parameters
   (7) Remote Data Structure Access
   (8) Disk Device Manager Operator Communications (DVOLCOM)
   (9) Magnetic Tape Device Manager Operator Communication (MTVOLCOM)
   (10) System Spool Manager Operator Communications (SPOOLCOM)
   (11) Program Library Maintenance
   (12) System Log Manager Operator Communications (SLOGCOM)
   (13) Add a Device, Remove a Device (Smart/dumb terminals, printers, real-time lines, SCS channels, etc.)
   (14) Mark a Device Inactive 3. Operator Terminal—Provides a sub-set of the capabilities of the system operator's terminal, together with functions for maintenance, field service, updating user ID's and passwords, etc.

4. System File Maintenance Terminal—Provides the capability to update records in system files via an interactive dialogue at the terminal. Each record update request from the terminal is first verified with the chief system user of the file before acting upon the request. System files maintained from this terminal include:
   (1) System Configuration File
   (2) System Requirements File
   (3) System Device File
   (4) Program Library Descriptor File
   (5) Function Library
   (6) SYSDIR Descriptor File
   (7) Node Descriptor File
   (8) System File Maintenance Terminals' own descriptor files The system file maintenance (SFM) terminal can be easily expanded to allow maintenance of other system and application files. It is table driven and can be used to update its own descriptor files. These descriptors not only specify the record types to be updated, but also the associated interactive screen display and dialogue.

As previously mentioned, logically different terminals use the same physical device—an intelligent vdu/keyboard with a multi-partitioned screen. The partitioning and function of each screen area is standard for all terminal taypes as is the man-machine dialogue. The various screen areas may include utility name and status, system status, a scrolled system log display. utility partition no. 1, utility partition no. 2, function prompts, a menu and error messages.

Simple functions can be invoked from the keyboard by pressing one of five function keys, which activate one of five options presented in the Function Print/Menu partition. The functions in the menu can be switched between a large set of groups of five functions.

More complex utilities interact with the user via two dedicated partitions in an individual fashion, but each utility uses the same command interpreter accepting from the keyboard commands with the general form:

COMMAND P1, P2, ... PN;Q1,Q2, ... QM
Where
    COMMAND is a utility-specific command
    P1 ... PN is a parameter passed to the utility
    Q1 ... QM is a parameter passed to the command interpreter.

One screen partition is used to display log packets being sent to the system log (SYSLOG). As SYSMON is the backup process to SYSLOG, these packets are available for immediate display at system terminals. As log packets are generated for specific events by all system processes, the system terminal 270 can show an associated message describing the event that caused the generation of the packet. The screen partition can be scrolled through a buffer of received log packets. A permanent copy of log packets is obtained by printing the contents of the system log via a utility involved from a system operator's terminal.

The System Terminal software can be used to develop application-specific utilities that can be invoked and used from a system terminal. Specifically, the following services may be implemented:

1. Invoke a user-supplied utility (i.e. a process) by name.
2. Provide ID and password security check against a user supplied criteria.
3. Allow use of the utility screen partitions as either two 10×40, one 10×80 partitions or one 2×80 partition.
4. Allow the whole screen area to be used, apart from the status and error message partitions, for the utility.
5. Provide a display buffer for any partitions previously defined above, and automatically maintain the screen partition to reflect the buffer's content.
6. Provide a command interpreter interface between the utility and the terminal.

User-defined utilities provide a convenient method of controlling and interacting with application systems, while maintaining a consistent human interface to all control functions.

The collection of processes providing system terminal functions are collectively referred to as the system monitor (SYSMON), and are an example of a process network. Each terminal manager invoked to interact with a specific physical terminal is implemented as a separate subprocess of a primary node process and a number of co-resident subprocesses provide common functions. The current version of SYSMON is source-written in Pascal and resides in a number of Ideal Machines in a general purpose processor (One IM per process). SYSMON shares a system bus ID pair with SYSLOG. SYSLOG is the primary system bus ID of the pair and SYSMON the secondary system bus ID.

If either SYSLOG or SYSMON fail, log packets are re-directed to the survivor which stores the packets until the failed member is restored, and the stored packets are transmitted to the new copy.

The program development system generates SPM or P-Code files as a result of compiling/assembling/linking operations. These code files are loaded by REX into processors in response to create process requests. A mechanism which links the products of the program development system and the requirements of REX, also allows human intervention at the system level for operational and management purposes. Function and program libraries consist of indexed string datasets resident on system or user disk volumes.

It is possible that several different variations of a program may exist, all performing the same function but each with different characteristics. This is especially true in the system 100 which has a number of different processors each with unique hardware attributes. For example, the system error logger as a function could have two programs available. One realized in SPM machine code, and capable of running in any processor; and a second, identical function program, written in Pascal and realized in P-code, only capable of running in a general purpose processor. Both of these programs would, however, be indirectly identified by the same function ID.

When a user requests a node creation as part of setting up a process network, a function ID can be specified rather than a specific program ID to realize the node's process. JSAM can consult the function library, using the function ID as a keyword. The entry corresponding to the function ID keyword consists of a list of program descriptors each give a detailed description of a program which could fulfill the requirements of the function. JSAM thus has a set of programs that it can match against the known resources of the system 100 when attempting to satisfy a create node request. After performing a dialogue with the function library, JSAM uses the selected program ID in its request to the chosen host processor to create a process.

A function ID consists of three fields:
1. A Function reference number in the range 0–64.
2. A System Version in the range 0–255, used to select between a number of Released Versions of the same program.
3. A Mode value, range 0–255.

User processes can interact directly with the function library to scan potential programs. Furthermore, if a program ID for a specific processor-type is required, a function library name can be used which specifies the processor type (via its normal extension board). The specific program description entry for that processor is returned. The user can specifically request a particular program ID in the create node request to JSAM in which case the function library dialogue is bypassed. The function library is resident on the system volume (duplicated, of course, on the system backup volume). The contents of entries in the library can be manually maintained from a system operator's console, and a degree of automatic maintenance occurs when changes are made to the program libraries (i.e., if a new version of an existing program is created and entered in a program library, the function library is conditionally updated to reflect the change).

The function library provides a convenient logical separation between functions and programs which can be a very useful feature in the development phase of a project, or to provide better capability to survive failure by providing options to get around specific processor-type nonavailability. Note that a number of function IDs can be mapped to the same program, a useful feature in test environment.

The interface to the function library is provided by the system directory manager (SYSDIR).

When source code is assembled and linked together, the output of this process is referred to as a load module. A load module contains from one to 16 separately relocatable pieces called relocatable modules. Each module is limited to 4096 words. The number of relocatable modules is further limited by size constraints in the load request.

A load module may be altered by changes called patches, which may later be removed from the load module. Each load module and related patch set constitutes a unique program on the system and therefore constitutes a different historical version of that program.

Since programs interact with other programs on the system and interfaces sometimes change, there is also a need to coordinate different versions of different programs. Therefore a system version refers to this coordinated change.

All Programs reside in data sets called program libraries. There may be several different program libraries in the system to allow distinctions such as system version, application type or ownership.

A program library is an indexed data set contained on either system or user volumes. The data set consists of three different types of records. There exists one program header record for each program in the library. This record contains program related information, which includes the latest load module number and latest historical version number for the program.

Each historical version of a program has a corresponding program version header. This record contains information relating to that program version including the names of the pieces that compose that version (i.e., load module and patches) and possibly a preprocessed version of the program called a load program. This processed copy of the program has all the patches (if any) applied and is in a format that allows efficient relocation and transfer of the program. Only those versions that are frequently called have load programs built and retained.

The third type of record is a load module record, which contains a particular load module and all the patches that have ever been applied to that load module.

The records are indexed by a key which contains the record type, the program number, and the NEB type and version. Program version headers also have the historical version number in the key. Load module records contain the load module number in the key.

A particular historical version of a program can be uniquely identified in the program library by its program library name which consists of the program library ID, the program number, the NEB type and version and the historical version number.

Programs are also identified by their external ID. This ID is used as an external interface for human interaction. This ID consists of a part number, version number, date program loaded and an alphanumeric nickname.

In order for a processor to execute a process, the program code of that process must exist in program memory. When it is not in memory, the program is loaded by a request to SYSDIR. This request may be sent in response to a create process request by the REX of the processor that wants the program loaded, or it may be forced by a process in another processor.

The requestor passes to REX the program ID of the program to be loaded. This ID might either be known by the process making the request or have been passed to it by JSAM which learned the ID from a function information request dialog, as explained earlier. If the Program ID is a function library name, SYSDIR is used to obtain the program library name by reading the function library record.

There are a number of different types of load requests. A normal load is one where the requestor (i.e., REX) first requests the program load information (i.e., memory and resource requirements) and is then returned the memory addresses for loading the program. A forced load allows the requestor to make a single request to load the program, specifying the load addresses in the request.

Within the scope of normal and forced loads, a primary load is when a program is being loaded to a processor and no other copies of that program code are currently loaded in the same processor. A secondary load (for those programs that allow it) is a load related to a program that already has program code loaded. This will load only process-related data memory modules, which are needed to handle multiple invocations of the same program. Finally, an overlay request is a request to load selected code modules. This mechanism is used to allow the partitioning of a program such that all its code segments do not have to be resident in program memory at the same time. An overlay request is a request to replace one or more of these overlayable pieces.

The 16 relocatable modules in the load module of the program may be of four different types. These are:
(1) Primary program memory modules
(2) Overlay program memory modules
(3) Program-related data memory modules
(4) Process-related data memory modules The different load types outlined above cause different combinations of these modules to be loaded into memory. In a normal primary load, primary program memory, program-related data memory and process-related data memory modules are loaded. A secondary load is a request to load only process-related data memory modules, as the other modules containing program code will be shared from a previous primary load. An overlay load is a request to load some of the overlay program memory modules, as indicated by an accompanying overlay map.

Process-related data memory modules allow an invoked process to access loaded and initialized private data. This saves a process from having to acquire the memory space dynamically and then initialize it. The initialization can be done at assembly time and the memory acquisition effectively accomplished via a program load.

Process-related data memory can also be used to hold preinitialized program control information which will be used by the system (e.g., process control block, event control blocks).

It is the requestor's responsibility to manage and control secondary and overlay requests. That is, the requestor must know that a primary load was performed, that the modules are in memory and where they reside so that any subsequent relocations can be performed on the new pieces. For overlay calls it is the requestor's responsibility to know which pieces can overlay which pieces, to keep track of which pieces are currently in memory, and to mechanize transfers of control between separate overlayable pieces. However, in normal system operation, all program loading is managed on the users behalf by REX, and this is only of concern in forced load requests which bypass the REX of the target processor.

INPUT/OUTPUT SERVICES

A. Overview

The system 100 is a multi-media computer system which utilizes failsafe architecture to provide very high levels of availability and uninterrupted processing. It is a tightly-coupled, distributed network of multiple high speed processors, interconnected by a high speed packet switching network, and a fully distributed fault tolerant operating system that together provide a uniquely flexible, high throughput processing system. The modular architecture of the system allows the system to be configured to accommodate the most demanding input/output and processing requirements.

The unique hardware/software architecture of the system 100 enables it to operate in environments which mix real-time, voice communications, data communications, computational, interactive and transaction processing. This fully integrated hardware/software design eliminates the need to interface uniprocessors, store and forward nodes, etc. to obtain the desired system capabilities.

The function of the input/output services of the system 100 is to manage all information transfers between processes and attached devices. This includes the interconnection of real-time voice or data channels, acquisitions of real-time data streams, data storage transfers, and control of and communication with large numbers of external devices. To accomplish this the system 100 utilizes multiple microprocessors, microcoded in ROM, to control the internal high-speed packet switching as well as the buses from the real-time, interactive and file services subsystems. Further a comprehensive set of I/O services routines (ISORs) is available to processes running in an ideal machine (IM). These can be used to acquire, control and communicate with any device attached to the system 100. The operational protocols associate with the ideal machine I/O service routines are described in greater detail in Section B. A process, once it obtains control of an external device, has a direct link with that device.

Applications, running in an ideal machine use the I/O services of the ideal machine monitor (IMM) which directly use the host processor's resident executive (REX) I/O service routines. Privileged users, working outside the IM environment creating assembler programs, can call directly on REX I/O service routines. It is at this level that a system designer would code customized device handlers.

Two kernel system software components are involved in I/O transactions. Before a user process can communicate with a device, ownership of the device must be acquired by the user process, or by some other process within the same job network (i.e., a process with the same job number). A user cannot talk to or control devices not specifically owned by a job of which the user process is a member. Device ownership is achieved by a request to the system device manager, (SYSDEV). SYSDEV checks to see if the device is available, and if so, sets up a logical path between the requestor and the device handler of the required device. Transactions can then take place between the user and the device handler directly with no intervention by SYSDEV until the user returns the device to the "pool' of unowned devices.

The second kernel system process involved in I/O transaction initialization is the System Directory Manager (SYSDIR). When a user wishes to transfer data to or from a device channel or dataset, the user must first issue an Open request. In the case of datasets, the open request is routed to SYSDIR. SYSDIR checks that the requester has access rights to the named dataset, and on which volume (disk or magnetic tape) it exists. SYSDIR builds a communications path between the user and the logical I/O handler of the dataset through which all subsequent transactions are handled.

The device and dataset handlers reside in the processors to which the device channels or data volumes are physically attached. The handler receives the packets generated by the REX of a processor requesting input/output services and provides the logical to physical interface functions needed to implement the request.

At any one time, the system 100 can be hosting a large number of independent jobs with each job acquiring and opening any number (within system limits) of devices and datasets. Device handlers can accept concurrent requests for devices, and each handler can manage multiple devices of the same class. Individual datasets can be opened for simultaneous access by multiple users and a range of access restrictions can be specified. Spooling is also available for queueing output to a specific device type such as a printer.

B. Input/Output Protocol

A well-defined protocol exists for using devices and datasets either through IMM Services or directly through REX IOSR's. Privileged users (those operating outside of the Ideal Machine environment) perform I/O functions directly using REX IOSR's, while other users (those operating within the Ideal Machine environment) use the services of the ideal machine monotor (IMM) which in turn calls REX IOSR sequences to perform a particular function. These IMM IOSR functions exist as groups of intrinsic Pascal procedures, each group addressing a particular area of the I/O protocol and are listed as follows:

Acquire Device Procedures:
VACQNAME: Acquire by name.
VACQLIST: Acquire by type and sub-type.
Data Set Maintenance Procedures:
VCREATEDS: Create a new dataset.
VMODIFYDS: Modify an existing dataset.
Open Procedures:
VOPEN: Open a device for I/O.
VOPENDSET: Open a dataset for I/O
Read Access Procedures:
VREADDEV: Prepare a device for a Get.
VREADCRT: Capture a CRT screen.
VREADDIRECT: Input from a direct dataset.
VREADKEY: Input from indexed dataset.
VREADNEXT: Read next record (indexed set).
VREADPREV: Read previous record (indexed).
Write Access Procedures:
VWRITEDEV: Prepare a device for a Put.
VWRITEDIRECT: Output to a direct dataset.
VWRITEKEY: Output to an indexed dataset.
Data Transfer Procedures:
VGET: Transfer from device or dataset.
VPUT: Transfer to device or dataset.
VTRANSFER: Transfer between device or dataset.
Device Control Procedures:
VCONTROL: Send control and receive status.
Data Set Control Procedures:
VDELETEKEY: Delete a keyed record.
VRENAMEKEY: Rename a keyed record.
VALLOCATE: Mark direct records in use.
VRLSELEM: Release direct records for use.
VADDEXTENT: Increase extent of a dataset.
VMOVEWINDOW: Move window in subfile.
VINSERTMARK: Mark a record in a subfile.

VDELETEMARK: Remove a mark in a subfile.
VINSERTELEM: Create a new element in subfile.
VDELETELEM: Delete an element in a subfile.
VMOVELEM: Move a set of subfile elements.
Access Completion Procedures:
VENDIO: Terminate a data transfer.
Close Procedures:
VCLOSE: Close an Open device or dataset.
Device Release Procedures:
VRLSEDEVICE: Release ownership to system.

For privileged users, REX provides several calls for both device and dataset manipulation. The way in which one of these basic IOSR calls is used is determined by the parameters supplied in the call. REXs' basic set of IOSR's include the following functions:
  (1) OPEN
  (2) CONTROL
  (3) ACCESS
  (4) GET
  (5) PUT
  (6) TRANSFER
  (7) ENDIO
  (8) CLOSE
  (9) GETIOSTATUS The above list is not exhaustive and REX provides functions which combine sequences of the basic set for convenient use in commonly occurring I/O operations. In general, each call to a REX function can choose between a number of variations of the functions basic service.

There are two types of calls to REX. One suspends the calling process until the request is complete. The second returns control to the caller immediately after the request is initiated and provides the program origin at which processing will recommence once the request is complete.

This does not apply to I/O calls from applications jobs running in an ideal machine where a process always suspends until the request has been completed. This avoids concurrent operations building up in a single ideal machine. Concurrency in the system 100 is obtained by running concurrent singular processes each in a separate ideal machine.

When a level 3 application process performs I/O, it communicates with a level 1 process which provides a logical interface to a device or dataset. However, before this communication can begin, access to the handler has to be gained by way of the Kernel System. Devices have to be acquired from the system device manager (SYSDEV) and datasets have to be created and opened by way of the system directory (SYSDIR) catalogue.

To build a logical control channel to a specific device (excluding datasets but including telephone lines in voice applications), the device must first be acquired by the process wishing to send or receive control messages. There are two basic ways to acquire a device.

Acquire-by-Name—Each physical device is uniquely identified by its termination point at the system 100 interface. If more than one channel to a device exists (as occurs, for instance, with operator stations and remote line concentrators), any of the devices' channel identifiers can be used to name the device. Acquire-by-name is used when a process has been specifically invoked as a result of the system detecting activity on an unassigned device. The channel ID on which the stimulus was received is passed to the invoked process as part of its start-up parameters. The process acquires the device by name and communicates with its device handler to effect whatever subsequent action is predefined for the process.

Acquire-by-Type—A process may need to acquire a device with certain physical or logical characteristics without regard to which particular device is assigned to provide them. For example, if a magnetic tape drive is needed, the user is not particularly concerned with which drive is assigned, as long as one is made available to receive data. In these circumstances, the user supplies a device type code that identifies both the physical device type required—(e.g., terminal, tape drive) and also a hierarchical list of sub-type groups, each of which identified one or more equally acceptable logical sub-types within the physical type (operator's terminal, supervisor's terminal, etc.)

The acquire request, together with the device channel ID or the device type code and sub-type list, is sent to SYSDEV. If a suitable device can be found, the device channel handler is informed and SYSDEV passes back to the user the process ID of the handler, the channel identified for each channel plus tupe and sub-type codes of the device. If the requested device exists, but is already allocated, the user has two options (indicated in the acquire request):

(1) To be informed the request was unsuccessful with no further action.
  (2) To have the request queued (with a queue priority and time limit supplied by the user) until a suitable or specific device becomes available.

If a requested device does not exist because it is out of service or becomes so after a request has been queued, the user is notified that the request cannot be fulfilled.

The Create function allows a new dataset to be formed with a number of attributes defined by the user in the create request. The modify function allows the attributes of an existing dataset to be subsequently changed. A create request is passed to the system directory manager (SYSDIR) which maintains a catalogue of all datasets known to the system 100 either on disk volumes or magnetic tapes. After validating the request, SYSDIR enters the dataset details in the system directory and passes back to the user an indication as to the success or failure of the request. Failure to create a dataset could occur if a dataset with an identical name already exists, if insufficient space exists to satisfy the initial space needs of the dataset, or if illegal attribute values were supplied in the create request.

The attributes that can accompany the create request include:
  (1) Dataset name
  (2) Dataset type
  (3) Hardware type (disk, magnetic tape)
  (4) Creator's identity (often log-on user code)
  (5) Access security information (covering groups of potential users)
  (6) Action regarding duplicated datasets
  (7) Create or add to existing dataset
  (8) Volume ID (if Add)
  (9) Allowable extents
  (10) Directory characteristics
  (11) Record parameters
  (12) Initial size required (if Create)

The Modify request enables the above attributes in an existing dataset directory entry to be changed by the owner.

A user can request exclusive use of a complete disk volume (magnetic tapes have single user access by nature). If a user requests creation of a dataset without specifying a "Pack ID" of a volume owned by the user, the dataset is created on any suitable public volume.

Devices no longer required by a job can be made available for use by other users with the release function. Any subsequent attempts to communicate with the device using the reference data allocated by the original acquire function will end in rejection.

If a job terminates without releasing previously acquired devices, they are automatically released. This is initiated by the job scheduling, allocation and monitoring kernel function (JSAM) which always informs SYSDEV when a job has terminated. SYSDEV in turn informs the device handlers to purge their tables of ownership of the terminated job. However, the presence of unreleased devices is an indication of a potential fault condition, so such occurrences are logged for analysis.

If a job terminates with open datasets, these are closed by the system directory manager (via JSAM request).

Once the initial dialogue with the kernel system is complete, the user process communicates with a level 1 device or dataset handler which is resident in the processor to which the device channel or dataset volume is physically attached. When a dataset is initially opened, the open request is first passed to the kernel system process SYSDIR before a level 1 handler is invoked. The following functions apply to owned devices or pre-existing datasets to which the user has the required access right for the specific request.

An open request establishes a communications path between the user process and the device channel handler or dataset access process. In the case of datasets, the user supplies his user ID along with the dataset name. These are checked against the descriptions in the system catalogue to verify the validity of the open request. In the case of devices, the user must supply a job number and the appropriate channel ID of the one or more obtained when the device was acquired. If the device channel has already been opened by a previous request and not closed, the current open request is rejected.

The open request establishes contact between control processes at each end of the communication channel which handle the subsequent data transfers.

Once an open has been performed, multiple read and write accesses may be performed by the opener on the device or dataset.

Read, write and update access requests establish the conditions prerequisite to the transfer of data. They check on the physical availability of the device or dataset for date transfer (it could be busy with a previous transfer) and effect all of the required actions at both ends of the channel necessary to permit a subsequent data transfer. This can involve the creation and loading of buffers at the data source. For example, in the case of dataset I/O, a read access request would specify a logical record in a file. As a result, the required data is transferred from the disk into a buffer in the file services processor 934, 936 (FSP). Any subsequent "GET" functions effect transfer of the data from the buffer to the requestor. A write access request to a dataset allocates an empty buffer into which a logical record will be placed. An update acts initially as a read, but the buffer which holds the user data is retained to permit rewriting of all or any portion of the data back to the disk. In other cases, external buffering is used. For example, with the magnetic tape, the buffering is provided in the magnetic tape controller. Note that for operator stations, data buffering is assumed to exist in the terminal associated with the station whereas no audio buffering is assumed for the station headset.

Put and get request functions request the physical transfer of data between the user process and buffers in the device, channel controller, device handler or dataset handler that were previously primed with a read or write access request.

With a transfer request, a user process can initiate a transfer of data between a source and destination channel or dataset without passing the data through the user's process. Thus a user process can effect a data transfer, for example, from a display record on disk to an operator station CRT with no intervention required by the user once initiated and with direct routing of data through the system 100.

An access completion request clears the access path, terminates the access and returns to the system any associated buffers. To validate the request, particularly for multiply-accessed datasets, the user specifies the access reference value obtained from the system when the read/write access was requested. When a sequence of accesses is needed, each access completion request can also be used to initiate the next access.

A close request deallocates the access control capacity which was assigned as a result of the initial open request from the user. Close clears the communication path between the two. To reaccess the device or dataset (except for device control only) the user would have to reinvoke the open function.

Control data can be sent to devices and datasets by way of IOSR control functions. This information may be trapped by the device or dataset handler, or may be transferred directly to the device itself.

The minimum requirement to be able to control a device is for the device to be acquired, whereas a dataset also has to be opened before any user interaction can begin. Acquiring a device provides the user with enough identification and authorization to talk directly to the devices handler. This is especially useful in managing devices that do not generate or transfer data. For example, the circuit switching function of the real-time subsystem 230 does not pass data through the system 100. It interconnects real-time data channels. A user who has acquired a set of these channels can send control parameters to the circuit-switcher specifying the interconnection required without having to prepare buffers or initiate control processes with Open/Close, Read/Write requests.

IMM IOSR's provide a group of control functions that simplify the control of the more complex dataset types available on the system 100. These functions provide access to the record-control sections of datasets, allowing modifications to be made to the structure of a dataset without having to read records from the dataset, reducing the amount of physical disk I/O required.

For privileged users working outside of the ideal machine environment, REX provides a single parameter driven procedure for all control functions.

An acquire request returns the ID of a devices' channels and also the process ID of the devices to the user handler. A privileged user can then use basic packet transfer services to communicate with a device or dataset handler in a totally self-structured way. This provides greater flexibility but transfers to the user the responsibility for the correct packet-level protocol between the user and the device handler which is normally the responsibility of REX.

C. Devices

In general, a singular device can include more than one channel attached to the system 100. For example in a voice application, an operator station consists of a duplex data channel to a CRT and associated keyboard plus an audio channel to and from the operators headset. If an application job needs an operator terminal, it has to acquire the two channels simultaneously since it makes little sense to attempt to utilize the two independently. When a complex multi-channel device is requested, SYSDEV's device configuration tables list the set of attached physical channels. If any one of the channels is unavailable, another device is selected if an acquire-by-type is being performed, or the acquire request is either enqueued or rejected if an acquire-by-name is specified.

If the device is successfully acquired, SYSDEV returns to the user the channel ID and process ID of each channel associated with the device. This effectively defines the communications link from the user to each of the devices channels. The return link is established in the open request and each control request.

The interactive service subsystem 908 can support:
(1) Smart terminals
(2) Dumb terminals
(3) Line printers
(4) Magnetic tape drives
(5) Synchronous and asynchronous channels
(6) Line concentrator data links It should be noted that the magnetic tape unit is a device that supports datasets. Before opening a tape dataset, the tape drive is first acquired by the system directory manager (SYSDIR) on the user's behalf. A dataset open failure response will be returned to the user if SYSDIR is unable to acquire a drive. Operator requests to mount off-line tape volumes are passed to the system monitor by SYSDIR as part of the open process. Tape datasets conform to ANSI X3.27 format, allowing archived data to be transported to other processing systems.

A number of printers can be attached to a system 100, of which a minimum of two are usually assigned as system printers. These are not normally acquired directly by users, and are owned by the system spooler. Data for printing on a system printer is passed by the user to the spooler with a print request header, with the spooler managing the transfer of print data to the printer. Non-system printers can be acquired for private use in the same way as any other assignable device. The printer handler can operate in three modes.

Transparent mode—with all printer control characters embedded in the data stream.

Edited transmission mode—in which the user sends data in message blocks with the printer handler formatting the data according to a layout defined previously by the user.

Line-oriented transmission mode—where data is sent on a line-by-line basis, each line containing format information in the first word.

The Printronix printer normally used with the system 100 contains a vertical forms unit that can be loaded with predefined form layouts. A graph plotting mode can be entered from the transparent mode.

The Real-Time Subsystem allows real-time data channels to be attached to the system 100. Some of the functions provided to the user include:

(1) circuit switching,
(2) data recording,
(3) data playback,
(4) signal processing, and
(5) supervisory signallying and control.

One use of the real-time channels is for PCM-encoded voice with a transfer rate of 64 K-bps. Equally, any other information that uses the normal analog bandwidth of the telephone system could be switched or processed by the same functions. Variations of the real-time channel interfaces enable non-PCM encoded data to use the sybsystem—(e.g., telemetry, video, etc.) The bandwidth available to a channel can be varied at the expense of the total number of channels that can be switched or processed.

Users can acquire real-time channels either by type or by name. Individual circuit switching and control can be accomplished with a simple acquire-control-release protocol. Supervisory information and control data can be received from and sent to owned channels. In telephony applications this would be used to set dial tone on a line, for the detection and generation of dial sequences, setting on-hook and off-hook conditions, for seizing lines, etc. Furthermore, a number of channels can be logically grouped by the owner and referred to by a network ID. Within a network, one-to-one, one-to-many and many-to-many interconnections can be set up by the user simply by providing interconnect maps to the circuit handler. Thus, in voice applications cross-connects, broadcasts and conferencing can be implemented through control functions. A complete network interconnection can be torn down with a single command by referencing the network ID.

Signal processing functions such as record and playback are invoked as transient processes in the real-time processors 410, 412 (RTPs). User-written signal processing functions can similarly be installed in the real-time processors 410, 412, which has access to the data channels attached to the real-time subsystem 230. Each real-time processor 410, 412 can handle 16 input and 16 output channels. Typical real-time processor applications could include spectral analysis, filtering, and the assembly or reassembly of subcommutated channels.

Record and playback functions allow data from real-time channels to be stored on disk and subsequently reconstructed as a real-time signal. To minimize disk storage requirements, voice messages and conversations can be compressed during record, and decompressed during playback by a real-time processor 410, 412 with a compression ratio of better than 2 to 1. It would also be possible to retrieve the data from disk for manipulation and processing by an independent job. During record, record markers are inserted in the data stream at approximately one second intervals, allowing the stored data to be the subject of a record orientated processing operation (e.g., editing stored voice messages). The record and playback processes function much as if they were simple mechanical recording devices, although in practice they are implemented as software processes hosted by real-time processors 410, 412 (RTP).

Each real-time processor 410, 412 can concurrently support approximately 8 record processes and 16 replay processes. The job scheduling, allocation and monitoring kernel function (JSAM) causes these processes to be initiated in response to a request for a record or playback function. The owner supplies a dataset name and channel ID for the transaction, and control information to operate the machine—initialize, record, replay, pause or terminate. The software "recording machine" interfaces to both the real-time channel handler and the dataset handler to actually implement the transfer using standard REX IOSR's. In addition, the channel that is the object of the record/playback transaction can, at the same time, be involved in a circuit-switch network.

D. Datasets

Datasets recorded on magnetic tape volumes conform to the ANSI X3.27 standard, initially with level 1 support on single or multiple tape volumes. Tape datasets are restricted to direct access, fixed record length. Each tape has an ANSI standard label which includes a volume ID.

Disk datasets comprise an integral number of physical disk tracks. When a dataset is created the expected number of tracks required by the user is specified in the create request. This initial space allocation (or extent) is in the form of contiguous tracks on the volume, making accesses to the dataset optimized for high speed. Access speed and transfer rate are factors which dominate over space allocation efficiency, especially in communications environments. Further extents for a datasets' records are requested if more space is needed.

As an extent is acquired, it is soft formatted into a series of blocks, the block size being a dataset attribute determined by the user. Since the disk drive controller transfers data in units of blocks, the block size is set to trade-off access time versus buffer requirements in the file services processor 934, 936.

A further parameter supplied by the creator is the record element size. This is the unit of logical allocation of disk space within a block and the block size must be an integral number of record elements. The various logical record types are all built from allocating record elements within blocks within the dataset extent.

The system 100 supports four different types of dataset organizations, six logical data structures, and three record types. The hierarchical aspects of dataset organization are as follows:

| 3 | DATASET ORGANIZATION: | Single Volume, singular Multiple Volume, singular Single Volume, duplicated Distributed. |
|---|---|---|
| 2 | LOGICAL DATA STRUCTURE: | Block Direct Access, Mapped Direct Access, Index Only, Indexed integral, Indexed sub-file, Indexed chain. |
| 1 | RECORD TYPE: | Fixed length, Integral records, Chained records, Subfile records. |

The user can either select a combination of characteristics to build efficient structure that are specifically tailored to individual applications (such as voice store and forward), or can write a higher level of access and control which uses the basic services provided by Delta's I/O system to realize a more general data organization, such as a database. The services provided by the system directory manager (SYSDIR) and the file services processors (FSPs) is comprehensive enough to make either type of task both concise and efficient.

Dataset types can be categorized into direct access and indexed. In direct access datasets, individual records are accessed by a numerical (ordinal) address within the dataset. Indexed datasets allow access by keyword, and also allow considerable manipulation of the datasets' record structure without actually reading or writing data records to and from disk. This is made possible by the ability to access the control structures of the dataset as well as actual data records. These control structures not only include the index keys, but also logical maps of the datasets' internal record layout, and mark tables that allow locations within the dataset to be specifically "marked" for future reference. The user has full access to these control structures in the various indexed type datasets allowing considerable scope for complex record manipulation with minimum physical data movement. It is also possible for the records within an indexed dataset themselves to be direct-access files of any length allowing "access-by-name" followed by "access-by-record-number" to be accomplished within a single opened dataset. Additionally, an indexed dataset such as those used for voice recording can contain records of arbitrary length, comprising of multiple linked blocks.

The system 100 supports multiple on-line disk and tape volumes. Further, these volumes can be attached to different file services processors 934, 936 (FSPs) or interactive services subsystems 252 (ISSs). To build a communications path to a specific dataset, open requests are passed to the system directory manager (SYSDIR) for routing to the appropriate destination.

SYSDIR maintains dataset directories and manages the construction of communications paths to datasets on the various volumes. SYSDIR maintains the master volume directory and the system catalogue which contains an entry for every dataset known to the system, whether on-line or off-line, together with the one or more volume IDs on which it was created. When a request to open a dataset is received, SYSDIR checks if the volume containing the dataset is on-line, and if so, to which file service processor or interactive services subsystem it is attached. If the requestor has access rights to the requested dataset, the file service processor hosting the volume containing the dataset is requested to initiate a process to which subsequent Read/Write access requests are passed by the user. The ID of this process is returned to the requestor, completing the open process.

A volume that contains the master system catalogue is referred to as a system volume. Two such volumes normally exist and each also contains the various system program libraries and data files required to run the system 100. The two system volumes are attached to separate file service processors 934, 936.

Each attached volume, including system volumes, have a volume directory that contains the details of datasets resident on that specific volume. When a volume is mounted and comes on-line, its volume ID is passed to SYSDIR so that SYSDIR can decide which datasets are available for opening.

When a new dataset is created, a 6-byte user code is supplied by the creator. The owner can control subsequent accesses to the dataset and can specify that the dataset be accessible only by the owner, be publicly accessible by any user, or have limited access as specified in an associated 16-bit access rights code.

This allows subgroup access to four different capabilities: read, write, modify, and remove.

SYSDIR supports four basic dataset organizations, any of which can be selected when a dataset is created. These various options include:

(1) Single volume, singular dataset—This is a dataset that is confined to one volume, with only one copy of the dataset in the system.

(2) Multiple-volume, singular dataset—A multipart dataset that exists on a number of volumes. Only one copy of each part exists, and each part is opened individually by referencing the dataset name and volume ID.

(3) Single volume, duplicated dataset—A dataset that the system automatically duplicates by creating and maintaining two identical copies of the dataset on different volumes mounted on separate file service processors 934, 936. Duplication is transparent to the user, and requires no special management to recover if one copy becomes unavailable for a period. The second copy will be automatically updated to reflect the latest state of the surviving dataset. (This does not involve bulk copying of the survivor. Changes that were made to the survivor while the second was off-line are marked and only those marked are transferred.)

(4) Distributed dataset—A dataset whose records can exist on a number of volumes. This type of dataset can be created to receive long records so that load-sharing of file service processors 934, 936 occurs. This would typically be required when real-time voice data is being stored. A single voice record needs continuous data storage for extended periods of time. With a distributed dataset, the system selects, for each individual Open of the dataset, a volume and associate file services processor 934, 936 that is currently least loaded. The record is then allocated to that volume. The user process must preserve in an application-maintained directory the particular volume to which the record was sent (this information is returned in response to the open request).

After a number of accesses, the individual records of a distributed dataset become distributed across multiple volumes independent of accession order. The information that exists in the directory for this type of dataset contains a list of volume IDs that contain records for the dataset.

To maintain a duplicated distributed dataset, the user may also request a concurrent Open on the next "least-busy" drive controlled by a different file service processor 934, 936. In the case of distributed datasets, however, individual record duplication is managed entirely by the user. SYSDIR simply selects the best volume to send the duplicate copy. The user is responsible for both writing the duplicates and recovering synchronization after failure.

Block direct access datasets are the simplest dataset type, with contiguous records accessed by an ordinal record number. No control information is maintained concerning the usage of records within the dataset—this is the user's responsibility. The record size is fixed and equal to the record element size of the dataset extent which is specified when the file is created. As is common with all datasets, a record can be "locked" to permit a read-modify-write cycle to be performed safely in environments where a single dataset is opened by multiple users.

Mapped direct access datasets are similar to block direct access datasets except that these datasets use variable length records which may change in size during the course of an access. Each record created in a mapped direct access is identified back to the user on an individual record basis, the ID being used to reference the record on subsequent accesses. This technique allows multi-volume indexed datasets to be built, with an index-only dataset (see next section) on one volume, with its indexed memo entry pointing to the individual records of a mapped direct access dataset on another volume. These basic tools can be used to advantage in implementing more general structures such as multivolume databases.

For all indexed datasets, records are referenced by an associated key held in a directory control area within the dataset. The key length is an attribute of the dataset and can be up to 255 bytes in length although in practice the smallest size possible is recommended. Either an exact or an approximate match can be specified in the access request. In addition to the basic read/write access of a record, it is possible to access the next record, to rename a key, to delete the record only or delete both the record and its key. To minimize data movement, a small amount of data can be stored with the key in the key index. This is termed a memo, and it can be read to or written from without accessing the whole of the associated record.

An index only dataset can be created that has no data area but contains only a key index. This allows the key index maintenance and access routines used with normal indexed type datasets to be used with nonsupported data structures created by the user. Verification and recovery of such structures is the creator's responsibility. The only meaningful data that can be transferred during the index-only dataset access is the content of the memo field. Accessing an index-only dataset returns a record ID of the index identical to that returned from accessing a mapped direct access datasets record. This allows hierarchies of linked indexes to be constructed.

An indexed integral dataset is the most general purpose dataset organization. Each individual record within the dataset can be of variable length (up to a maximum defined when the dataset was created) with a complete record transferred as a single operation.

In an indexed subfile dataset, each indexed record is equivalent to a direct access dataset. A basic record element is referenced via a key into the index of the dataset (this points to the beginning of the contiguous record elements making up the direct access subfile) plus an ordinal address within the subfile (this offsets the access to a point within the record elements making up the subfile).

To add greater flexibility to the indexed subfile, access to individual records in the subfile is directed through a map called the logical sequence array (LSA). A physical offset into the subfiles' record elements is made using the ordinal number provided in the access request after it has been mapped through the logical sequence array. By allowing the user to reorder and replace the values in the logical sequence array, the accession order of the physical records can easily be changed. Thus data can be manipulated by manipulating the logical sequence array rather than the real data records allowing the user to impose his own structure within the records of an indexed subfile type with minimum data movement. Each indexed subfile records has its own logical sequence array.

An indexed chain dataset is similar to the indexed subfile, except that there is no logical sequence array and the order of records in the subfile is not easily changed. The indexed structure is a set of non-contiguous physical records successively linked by pointers contained within each record element. Initial access to a record element is via the key index augmented with either the ordinal address of the physical record or with the identity of a marker associated with a user-designated point in the set of physical records. Within an indexed chain dataset, a user can "mark" any individual record element using a value that is stored in a mark table associated with the record. Subsequent access to another record element in the same chain can then be requested by any of four references:

(1) Absolute ordinal location relative to the beginning of the subfile.

(2) A differential location relative to the last access.

(3) A reference by specific mark value.

(4) A specific number of marked locations, counted from the last access.

The indexed chain dataset is useful whenever access patterns are basically status. For example, a complete program library could be maintained as a single indexed chain dataset with each indexed entry a specific program code file, which is accessed serially.

THE APPLICATION ENVIRONMENT

A. Introduction

The system 100 is a general purpose multi-media computer system. The system is a tightly-coupled distributed network of multiple high speed processors, interconnected by a high-speed packet switching network and a fully distributed fault tolerant operating system that together provide a uniquely flexible processing environment. The system 100 is functionally organized into five subsystems each consisting of multiple processors performing specific functions (i.e., file handling, interactive processing, real-time, executive or general processing).

Application programs are supported by the information processing subsystem 906. The information processing subsystem 906 may contain from 1 to 26 general purpose processors 942, 944 with each general purpose processor having up to 8 M-bytes of user memory. Application processing or development is supported by the general purpose processors, which can directly execute the pseudo-machine codes, or P-codes, generated by a high-level systems programming language such as Pascal. The P-code set is a high-level machine instruction set which is efficiently produced from block structured procedural languages such as Pascal, "C", ADA and FORTRAN.

The general purpose processors 942, 944 are supported by the other four subsystems for Input/Output, real-time, file storage and executive services. These systems utilize a system 100 assembler to generate SPM machine codes basic to all system 100 processors. To produce both high-level Pascal programs, which operate in a general purpose processor, and low-level SPM assembler programs to run in other system 100 processors, an interactive program development system (PDS) provides the system designer with the following facilities: (1) Pascal complier, (2) Pascal linker, (3) SPM assembler, (4) SPM linker, (5) Screen editor, and (6) programmer's utilities.

The Pascal language used with system 100 is the ISO Pascal with extensions. The extensions fall into two general categories:

(1) Those that enhance the basic capabilities of the language, for example, extra character manipulator routines not provided in the basic International Standards Organization (ISO) version, and (2) Extensions that interface fo the Kernel system and lower level resources, allowing a Pascal program to call on the services of distributed hardware and software functions of the system 100.

Within this environment, a complete multifunction application system utilizing all hardware/software resources of the system 100 can be realized as a set of programs coded in Pascal. Each Pascal program, when scheduled as an active P-code process in the system, runs in its own protected allocation of system resources called an ideal machine (IM). This allows low-integrity program development to occur along with production processing of highly critical applications, without compromising overall system integrity. These activities may occur concurrently in a single general purpose processor, simultaneously in multiple general purpose processors or a combination of both.

Each general purpose processor in system 100 has a resident executive system (REX) and an ideal machine monitor (IMM). REX contains programs to perform physical initialization, interrupting handling, event and process handling, memory management, I/O, list processing and various computational and utility routines. The ideal machine monitor provides programs to create ideal machines, program loading, initiation, scheduling and termination, extended memory management, ideal machine I/O interface, ideal machine program management and the interfaces to permit use of REX system services.

A general applications processor may have from 500K-bytes up to 8 M-bytes of user memory. Within this memory each process, operating as P-code, has private hardware-mapped virtual address space relative to other co-resident processes. Communication to other active processes in the system is through the ideal machine monitor. Within this environment, a large number of processes may be active concurrently. These could be multiple processes operating in a production mode, processes in development or checkout under the program development system or any combination of the two. Each program development system that is active within the system 100 requires an ideal machine resource from a general purpose processor and an interactive terminal. A systems designer can use the program development system to create source text files, compile or execute Pascal programs or assemble SPM programs. Pascal programs can be tested interactively from a program development system terminal whereas SPM programs require a systems console for checkout, and can be loaded for execution only by processes outside of the program development system.

Typically, a single P-code process would be sufficient to run an application using calls to functions provided by the Kernel system to satisfy its input, output and storage demands. If a multi-invocation, single function application is required (as will often occur, for example, in telephone answering support services), then the designer need only be concerned in programming the service for one terminal. This is because the ideal machine architecture used in the general purpose processor allows multiple invocations of the same function to be run concurrently with each innovation of the program supporting just one terminal. To avoid inefficient duplication of code, a single copy of an application's P-code is shared within a general purpose processor if more than one ideal machine is running the same function.

An applications designer will very rarely need to program at the SPM level, as the Kernel system provides access to all of the processing resources and supported peripheral devices. However, if an application calls for a new device type to be added, an SPM level-1 device handler must also be written. Programs at the SPM level execute as privileged tasks, thus a complete knowledge of system hardware and software architecture is needed to produce high-integrity programs that do not interfere with existing system processes.

B. Program Spaces

The system 100 provides two distinct programming environments—the host programming space and the image programming space. The host space represents the low-level programmability of the system 100 with programs resident in the program memory of a processor and encoded in SPM machine code. The executive services processors 916, 918, the disk data processors 934, 936, the interactive services executives 702, 706, the real-time executives 406, 408, and the real-time processors 410, 412 are all entirely programmed in SPM machine code, as are the programs which mechanize the ideal machines in the general purpose processors. Their program memories collectively form the host programming space of the system 100. The resident executive (REX) of each processor is contained in this space as are hardware-coupled or speed-critical system components. For example, device and dataset handlers, real-time signal processing routines, the job scheduling, allocation and monitoring function, etc., are considered part of the host space. The SPM machine code set is speed-optimized with a basic instruction cycle time of 133 ns. Spare program memory capacity exists in many processors which can be used for any application processes needing to be written in SPM code. In particular, the real-time processors 410, 412, when not being used to host dedicated functions such as Record/Playback, are totally available for user-specified real-time signal processing or other activities. If an application requires extra host space beyond that configured in a processor of a specific type, then additional processors of that type can be configured into the system 100, up to the global maximum of 32 processors in a single system.

The host-space is not the normal applications programming environment. An intimate knowledge of the basic machine architecture of the SPM is required to utilize efficiently the large machine code set, and an application has to interface directly with REX for support services. Further, if the spare host space capacity of a minimum configuration system is used, then application processes would have to be co-resident with critical system processes, which would tend to reduce the overall reliability of the system. For although REX manages the program and data memories of a processor on an allocation basis, it does not provide any intrinsic memory protection as any such schemes would reduce the overall performance of the processor.

The image space provided in the general purpose processors provides an excellent applications programming environment. In the image space, each process resides in its own isolated, protected memory space and is implemented using a high-level instruction set, the code of which can be efficiently generated from source programs written in a systems programming language. The image space instruction set in a general purpose processor is implemented by using the program memory of the general purpose processor to host Pascal P-code instruction emulation routines, the actual high-level P-codes being fetched from the general purpose processors data memory. Thus, in a general purpose processor, the high-speed program memory is used in a fashion similar to a writeable microcode control memory and what is normally considered as data (user) memory in other processors is used to hold both P-code programs and process-related data.

General purpose processors are created by adding a general purpose extension unit to a standard processor module 500. P-code instruction emulation cycles are optimized by an extension SPM instruction, jump virtual, which vectors the SPM to a specific emulation routine via any one of four 256-way hardware instruction decode tables. The jump is based on the contents of a data memory location which contains the P-code to be executed. The data memory capacity of the general purpose processor may be extended to 8 M-bytes from the normal limit of 128K-bytes to allow a large number of co-resident P-code processes to exist and operate concurrently. Each P-code process maps its 64K-byte code space and separate 64K-byte data space via a set of 32 mapping registers to address physical memory locations in the 8 M-byte store range. To reduce process context switching time to a minimum, each process is assigned its own unique set of mapping registers from a pool of 128 sets of 32 that are available in each general purpose processor. These hardware features of the general application processor allow a large number of fast P-code processes to be supported with an effective P-code instruction cycle time of between 4 and 5 microseconds.

The ideal machine is a collective term used to describe the environment provided for a P-code process in a general purpose processor. It emphasizes the isolated, single-user resource that the general purpose processor provides for each resident P-code process, with an image machine architecture totally different from the underlying host general purpose processor. Each P-code process resides in its own ideal machine with 64K-bytes of P-code program space of unique virtual memory, which can map to shared physical memory, together with an unshared 64K-bytes of data space available for the stack and heap of the process while it is running. Both the code and data segments appear to be internally contiguous, and do not overlap or interfere with the code and data segments of other processes.

The P-codes in the code space are sequentially executed by a P-machine implemented as an SPM software emulator in a general purpose processor. The P-machine not only provides basic P-code interpretation and execution, but also provides access, via intrinsic calls, to the rest of the system 100. A P-code process executes "sequentially" until suspended during an I/O or an intrinsic call, although in practice a general purpose processors CPU time is sliced on a "round-robin" schedule between all of the nonsuspended P-code processes resident in a general purpose processor.

An ideal machine environment of a P-code process includes P-code module overlap from disk, up to 64K-bytes of storage space, a stack and a heap (in inverted storage space opposite a stack). When an application process is being designed, no regard need be paid to the final physical organization of the process. The only restrictions being to keep the code generated to within 64K-bytes, and to ensure that stacks and heaps do not overlap when the program runs (i.e., do not exceed a total of 64K-bytes). Applications requiring code or data segments larger than 64K-bytes have recourse to a number of alternatives:

(1) Sequential processes can use the segment overlay facility provided by the ideal machine to swap in code segments from disk.

(2) Concurrent processes can create a network of P-code processes (or a mixture of P-code and SPM-code processes) that communicate via signals, packets, or shared memory files (if resident in the same general purpose processor).

(3) Processes requiring large data spaces can acquire unlimited amounts of free data memory by the memory file mechanism. This allows a data structure to be built which resembles a record-structured random access dataset which is memory rather than disk resident. If two or more P-code processes declare the same named memory file, they can use its shared records if both are resident in the same general purpose processor.

A P-code process can be used as a node in a jobs' process network in the same way as an SPM-code process. Once established, it can create further subordinate processes it creates.

In most applications, the primary node of a job will be a P-code process. Even if a job is real-time critical and requires most of the application to be SPM-code nodes, a high-level control program to initiate and orchestrate these processes will normally be written in Pascal to provide a structured and maintainable program. Applications which require a higher degree of information processing and altorithmic logic reside mostly in Pascal, using the access methods provided by the kernel system to communicate with and control devices and datasets. The majority of applications fall into this class due to the accessability of system 100 resources provided by the ideal machine monitor operating system. Most applications will not require additional SPM processes to be programmed. Such programming is needed only when a new device type is being interfaced to the system to provide the necessary software device manager.

Many of the level 2 kernel system functions are programmed in Pascal and reside in ideal machines in a general purpose processor. The system device manager (SYSDEV) which is responsible for assigning ownership and access rights to all devices attached to system 100 is an example of this. SYSDEV uses large, memory-resident tables to track the characteristics and changing usage of devices. These tables are examples of memory files. The large user 8 M-byte memory of the general purpose processor allows virtual machines to use such large data structures reducing the access frequency or disk storage and so increasing overall system performance.

A P-code process is initially created using the program development sys.tem to write and compile a Pascal program. The generated P-code module is linked with any required service routines, procedures or library modules to finally produce a load module. This load module is then entered into a program library from a system operator's terminal and linked to an entry in the system's function library. This gives the P-code program a standard program ID which can be used in a create job or create node request to the job scheduling, allocation and monitoring subsystem (JSAM). When JSAM retrieves the program descriptor from the library, it notes that this is a P-code process and so needs a general purpose processor with sufficient resources to build an ideal machine to host the process. Having selected a suitable general purpose processor, a create Pascal process request is passed to the ideal machine software in the general puppose processor. The ideal machine monitor software creates a new ideal machine for the P-code process and if the program is not already loaded, loads the code into general purpose processor data memory. The process is then dispatchable along with any other processes in their own ideal machine monitors.

JSAM can attempt to select a host general purpose processor 942, 944 which already has the program P-code loaded into data memory. The new process's ideal machine address space is then simply mapped out to the memory locations containing the code, sharing the same copy with any other processes running the same program. This reduces start-up time by avoiding a program load (although a load might still be required for process-related data modules), and reduces the amount of data memory needed for program space in identical, multi-process applications. An alternative process allocation strategy is to load-share across general purpose processors to improve the response time of the system. However, once each processor is running a copy of the same program code, code-sharing as described above would result from any further requests for the same program function.

C. Ideal Machine Monitor Service Functions

Programs resident in ideal machines interface to the rest of the system 100 using a set of ideal machine monitor routines. Each routine is called as a procedure from the Pascal program, and associated with each call is a parameter list of variables supplied by the user and resident in the user's own data space. Ideal machine monitor service routines are named as external in the users program, and linkage to them from the call in the user's program is made at link time.

The service functions provided by ideal machine monitor can be classified into the following areas:

(1) Input/Output to devices and datasets.

(2) Inter-process communications and process initiation.

(3) Event Management.

(4) Time Management.

(5) Memory Management.

The ideal machine monitor service routines either map into specific requests to the REX services available in the general purpose processor 942, 944, or are performed directly by the ideal machine monitor subsystem itself (for example, general purpose processor memory management functions). Ideal machine monitor service routines that call equivalent REX functions generate no P-code in the user's code space other than a call to an ideal machine monitor intrinsic procedure. Other ideal machine monitor service routines will include some code in the user's code space that generates call sequences to basic REX functions.

I/O calls form the bulk of the services, and the standard interchange protocol established by REX is reflected in these procedures with the Acquire—Open—Access—Close—Release sequence required. However, specific routines are included to simplify the interface to the various dataset types that are supported on the system 100. Thus, while many of the I/O calls can be equally applied to manage the data channels that exist between devices or datasets, a subset of these calls relate only to datasets.

The inter-process communication (IPC) routines allow IM processes to use the basic packet mechanism of the IPC network. A user process has access to primitive functions of the system 100 through these procedures, in that any legal packet type can be constructed and dispatched by the IPC. Also included in these calls are routines to create, identify and destroy subprocesses. This allows the user to arbitrarily build complex process networks in the system 100, consisting of both P-code and SPM-code processes using any available and allocatable system resource.

The event management routines enable a process to check for, and possibly wait on, a specified event. Events can be generated by both hardware and software and include interrupts, packet receipts, time-outs, I/O completion, process termination and signals from other processes.

Time management routines allow initiation of timers that can be used as the source of an event at some future time. This basic mechanism can be used to construct complex process scheduling activities.

Memory management services allow a process to obtain extra memory allocation from the large memory space of the general purpose processor. A unique Pascal variable type is accessed via the memory management routines—the memory file. To the user, this has the characteristics of a random-access file-type, but uses memory resident records rather than records stored on mass storage devices. The owning process has access to one record of the memory file at any one time, and the record window is accessed via the data space of the owning process. The memory file extends the data space available to a process without increasing its basic 64K-bytes of virtual address space. Furthermore, multiple processes can share the same named memory file providing an effective interprocess communications technique for ideal machines is resident in the same general purpose processor 942, 944.

The general nature of services provided to the user by the ideal machine monitor is closely related to the attributes of the system 100 as seen by the underlying REX services. However, the structuring power of the Pascal language enables these basic functions to be built into more complex mechanisms as needed, but still allows total control of, and access to, all the system 100 resources.

The ideal machine monitor input/output services routines (IOSRs) interface with the underlying REX input/output services routines to perform a requested I/O operation. The input/output services routines establish control and data paths between the user and the devices and datasets attached to the system 100.

In general, an I/O operation proceeds as follows. A user requests that an I/O function be performed by calling the appropriate input/output services routines and supplying a set of parameters that define the details of the request. The ideal machine monitor input/output services routines function formats the parameters into REX input/output services routines call arguments and invokes the appropriate REX input/output services routines, or sequence of REX input/output services routines. During this time, the user's process is suspended until the operation is complete. The ideal machine monitor input/output services routines returns either with a successful completion or an error with the appropriate status to indicate why the operation was unsuccessful.

The exact sequence in which ideal machine monitor input/output services routines procedures need to be executed largely depends on the specific device or dataset being accessed. The ideal machine monitor input/output services routines procedures have been listed previously.

All devices which are acquired and all datasets which are open must have a unique file information block (FIB) associated with them. The file information block resides in the user's data space and contains descriptive information about the device or dataset. This information is used by the ideal machine monitor input/output services routines and must exist from Acquire to Release for devices and from Open to Close for datasets.

The access control block (ACB) is used to maintain information relevant to each particular access of a device or dataset. As such, at any given time, a unique access control block must exist for each active access. An access is established by the execution of one of the access type verbs (e.g., VREAD, VWRITE . . . ) and remains active until the access is completed (usually by a VENDIO operation).

When a device is acquired, an acquire response message is returned which contains the reference information needed to open and access the device. To accommodate this, the ideal machine monitor input/output services routines maintains the message packets in its own environment with an associated unique identifier. This identifier is then placed in the user's file information block (FIB) for future reference as required by the ideal machine monitor input/output services routines.

Interprocessor communication in the ideal machine is accomplished by way of 16-word packets with the format of the packets left to the caller. The areas covered by these procedures handle the sending of packets to other processes, and also include the initiation, identification and termination of processes.

The following procedures and functions are available related to interprocess communications and management:

VSEND: Send a packet to a process.
VSIGNAL: Send a packet to a process within the same processor.
VCREATE: Create a new subprocess.
VQUIT: Terminate the calling process.
VCREATORPID: Return the PID of the creator of the calling process.
VDECLAREFC: Declare the valid packet function codes for the calling process.
VSELFPID: Return the PID of the calling process.

The event management procedures deal with the detection of events and not the allocation or deallocation of event control bocks (ECBs). To the user of the ideal machine, event control blocks are an internal structure used totally by the system to maintain events for the user.

The procedures and functions relating to event management include:

VCHECK-EVENT: Check for the occurrence of an event and return true if the vent has occurred, otherwise, return false.
VWAIT: Make the calling process non-dispatchable until an associated event occurs.

The procedures and functions furnished by the ideal machine related to time management include:

VSTART-TIMER: Start a REX timer for the current running process.
VCANCEL-TIMER: Cancel a timer that was set for this process
VTIME: Return the current time to the caller.

The resource manager is an internal ideal machine monitor function that handles the allocation, deallocation, and bookkeeping required to map the logical address space of the ideal machines into the 8 megabytes of physical memory in a general purpose processor. It does this by using 256 segment maps, with each map having 16 hardware registers, and each register mapping out to a single 4096 byte block. When a process is initiated in an ideal machine, a data segment map of 16 physical memory address registers is allocated for the processes' data segment. Then, if the program required to run the process is not already loaded, a code segment map is allocated and the program is loaded into the mapped area. After the maps have been allocated, physical memory pages (of 4096 bytes each) are allocated as required to accommodate the data memory requirements for the process. The first page of the Pascal stack is reserved as a process communication area and is used by the ideal machine monitor to manage the process.

In addition to the 64K-bytes of data memory that are available for the Pascal stack and heap, a process may use large memory files to extend the memory of the Pascal heap.

Two memory files are allocated for a single process. These files are managed on a record basis in a manner similar to direct access files on disk. Any number of such files (within general purpose processor memory limits) may be opened and, at any given time, any record of an opened file can be mapped into a set of pages on the heap of the user's data segment. The internal management of the data in a record is left to the user. These memory files may be shared by multiple users. However, memory files do not have to be shared in the same order by all users (i.e., Process "n" could have opened the files in the order D, C, B, A). Also, a memory file record can be mapped into more than one data segment at the same time and a single memory file can be opened multiple times by the same user.

The procedures and functions supported by the ideal machine monitor relating to memory management include:

VOPEN-MEM-FILE: Open a memory file for use by the calling program. This is allocated as the next 4K byte page on the heap.

VSEEK-MEM-RCD: This function loads the requested record in the map of the caller at the appropriate place as established by VOPEN-MEM-FILE.

VEXTEND-MEM-FILE: Extend the space allocated for the associated memory file by an additional number of records.

A set of utility procedures and functions is provided by the ideal machine monitor.

VGET-CREATE-PKT: Return the create request packet to the caller.

VLOG-IT: Print the contents of a packet on the local auxiliary extension board console.

D. Program Development System Overview

The program development system (PDS) is an interactive system: that allows the programmer to edit, compile and link programs directly from a terminal. From any of a number of program development terminals, a programmer can invoke the creation of a program development system to be run in an ideal machine. Each program development system provides the programmer with an environment similar to that of a stand-alone minicomputer that is totally dedicated to the programmer's own tasks. The programmer is also freed from the need to submit source programs to background batch-streams for compilation and linking. In addition, programs compiled for operation in ideal machines may be executed directly from the terminal within the environment of the program development system.

The program development system operates in a 64K-byte ideal machine and provides the following major facilities:

(1) Interactive Screen Editor
(2) Pascal Compiler
(3) SPM Macro Assembler
(4) SPM Link Editor
(5) Pascal Linker The program development system provides a convenient, simplified interface to I/O services that can be used to manage user files from the program development system terminal. Text, data and code files can be copied and deleted using a simple dialogue, with text and data files printed with a single command. A listing of a user's dataset directory can be requested, and code files can be displayed and patched from the program development system terminal.

The program development system can be used to check out Pascal program modules prior to integration. The structured nature of the Pascal language and the strong type-checking of variables performed by the compiler reduces the normal checkout burden to verifying correct logical operation. To aid in interactive checking, the standard Pascal intrinsics READLN and WRITELN are available to be inserted in the program, with I/O directed to either the program development system terminal or the printer. This allows user-specified program tracing. In addition, the full range of standard run-time error-messages defined for Pascal are displayed at the program development system terminal.

These check-out facilities are not available once the program module is integrated into an application system running in its own virtual machine, as the program development system operating system that provides these services is no longer present. READ and WRITE are replaced by the comprehensive I/O services provided by ideal machine monitor input/output services routines.

The integration of SPM code into the host space of system 100 is a privileged task calling for a special means of debugging and testing, as well as responsible action on the part of the user. Native SPM code cannot be run directly under the program development system—only Pseudo-codes (P-codes) produced by the Pascal Compiler can execute in an ideal machine. To check out SPM programs, particularly those destined for ROMs or those requiring testing in a stand-alone processor, an auxiliary extension board (AEB) can be used to debug code in the target processor in which it is to reside. An auxiliary extension board, when plugged into a processor, provides complete control of an SPM via a soft "front panel", consisting of an interactive terminal and a printer. To the programmer, an SPM processor (together with a normal extension board) plus an auxiliary extension board workstation provide a complete stand-alone test and integration facility. In addition, a processor equipped with an auxiliary extension board can co-exist and participate in the normal operation of the system 100.

For most SPM programs, checkout does not require an auxiliary extension board equipped processor. Instead, a system programmer's terminal 270 operating under the system monitor (SYSMON), can provide the programmer with the ability to initiate, terminate, monitor and alter SPM programs via the REX monitor.

When a new program function has been successfully tested, it is installed in the system program library from where it can be invoked automatically in response to external stimulus by the job scheduling, allocation and monitoring (JSAM) function of the kernel system. Insertion of a new program into the library is carried out from the system programmers terminal 270 through the system monitor. SYSMON also provides a program development console which can be used to supervise and manage all on-line program development systems.

E. Screen Editor and Utilities

Text files for input to either the SPM assembler or the Pascal compiler are generated and modified from a program development system terminal using the interactive screen editor. After invoking the editor, the user is asked to define a text file that exists in his directory, or alternatively, the name of a non-existent file that will be created as a result of the edit session.

The user is presented with a "window" into the text file with one terminal screen-full of data representing the current window position. The initial position of the window is at the top of the text file (or blank if a new file). The top line of the display continuously displays the current edit mode together with a list of the possible options that are associated with that mode. In this way, the user is always made fully aware of what options are available at any given stage in the edit.

The main edit mechanism is the cursor. The cursor can be moved around the screen and text can be inserted, deleted or change from the cursor position. Note that the screen of the program development system terminal is not the location where the actual text manipulation is taking place—this occurs in the program development system virtual machine. However, the high-speed link between the program development system terminal and the system maintains an accurate and updated image at the terminal of the current state of the text file being edited. By selective screen erasure and remote cursor control, the program development system achieves this without successive complete screen re-writes.

The following commands are available to the screen editor user:

- Adjust: Adjusts the indentation of the line that the cursor is on. Uses the arrow keys to move. Moving up (down) will adjust the line above (below) by the same amount of the adjustment on the current line. Repeat-factors are valid.
- Copy: Copies what was last inserted/deleted/zapped into the file at the position of the cursor.
- Delete: Treats the starting position of the cursor as the anchor. Use any moving commands to move the cursor. "Etx" deletes everything between the cursor and the anchor.
- Find: Operates in Literal or Token mode. Finds the target string. Repeat-factors are valid, direction is applied. "S"=uses same string as before.
- Insert: Inserts text. Can use backspace and delete to reject part of an insertion.
- Jump: Jumps to the beginning, end, or previously set marker.
- Margin: Adjusts anything between two blank lines to the margins that have been set. Command characters can be used to protect text from being margined. (Invalidates the copy buffer).
- Page: Moves the cursor one page in the current direction. Repeat-factors are valid; direction is applied.
- Quit: Leaves the editor. Exit modes are Save, Exit, or Return.
- Replace: Operates in Literal or Token mode. Replaces the target string with the substitute string. Verify option asks to verify before it replaces. S-option uses the same string as before. Repeat-factors replace the target several times. Direction is valid.
- Set: Sets Markers by assigning a string name to them. Sets Environment for Autoindent, Filling, Margins, Token, and Command characters.
- Verify: Redisplays the screen with the cursor centered.
- Exchange: Exchanges the current text for the text typed while in this mode. Each line must be done separately. Back-space causes the original character to reappear.
- Zap: Treats the starting position of the last item found/replaced/inserted as an anchor and deletes everything between the anchor and the current cursor position.
- down-arrow: moves repeat-factor ("Repeat Factor" is a number typed before a control command. Typing a "/" repeates indefinitely.) lines down
- up-arrow: moves repeat-factor lines up
- right-arrow: moves repeat-factor spaces right
- left-arrow: moves repeat-factor spaces left
- space: moves repeat-factor spaces in direction
- back-space: moves repeat-factor spaces left
- tab: moves repeat-factor tab positions in direction
- return: moves to the beginning of line repeat-factor lines in direction
- " "","−": change direction to backward
- " "","+": change direction to forward
- "=": moves to the beginning of what was just found-/replaced/inserted/exchanged A set of utility functions are provided by the program development system which allow the programmer to manage the files and programs generated by the program development system. A brief description of these utilities is as follows:

Hex Dump Allows the user to display and update disk files at the Hex code level. Options are:
- Read: Read and display blocks of data in hex format.
- Change: Change a byte of the displayed dump.
- Update: Replace the updated block in the disk file.
- Quit: Return to the editor.
- Copy: Copy one file to another, with amendments if the destination file exists, or create a new file if no destination file is specified.
- Delete: Delete a file from the user's directory.
- List Directory: Displays or prints the user's file directory.
- Print: Print a text or data file, either immediately if the printer is free, or spooled for later printing.
- Execute: Load and execute a P-code file in the space above the program development system code in the ideal machine that hosts the program development system. Run-time errors trap back to program development system with a standard error message. Ideal machine monitor Input/Output services routines may be linked into the program. READLN and WRITELN are available to communicate with the program development system and provide user-defined program flow tracing.

F. SPM Functions

The SPM macro assembler generates relocatable SPM code segments from text file input. The object code produced by the assembler can be input to the SPM link editor along with other object modules to produce a final relocatable load module.

The major features of the macro assembler are:

(1) Segmentation—The SPM program can be divided into numbered sections with the CSECT (Control Section) directive. The assembler concatenates the various components of a CSECT into a contiguous code section in the object module. Up to sixteen CSECTS can be defined in a program module, with one section having the attribute of COMMON. Common sections from all object modules are overlayed by the linker.

(2) Macros—User defined code sequences can be defined as named macros. Assemble time parameters can be passed to the macro expansion, allowing SPM programs to be structured out of tailored, functional components. Establishing common libraries of well tried macros is an efficient method of improving programmer productivity and program maintainability.

(3) Assembler Directives—The sequence of assembler processing can be controlled by directives in the text. In particular, the following two directives can be used to skip forward through text as determined by assembler evaluated expressions.

GOTO, Expression Symbol, Symbol, Symbol . . .

This skips to the next occurrence of a symbol, selected orinally from a list of symbols as determined by the evaluation of the expression in the GOTO.

JUMPVAL Expression 1, Relation, Expression 2, Symbol

Skips to "Symbol" if the "Relation" between 'Expression 1' and 'Expression 2' is true. These directives allow parameter-driven variants of a program to be assembled. For example, the changing of a parameter TEST from 1 to 0 could include or exclude test sections of code from a program.

Include from Text Library—A secondary text source can be defined as input to the assembler. This contains symbolically labeled sections of text that can be inserted into the primary source text stream when called by a LIBRARY directive. The format of the directive is:

LIBRARY, HOL(filename) Symbol 1, Symbol 2 . . .

where "filename" is the name of the library file and "Symbol" identifies a section to be included.

Other directives are available with the SPM assembler. The assembler is a two-pass program that generates as output an assembly listing, a symbol dictionary and an object code file. The additional directives are:

Input Control:
COLUMN: Define continuation of source text line passed 79 characters.
LIBRARY: Insert from library file.
LEND: End of library insert.
Output Control:
PRINT: Switch output listing on.
PRINTOFF: Switch output listing off
PAGE: Restore listing to top-of-page.
SPACE: Insert blank lines
TITLE: Title and sub-title definition.
TABSET: Indentation of macro expansion listing.
LINES: Lines per page control.
OUTPUT: Allow output text from a macro expansion.
Location Counter:
ABSOLUTE: Defines absolute code location.
RELOCATE: Defines code location as relocatable.
ORIGIN: Set location counter.
RESERVE: Reserve memory locations.
BOUND: Set location counter to Modulo-n boundary.
CSECT: Following code belongs to numbered control section.
COMMON: Following code belongs to common control section.
Symbol Definition:
LABEL: Set an assembler symbolic label.
EQU: Define an expression equal to an argument.
LOCAL: Define a local (limited range) label.
SET: Redefine a symbol to an argument value.
SPNAME: Scratchpad symbol (as opposed to Prog. Mem.)
SPEQU: Scratchpad symbol using scratchpad address mode.
SPDEFAULT: Define address mode for all following SPEQUs.
RENAME: Rename a symbol (Both values available).
ALIAS: Rename a symbol (Only new value available).
Data Generation:
DATA: Set data in memory (various formats).
BYTER: Form one 16-bit word from two 8-bit bytes.
Program Module Communications:
DEFINE: Declare a global symbol.
REFER: Reference an external global symbol.
Input Statement Processing:
END: End of text input.
GOTO: Skip to computed symbol.
JUMPVAL: Skip to symbol on condition.
VOID: Conditionally skip macro expansion.
Macro Definition:
META: Define a macro.
MEND: Terminate a macro definition.
AMEND: Alternative macro exit.
Loop Control:
LOOP: Begin a repeated text insertion.
LOOP TEST: Conditional termination of repeat text loop.
LOOP EXIT: Unconditional termination of repeat text loop.

Object modules produced by the assembler are input to the SPM link editor. The output of the linker is a further set of modules that can be submitted to the relocating loader that loads program functions on behalf of the system. The linker allows the various CSECTS and COMMONS of the input object modules to be further structured and rearranged such that a logical sequential program is produced. A list of object modules (up to 16) is submitted to the linker. The user can then specify a particular CSECT value in the range of 0 to 15. The input modules are then scanned and all CSECTS with the specified value are extracted. The CSECT can contain both relocatable and absolute (i.e., fixed load address) code sections. An output load module is specified, and the relocatable CSECT components are contiguously placed into it. The loading into the output module of the CSECT can start at an offset from the beginning of the output module. Absolute sections of code are appended to the relocatable linked sections. When all the CSECT components have been transferred, a further CSECT can be specified.

COMMON sections are treated in a similar way except that each section is overlayed into the load module, i.e., the space in the load module taken by a given set of named common sections is equal to the size of the largest common in the complete set of common sections.

Any of 16 load module segments can be specified as the output location of the link, and multiple CSECTS and COMMONS can be directed to the same load segment. Any CSECT not specifically mentioned in a transfer is default loaded to segment 0, and the default link is to link every object module in the order submitted into a single load module. Resolution of global references between the load module segments, and the assignment of relocatable values, finally takes place at load time. As programs are eventually loaded by REX into whatever memory resource is allocated (that is, not into known memory locations) the final relocation of a program's load module takes place dynamically at load time. Note that absolute program segments are normally used only for system functions such as REX, EXREX and related programs.

During the linking process, the user is able to supply undefined global references and can also reassign values to global references.

As output, the linker produces:
(1) A load module with up to 16 segments.
(2) A list of global references sorted by value in alphabetical order.
(3) A segment load map.
(4) A cross-reference of globals versus segments.

The following link editor commands are available:
CLEANUP: Define program entry point for orderly termination by the program.
EXTBASE: Set a default load module segment base.
EXTDEF: Set an undefined global reference, or override current value.
EXTEQU: Replace all references to global symbol "a" with value of symbol "b".
LIST: List the output load module.
MODULE: Specify beginning of input list of object modules.
OBJEND: End of list of object modules.
REFLIB: Library of reference values to be searched for undefined global references.
SECTION: Assign a CSECT to a load module section.
COMMON: Assign a COMMON to a load module section.
START: Define a normal entry point.

G. Extended Pascal

The Pascal language supported by the program development system is ISO Standard Pascal with certain extensions. Pascal is the major tool with which application systems are constructed. The Pascal compiler supported by the program development system generates Pseudo-Code (P-code) that is directly executable by the general purpose processor 942, 944 of the system 100.

Pascal source text files are created with the screen editor and submitted to the compiler. The source text may contain compiler control switches as defined in Jensen & Wirth; however, the actual switches available for use with extended Pascal are different from those defined in the User Report. A monitor of progress of the compilation is shown on the program development system terminal, which displays numeric information relating to each procedure as it is compiled (Pascal is a single-pass compiler). If an error occurs, the line containing the error is displayed with the offending error highlighted. The user has the option of continuing with the compilation to highlight other errors, or entering the screen editor at that point to correct the error.

An include file mechanism is provided that allows text to be included from a source library. The use of the include mechanism allows large programs to be subdivided into segments for easier editing. However, once segments have been successfully compiled and tested, if is more efficient to link P-code segments together, rather than include the original text in every compilation.

Program development system Pascal compiler switches include:
C: Place comment in code file (ex. for copyright)
F: Change byte-se x of output code
G: Control use of "GOTO" statement in program
I±: Perform I/O check after each I/O operation
I(f): Include file "f" into source text
L(f): Send compiler listing to file "f"
M(n): Limit error messages to "n"
P: Top-of-form
Q: Console compite trace enable flag
R: Allow run-time check of array subscripts and variable subranges The extensions to standard Pascal provided by extended Pascal are, in most cases, realized as procedure and function calls. The extensions can be divided into two classes—first, those that are satisfied by routines intrinsic in the ideal machine interpreter, and second, those that are satisfied by procedures in the program development system itself. The implication of this classified is discussed in the next section.

H. Pascal Linker

The two major areas addressed by these extensions are the provision of string functions for character manipulation, and extra file control and access routines.

One specific extension to standard Pascal is the SEGMENT PROCEDURE declaration. This allows a program to contain disk-resident procedures that are overlayed into the ideal machine when referenced from the program. In this way, a program can be sectioned into components that do not need to be resident concurrently in the ideal machine, allowing a program to be actually much larger than the 64K-byte code space available in an ideal machine, which is a size limit dictated by the 16-bit address range of P-codes. The net code size requirement is therefore the sum of the common, or root, segment of the program plus the size of the largest overlayed segment.

The following PDS Pascal extension procedures and intrinsics are available:
BLOCKREAD: A function that reads a variable number of blocks from an untyped file.
BLOCKWRITE: A function that writes a variable number of blocks to an untyped file.
CLOSE: Procedure to close files.
CONCAT: STRING intrinsic used to concatenate strings.
DELETE: STRING intrinsic used to delete characters from STRING variables.
EXIT: Intrinsic used to cleanly exit from the middle of a procedure.
GOTOXY: Procedure used for v.d.u. screen cursor-addressing whose parameters are column and line numbers.
FILLCHAR: Fast procedure for initializaing PACKED ARRAY's OF CHAR.
HALT: Halts a user program and return to Program Development System command mode.
INSERT: STRING intrinsic used to insert characters into STRING variables.
IORESULT: Function returning the result of the previous I/O operation.

LENGTH: STRING intrinsic that returns the dynamic data length of a STRING variable.
MARK: Used to mark the current top of the heap in dynamic data memory allocation.
MEMAVAIL: Returns number of words between heap and stack in data memory.
MOVELEFT: Low-level intrinsic for moving mass amounts of bytes.
MOVERIGHT: Low-level intrinsic for moving mass amounts of bytes.
POS: STRING intrinsic returning the position of a pattern in a string variable.
REWRITE: Procedure for opening a new file.
RESET: Procedure for opening an existing file.
RELEASE: Intrinsic used to release memory occupied by variables dynamically allocated in the heap.
SEEK: Used for random accessing of records within a file.
SIZEOF: Function returning the number of bytes allocated to a variable.
STR: Procedure to convert long integer to string.
IMM Service
Routines: Set of over 50 procedures that provide access to I/O and management services.

An example of a segmented program is the program development system itself. The root segment of the program development system simply displays a choice menu on the program development system terminal and then accepts a selection from the keyboard. This results in a segment procedure to be loaded from disk that implements the choice (i.e., editor, filer, etc.)

A disadvantage of segmented programs is that its loaded code cannot be shared among a number of users, as the instantaneous state of each user's code space is not constant but depends upon the particular state of each program's segment overlay. For example, as program development system is an overlayed program, every program development system user who logs-on causes a new copy of the program development system code to be loaded into memory. If, on the other hand, a number of identical applications use a non-segmented program, then only one copy of the program code would actually exist in each general purpose processor 942, 944. The individual virtual machines created for each instance of the application would map the virtual machine code space to the single copy of code and share it.

A more rational way to organize large multiuser applications is to design a system using a number of cooperating, memory-resident processes. This brings two advantages:

(1) Better response due to no segment-loading overhead.

(2) Reduction in real memory space taken with multiple users due to code-sharing of the nonsegmented components of the application system.

I. Pascal Linker

The Pascal linker allows precompiled procedures to be linked to form an object code file that can be loaded and run in an ideal machine. A reference to an external procedure or function can be made within a separately compiled module, provided that the referenced procedure has been declared as external. The linker attempts to resolve references between a set of modules submitted to it, or by selecting named precompiled procedures from within a library of code modules, if one is supplied. It is also possible to specifically replace all calls to a procedure internal to a module with a procedure supplied at link-time. This allows a new or test version of a procedure or function to be globally replaced without recompiling each module.

A link stage is required for programs that run outside the program development system environment and which use the ideal machine monitor service routines for the following reasons. First, most of the extensions to standard Pascal are implemented as functions and procedures called from the user program. Some of these calls are satisfied intrinsically by the ideal machine interpreter—an example of this is any of the character string functions. When compiled, a call to one of these functions generates a single P-code instructions (with an argument) that performs the requested function in one P-code instruction execution cycle. These functions are effectively micro-coded into the ideal machine's instruction set.

However, other extensions call internal program development system procedures implemented as P-code routines. When a program is being run under the program development system (by typing EXECUTE from the program development system terminal) many of the extensions used in a program are serviced by the program development system itself. Examples of this are the GET & PUT intrinsics—using these standard intrinsics actually generates calls to routines in the program development system that drive lower level I/O functions. Such a user program is referred to as a Level 4 process with the program development system providing a Level 3 operating environment which divorces the Level 4 application program from the underlying architecture of the ideal machine and system 100. This is the environment that the editor operates in, and a user would normally test subsections of his application by using the program development system execute function.

Eventually, however, an application program operates in a stand alone environment, and is initiated not from a terminal command under program development system, but by the JSAM. Therefore, any procedural routines normally supplied by the program development system to implement intrinsics and extensions (i.e., GET and PUT) must be linked with the application before it can operate independent of the program development system.

The second requirement for a link stage relates to the low-level ideal machine monitor service routines. Once again, a subset of these calls trap directly to micro-coded routines in the ideal machine monitor—typically those that call REX functions directly (for example, Send a Packet). Other routines require a P-code "front-end" to map a higher level call into a specific set of primitive ideal machine monitor calls—for example, one ideal machine monitor service routine reads the memo in an indexed dataset via a sequence of basic ideal machine monitor intrinsic calls. These P-code drivers must be linked into the users application.

Note that these procedures, when linked to the user porgram, reduce by a small amount the code-space available for the application, as they reside in the same 64K-byte address space available in a single ideal machine. However, the amount of space taken by extension, intrinsic and ideal machine monitor service routines is not great—typically less than 2K-bytes.

When a program is running under the program development system after an EXECUTE command, the application code is co-resident with program development system in the same virtual machine, and hence the amount of space available for the application is less than 64 K-bytes (program development system takes approximately 16K-bytes). Normally, the various segments and procedures of an application are tested in this environment.

J. Program Testing

The program development system, as an interactive single-user system, does not provide any specific testing tools for SPM programs. As the program development system resides in an ideal machine which executes P-codes, SPM code cannot be checked out in the program development system environment itself. To test SPM code, two facilities are available:

(1) Monitor functions from a system programmer's console for in-system testing (2) Use of an auxiliary extension board for in-system and stand-alone testing.

For Pascal programs, a high degree of static checking is carried out by the Pascal compiler, which not only checks for syntactic and semantic errors, but also provides extensive type-checking of variables across assignments, procedure calls, etc. A successfully compiled Pascal program will mostly contain only logical errors at run-time. As these programs are, by the nature of the Pascal language, of a modular design, individual sections can be tested by executing them under the program development system with run-time errors reported to the program development system console. For execution tracing, the module can be seeded with READs and WRITEs which will interact with the program development system terminal as the program runs. The Hex Dump utility can also be used to print diagnostic lists of data files generated by the program as an alternative source of trace information. This latter method is then available for producing dumps of trace files generated by the complete application system running outside the supervision of program development system. The interactive nature of the editor and compiler ensures a fast error correction cycle to eliminate logical operation problems.

Privileged programmers use the program development system to generate SPM programs to be run in the host space of the system 100. SPM programs are necessary when a new device handler, a hardware-specific transient, a time-critical transient or a time-critical job supervisor is required.

Authorized personnel using a system programmer's terminal 270 can load and run programs for test purposes, interacting with the processor environment in which the program is loaded. From a system programmer's terminal 270, the program, scratchpad and data memory of any processor can be displayed and altered. Packets can be sent to, and received from, the process using the test program, and dump tables can be specified in the event of the process trapping the processor. As a system programmer also has access to all of the functions available to a system operator, the system log can be used to collect run-time trace packets sent from the test program, and the verified program can then be installed in a program library. All of these functions can occur during normal system operation.

K. Ideal Machine Implementation

The implementation of the ideal machine software in a general purpose processor is presented here for interest only. Except for any desired application program, no user programming is required in a general purpose processor.

The ideal machine monitor subsystem is a collection of SPM processes resident in a general purpose processors high-speed program memory. Two main processes (i.e., processes with an allocated scratchpad context, and a system process ID (SPID) of 0) can be identified: ideal machine monitor subprocess driver (IMMS) and general purpose processor resource manager.

All requests for ideal machines are sent as create process requests to IMMS by JSAM, specifying a P-code Program ID. Ideal machine monitors creates a subprocess within its own main context for each such request. The shared program code for this subprocess provides two functions:

(1) ideal machine monitor interpreter driver (IMMI), and (2) ideal machine interpreter (IMI).

The IMMI function of the subprocess generates a request to the general purpose processor resource manager to load the program specified by the request into data memory and return to IMMI the data and code segment register contents needed to map out the loaded code in memory. If the P-code is already loaded, the existing copy is pointed to. IMMI then initiates running of an ideal machine by starting the ideal machine interpreter (IMI) decoding and executing the P-codes contained in the code space now pointed to by the mapping registers.

IMMI provides intrinsic services on behalf of IMI during process execution, including interfacing to REX functions. IMMI also deallocates resources used by the ideal machine when the P-code process terminates by calling the general purpose processor resource manager.

IMMI and IMI functions are provided by a single wubprocess and use the suspend option when waiting for the completion of REX functions (I/O, Event Management, etc.)

Every P-code process running in its ideal machine employs an IMMI/IMI subprocess to implement the basic machine emulation. However, due to SPM code sharing, the only SPM program-code required to be resident in the general purpose processor program memory are single copies of ideal machine monitors, IMMI and IMI. The general purpose processor resource manager is a P-code process running in system ideal machine.

Major kernel system processes implemented in Pascal use a main process invocation of IMMI/IMI. As each main process has its own scratchpad context, it can be assigned a unique system bus ID (SBID) by JSAM. This is necessary for those Level 2 system processes (for example, SYSDEV) requiring an instant global address (SBID) to which any process can send a packet. (When an IMMI/IMI process runs as a subprocess under ideal machine monitors, the subprocess identity cannot be pre-established, thus such subprocesses cannot be assigned global addresses.) In certain cases, SBIDs are also assigned dynamically to permit use of the packet rerouting facilities provided by the inter processor communications system to implement fault tolerant dual processing schemes.

Finally, this approach provides a system ideal machine with its own scratchpad context, reducing the process context-switching overhead to a minimum. In contrast, a normal ideal machine operating as a subprocess must save its operating context in a shadow context in data memory, to permit sharing of the ideal machine monitors main context.

RESIDENT EXECUTIVE (REX)

A. Overview

The resident executive (REX) is a firmware subsystem integral to each system 100 processor. It provides the resources management which software processes require to effectively use the hardware facilities of the standard processor module 500 (SPM), common to all processors. Software processes executing in a processor perform under the management of REX, which can support the operation of multiple, concurrent software processes. REX's responsibilities include the following service areas:

(1) Logical initialization of the standard processor module 500 on power-up.

(2) Loading of programs into the standard processor module 500 on request.

(3) Allocation of memory resources to processes.

(4) Scheduling and dispatching of processes.

(5) Process suspension and event management.

(6) Input/output and packet transfer services.

(7) Inter-processor utilities and subroutine calls.

(8) Timer utilities.

(9) List processing utilities.

(10) Interrupt handling.

(11) Diagnostics.

In the system 100 each process contains an identical coph of REX, combined with a processor-specific extension to REX (called generically, EXREX). EXREX manages the particular hardware extension of the standard processor module 500 which, together with the standard processor module 500 form one of the five different system 100 processor types.

Communications between REX and an active resident process is via subroutine calls. Communications between a specific processor's REX and a process in another processor is vis packets transmitted over the inter-process communications (IPC) network. There is a close relationship between the multiple copies of REX and the kernel system management process, JSAM (job scheduling, allocation and monitoring subsystem manager). Each REX is periodically requested by JSAM to report the status of its resources and this information is used to allocate required resources to the dynamically changing workload imposed on the system.

An understanding of REX services is important to users of ideal machines for applications programmed in Pascal, although such applications programs do not interface with REX directly. Ideal machines created in general purpose processors 942, 944 (GAPs) provide a logically separated and hardware fence protected environment for Level 3 application systems. Nonetheless, most of the image machine monitor services routines called via Pascal program procedures make direct and obvious use of the underlying REX callable subroutines of the host general purpose processor.

A system 100 consists of a collection of independent, tightly-coupled processors, each with its own central processing unit, program, scratchpad, and data memories. Although working cooperatively with other processes in the system, each within itself is an autonomous processing unit. At a system-wide level, each provides a useable resource to which work, in the form of software processes, is allocated. At the processor level, this allocated workload together with its hardware must be managed by the processor itself, free of any higher-level system-wide organizational structure.

The resident executive provides this management. Each processor, of the five different types that can exist in a Delta 2 system, has up to 32K-words of program memory, 12K of which is read-only memory used to house a copy of the REX program code. Each contains an identical copy of the basic REX code and has its own personal extension to REX that manages the hardware resources specific to that processor type. This extension is referred to as EXREX and is housed in an additional 4K-words of read-only memory.

Because REX provides a set of fixed, well-defined user functions and is in integral part of the basic hardware of a standard processor module 500, it is considered to be as much a primitive component of a standard processor module 500 as are the instruction set, memories, registers, and basic logic of the board itself. Thus the standard processor module 500 processor is a self-managed hardware system providing a reliable environment in which to host multiple concurrent processes, all contending for the use of the processor's fixed resources. A user process executes compiled basic machine instructions to achieve its specific goal but calls on a REX function to communication with other processes, acquire additional machine resources, use timers, or perform other general activities. REX management not only provides the applications programmer freedom from concern with many hardware-specific operations, but greatly increases the overall reliability of the system since most of the more complex activities needed by the user, and normally callable by basic machine instructions, are provided by mature, well-tried REX routines. Additionally, it reduces the problem of resource and activity contention by concurrent processes in a single processor by allowing for a structured, disciplined way to handle allocation of processor resources to processes. Thus the low-level program visibility of a processor presented to a programmer is both the standard processor module 500 instruction set and the set of REX-callable functions.

The life-cycle of a process within the system 100 is used as an example of the kinds of services REX provides within each processor.

A process is the basic unit of work from which system-wide jobs are built. To execute, a process needs a processor with the available resources necessary to host the associated program (memory, attached channels, execution time, etc.). Processes are initiated by a component of the kernel system called the job scheduling. Allocation, and monitoring subsystem manager (JSAM), which bases its decision as to which processor should host a process by comparing the quantity and types of resources required with those available in the system's processors. JSAM maintains current resource inventories by a regular background dialogue with the REX of each live processor in the system. (Process requests can be sent to JSAM by any active process in any processor in the system.)

Having chosen a suitable host for the requested process, JSAM sends to the REX of that processor a request to initiate the process. If the program code needed by the process is not already in program memory, REX loads the code froma disk-resident program library and creates the process. Once running, the process acquires from REX whatever resources are necessary to perform its task.

REX can initiate and manage a large number of processes, suspending those awaiting resources or an event and scheduling the execution of those currently dispatchable. When a process is running, it can make subroutine calls to REX to request a wide range of services including:

(1) Dynamic allocation of scratchpad and data memory.

(2) Management of and access to user-defined lists allowing a process to efficiently maintain a variety of single and multi-thread queues and stack structures.

(3) Communications with other processors in either the same or different processors.

(4) Management of any number of general purpose timers on behalf of the process.

(5) Semaphore services for user-defined resource sharing and activity synchronization.

(6) Management of hardware interrupts.

(7) A set of general purpose I/O services allowing data transfer to be performed between and among devices, datasets, and processes owned by the requesting process, regardless of where it is located in the system.

(8) A large number of general purpose utility and computational routines designed to ease the burden of user-programming of standard processor module processes.

During process activation, REX manages the interface between the process and any outside events related to it (for example, the receipt of packets destined for it). A process can be suspended, and thus become dormant for a number of reasons: waiting for a response to a communication, a timer to fire, or a resource to become free. When a process is suspended, REX enqueues the process until the event occurs, and dispatches whichever process has become the next-most-eligible to use the machine.

When a process terminates, REX returns all interprocessor resources used back to the general pool, and notifies JSAM of termination.

REX also manages hardware interrupts and provides a utility routine for each possible external interrupt condition. Many interrupts relate to the detection of hardware errors within the processor. REX manages the trapped error-condition allowaing inspection from a system terminal and diagnostic processing.

When a processor is first powered-up, REX takes the hardware through a predefined series of initialization and diagnostic routines. After successful completion, REX reports to JSAM that the host processor is available for work allocation.

B. Memory Management

Scratchpad management provides all resident programs in a standard processor module 500 including REX, with an orderly way of using the scratchpad memory resource. Order is preserved by requiring that all allocations and decallocations be accomplished using REX's scratchpad routines exclusively.

Each processor contains 4096 16-bit words of high-speed scratchpad memory, organized as 32 pages of 128 words each. Each page is arranged as eight packets of 16 words each (the structure of a scratchpad and interprocessor packet are obviously similar and logically equivalent).

The first page of scratchpad memory, page zero, is reserved for common use. Information which must be inaccessible to all resident processes in the host processor, such as the date and time, is maintained here. REX uses page one as its own private scratchpad area or context. The remaining 30 pages are available for allocation by REX either for user-process contexts or dynamic working storage.

A context is an area of scratchpad memory allocated by REX at the time each process is created. The number of scratchpad packets allocated is specified to REX in the create process request. This is generally kept to a minimum since context packets are allocated for the life of the process and provide "registers" for system control information as well as a static working area of storage used by the process as it desires.

The initial context allocation to a process may not meet all of the processes' lifetime requirements for scratchpad memory. This may occur because the size of the context is physically limited, or because it is wasteful for a process to request long-term allocation for waht are often short-term needs. REX satisfies such requirements for dynamic working storage by allocating and deallocating packets to each process on demand. Such requests are made on an individual packet basis. The amount of scratchpad allocated can thus expand and contract as necessary to meet the changing demands of the process during its lifetime.

Since a context must be allocated to each main process in a processor, the number of main processes is limited to the number of contexts. To keep this number as large as possible, REX allocates dynamically from those pages from which a context has already been allocated and maintains all spare packets available from previously allocated contexts on the available packet queue. Each time a context is allocated, packets not requested from the context's eight packets are placed on this queue. Because REX prefers to have as many full-page contexts as possible, each time a context is deallocated, spare packets from the same page are removed from the available packet queue. If the packets are contiguous with the deallocated context, they extent it. If not, they are placed on a free packet stack to await the return of the rest of the packets in the page. The free packet stack is composed entirely of packets which were once on the available packet queue, but have since been removed because the context from the page of which they were a part is no longer allocated. The free packet stack is maintained as a single-linked stack, using REX's standard scratchpad list facilities. When the remaining context packets are returned, they are all removed from the free packet list and used to extend the unused context back into a full page. REX will not allocate from the free packet stack unless the available packet list is empty. In this way, REX reconsolidates complete context pages.

The page consolidation function is performed by REXIDLE (REX's permanent background process which continually scans the available packet queue.

Besides managing scratchpad memory as a resource, REX also provides a set of functions for maintaining lists of individual packets on single-linked stacks or queues for user-defined operations.

Data memory management provides all resident processes in a processor, including REX, with an orderly way of using the data memory resource.

Each processor contains 64K 22-Bit words of data memory. Each word consists of 16 bits and six error correcting code (ECC) bits. The ECC bits permit detection of all 2-bit errors and correction of all 1-bit errors.

Initially, a minimal work area of 4K-words is assigned to REX. All remaining available memory is assigned to extension board REX (EXREX), the needs of which vary depending on processor type. If, during initialization, EXREX determines that this assignment is excessive the surplus memory blocks are transferred back to REX.

Whatever the size of the area initially assigned to REX, it may at times exhaust its supply of data memory. EXREX can aid REX by providing temporary extension blocks on these occasions. During physical initialization, EXREX informs REX of the addresses of its allocation and deallocation routines, its data memory area, and the maximum length of the extension blocks it can provide. Then whenever REX requires additional data memory, it requests a block from EXREX and later, after the need for a block passes, it is returned to EXREX.

The data memory management routines used by REX and available to all processes implement a buddy system of storage management. Blocks of any length up to the maximum may be requested by a process. However, available data memory is maintained only in blocks of 4, 8, 16, up to 32,768 words, that is, the lengths of all available blocks are in powers of two and in the range $2^2$ to $2^{15}$ inclusive. A request for a block of any other length is satisfied by allocation from the next-larger available block, successively smaller power-of-two blocks until the request is satisfied with a total allocation which exceeds the requested size of the least possible amount. Since the smallest available block is four words in length, up to three extra words may be allocated to satisfy a request. The unused memory remaining after request allocation is retained as a number of smaller available blocks.

During allocation, it is possible that an available next-larger block does not exist from which to allocate the request. In this case, a still larger available block can be successively split into two "buddies" of equal size until a block of the next-larger size is obtained. Since the length of each available block is a power of two, the length of each buddy thus obtained is also a power of two.

When a previously assigned block id deallocated, unless its original length was a power of two, the block cannot be made directly available. Instead, smaller blocks, the lengths of which are each successively larger powers of two, are split off from the deallocated block until the length of the remainder is also a power of two. It can then be made available.

Each time a new available block is created, either by deallocation or as a result of splitting, all other available blocks of the same length are examined to determine if the buddy of that block is also available. Since the origin in data memory of each block is a multiple of its length, the address of the buddy may be easily determined. If the buddy is available, both blocks are recombined to form a new available block of the next-larger size. Recombinatio is performed by REX's background process, REXIDLE.

Program memory in each processor consists of at least three blocks of 4096 16-bit word ROM and up to 65,536 16-bit word RAM for REX and EXREX. Both ROM and RAM are 50 nanosecond memories. Since only RAM can be loaded dynamically, one might expect REX to consider only RAM as a manageable resource and to accept ROM as a non-alterable preassigned resource. This is not the case, however. REX treats all program memory, both RAM and ROM, as a manageable resource and wherever possible does not differentiate between the two. This uniformity of treatment presents a number of important advantages, particularly in the area of program loading.

A request to load a program into program memory can be accepted regardless of the memory type of the target area. Programs cannot actuqlly be loaded into ROM, but part of the loading operation is to verify that the expected checksum which accompanies the program being "loaded" matches the actual checksum computed from the data in memory. Thus a program on disk can be "loaded" into ROM to verify that the two are identical.

Another advantage of treating memory uniformly is that, as long as loads are requested for all programs, RAM and ROM can be interchanged without altering any code. If the target area is RAM, the area written to is changed. If the target area is ROM, it is not. This flexibility greatly facilitates testing and debugging.

REX allocates blocks of program memory in lengths of up to 4K-words. Blocks can be requested by length alone, or by both address and length. Each block of available program memory (whether RAM or ROM) is described by a program memory element (PME), an internal data structure maintained in a queue by REX in its own data memory area.

When a block is requested by length, REX searches the program memory queue for a block of sufficient size from which to satisfy the request. The search is begun at the head of the queue, and the first block of sufficient size encountered is selected.

If a block is selected from which to make the allocation, the program memory element for the block is changed (the length and address so that it then describes only that portion of the original block which remains after the allocation is made). If no residual exists, the program memory element is instead deleted from the queue and returned to available data memory. On the other hand, if the allocation cannot be made because a block of sufficient size does not exist, the request is rejected and an error return to the calling process is made.

When a user requests that a previously allocated block be returned to available program memory, an attempt is made to recombine the returned block with any existing unassigned blocks on either side of it in the program memory address space.

A program can consist of from one to nine relocatable load modules, each limited to a maximum length of 4K-words, and up to 32 overlay modules. Load modules can be either two types: primary or secondary. Primary are program-related, that is, only one re-entrant copy need exist in memory no matter how many processes share its use. Secondary are process-related and a separate copy of each must exist for each active process. Overlay modules are loaded by explicit request and may overlay primary or secondary modules. (Generally, overlay modules do not exist in re-entrant programs). A program must have at least one primary module loaded into program memory before a process can be created.

Programs are loaded by REX in response to create process request packets. Such requests assume the implied condition that the program be loaded only if it is not already present in program memory. Because the transfer of a program from disk is a relatively time-consuming operation, REX creates a subprocess to perform each load.

Initially, the subprocess sends SYSLOAD (part of the system directory subsystem resident in a disk data processor 934, 936 a packet requesting the transfer. SYSLOAD (via the SYSDIR program load process PGMLOAD) responds with a packet containing information describing the program, including the quantities types and memory required. The loading subprocess allocates that memory and creates all control blocks necessary for each of the program's load modules.

The subprocess then requests that the program be loaded. As the program packets arrive, they are put into memory one by one until the entire program has been loaded. The subprocess proceeds to calculate a checksum from the loaded program, and compares it with another passed to it in the last packet received from PGMLOAD. The subprocess accepts the load if an error has not occured during the transfer, and the two checksums match. Otherwise, the load is rejected (if rejected, the load is not retried). In either case, the load subprocess then terminates.

Once loading of a given program is begun, any further program, load requests to the same process are enqueued to allow the one in progress to complete. Eventually, after the load completes, the subprocess initially created to perform the load for the first request proceeds to process each of the other requests, in the order in which they were received.

It may occur that a program load is required but a contiguous area of available program memory is not sufficiently large enough to accept it. In this event, REX re-examines each program in the program load list, considering those not currently being used by a process. If the required program can be accommodated by overlaying an unused adjacent one, the request is accepted; otherwise, it is rejected. Note that unused programs are not automatically deleted to avoid having to reload if they are required again in the future.

C. Process Management

Work performed by a processor other than handling interrupts is accomplished by the execution of processes. A "process" is a program and associated set of dynamic data (that is, its context) provided execution time by REX.

For each process, a control data structure referred to as a process control block (PCB) is allocated in data memory describing the attributes and status of that process. REX maintains several different lists of process control blocks which allow control of the execution phases a process can be in. The process control blocks listed are organized in descending order of dispatching priority, the dispatching priority determining which of the members is most eligible for attention. One list consists of all process control blocks for dispatchable processes while the remaining lists are made up of those for dormant or nondispatchable processes; for example, processes awaiting for an event to occur before they can proceed.

A process can create subordinate processes that execute using the same scratchpad context as their creator, and these can each create still other processes using that same context. In this way, a total of up to 256 processes can be created to execute using one scratchpad context. The first process created in a given context is called the "main" process. All other processes spawned by the main process are called "subprocesses".

A single process, executing alone in its own context, is referred to as a "simple" process. A main process and a set of subprocesses, all of which share a common context, are referred to as a "compound process".

When a main process is created, it can be defined as a "bypass" process designated to receive not only packets addressed to it, but those addressed to any of its subprocesses whether the subprocess actually exists or not.

Any process (main or sub) to which JSAM allocates resources can create another main process, and any main process thus created can itself request the creation of still other main processes. For certain kernel system subsystems, the original request to JSAM causes a multiprocess block of resources to be allocated. In such cases, the request can be directed to the same processor in which the requesting process itself is executing.

When REX receives a create process request packet (from the requestor, generally JSAM), the program load list is first examined to determine if the required program already resides in program memory. If it does not, the program is requested from the system library and loaded. The created process is then immediately available for execution.

A process can request the creation of subprocesses, and any subprocess thus created can itself request the creation of still other subprocesses (up to a maximum of 255). Each uses the same scratchpad context as the creating process, possibly with a "shadow context" overlay kept in data memory. The program to be executed by a subprocess must have been loaded with or by its main process and must reside in program memory at the time the subprocess is created. A subprocess is created by a direct function call to REX.

Process deletion refers to the elimination of one process in response to a request from another, enabling a process working as a control node to order the termination of one of its subordinates. JSAM, however, also uses this function to order the termination of an orphaned process (one whose control node has failed).

It is important to distinguish between process deletion and process abortion. Process deletion is the execution of a planned sequence of operations by one process to elicit its own orderly demise at the request of another. Process abortion, however, is the premature removal of a process by REX as a result of an unrecoverable error detected and attributable to that process. In order to be deleted, a process must have defined a deletion entry point to REX. A subprocess can be deleted only by the process that created it, or by its main process.

No subprocess can outlive the process that created it, and an attempt to terminate a main proces with any surviving subprocesses results in a trap. For this reason, a compound process, if it is to be terminated, must delete all of its created subprocesses prior to terminating.

Each process if assigned a bi-level dispatching priority consisting of a process class and a rank within that class.

Five process classes are defined, number from zero to four. Processes assigned to class four have the highest priority; those assigned to class zero have the lowest (processes with class zero are reserved for use by REXIDLE). Within each of the four classes, processes are ranked from zero to 255, the highest rank being 255. The kinds of processes normally assigned to each class are listed as follows:

Class 4: Interrupt-initiated background processes, imperative timers.
Class 3: Normal events.
Class 2: Delayed timers (e.g., timeouts), lot-priority processes, time-initiated long processes.
Class 1: All other processes (except REXIDLE).
Class 0: REXIDLE.

The initial dispatching priority can be assigned when the associated program is assembled, or the assignment can be deferred until the process is actually loaded. In either case, after a process begins execution, various REX routines allow the process to dynamically alter its own priority or, subject to certain restrictions, that of another process.

REX selects the highest-priority dispatchable process for execution, that is, the one whose process control block is at the head of the dispatchable queue. Once given control, a process is allowed to execute until it voluntarily relinquishes control or is interrupted by the occurrence of a hardware interrupt.

A process can relinquish control voluntarily or involuntarily. It voluntarily relinquishes control in one of three ways.

(1) By calling a wait routine to wait for one or more events to occur, including calling an input or output services routine in a mode which invokes suspension until the requested service completes.

(2) By calling a routine to signal processes' desire to terminate its owh execution.

(3) By calling a resource management routine, in a mode which invokes a wait if the resource is not immediately available. (This is considered a voluntary relinquishment of control since the process chooses to call this routine.)

The first method of voluntarily relinquishing control, calling a wait routine, is used whenever a process cannot proceed until some external event occurs. The event might be the completion of an I/O operation, the expiration of a specified time interval, the receipt of an unsolicited packet, or any other condition defined for the process.

Calling a wait routine causes the calling process to be made nondispatchable until a specified or an unsolicited event occurs. Control is returned to the process when it again becomes the highest-priority dispatchable process.

The second method is used when a process has no work left to perform. This may be because it has successfully accompoished all of its assigned tasks, or because some insurmountable problem has forced it to abandon its mission prematurely.

Once a process terminates, control is never returned. Therefore a process must complete all internal processing prior to termination, including the return of any owned resources and termination of all subprocesses.

Calling a resource management routine, the third method of voluntarily relinquishing control, need not result in a loss of control. However, if it cannot allocate the resource because it is not available, the process does lose control. When the resource becomes available, the process will again be made dispatchable.

A process involuntarily relinquishes control whenever a hardware interrupt occurs. After the interrupt is serviced, control may or may not be immediately returned to the interrupted process.

As previously explained, all processes are assigned to one of five process classes. Processes in one class are allowed to interrupt those in a lower class. Processes in the same class, however, are not allowed to interrupt others in that class, regardless of rank.

When a process of one class interrupts that of a lower class, the interrupted process is said to be "suspended". Since five process classes are defined and processes cannot interrupt others in the same class, at most four processes, one in each class except the highest can be suspended at any one time.

The servicing of a hardware interrupt can result in making dispatchable a process whose class is higher than the interrupted process. In this case, the interrupted process is suspended and the higher-class process given execution control. Other interrupts, after servicing, can result in execution control returned to the interrupted process.

A dormant or suspended process can again become dispatchable in one of three ways:

(1) An event for which it is waiting occurs.

(2) The process is restarted.

(3) A previously unavailable resource becomes available.

When a process voluntarily reliquishes control by calling a wait routine, it normally must wait for its process control block to come to the head of the dispatchable queue, and then for the active process to relinquish control before it is again allowed to execute. (It can, however, be restarted by an interrupt handler or another process.) When a process waits for a specified or an unsolicited event to occur, its process control block makes its way back to the head of the dispatchable queue in one of several ways, depending on when the event occurs and how it was initially defined.

If, at the time the wait routine is called, the event has already occurred, the process remains dispatchable but is process control block is replaced on the dispatchable queue in descending order by dispatching priority. The process must then wait for all processes ahead of it to execute before it is given another turn.

If the wait routine is entered before the event has occurred, the process is made nondispatchable and its process control block is moved to the event quque. When the event occurs, the process control block is returned to the dispatchable queue in the usual priority order to await its next turn at execution.

A nondispatchable process can again be made dispatchable by a call to a restart routine. This call can be made by an interrupt handler or another process.

When an interrupt handler restarts a process, the restarted process, if it is assigned to a higher priority class than is the active process, forces the suspension of the active process and immediately becomes the active process.

When a process restarts another process, the restarted process is made dispatchable but the currently active process is never suspended in its favor. The restarted process must wait its normal turn to execute.

A request to restart a process is acceptable only if the process is waiting for an unsolicited event to occur. If the process is nondispatchable for any other reason, the request is ignored.

A process made nondispatchable due to the lack of a requested resource is made dispatchable when the resource again becomes available. The process regains control at the same point and with the same register contents, as if the resource had been available initially. The temporary loss of control is thus transparent to that process.

Most processes perform some initialization prior to beginning data processing. They may need to set up tables, create subprocesses, or complete various other functions that generally prepare the process to handle events. To ensure that this initialization is allowed to take place, each process is created dispatchable. The process will, therefore, execute at least once and perform any required initialization at that time.

If a process is to accept any unsolicited packets the function codes contained in those packets must be defined to REX. A process accomplishes this by allocating and initializing a function code branch table. Function code branch table is created in a 16-word area of data memory, with one word for each possible function code (the first word of the area corresponds to function code zero, the last to function 15). Each word of the area must be initialized to contain either the address where control is to be passed if a packet with the corresponding function code is received, or zero to indicate that packets received with the corresponding function code are invalid and are to be discarded.

It should be noted that a process can change the function code branch table at any time, and the process can temporarily enable or disable one or more function codes.

The structure of a compound process, where each member process uses the same scratchpad context, greatly facilitates communication among the components. However, conflict for the use of the limited scratchpad space may also be introduced.

To avoid this problem, a "shadow context" whereby eight packets selected from the scratchpad context can be saved is allocated in data memory for each process of a compound process. Then each time a compound process is allocated to execute, REX verifies that its content in scratchpad reflects the content of the shadow context of the executing component process. If necessary, REX swaps into scratchpad the executing process shadow context, saving the overlayed context packages of the suspended process in its shadow context.

A shadow context is not automatically defined for a main process when it is created but if a creating process defines a shadow context for itself, then identical ones are automatically defined for all subprocesses in its compound process.

If a main process requires a shadow context or a subprocess needs one different than that of its creating process, the required shadow context can be defined and allocated data memory.

D. Event Management

An "event" is any change of state (either "hardware" or "software") that can be recognized and communicated to a process.

Hardware events generate interrupt requests for 15 possible interrupt conditions in each of three levels. For each level, a separate interrupt branch vector contains the addresses of all interrupt handler routines designated to service the interrupt conditions assigned to that level. Control is transferred directly to the designated interrupt handler routine whenever an interrupt request is generated at a higher level than is currently being serviced.

Software events do not generate interrupt requests, nor are they limited to a small number of predefined conditions. Rather they are defined dynamically by processes, and their number is limited only by the amount of available data memory. Each of the following conditions, when properly described to REX, constitute a software event for a process:

(1) The receipt of an input packet.
(2) The expiration of a time interval.
(3) The completion of an I/O operation.
(4) The termination of a subprocess.
(5) The receipt of a signal from another process.

The term "event" when used in the following paragraphs refers exclusively to a software event.

For each event, REX maintains an event control block (ECB) in data memory. The event control block describes the event to REX, and contains information used by REX to recognize the event and control execution of the process associated with it.

Generally an event control block is created in anticipation of an event, that is, before the event actually occurs. Events for which event control blocks are created in advance are referred to as "solicited".

In some cases, however, an event is not certain to occur. In other instances, even though it is sure to occur, an unpredictable amount of time may pass in waiting. In the interest of conserving data memory, event control block creation can be deferred until after the event occurs. An event of this type, for which an event control block is not created until after the event occurs, is referred to as "unsolicited".

Events can have time limits associated with them, referred to as "timed" events. Those that do not are called "untimed".

A timed event is one which must occur within a specified interval of time. A packet transfer, for example, is typically a timed event. If the transfer does not complete within a given time interval, a problem has definitely occurred.

The event control block which describes a timed event contains an expiration time specified when the event is defined. If the event occurs prior to this, it is said to have completed "normally" and if it does not, it is said to have completed "with error". The error is called a "timeout". If an event "times out" and then occurs, it is no longer defined and is ignored.

An untimed event is one which need not complete within any specified interval of time. The event control block which describes an untimed event does not contain an expiration time, and therefore the event cannot "time out".

Interval timers are, for the most part, treated in a manner identical to timed events. The event for an interval timer is the expiration of the specified time interval. However, timeout in this case is not considered an error.

When an event occurs, the event control block describing that event is "posted" to the process associated with the event. Whether or not the process is then made dispatchable to service the event depends on the status of the process itself, and the return-point addresses specified. If the process is waiting for the event to occur and the supplied return-point is nonzero, the process is made dispatchable from the return-point address. An executing process must explicitly check its list of posted event control blocks to determine if an event, either unsolicited or solicited (identified by a reference number), has occurred.

Note that even if a suspended process is made dispatchable by the occurrence of the event and is of the same class but of a higher rank than the currently active process, control remains with the active process until it voluntarily relinquishes control.

When an event occurs, the event control block describing that event is "posted" to the process with an event completion code. This code indicates whether the event completed normally or with error and if completed with error, the code also indicates which error.

An event completion code is made up of an error group and code. Codes belonging to group zero indicate normal completions and thos belonging to all other groups indicate error completions.

Whether the event completed normally or with error determines at what point the associated process will be dispatched to process the event. If the event completed normally, the process is dispatched at the primary return-point address. If the event completed with error, the process is dispatched at a secondary return-point address.

A 16-word function code branch table is defined for each process, each one-word entry in the table corresponding to one of 16 function codes associated with each packet or signal that a process will recognize. The entry contains the address where control is to be passed when a packet or signal with a given function code is received.

For each process, a function code mask determines whether events with a given function code are solicited or unsolicited. Each bit in the mask corresponds to a particular code and if a bit is set, then a packet or signal with the corresponding function code is unsolicited.

E. Input/Output Functions

The high degree of processor specialization in the system 100 is particularly evident in the area of I/O control. A number of different special purpose processors may participate in performing this function for the many attached I/O devices.

Each input, output and control channel for each device in the system 100 is attached to a processor designed specifically to host handlers for that class of device. Disk drives are attached to disk data processors 934, 936; magnetic tape drives, terminals, printers, and data channels are attached to interactive services executives 702, 706, telephone, operator terminal voice channels, and real-time data channels are attached to real-time executives 406, 408.

In each processor, a system process known as a device handler is hosted for each type of device channel attached to that processor. The responsibility for all communication with and control of a device channel rests with its assigned device handler. A user-process application in the system 100 does not communicate directly with I/O devices. Instead it makes requests to device handlers that interact with the device to perform the requested functions.

Generally the device handler does not reside in the same processor as the user-process. Device I/O for a user, therefore, involves inter-processor communication in the form of packet interchanges over the main buses.

Because communication with all device and data set handlers is as such, it is beneficial to both user and handler designer to provide a standard framework within which these packet interchanges can be defined. The REX I/O service routines (IOSRs) make up this framework.

The input/output services routines (IOSRs) are a set of subroutines, each affecting a prescribed sequence of packet interchanges with a device or data set handler. Each packet interchange performs some basic I/O function and together provide a complete interface between the user-process and device or data set handler.

Generally such an interchange proceeds as follows: a user-process request an I/O function be performed by issuing a subroutine call to the appropriate input/output services routine, which formats the user's request into a request packet and forwards it to the specified device or dataset handler. The handler then either performs the requested function responding with a confirmation packet to the input/output services routine, or rejects the request responding with an error packet. In either case, the input/output services routine extracts any pertinent information from the response packet and returns it to the user-process. The manner in which a specific handler responds to a given function depends on the nature of the device, and the particular handler implementation.

The input/output services routines allow the user to perform I/O operations in either two modes: "wait" or "no-wait".

When a user issues a request in wait mode, the input/output services routine places the user in a wait state suspending him until either the requested operation completes or some other previously defined event occurs (the choice is the user's). A process exclusively using wait I/O cannot, therefore, overlap operations and it never has more than one I/O operation outstanding at any one time.

When a user issues a request in no-wait mode, the input/output services routine returns control to the user once the requested operation is initiated which is as soon as the request packet is sent. A user operating in this mode can have several overlapping operations outstanding at the same time.

The input/output services routines monitor I/O operations using two reference values supplied by the user when requesting an input/output services routine operation. The first, a channel reference number in the range of one through 255, is uniquely associated with a device or dataset. This number is assigned when the device or dataset is opened, and released when the device or dataset is closed. The second, an access reference number also in the range one through 255, is uniquely associated with a particular input or output operation for a device or dataset. This number is assigned when the I/O operation is initiated, and released when the operation is completed.

Once a device or dataset has been opened, all accesses must specify the assigned channel reference number to select a particular device or dataset. After an access to an individual logical data record has been issued, all data transfers to or from that record must specify the assigned access reference number associated with that record.

The reference numbers assigned by the user when an operation is initiated are returned when the operation is completed. The user can, therefore, determine which of several outstanding concurrent input/output services routine operations has completed.

A time limit, expressed by the user, can be applied to all I/O operations. The user can specify a time interval (in seconds) which when added to a predefined system timeout value determines the actual timeout interval for the operation. The time begins when the request packet leaves the outstack.

One parameter in each input/out services routine is the address of a parameter list in data memory. The list is constructed by the user prior to calling an input/output services routine, and contains a set of parameters specific to each input/output services routine call. The contents of the list are not changed by the input/output services routine.

F. Time Management

The variety of time management facilities provided by REX are divided into two categories: those related to interval timing, and those concerned with date and time-of-day maintenance.

All interval timing functions within a processor are controlled by that processor via one 16-bit hardware register in the processor's standard processor module CPU 504. The register is called the programmed interval timer (PIT).

To maintain internal consistency, REX alone controls the programmed interval timer, satifying the various timing requirements of individual processes by creating a "virtual programmed interval timer" for each timing interval required and manipulating the hardware programmed interval timer to operate all of the virtual programmed interval timers. A process can explicitly or implicitly request that an interval timer be created.

An explicit request is made whenever the process calls one of the REX time management routines to request that the elapse of a specified time interval be defined as an event.

An implicit request is made whenever the process calls a REX routine (other than a time management routine) to define an event which must occur within a specified period of time.

Regardless of whether the interval timer is created explicitly or implicitly, it is placed on a single list along with all other event control blocks associated with timed events. REX maintains the event control blocks on this "timer" list in chronological order by expiration time.

The expiration time at the head of the list is used to determine the current value to be loaded into the programmed interval timer. When an event control block reaches the head of the list, the difference between its expiration time and the current programmed interval timer contents is calculated, and the programmed interval inter is reloaded with this value. When the interval expires, the event control block is removed from the list and posted to its process.

JSAM, a system process, periodically provides REX with the system data and time in both binary and BCD formats. REX maintains the most recently received values in scratchpad page zero. JSAM sends updates to successive processors approximately every 50 ms. In a system with a full complement of 32 processors, each processor receives a new date and time about every 1.6 seconds.

For some applications, this discrepancy from true system time is not acceptable. REX provides a correction factor in page zero equal to the number of programmed interval timer ticks since the last update was received. The user can use this value to adjust the date or time-of-day to obtain a more accurate result.

REX performs the functions described previously by setting and resetting the programmed interval timer. It operates as follows:

By loading the programmed interval timer with the appropriate count, REX selects a time interval requested by a process. Each 256 instruction cycles, the programmed interval timer is decremented by one (that is, "ticks" occur every 34,133 microseconds). The 16-bit programmed interval timer can be decremented a maximum of 65,536 times and thus define a maximum time interval of 2.237 seconds.

When the programmed interval timer is decremented past zero (that is, when the specified interval expires), a Level 1 interrupt request is generated.

The programmed interval timer continues to be decremented, however, and must be reset under REX control within 1024 ticks (approximately 34,953 milliseconds), or a Level 3 watchdog timer interrupt is generated to signal an overrun.

Programmed interval timer is considered about to "tick" if it will decrement within the next 16 instruction cycles, and it can be tested for this condition. If a tick is imminent, it should be allowed to occur prior to programmed interval timer readout to avoid errors in calculations by use of a noncurrent value.

G. User-Defined Resource Management

All processes acquire, use, and release resources. These might include memory space, datasets, I/O devices or could be slightly more abstract such as execution time or permission to access a list. In fact, almost anything of interest to a process can be considered a resource for that process.

Some resources are of interest to more than one process and must be shared. Access to shared resources must be controlled to prevent the activities of one process from interfering with those of another. This control can be vested in a formal resource manager. The REX data memory manager, for example, controls all accesses to REX's pool of data memory.

Alternately, the processes involved can exercise the resource control necessary by cooperating with each other. This shared resource control is implemented using flags to synchronize the activities of the cooperating processes. REX supports two kinds of flats: binary and general. These, and the routines for using them are described and followed by a discussion of how such flags can be used to control access to shared resources.

A binary flag is a flag which has two possible values: true or false. REX represent such a flag as a resource control block (RCB). Each resource control block has a unique name by which it and the flag it represents are known. The value of a binary flag is true if a resource control block with the same name exists and the value is false if one does not.

A general flag is a flag which can take on any integer value in the range zero to 32,767. It is also represented by REX as a resource control block, and has a unique name by which it and the flag it represents are known. The current value of a general flag is stored in the resource control block (the value of a binary flag is stored in the resource control block, but is always one).

A resource can be successfully shares as long as all processes which access that resource synchronize their activities to avoid conflict. The manner in which this synchronization is completed depends on the relationship which exists among the processes sharing the resource. Three relationships are common: (1) competition for a single resource, (2) competition for a pool resource, and (3) production consumption.

These relationships, and methods for using flags to synchronize process activity to avoid conflict, are examined in more detail in the following paragraphs.

Processes which compete for a single resource must synchronize their activities to avoid conflict with one another. For example, processes updating the same word in memory cannot do so simultaneously and still maintain the integrity of the contents. Rather they must synchronize their activities so that each is allowed to complete any outstanding update operation before a new one is begun by another. In such cases, synchronization can be accomplished using a binary flag. Access to the resource can be denied or permitted depending on whether the value of the flag is true or false.

In operation, the first process to find the flat set false (no resource control block) in its attempt to access a single resource is permitted to acquire it. A resource control block is now created so that other processes attempting access to the same single resource find the flat set true and are suspended. After the using process releases the resource, the next process (if there is one) enqueued for that resource is given access to it. In this way, the resource is passed from one process to the next, with each in turn granted exclusive access to the resource for as long as is needed.

Processes may compete for a resource from a pool of undifferentiated resources, that is, any one of a number of identical resources may satisfy the requirements of any one of a larger number of processes, all of which require one or more such resources. The available resources must, therefore, be shared. Without a formal resource manager, the participating processes must synchronize their activities to avoid conflict with one another.

For example, suppose a number of processes all share a smaller number of identical magnetic tape units. Access to this pool of resource units can be controlled using a general flag as a resource counter. Each time a unit is.allocated, the count of available unit (value of the flag) is decremented by one; each time a unit is deallocated, the count is incremented by one. The count, therefore, always equals the number of units available for allocation. If a process attempts to use a resource when the count is zero, it is suspended until a resource unit (a magnetic tape unit in this example) is released by another user.

For a given resource, two or more processes may relate to each other as producer(s)-comsumer(s), that is, one or more processes may produce a resource that one or more processes may consume. Where such a relationship exists, participating processes must synchronize their activities to ensure proper resource production consumption, and avoid conflict between competing producer(s) and consumer(s).

For example, suppose one process (the producer) fields request packets and adds them to a list. Several . over processes (the consumers) remove these request packets, one at a time, and respond to them. This flow of request packets from producer to consumer is maintained using a general flag as a resource counter. (In this example, the actual list of request packets would itself be a shared resource. Access to it could be controlled using a binary flag). Each request packet is added to the list, the count (value of the flag) is incremented by one; each time a request packet is removed, the count is decremented by one. The count, therefore, always equals the number of request packets available for processing. Any consumer attempting to remove a packet from the list when the resource count in the general flag is zero is suspended until the producer adds another packet to the list. If the producer adds packets to the list faster than they are removed, the list lengthens. If the consumers exhaust the supply, they must wait but are restarted as soon as more request packets become available.

A general flag can be simulated using a binary flag to manage access to a shared counter. Similarly, a binary flag can be simulated using a general flag with a count of one. What then, are the advantages and disadvantages of each?.

Binary flags are simpler to use since only two routines need be called and fewer instructions are required. However, if there is no contention for a resource, a resource control block will be created and deleted each time the resource is accessed. This takes time and also means that a process could be denied the resource, not because it is not available but rather because the resource control block cannot be allocated for lack of memory.

With general flags, the creation and deletion resource control blocks is explicit. It is possible to create a resource control block once, then access the resource several times before deleting the resource control block. However, using general flags requires more instructions since four separate routines need be called.

In summary, if a process accesses a particular resource infrequently, a binary flag is appropriate and should be used. If the resource is accessed often, it may be better to use a general flat (with a count of one) so that the resource control block is created and deleted only once for all accesses H. List Processing Many applications utilize lists as a means of maintaining order in a group of structurally related data elements. Performing operations on these lists is commonly referred to as list processing The maintenance of any list, regardless of structure, requires that certain common functions be performed (for example, the addition or deletion of an element). REX supports these functions for user lists maintained in data memory A variety of list structures is also supported by REX. A list has a corresponding list control block and may be either a stack or queue, single linked (forward step pointer) or double-linked (forward step pointer and backward step pointer) All lists supported by REX are linear.

The list control block for a single linked stack has three words defining a list type code (C7-C$ =1,0, 0,0), a top pointer and a forward step pointer A double-linked tack control block includes list type code (C7-C4 _1,0,0,1), a top pointer, a forward step and a back-pointer. The single linked queue control block ward step pointer, has a list type code (C7-C4-1,1,0,0), a head a tail pointer and a forward step pointer The double-linked queue control block includes a list type code (C7-C4=1,1,0,1), a head pointer, a tail pointer, a forward step pointer, and a backward step pointer and thus requires five words of storage.

Elements of a resident list in data memory are represented in one of two formats: "standard" or "primitive". The standard format is intended to meet most demands; however, when space considerations are foremost, the overhead required by this format may prohibit its use. In this case, it may be necessary to use the primitive format, though this requires that some capabilities be sacrificed.

The standard format provides broad flexibility in the handling of lists. It also permits multi-threading of list elements to any predetermined level and movement of list elements from list to list without regard to differences in individual list structure. Each list element represented in this format consists of a control and data section.

The control section is made up of a single two-word control header, followed by one or more four-word control segments. One control segment is required for each list on which the element is to appear at any one time. For example, a triple threaded list element would require a 14-word control section, that is, a two-word control header followed by three 4-word control segments.

The data section can be contiguous with or separated from the control section, or may be omitted entirely. Access to the data section is made via a pointer (first word) in the control header.

The second word of the header includes a first field defining the list length and a second field defining the number of segments in the control section. The four words of each segment include a pointer to the first word of the header, a link control block (LCB) pointer, a forward link pointer and a backward link pointer.

The primitive format is used where list element lengths must be kept to a minimum. It provides a compact means of representing single-threaded list elements, that is, those which appear on only one list at a time.

Each list element in this format consists of a two- or three-word control segment equivalent to the first two (or three) words of a control segment in a standard element. These words define a link control block (LCB) pointer, forward link pointer and optional backward link pointer. The data section of a primitive link element (if one exists) is known only to the user, not to the list processing routines themselves and follows immediately the two- or three-word control section.

I. Inter-Processor Communications

A packet is the unit of information transferred between processors on the main buses of the system 100. It consists of 16 words, the first of which is a header used by an executive services processor 916, 918 to route the packet to the proper receiving processor. The packet is presented to the main bus via a processor's outstack and received from the bus into a processor's instack. The placement of packets into an outstack and removal from an instack are controlled by REX.

Within the system 100 a process is uniquely identified by a 20-bit process ID (PID) consisting of three components: a bus ID (BID) assigned when the processor enters the system on power-up; a context ID (CXID) related to the scratchpad context used by the process; and a subprocess ID 9SPID) with a zero value if the process is the context's main process. Component processes of a compound process have subprocess IDs of non-zero value. Since all processes within a given processor have the same bus ID, the context ID and subprocess ID are sufficient to identify which process within a processor a packet is address, and together form an internal process ID (IPID).

There are two basic packet types defined: process packets and immediate packets. Packets with a context ID other than zero are routed to an existing process in the receiving processor. These are referred to as process packets because they establish communication and control activity between processes in the system. The format of a process packet allows REX to accept packets on behalf of the receiving process to carry out standard sequences of control and data interchange for that process. The format is given in the interface specification of a process, which defines what packets can be meaningfully sent to a process, and what packets a process will send during its lifetime.

Immediate packets are distinguished by a context ID of zero. This indicates that they are not addressed to a specific process, but are either related to an ongoing data interchange managed by REX or to system and maintenance activities. Such packets are handled immediately at the interrupt level by REX, EXREX, or specially-defined handlers. There are several types of immediate packet, each of which has its own format and is handled differently. The function code in the packet distinguishes one type from another and determines which handler is invoked to process the packet.

The most universally used immediate packet is the immediate data packet. It is used by REX to effect all data transfers in the system in response to input/output requests. Immediate data packets are created by the outstack handler and processed as input by the appropriate receiving handler.

Force-load memory packets facilitate various system development and debugging activities by permitting memory to be loaded directly with the contents of the force-loaded packet.

JSAM bus test packets instruct REX to perform various tests related to the specified ports. These packets contain a list of headers so that as long as the tests are successful, they can be daisy-chained to each processor in the list. JSAM is notified of any bus-port test failures.

Maintenance packets are used to communicate with diagnostic programs in unusual situations. The contents of these packets are defined by their users.

Several of the function codes direct to context zero are reserved for use by EXREX. This allows handlers, unique to a normal extension board (NEB), to be invoked so that special functions can be performed for the extension board at the interrupt level.

The data area of the CPEXECUTE packet contains processor program code which is loaded into REX's own program area. After inserting a program jump back to REX at the end of the code, REX executes the "program" sent in the CPEXECUTE packet. This packet is used in systems development and troubleshooting environments.

When an incoming packet has been transferred to a processor's instack (X or Y) by an executive services processor, an X-instack-full or Y-instack-full interrupt occurs in the receiving processor and control is transferred to the instack handler. The instack handler reads the packet header to determine whether it is an immediate or process packet. If it is an immediate packet, control is transferred to the appropriate immediate packet handler. Otherwise, the instack handler will find and/or create all control blocks needed for the process packet to be passed to the destination process.

Output from a processor is placed on the main bus (X or Y) via one of two 16-word hardware outstacks. The outstack handler controls the placement of data into these stacks and sets flags to enable the executive services processor 916, 918 controlling the bus to actually effect the transfer of the packet to the destination processor. REX supports two methods of output: direct and nondirect. The direct method is used to transfer exactly one packet of data, which does not require sequence control transfer structures. However, there may be an associated event control block if the output operation is to be timed, or if the user is to be notified when the data leaves the outstack. The nondirect method is used to transfer data areas that require more than one packet. This requires a transfer control block (XCB), which is a data structure used by REX to control the sequencing of multiple packets between the sending and receiving processors. Nondirect transfer also provides additional capabilities in the form of header and buffer lists. The user calls REX routines for both methods, which enqueque the request on the bus output queue.

Duplicate copies of the same data area can be transferred to two different processes with the use of a header list. The header list contains two headers, one for each of the processes to which the data is to be sent.

Several noncontiguous data area can be transferred in a single operation with the use of a buffer list. The buffer list contains the address and length of each area to be transferred.

When an output operation fails due to a port reject, REX automatically tests the port and retries the operation on the other port. If that port is closed, it retries the same port again. Retry is possible since REX retains a copy of the data placed in each outstack in a separate "shadow" packet in scratchpad. To test the port, REX sends a self-addressed port test packet through the port, permitting REX to differentiate between problems with the intended recipient process or difficulties elsewhere on the bus. If the problems are located elsewhere, REX closes that port and notifies JSAM through the remaining port.

J. REX Processes

Along with providing a large number of callable subroutine functions to a user-process, the resident executive subsystem implements a set of processes used by REX itself to fulfill its own operations. Each processor contains the program code used by REX's processes in read-only memory and on power-up initialization, two processes are immediately created in every processor:

REXMAIN: The main REX process primarily responsible for the creation and deletion of all other processes in the same processor. It also performs program loads and manages interprocessor communications.

REXIDLE: A permanent subprocess used to absorb and report all unused machine time in a processor.

REXMAIN creates additional temporary subprocesses from time to time, but these are deleted as soon as their assigned functions have been completed. For example, in order for REXMAIN to create a process, the required program must first be loaded into memory. This is a relatively time-consuming operation. Therefore, whenever a program load is required, REXMAIN creates a temporary subprocess that is used to load the program, create the process, and send a response packet back to the requester.

REXIDLE, REXMAIN's only permanent subprocess, absorbs all otherwise unused instruction cycles in a processor. A count is kept of the number of unused idle cycles in a processor. This is reported to JSAM as a measure of the level of activity in the processor.

REX's main process REXMAIN operates out of context number 1 of each processor. As its subprocess ID is 0 (for example, it is the context's main process), then the PID of REX to which requests are sent to a given processor is:

Bus ID=LBID of processor (allocated dynamically by JSAM)
Context ID=1
Subprocessor ID=0

The main packet requests sent to REX are for the creation and deletion of processes within the host processor of the receiving REX.

REAL TIME SUBSYSTEM

A. Functional Description

The real-time subsystem 230 as shown in FIG. 4 is an integrated set of hardware and software components, tailored to provide fast circuit switching and real-time processing functions. The real-time subsystem 230 can interface to a large number of synchronous data channels, each one capable of carrying a continuous, non-interruptable real-time signal. For example, in voice applications, these channels would connect to the separate telephone room subsystem 206 to transmit PCM voice signals to and from the system 100.

The integral executive software of the real-time subsystem provides a high-level user interface to the three classes of real-time functions:

(1) Switching, to make or break the flow of data from a source channel to one or more destination channels.

(2) Processing real-time data that flows between the system 100 and one or more external channels.

(3) Effecting the transfer of channel supervisory and control messages between the system 100 and the synchronous data channels which, in voice applications, would be the telephone room subsystem channels 232, 233.

These functions can be controlled by any process owning the channels involved, generally a Level 3 application process running in an ideal machine.

For voice applications, the channels between the telephone room subsystem 206 and the real-time subsystem 230 are duplex paths with a nominal data rate of 64 Kbps in each direction, enough for each path to carry a two-way digitized voice connection. The single real-time subsystem 230 has the capacity to attach up to 1260 physical channels, and each system 100 is able to support up to four interconnected real-time subsystems. The allocation and use of real-time channels is managed in a fashion similar to that of any other type of data channel connected to the system (for example, printers and terminals). Each channel has a unique identity and before an application can effect a switching or processing function, the channel must be acquired from the system device manager (SYSDEV) by the application in the normal way.

To reduce the number of physical connections in voice applications that need to be made between the telephone room subsystem 206 and the real-time subsystem 230, groups of 30 real-time 64 Kbps channels are multiplexed onto single, full-duplex 2.048 Mbps synchronous data linkes 232, 233. These high-speed links form the actual interface to the real-time subsystem 230, and an external equipment subsystem such as the telephone room subsystem 206 performs the multiplexing and demultiplexing of individual 64 Kbps channels onto the links. In voice applications, this subsystem 206 also performs the analogue-to-digital and digital-to-analogue conversion of channel information. Multiplexed into each high-speed link is a duplex 64 Kbps control channel used to communicate with the system 206 equipment and, in the case of the telephone room subsystem 206, control the line group controllers 302, 306 that route each channel onto the synchronous link to the real-time subsystem 230. It also controls the line interface boards 310-318 onto which each analogue speech path terminates.

Switching functions allow external real-time channels, attached to the real-time subsystem 230 (via the external subsystem), to be interconnected. The real-time subsystem 230 provides a "logically continuous" circuit link between groups of channels, but uses electronic time division multiplexing (TDM) to actually perform the switching rather than mechanical switches. Additionally, the real-time subsystem 230 provides 508 switched simplex links which, once set up, require no intervention or action by the system 100. The switching function is fully programmable by executive processors in the real-time subsystem 230, which provide the following advanced switching functions:

(1) Dynamic allocation of bandwidth through the switch channels with higher or lower individual data rates than the nominal 64 Kbps. This is referred to as a super- and sub-commutation. A higher data rate per channel is achieved at the expense of fewer switch paths through the real-time subsystem 230.

(2) Many-to-one channel switching, used in voice applications for conferencing a number of callers.

(3) One-to-many channel switching, used in voice applications for broadcasting messages, conferencing, and recording.

A real-time subsystem 230 is configured with its own processing resources within which real-time signal processing functions are located. Data from real-time channels attached can be input to transient processes hosted by the real-time subsystem 230. Alternatively, a process running in the real-time subsystem 230 can generate real-time data which can be output to a real-time subsystem 230 outgoing channel.

Examples of transient signal processing in voice applications are voice record and playback. These functions permit record and replay channels to be logically connected to the file services subsystem 908 to record or playback real-time voice data using random access disks as the storage media.

Before recording, the real-time data is available for processing activities such as compression or filtering. Subsequently, the recorded data is retrieved, reprocessed as necessary, and returned to an outgoing real-time channel one or more times. These facilities are used in applications such as voice and image store and forward, image processing, message libraries, etc. During recording, a compression factor of better than two to one can be achieved, depending on the nature of the data processed.

Record and playback compression are specific examples of real-time signal processing activities performed by transient software processes hosted by the real-time subsystem 230. The real-time processors 410, 412 can be user-programmed to perform other processing functions on real-time channel data. A single real-time processor 410, 412 can sink up to 16 channels into data memory for processing; simultaneously, another 16 independent outgoing channels can be sourced by the same real-time processor 410, 412. Typical applications include spectral analysis, filtering, and pattern recognition. The real-time processors 410, 412 are fully integrated members of the system 100 family of processors, and can host process nodes of systemwide distributed jobs. In a user-defined transient process a real-time processor 410, 412 can be initiated and controlled by a high-level Pascal primary node in a general purpose processor. In a time-critical application, a job's primary node could reside in a real-time processor 410, 412 itself.

B Switching

Channels attached to the real-time subsystem 230 need to be interswitched in many applications, as are those related to voice communications. Automatic call distribution, telephone answering, and voice messaging are all examples of applications which use the real-time subsystem 230 for their switching capabilities. These applications, realized as Pascal-sourced Level 3 job supervisor processes, communicate with the real-time subsystem 230 via an uncomplicated procedural interface within the application program process.

Tne protocol can be divided into three stages: acquisition, control and release. In stage one, the real-time channes to be switched or controlled must first be acquired by the application process. The channel acquire request is sent to the system device manager (SYSDEV), which grants ac-ess to the channel if it is currently unowned, and at the same time informs the executive software in the real-time subsystem 230, of the job identity of the channel's new owner. In this way, the real-time subsystem 230 can restrict the use of the channel to the owning application. Precisely which channel an application acquires depends upon the application and for what particular reason it is needed. For example, in the telephone answering support service (TASS), a job is initiated by an unanswered telephone with TASS being passed as a start-up parameter. TASS then acquires the specific channel by quoting its physical channel ID (in practice, its normal seven-digit telephone number). However, if TASS later needs to dial out to a central office, any one of the free trunks connection the system 100 to the central office will suffice. After receiving an acquire request from TASS, SYSDEV will assign one of the free trunks to TASS and pass the job identity of that specific TASS (at any given time, multiple different TASS jobs can be in execution) to a real-time processor 410, 412. In the case where an application acquires a composite multi-channel device such as an operator station 224, 226 (a keyboard/VDU together with a voice headset), SYDEV will pass back to the application both channel identifications related to the one device: the channel ID or the data line connecting the keyboard/VDU to the interactive services subsystem 252, and the channel ID of the voice line connecting the operator headset to the real-time subsystem 230. This second channel ID is used later in switching commands to connect the operator's headset to other voice channels.

The second stage of the real-time subsystem/user protocol, once all of the channels needed by the application have been acquired, is the control phase. Control functions are divided into two classes: (1) Switching commands that set up interconnects among owned channels and (2) Supervisory commands that cause various signals or state conditions to be generated on the channels.

If stage three, after completing whatever functions the application requires, the channels are returned to the general pool of unowned devices via a release request to SYSDEV.

Stitching commands given to the real-time subsystem 230 either set up or tear down a network of interconnected channels.

In setting up an interconnected channel network, the application can include up to seven owned channels in a single command. The parameters accompanying the command specify how each channel is to be connected to each other, and contain sufficient detail to allow any combination of interconnections to take place between the seven duplex channels permitted in the command.

A desired network interconnection, if it is to be constructed via a single command, can be represented as a 7 by 7 matrix. If each matrix element represents one network interconnect, then the elements row depicts the channel from which the data comes and the elements column depicts the channel to which the data goes. For example, to set up a three-way conference call between two callers on channels 3 and 5 and an operator on channel 2, the following array would be generated by the application program:

CH0: 0 0 0 0 0 0 0
CH1: 0 0 0 0 0 0 0
CH2: 0 0 0 C 0 C 0
CH3: 0 0 C 0 0 C 0
CH4: 0 0 0 0 0 0 0
CH5: 0 0 C C 0 0 0
CH6: 0 0 0 0 0 0 0 where 0 implies no connection and C implies a connection.

Having specified the desired network, the user supplies a reference number by which this network can be identified in the future (the Circuit Net ID). The real-time subsystem circuits function implements the connections and wnen successful, acknowledges back to the application The real-time subsystem 230 rejects a circuits command if an unowned or non-existent channel is specified.

A second switching command from the application is used to disconnect, or tear down a previously set up interconnect. In this case, the application has only to pass the Circuit Net ID with the disconnect command. The real-time subsystem 230 then disconnects each connection specified in the original circuits command referenced by the Circuit Net ID. If a specific interconnection is to be modified as would occur when the operator drops out to leave a simple two-way conversation in the previous three-way Opepator/Client/Client example, the application would first tear down this entire network and then interconnect the two clients with a new circuits command. Such tear down and reconnect would be totally transparent to the clients.

An application can interact with the content and status of a real-time channel in one of two ways:

(1) The real-time subsystem 230 can be used to produce signals which can be applied to a channel. In voice applications, this is used to generate tones or tone sequences such as reorder, recording-in-progress, and dual tone multi-frequence (DTMF) digit sequences.

(2) The application can interact directly with the multiplexing and interfacing hardware outboard of the real-time subsystem 230. In applications requiring the telephone room subsystem, the state of each voice line can be individually controlled and the line status requested.

For voice applications, interface to these supervisory commands is again via simple procedures. Three main Pascal program calls exist for these applications:

(1) Signal Generator with parameters Channel ID frequency amplitude and duration.

(2) Dialer with parameters Channel ID, digits to be dialed, DTMF or dial-pluse select.

(3) Supervisory with parameters Channel ID command (0..63), command argument (0..63).

The signal generator command produces an audio tone on the identified channel with an amplitude specified by the user and an integral frequency between 1 and 3200 Hertz. The dialer function generates a train of digits on a channel, encoded either as 50 ms DTMF tones or as make-break dial pulses. The supervisory command allows an opcode and related argument to be passed to the interface controller of any individual line termination in a telephone room subsystem 206. Typical opcodes generate off-hook condition on lines, request line status, seize ringing lines. etc.

C. Real-Time Processing

The telephone answering support system and voice messaging system are examples of applications which process and transfer data between real-time subsystem channels and disk datasets. Since one significant use of the system 100 is for such applications, a detailed overview of its operations follows. Two transient signal processing functions are invoked as necessary to satisfy the requirements for record and playback; both are hosted by the real-time processors 410, 412 of the real-time subsystem 206. Among the system 100 processors, real-time processors have the unique attribute of being in direct contact witn the channel switching hardware of the real-time subsystem 230, 238. This enables the record and playback functions to interact directly with data on the real-time subsystem channels. Furthermore, specific hardware extensions in the real-time processors 410, 412 greatly increase the efficiency of the speech compression/decompression algorithms used by record and playback to reduce the disk storage requirements.

The record and playback functions are implemented as Level 1 transient processes. When an application program wishes to use either of the functions, it sends a create node request to job scheduling, allocation monitor (JSAM), specifying the function ID of either record or playback. JSAM initiates a process that performs the function in an available real-time processor 410, 412 within the subsystem. The application then communicates control requests directly to the function process.

The first stage of a record/playback operation is similar to that of a switching operation. The application sets up a channel interconnect network, as in a circuits command. However, of the seven channels that can normally be specified in a switching command, only two relate to internal real-time subsystem channels carrying real-time data into or out of the record/replay function In this way, a single command from the application can both set up a channel network and then either record from it or replay to it, with up to five external real-time subsystem channels involved in the operation For example, the network could be used by an operator during an in-call to record a message in the telephone answering support service application.

In the array, the vertical dimension defines the source of data and the horizontal dimension defines the destination. As an example, channel 1 is assigned to the operator, channel 3 to the client, channel 5 to the operator recording process and channel 6 to the client recording process. The record network map array would be defined as:

CH0: 0 0 0 0 0 0 0
CH1: 0 0 0 C 0 C 0
CH2: 0 0 0 0 0 0 0
CH3: 0 C 0 0 0 0 C
CH4: 0 0 0 0 0 0 0
CH5: 0 0 0 0 0 0 0
CH6: 0 0 0 0 0 0 0

This array would be constructed by the application and passed as a parameter in a Pascal procedure call after both channels specified had been acquired, and the record/playback processes had been started. Recorded information may be stored in either compressed or uncompressed format. The format chosen is stored along with the data so that playback can expand the data if required.

Once the setup commands specifying the record replay networks have been given, the record/replay functions are controlled by the application process in a manner similar to that of a simple tape recorder. Each process can be in one of five distinct states:
(1) Initialized (for example, functions active).
(2) Ready to be activated (for example, network setup).
(3) Recording of playing back.
(4) Pausing.
(5) Terminating record or playback.

The following control commands can be sent to the record of playback processes by the user:

(1) Start Recording/Playback—Includes information which allows access to the dataset that will sink or source the data. Indexed chain datasets are used and can be either singular for efficiency or duplicated for security.

(2) Pause Record/Playback—Ceases recording or replaying temporarily and inserts a mark in the file. (This can be used later in playback to skip back to the marked location.)

(3) Restart Recording/Playback—Restarts either at the current pause mark or at an alternative mark supplied by the user in the restart command.

(4) Mark Recording/Playback—Without halting the process, a mark is inserted into the dataset at the current position.

(5) Stop Record/Playback—Ceases recording or replaying and returns to ready state.

(6) Terminate Record/Playback—By reference to a Circuit Net ID, recording or replaying cease, all data paths are closed, and the existence of the record or playback process is terminated.

(7) Record/Playback State/Status Response—Sent to the user by Record or Playback when the process enters a new state, or when a request could not be implemented (This could be unsolicited if an end-of-message occurs during playback.)

During recording, compression can take place to reduce tne amount of disk storage required. Compression of data is achieved in two ways: (1) each PCM value representing a voice (or possibly image) sample is difference encoded (assisted by a hardware look-up table in the real-time processor 410, 412) to give an initial 1.5:1 reduction or (2) a run-length encoding process (which removes silent parts of voice data) can further increase this initial compression ratio.

The real-time processors 410, 412 of the real-time subsystem 230 can be used to host any software functions interacting directly with data on real-time channels. The real-time processors 410, 412 are located between the executive services bus 912, 914 and the real-time subsystem inernal synchronous S and T TDM buses 414, 416. This enables them to communicate with any other processor while being able to sink and simultaneously source up to 16 channels from the real-time processor's data memory.

As a guide to the processing capacity provided by a real-time processor 410, 412, up to eight record and 16 playback functions can be concurrently hosted by a single real-time processor 410, 412. The number of real-time processors in a real-time subsystem 230 is limited only by the upper limit of processors in the system 100, and thus can never exceed 22.

Real-time processors are standard processor module-assembler programmed, and generally host Level 1 transient processes used to provide signal processing services to Level 3 Pascal applications in a general purpose processor 942, 944. However, a time-critical Level 3 application could have its primary node hosted in a real-time processor 410, 412 if necessary.

D. External Interface To The Real-Time Subsystem

Logically, each real-time channel interfacing to the real-time subsystem 230 has a unique identity, and is treated by the system as if it were physically terminated at the real-time subsystem 230. In practice, however, the number of physical connections between the telephone room subsystem 206 and the real-time subsystem 230 is minimized by multiplexing groups of 30 channels onto full-duplex, high-speed synchronous links 232–235.

TDM is used on each of the two links connected to a real-time processor 410, 412. Each link provides 8000 frames per second with each frame 125 microseconds in duration. The 125 microsecond frame is further subdivided into 32 time slots with each slot able to sink an 8-bit data sample. At the incoming switching point of the system 100, each digitized voice channel deposits a voice data sample of eight bits into a specific, assigned time slot in a frame which remains its own unique slot in each frame until voice sampling ends. Thirty time slots in each frame carry voice data while the remaining two time slots in each frame are used for control and synchronization data. The control slot allows control data to pass up and down the link between the real-time subsystem 230 and the outboard multiplexing equipment, which interfaces the physical channels onto the high-speed link. The control slot carries down the link the individual control message generated as a result of supervisory commands given by an application process. Tne reverse direction carries status and result data back to the system 100. The synchronization channel is used to keep the multiplexors and interface boards in step with the switching hardware of the real-time subsystem 230

The time allocation on the high-speed synchronous link conforms to CCITT recommencations for 2.048 Mbps PCM links carrying 64 Kbps encoded voice. However, in the real-time subsystem-telephone room subsystem connection, a unique control protocol exists that is specific to the various line interface boards and line group controllers of the telephone room subsystem 206, and does not conform to that of the CCITT recommendations since this also encompasses the commands that are sent over the control slot. The differences between the two protocols are such as to be easily handled by logic on an interface board were it ever desired to directly connect a CCITT 2.048 Mbps link to a real-time system. Of the 32 channels in a link, channel 1 carries synchronization data, channel 17 carries control data and the rest carry voice data.

The telephone room subsystem 206 (See FIG. 3) is outboard of the real-time subsystem 230 attached via the high speed serial links 232, 233 and provides a direct interface to individual analog telephone lines, trunks, and other voice-grade circuits. The telephone room subsystem 206, as it relates to the real-time subsystem 230, consists of the following:

(1) A variety of line interface boards 310–318, each interfacing two physical voice-grade circuits of the same type. The line interface boards provide analog-to-digital and digital-to-analog conversion (via mu- or A-law codes), together with generation and detection of supervisory signals such as dial-tones, dial-pulses, on-hook off-hook condition detect, etc.

(2) Two line group controllers 302, 306 are associated with each physical card cage capable of housing 15 line interface boards 302–318. The 15 line interface boards provide 30 individual, full-duplex real-time channels, multiplexed by one of the line group controllers 302, 306 onto a single, 2.048 Mbps serial link connected to the real-time subsystem 230. Each line group controller 302, 306 is microprocessor-controlled (Intel 8085) and receives control and supervisory data over the control channel slot from the real-time subsystem 230. Each line group controller 302, 306 also collects status information from the line interface board 310–318 and sends it to the real-time subsystem 230 via the control slot on the up-link. Selection of one of the two line group controllers 302, 306 as controller is under software control via the real-time subsystem 230

Each of the different types of line interface boards is tailored to the operational characteristics of a particular class of telephone line, trunk, or voice-grade circuit. All, however, have a basic set of features:

(1) Termination of two voice-grade circuits of a type unique to a line interface board.

(2) PCM encoding and decoding for each line.

(3) Dual port access to two different line group controllers.

Tne PCM encoding/decoding function is performed by Codecs (Coders/Decoders) on the line interface board. A Codec performs an eight-bit, non-linear analog-to-digital and digital-to-analog conversion. This non-linear (quai-logarithmic) conversion is used since it is more sensitve to the lower end of the voice intensity spectrum where the major part of speech information is found. The difference between the transfer characteristics of mu-law used in America and the A-law used in Europe is slight and easily converted from one to the other.

The quasi-logarithmic Codec output of one 8-bit floating point number for each voice sample occurs each 125 microseconds as a direct consequence of the sampling rate, which is 8000 samples per second per voice channel. This floating point format of each PCM sample permits a much greater sound intensity range to be encompassed than would be possible with a strictly linear (for example, integer) representation.

Four classes of line interface board are necessary for most telephone applications. An operator line interface board 310 provides two simple four-wire links to operator station headsets with no DTMF, supervisory or control signaling. A concentrator line interface board 312 terminates two "dry" (no line voltage) two-wire links from remote line concentrators with no supervisory or control signaling other than DTMF. A direct inward dialing line interface board 314 terminates two 2-wire DII trunks, handles all DTMF signals and detects supervisory and control signals and incoming dialed digits. A loop-start/ground-start line interface board 316 terminates two pay station telephone number conventional lines, can accept incoming calls, can seize a line to dial outgoing calls, and can handle all DTMF, supervisory and control signals.

The dual-ported line interface boards 310–318 connect to the pair of eight-bit data highways 304, 308, each attached to a separate line group controller 302, 306. Either line group controller of a pair 302, 306 can multiplex up to four operator line interface boards 310, and up to 11 line interface boards 312–318 of any other type onto a high-speed full-duplex synchronous link interconnecting the line group controller 302, 306 to the real-time subsystem 230. The line group controllers 302, 306 sequentially poll each line interface board 310–318 for channel data and status conditions and pass to each line interface board PCM data for output, and any commands to set line conditions or requests for status. If a line interface board fails the two telephone lines attached lose services. Line group controllers and line interface boards are redundantly connected so that any voice channel can be routed into the real-time subsystem 230 via two independent paths. The executive control processes in the real-time subsystem 230 affect a switch to the other line group controller/synchronous link of a pair if the active link or line group controller is detected as failed. In brief, of the two dual-ported line group controllers 302, 306 per 15 line interface boards 310–318, one is the active controller and the other is a hot stand-by.

A telephone room subsystem 206 consists of from one to seven racks, each containing from one to six card cages and redundant power supplies. Each card cage holds two line group controllers, up to four operator line interface boards, and up to 11 other line interface boards. Altogether, a telephone room subsystem 206 can accommodate up to 1260 voice-grade circuit terminations. The system 100 can support four separate real-time subsystems, each with its own telephone room subsystem permitting a total of 5,040 voice-grade circuit terminations.

E. Hardware Architecture

FIG. 4 is a representation of the real-time subsystem 230 architecture, whose main components consist of the following:

(1) Two high-speed TDM real-time buses 414, 416, each of which is a 16-bit parallel synchronous link used for the interchange of PCM or other data between ports on the link. The two buses are asynchronous relative to eacn other.

(2) Two real-time executives 406, 408 with each in control of the switching and routing hardware of one of the two TDM buses 414, 416. The executives 406, 408 host system software processes which provide a simple, logical interface to the rest of the system 100, including application processes.

(3) External transfer switches 402, 404, interface serial PCM or other data links to the TDM bus pair. The external transfer switches 402, 404 and TDM buses 414, 6 are used to exchange data between real-time data channels, which in voice applications are the telephone room subsystem channels and the real-time processors 410, 412 in the system 100.

(4) Up to 22 real-time processors 410, 412 interface with both TDM buses 414, 416 and serve as hosts to dynamically allocated software transient processes, thus providing a capability for a variety of data signal processing and, in voice applications, voice data compression and decompression.

The real-time subsystem 230 is fault tolerant and can survive single failures of either its executive processors buses, or any switch on any real-time processor 410, 412. In the event of failure, channels are rerouted via alternative resources. The real-time subsystem 230 uses load-shared redundant capacity.

Internal to each real-time subsystem 230 is an independent bus-pair 414, 416 denoted S and T. Each bus is functionally identical and backs up the other so that if one fails. the real-time subsystem 230 can still operate normally using the survivor. The function of the buses is to exchange real-time data among external transfer switches 402, 404, real-time processors 410, 412, and real-time executives 406, 408.

Each TDM bus 414, 416 is 16 bits wide and of the 512 time slots per 125 microsecond frame available, four slots (0, 1, 2, and 3) are preassigned by the system to exchange control information between the various devices that are attached to the bus. This leaves 508 usable slots for real-time data channels. Each time slot provides a 0.244 usec period during which PCM or other data samples can be put on a bus from one source and read from the bus by any number of destinations. Each time slot occurs once per frame, and frames recur at 125 microsecond intervals. Thus each slot permits 8000 PCM samples (or other data) to be transferred per second.

For voice applications, an 8-bit PCM speech sample occupies one time slot and one slot in the frame is assigned for each speaker when a pair of channels are interconnected. This means a real-time subsystem 230 could support as many as 500 simultaneous oonversations, if no slots were required for DTMF or other signals, or for supervisory control.

Associated with the 16 physical data lines of each TDM bus 414, 416 is a parity line, a number of control lines which supply the basic frame and slot reference signals to the devices using the bus, and an ACK/NAK signal line used in the exchange of non-voice data to resignal the detection of parity errors on the bus. If the sender receives a NAK indicating detection of a parity error, that data is sent again in the same slot of the next frame. If a number of retries occur and the parity error continues, the bus is deemed to have failed and all traffic is rerouted onto the surviving bus. Parity is not tested on PCM transfers.

Or the two real-time executives 406, 408 in the real-time subsystem 230, one is designated as primary by virtue of its being the first real-time executive to become operational at system start-up. This prime real-time executixe originates the frame and slot clocks for both the S and T buses. Each bus operates synchronously but relative to each other the S and T buses operate asynchronously. The second real-time executive regenerates the timing clocks synchronously from the primary's clocks. The primary's clocks can be strapped to originate either from a self-contained crystal or from an external "master clock".

Attached to the S and T bus-pair 414, 416 are up to 42 external transfer switches 402, 404 which perform two major functions. (1) They interface and control the duplex 2.048 Mbps serial links connecting the real-time subsystem 210 to the data channels and in voice applications, to tne telephone room subsystem 206. (2) They control the data transmission into and out of the 512 time slots on each TDM 414, 416 bus (S and T buses) from the data channels connected to the input of each external transfer switch 402, 404. In voice applications, there are 64 channels attached to each external transfer switch since each external transfer switch has two serial links, each having a capacity for 30 multiplexed PCM channels and two control and supervisory channels. Data interchange is defined by the contents of the S and T port memories in each external transfer switch 402, 404, with each memory containing 512 port command words. These words control data transfers from data channels into the external transfer switch 402, 404 and in voice applications, from any of the 64 multiplexed PCM channels onto specified time slots of the available 512 on either the S or T bus.

The external transfer switch 402, 404, together with the real-time buses 414, 416, form a totally autonomous switching system. Once the controlling real-time executives 406, 408 have loaded the external transfer switch command memories to reflect a desired channel interconnect, data is transferred through the external transfer switches 402, 404 and along the bus, driven only by the synchronizing bus clock. No intervention or processing by the real-time executives 406, 408 is required to maintain a given interconnect. Any channel interfaced to an external transfer switch via a serial link can be connected to any other connected channel by assigning appropriate time slots, and properly loading corresponding commands to the respective external transfer switch port command memories.

Each external transfer switch 402, 404 is physically identified by a seven-bit S and T bus identifier (STBID), associated with the physical connector into which the external transfer switch 402, 404 is inserted. The STBID is reset by the controlling real-time executive 406, 408 to designate which external transfer switch is being addressed when control data is transferred from a real-time executive to an external transfer switch (during the four-slot bus control period).

Each real-time subsystem 230 contains two real-time executives 406, 408. Each real-time executive 406, 408 interfaces to both the S and T bus 414, 416 and is responsible for managing one of the two. Thus, they are referred to as real-time executive-S 406 and real-time executive-F 408, respectively. Real-time executive S 406 is the processor that activates the various control signals associated with the S-bus 414, and can load the command memories associated with the S-port of each external transfer switch 402, 404. The one exception to the control of the T-bus 416 by real-time executive-T 408 and the S-bus 414 by real-time executive S-406 is in the frame and slot clock signals for both the S and T buses 414, 416, which are under the control of the prime real-time executive (defined as the first real-time executive to become operational at system wake-up). The other real-time executive regenerates the bus clock signals in synchronization with the prime's clock. Similarly, real-time executive-T 408 controls the T-bus 416 and its associate external transfer switch bus ports.

As shown in FIG. 6, a real-time executive 406, 408 includes:

(1) A standard processor module 500, with resident executive and x and y inter-processor executive services buses 912, 914.

(2) A real-time processor extension 604 providing an additional 24K words of program memory 614, 64K words of data memory 616, and a microprogrammed DMA controller 618.

(3) An internal transfer switch 606, similar to an external transfer switch 402 except that instead of interfacing serial lines to the S,T bus, it interfaces the real-time executive's data memory to the S,T bus via 17 logical DMA channels 620.

(4) A jumper clip manually placed on the S or T bus backplane next to the connector into which the internal transfer switch 606 is inserted. This clip distinguishes the real-time executive-S 406 and real-time executive-T 408 from a real-time processor 410, 412.

The real-time processor extension 604 provides 24 words of added program memory 614, 64K words of data memory 616, the DMA channels 620, and also extends the normal instruction repetoire of the standard processor module 500.

The real-time processor extension 604 can generate interrupts to its associated standard processor module 602 when its data memory buffers either fill or empty after data transfer to, or from the real-time slots on the S and T bus 414, 416. This is the general method of communication from the DMA controller 618 in the real-time processor extension 604 to processes in the standard processor module 602.

It is possible to set an interrupt mask register by one of the real-time processor extension special instructions to enable or disable specific interrupts as well as switch on or off certain real-time processor extension facilities. The conditional test instructions, provided in the real-time processor extension set, can be used to decode the specific cause of an interrupt. A First-In, First-Out (FIFO) buffer between the real-time processor extension 604 and the standard processor module 602 allows multiple interrupts to be posted to the standard processor module 602 processor by the real-time processor extension 604.

A real-time processor 410, 412 is physically identical to a real-time executive 406, 408. It provides essentially the same functions, the only differences consisting of the following:

(1) The 17th DMA channel, used in a real-time executive 406, 408 to send control information onto the bus during the first four slot times, is disabled in a real-time processor 410, 412.

(2) The software processes, hosted by the real-time processors 410, 412, are not involved in the management of the real-time subsystem 230. Processes in a real-time processor 410, 412 use the services and facilities of the real-time subsystem 230 in ways comparable to the use of processor facilities by processes in other system 100 processors. The important difference being that the real-time processor 410, 412 can directly and rapidly acquire and generate real-time data by virtue of its physical connection to the real-time bus.

A real-time processor 410, 412 can host predefined transient or user-defined system processes programmed in standard processor module assembler language. A real-time processor 410, 412 process node could be subordinate to a controlling primary job process resident in a general purpose processor 942, 944, or could itself be a job's primary node invoked in a real-time processor 410, 412 for time-critical applications.

F. Software Architecture

Figure 11:
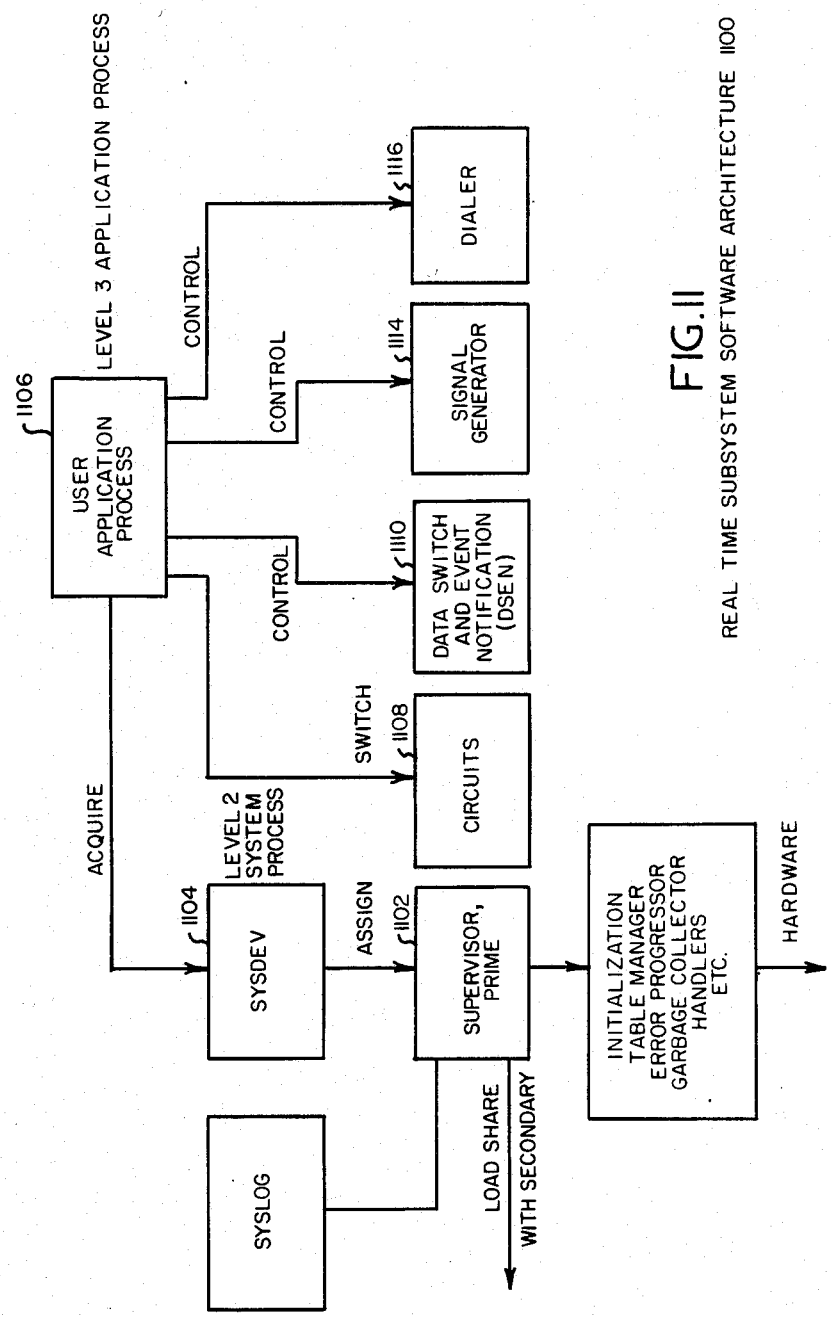
FIG. 11 is a block diagram representation of the software architecture for the real time subsystem shown in FIG. 4.

The real-time subsystem software architecture illustrated in FIG. 11 shows the major software components resident in both primary and secondary real-time executive and their relation to other processes. Within a real-time executive 406, 408, several major functional areas exist.

A prime supervisor process 1102 performs a variety of executive and utility functions including interfacing requests for assignment from the system device manager (SYSDEV) 1104 in response to acquire requests from user application process 1106. When the real-time subsystem 230 powers up, the first real-time executive 406, 408 processor (either S or T) to report itself ready is assigned as primary real-time executive. Assign requests from SYSDEV 1104 are always passed to the prime supervisor first. The prime supervisor then decides which of the two real-time executives 406, 408 should manage this particular assignment and all subsequent requests relating to it (as identified in future requests by the owner's job number which is passed with all requests). This decision is made with an aim to load-share requests between the two real-time executives 406, 408. Having decided which real-time executive is responsible for this job's channels, the information in the assign request is recorded by prime and passed to the secondary real-time executive supervisor. The secondary supervisor also records the data and acknowledges the request back to SYSDEV 1104. Subsequent requests to the other processes in the real-time subsystem 230 are directed to the primary real-time executive first, and then redirected to whichever real-time executive is responsible to the requesting job for its channels.

The user does not communicate directly with the supervisor 1102. This link is managed via SYSDEV 1104 which also sends free requests to the supervisor 1102 when a user wishes to release a channel after it is no longer required.

Switch circuits (circuits) 1108 respond to a user request to create and destroy interconnections among channels owned by the job. Packets, sent to circuits 1108 as a result of switching requests from the channel owner, contain simple interconnect maps describing which data source channels should be connected to selected destination channels. A particular subset of interconnections can be uniquely identified by reference to a circuit network ID, a number supplied by the user 1106 when setting up an interconnection. An interconnection can then be destroyed with a single request referencing that same circuit network ID. A user can specify any number of circuit networks (up to 255) using nonoverlapping channel sets, provid-d that all of the channels are "owned" by the job.

Data switch and event notification (DSEN) 1110 manages information passed along the control channels of the serial links connecting the external transfer switches 402, 404 to the external subsystem, which multiplexes and interfaces individual physical channels to the system 100. Data switch and event notification 1110 provides a simple interface to these control channels. A user wishing to forward control data to an owned channel sends a request to data switch and event notification 1110 identifying the channel, together with the control command code and an associate argument. Data switch and event notification 1110 routes this message along the appropriate serial link control channel to the line group controller 232, 233 which controls the designated channels' interface board.

Unsolicited status messages originating from a channel are collected by data switch and event notification 1110. If the channel is owned by an active process, data switch and event notification 1110 passes the control message to the owner. If the channel is not owned, the message is passed onto the system device log-on process (SYSDLO). SYSDLO then decides if some action should be taken, possibly initiating a job to respond to the message. On a system wide basis, an unsolicited stimulus message from data switch and event notification 1110 is an external event with SYSDLO acting as the unsolicited event halder. The following describes an example of data switch and event notification 1110 operation for a voice message call sequence.

Event 1—A ring is detected. A line group controller 232, 233 detects the line state change via a line interface board signal, and sends a message to data switch and event notification 1110 via Channel 17, the S,T bus, and a DMA data channel into the real-time executive memory.

Event 2—Data switch and event notification 1110 consults the channel assignment tables and determines that this channel is owned by SYSDLO (that is, it is not assigned to an application job). Data switch and event notification 1110 passes a message containing the line ID to SYSDLO.

Event 3—SYSDLO's tables describe what action to initiate if this event, or sequence of events occur on this channel. In this case, it requests JSAM to initiate a voice messaging process to handle the call.

Event 4—JSAM starts a voice messaging process in an ideal machine, passing the ID of the channel as a start-up parameter.

Event 5—Voice messaging "acquires" the channel with a request to SYSDEV 1104.

Event 6—SYSDEV 1104 "assigns" the channel in response to the "acquire".

Event 7—Voice messaging sends a control packet to data switch and event notification 1110 to set ring back on the line.

Event 8—Data switch and event notification 1110 passes the message to the line group controller 232, 233 controlling the line interface board 314, which turns on the ring back generator in the line interface board 314.

Event 9—The phone is answered by the system 100.

A signal generator (SIGGEN) 1114 is a utility function that permits the real-time subsystem 230 to generate a tone, or set of tones and attach the tone to a specific circuit network. A tone may be in the range of 1 to 3200 Hz at integral frequencies, subject to quantization approximations A single request to SIGGEN 1114 can specify the channels to receive the tone frequency, and relative amplitude of the tone together with the tones' duration.

Dialer 1116 is a utility function used with telephone applications. A process that has acquired a channel can request that either DTMF or dial-pulses be generated on that channel provided the channel has the correct type of line interface board to activate the request.

With DTMF dialing, DIALER 1116 uses SIGGEN 1114 to send DTMF tones to the channel being dialed in accordance with CCITT recommencation Q.23 (each digit tone is transmitted for approximately 50 ms, with an inter-digit silence of approximately 50 ms).

To generate dial-pulses, DIALER 1116 uses data switch and event notification 1110 to send dial-pulse control requests along the normal supervisory control channel to the line interface board 314 to which the channel is attached. The line interface board 314 then switches the line condition to implement each pulse.

The record and playback functions in voice applications can send data samples to a disk dataset with delta data compression. This initial data compression can be further enhanced by replacing strings of identical samples (representing silence in voice data) with a run count. Using both compression and run-length encoding, overall data reduction of more than two to one can be achieved for normal speech The compression algorithm uses an error-correcting feedback loop, with hardware look-up tables to speed the loop delay It operates as follows:

(1) The compression technique uses a feedback algorithm to reduce the error between input and the regenerated samples An incoming 8-bit PCM sample has a feedback sample subtracted from it to yield an 8-bit result. The feedback sample represents the reconstructed previous linear PCM sample derived from the output of the compression algorithm.

(2) The 8-bit difference sample is used to address a 256 word five-bit look-up table using the real-time processor extension special COMPRESS instruction This look-up returns a five-bit compressed difference signal.

(3) Three successive compressed difference samples are packed into one word and bit zero is flagged to indicate the format of the word. Such words are blocked and then sent to the dataset.

(4) Each difference sample is expanded back to an 8-bit form by the EXPAND instruction of the real-time processor extension, using another hardware look-up table It is then accumulated with previous reconverted samples to form the normalized feedback sample for the next differencing operation.

Because the feedback algorithm prevents accumulative errors, the compressed PCM output is far more accurate than a simple five-bit sample would suggest.

To reconstruct the original signal, the five-bit samples are expanded and integrated since drift in the difference signal has been eliminated during record. For further reference to this modulation technique, refer to "Delta Modulation Systems", R. Steele, Wiley & Sons, 1975.

Finally, certain markers are placed in the data stream. A data stream marker is a three-word sequence, with a control word indicating a data marker followed by a unique mark ID. This ID can be used by processing routines to perform data processing functions on the dataset. During record, a data stream mark is inserted into the recorded data at one second intervals followed by an End-Of-Message (EOM) marker at the end of the data stream.

KERNEL SYSTEM

The Kernel of the system 100 includes the set of 8 to 32 processors, organized into subsystems of from four to six types, plus the system-level software and data base necessary to integrate the subsystems and provide the user or application programmer with an apparently monolithic, powerful and easy-to-use computer.

A feature of the system 100 is the automatic initial program load (IPL) when a system, or any processor, is started or restarted; another is the ability to dynamically maintain, on-line, the system files required for "SYSGEN". A third, and even more important, feature is the distribution of system functions among the processors to achieve true parallel processing.

A. System Resource and Job Management

Job scheduling, allocation, and management resides in primary form in one executive services processor 916 or 918, and in secondary form in the other. JSAM both actively and passively maintains the status of all processors in the system, the performance of each, and the resources of each currently unassigned and available. If a new processor is reported by interprocessor communications, JSAM uses the system configuration file to sequence the integration of the processor into the system. Upon being integrated, the new processor becomes a set of resources and functional capabilities available for use.

If a processor fails ortraps, JSAM causes the processor to be logically deleted from the system and reconnected under a new identity. JSAM also effects the relocation or recovery of those processes which had been initiated or allocated by JSAM. JSAM receives job request packets from any qualified originator, assigns job numbers, allocates any necessary resources, and either initiates a new process or hands the job request packet over to an appropriate virtual machine operating system.

JSAM responds to requests from any process desiring to set up or subsequently tear down a process-net: a set of one or more processes, initialized to establish any necessary intra-net communication, allocated to the requesting process and controlled much as if the net were a pseudo-device. In addition, JSAM maintains a TICKLER file, used to schedule periodic and deferred job requests on intervals of six minutes to one year, with a resolution of six minutes.

The system 100 is designed to respond to outside stimuli. Stimuli from devices not allocated to some active process (such as the ringing of a previously quiescent telephone line or powerup of an operator station) are sent to SYSDLO for analysis and resolution. SYSDLO uses data from the system device file to determine the action to be taken at this time of day and day of the week, for the specific device. Actions to be taken can include:

(1) Wait for additional stimuli (e.g., rings) before responding.

(2) Log an illogical stimulus and optionally cause the device to be logically turned off.

(3) Actively interact with the device (e.g., initial log on of an operator station) to define the specific nature of the required response.

(4) Determine that no action is required.

(5) Initiate a job request packet to JSAM, with parameters obtained from the SDF record of the device.

SYSDLO is a singular process which may reside anywhere in the system where adequate data memory exists for the required on-line data base.

B. System Files and Device Management

Each system 100 is required to have two disk packs, pre-initialized as system disk packs 930, 932 (SYSDISKs) and mounted on drives attached to two different disk data processors 934, 936. Each SYSDISK includes special transient routines to permit autonomous wakeup of the disk data processor 934, 936 under certain circumstances. In addition, each SYSDISK 930, 932 contains a logical duplicate of the following files:

(1) SYSCAT—The system catalog is maintained by SYSDIR as data sets are created and deleted. SYSCAT includes all disk data sets, the data sets mounted on each magnetic tape unit, and may include unmounted magnetic tape data sets. Attributes of each cataloged data set include: (a) Creation date and creator identity, (b) Access security specification, and (c) Redundancy type and location. The following redundancy type and location information is provided: (a) singular—volume ID (or IDs if more than one volume), (b) duplex—volume IDs, copies one and two (recorded in parallel but not automatically re-duplexed if one volume fails), and (c) duplicate—volume IDs, copies one and two (automatic recreation of second copy if one copy fails and is not recoverable).

File organization options include: (a) record length (maximum if variable), which can be fixed or variable, (b) direct or indexed (number of directories), (c) offset and length, index one, each record, and (d) offset and length, index two, each record.

A name is also associated as an attribute of each dataset.

(2) SCF—The system configuration file is maintained interactively via SYSMON. This file lists the minimal set of hardware and software required for processor, subsystem and system operation. It is used by JSAM to effect the wakeup of processors, subsystems, and the entire system, and to facilitate recovery in the event of a failure. This file initializes SYSMON for the log data to be captured and summarized on-line.

(3) SDF—The system device file is maintained interactively via SYSMON and indirectly by service processes in virtual machine operating systems that permanently "own" devices (such as the telephone answering support system, which permanently "owns" most of the attached telephone lines). For each device, this file includes: device type and subtype or subtype range, virtual machine operating system ownerhip, if any; account ownership, if any; a list of system termination points, by channel type and physical address, in/-out of service, data and time, physical location, extra system identifiers (telephone number, unit serial number, etc.), periodic diagnostics (e.g., line check) parameters, service schedule by time-of-day, day-of-week, and type of stimulus versus type of response.

(4) The kernel program library is maintained by the kernel program librarian, through SYSMON. The library of all programs directly executable from bipolar program memory/writeable control store by any processor in the system. Included for each program is the set of resource and precedent programs necessary for execution. Each program is indexed by name, version and change level.

(5) The TICKLER file is maintained by JSAM. It contains job reqjests scheduled for activation from six minutes to two years in the future. Each request can include parameters to permit automatic rescheduling at intervals of minutes, hours, days, weeks, or months.

SYSDIR exists in a primary and secondary form, one to each disk data processor 934, 936 which hosts a SYSDISK 930, 932. SYSDIR mechanizes the following functions:

(1) CREATE, which allocates space on a requestor-selected or SYSDIR-selected volume, and catalogs the data set.

(2) DELETE, which decatalogs a dataset and restores to available space all space allocated to the dataset.

(3) RECATALOG, which effects a change in the name or other attributes of a dataset catalog descriptor.

(4) OPEN, which establishes the linkage (headers) for communication between the requestor and the disk data processors hosting the dataset.

(5) CLOSE, which terminates the linkage established by the OPEN.

SYSDEV manages the inventory of external devices attached to the system 100 including telephone lines, operator stations, pointers, array processing unit channels, data links, concentrators, and any others. SYSDEV, in conjunction with SYSMON, maintains the system device file. Any synchronous bus processor or interactive services bus processor, upon wakeup, communicates with SYSDEV to obtain the type and identity of all attached devices. In addition, SYSDEV mechanizes the following functions:

(1) CREATE, which effects the posting of an additional device.

(2) DELETE, which effects the posting of the removal of a device.

(3) RECLASSIFY, which changes designated parts of the record of an existing device.

(4) GETDEVICE, which allocates a device by identity or by type and list of subtypes.

(5) RELEASE, which returns to inventory a specifid device, all devices owned by a process, or all devices owned by a job.

C. Utility Software

System Logger (SYSLOG) is initiated and allocated by JSAM to reside in a disk data processor 934, 936. It receives all log packets and validates them for format and generation rate. It posts each log packet to an appropriate FIFO file on disk for subsequent processing. If desired, the disk files may be moved to tape.

Kernel Program Librarian is initiated on demand via a SYSMON file update console. Used to post new, or update old, programs (from levels 0 through 4) in the kernel program library. Sources can be any of various I/O devices or files created by the system assembler running under the program development system.

Disk Utilities are accessible via SYSMON and respond to the commands DUMP, COPY, PACKINIT, and VALIDATE.

Voice Compression and Record is a pseudo-device invoked and acquired by a process (job) desiring to acquire and store a voice message. The program resides in a data processor on the synchronous bus 912, 914. During initiation it sets up to record the message through one or two (selectable) disk data processors 934, 936. The message index and any segmentation marks are supplied by the requestor.

Voice Message Retrieval is a pseudo-device invoked and acquired by a process (job) desiring to retrieve and playback a recorded voice message. During initiation, the requestor supplies the message ID or IDs (if two exist). Datasets are opened as necessary and playback is effected under supervisory control of the requestor.

Voice Response Unit playback is a psuedo-device similar to voice message retrieval, except that the program is given the voice response unit file ID and a string of voice response unit segment IDs which it uses to construct the voice response unit sequence and autonomously terminate.

System Program Loader (SYSLOADER) is invoked only by REX in the target processor, as the result of a request packet. It provides read-only access to the kernel program library, and effects program relocation where required.

D. Virtual Machine

A virtual machine may be created to host the processes of a new job or to provide parallel processes for an existing job. At the time of creation, a nucleus of real memory is allocated. In the virtual machine engines, the following rules are applied:

(1) Instruction memory is partitioned from data and stack memory as a separate space.

(2) Instruction memory is read only after the program has been loaded.

(3) Memory is not swapped or moved to bulk storage except as explicitly requested by the program executing in the virtual machine.

(4) Memory used for stack or data space may be dynamically managed or completely allocated during virtual machine initiation.

(5) Interactive jobs initiated from a terminal (or from an operator station for so long as no telephone line is in use) are always assigned a lower priority than jobs involving a telephonic line.

(6) System-initiated, periodically scheduled jobs not involving a telephone line, and not operating interactively, are assigned an even lower priority.

The resources acquirable by a single virtual machine are subject to the following limitation:

(1) Memory—Each partition (instruction, data, stack) has a 24-bit byte addressing capability, mechanized as an 8-bit segment register (most significant) and a 16-bit address register (least significant). The most significant 12 bits address a page table to access the most significant 11 bits of the sought real memory address. The total memory used by one virtual machine can extend to 8 M bytes; allocation is dynamic.

(2) Devices—Virtual devices are acquired by an application program from virtual machine monitors as required. A virtual machine monitor acquires corresponding real devices from the system as necessary. The maximum number of virtual devices acquired by a virtual machine is determined at the time the program running in the virtual machine is loaded.

(3) Files—Unless special steps are taken upon creation, files are accessible only through the virtual machine operating system under which the files were originally created. Furthermore, the virtual machine operating system can categorically limit, through virtual machine monitor parameters, the space occupied and the number and types of files to be created by a virtual machine.

VIRTUAL SYSTEMS

At the user level, a DELTA system consists of an arbitrary number of virtual machines. Each virtual machine uses a virtual machine operating system to fulfill the operational purpose for which it is created, such as on-line interactive operations, application program execution, etc. A virtual system consists of:

(1) A virtual machine composed of a virtual machine interpreter and a virtual machine monitor.

(2) A virtual machine operating system.

(3) A set of real devices allocated upon request of the virtual machine operating system or by the application program through the virtual machine operating system.

(4) A set of files accessible (in a security sense) to the virtual machine operating system, opened either by virtual machine operating system or by an application program through virtual machine operating system.

Three generic types of virtual system are presently defined, each with its own virtual machine operating system.

System Monitor (SYSMON) is an interactive system via which a variety of specialized monitors can be invoked. The specialized monitors include (1) a maintenance monitor, (2) a system programmer monitor, and (3) an operations monitors, one for each unique VMOS. Within each specialized monitor, SYSMON provides the ability to identify a set of logger events, plus a set of corresponding functions to permit on-line access to system and application performance and status data. Examples might include:

(1) The number of operator stations of certain subtypes presently logged on, and the identities of the operators.

(2) A running summary of reported error conditions.

(3) A printed log of alarm conditions.

The psuedo-machine operations accessible to the SYSMON virtual machine interpreter include privileged instructions not accessible to other virtual machine interpreters. Thus, SYSMON is the only virtual machine operating system able to interact at the level of the writeable control store within the system 100. To preserve access security to the maximum possible extent, activation of a SYSMON virtual system is restricted to a set of physical operator stations so designated in the system device file. In addition a user ID and password validation is required. In addition to the monitor identified above, SYSMON also provides, via a file update mode, the only means for updating the kernel system files.

The Program Development System (PDS) is a software system derived from the Pascal system of the University of California at San Diego (UCSD). Each virtual machine created under the program development system appears to be a single-user data processor with a. terminal, a printer, and a set of files accessible to the user. The user may access any of the following:
  (1) A File Handler.
  (2) Two Editors; one screenoriented and one line-oriented.
  (3) Pascal Compiler.
  (4) BASIC Compiler.
  (5) Linker for the Pascal and BASIC compilers.
  (6) Processor assembler and linker.
  (7) Debug utilities.
  (8) Computational and service utilities.

The user may also invoke any program created under PDS which executes on the PDS virtual machine engine.

Telephone answering support system (TASS) provides the functional framework for the telephone service system communications services centers. Telephone answering support system is a stimulus-response system incorporating a highly-structured, very versatile telephone receptionist interface. Telephone answering support system integrates the circuit switching and signal (i.e., voice) processing to provide for the acquisition and retrieval of voice messages, using digital disks as the storage medium. Telephone answering support system coordinates the assignment of operators to calls, control of the telephone network, maintains the TASS data base, and the acquisition of data for SYSMON supervisory use.

The telephone answering support system data base consists of:
  (1) A set of account-ordered files, including formatted display data, accounting records, and messages and bulletins.
  (2) An operator records file.
  (3) The service schedule and other portion of the records for those devices (lines, trunks, etc.) flagged in the system device file as being updatable via the telephone answering support system.
  (4) The telephone answering support system event log SPOOL.

Services provided under telephone answering support system include:
  (1) Call intercept (Incall) handling, including message acquisition, voice, or typed.
  (2) Retrieval call (Recall) handling, including MFT and voice command control of playback.
  (3) Message dispatch (Outcall), the scheduled or unscheduled (demand) active delivery of a message.
  (4) Field service dispatch.
  (5) Order-taking.
  (6) Classified ad voice response.

INTERACTIVE SERVICES SUBSYSTEM

A. Overview

The interactive services subsystem 252 (FIGS. 2, 7) within the system 100 provides executive services and management of data transfers betwen processes and various attached peripheral devices. The system 100 may contain from one to four interactive services subsystems 252, each processing two interactive buses 704, 708 and two dedicated interactive services executive processors, 702, 706 individually managing a separate bus. Each interactive services subsystem 252 parovides up to 64 device controllers through which a variety of peripheral devices such as terminals, magnetic tapes, pointers, etc. may be attached. (Disks are controlled and managed by the file services subsystem 908). Thus up to 1024 asynchronous full-duplex serial lines can be attached to a single interactive services subsystem 252 and for each a total of 1984 data buffers may be defined. Since each interactive services subsystem 252 has its own complement of processing resources, data buffers, buses, controllers, and handlers, a smooth growth path without bottlenecks is assured with the capacity to support ultra-large configurations.

Each interactive services subsystem 252 controls a separate bus pair to which is attached dual-ported, fully-buffered device controllers. The interactive services executives 702, 706 use an adaptive polling technique and a multiplexed DMA channel controlled by a separate, independent microprocessor. The microprocessor transfers data between memory buffers and devices at a rate determined by the demands of the various devices.

The interactive services executive processors 702, 706 used are members of the standard processor familty, which consists of a 16-bit standard processor module 500 (724) and an interactive processor extension unit 726 that provides data buffering and bus control functions. Each interactive services executive 702, 706 hosts multiple concurrent processes, (each process generally a Level 1 element of the kernel system), provices a device and channel handler functions, and are part of the system software. An interactive services processor 702, 706 can be user-programmed to augment the kernel system when a device, unique to an application, is attached to the interactive services subsystem 252.

However, since interactive services processors 702, 704 are programmed in the low-level SPM assembler, the resulting process coexists with other processes in an unprotected environment and programming the interactive services subsystem 252 becomes a privileged task, requiring an understanding of the standard processor module 500 hardware, resident executive, and all other kernel system protocols.

A Level 3 Pascal-programmed application task uses the services provided by an interactive services subsystem 252 through procedure calls. These procedures are a subset of the virtual machine monitor's intrinsic support functions which handle general input/output to devices and datasets. To an application, a device attached to the interactive services subsystem 252 appears as a channel along which data and control information can be passed. A well-defined protocol dictates the sequence of interactions that can take place between an application and a device and is identical to the protocol used in handling data channels from datasets residing on disk or magnetic tape. Many of the procedures used for data transfer are the same for both device-related and dataset transfers. Magnetic tapes are attached to the interactive services subsystem 252 as peripheral devices, but logically support datasets. Therefore, dataset-related calls from an application, program can be directed to either the file services subsystem 908 or the interactive services subsystem 252 depending on whether the dataset has been opened on disk or magnetic tape.

Access from an application residing in the information processing subsystem 906 to the interactive services subsystem 252 is via Level 2 manager processes which manage (on a system-wide basis) device allocation and usage for single or multiple interactive services subsystems 252. This management function is essential in multi-task environments, where many concurrent and simultaneous applications need to acquire and use a fixed number of peripherals. To acquire a terminal, printer, or line, a request to the system device manager (SYSDEV) must first be made. SYSDEV allocates the device; builds a communications path between the application and the device's handler, and records the details in its internal allocations tables. Similarly, a magnetic tape dataset is opened through the system directory manager (SYSDIR) which acquires a magnetic tape drive, ensures that the correct tape is mounted, and builts a communications path from the application to the magnetic tape handler in the interactive services subsystem 252 or subsequent data transfer operations.

The interactive services subsystem 252 does not generally host any kernel system Level 2 processes. The processing capacity is reserved for the various device-related processes that need the specific environment provided in the interactive services processors 702, 706, namely the unique access to the data buffers and control registers of the physical channel controllers attached to the interactive bus 704, 708.

B. I/O Protocol

Irrespective of the nature of a device, a general communications protocol exists between a using process and a device. This protocol is consistent not only for applications programmed in Pascal and running in the virtual machine environment in the information processing system 906 but also for low-level standard processor module assembler processes using basic resident executive services. The protocol is composed of the following distinct steps that lead up to, implement, and then terminate a data transfer:

(1) Acquire the device for use.
(2) Open a communications path to the handler.
(3) Access the device for read or write.
(4) Transfer data between the user and the device.
(5) Terminate a data transfer operation.
(6) Close the communications path to the device handler.
(7) Release the device back to the system.
(8) Between the acquire and release stages, send and receive control information to the device as appropriate.

These steps do not have to be sequentially performed for each data transfer. Often a device is acquired and opened for the duration of a job's existence and in other instances, only control functions have any logical meaning when related to a particular device. However, all of these cases are contained within the general protocol.

Before being able to talk to a device, the user-process must first own it. An acquire request is routed to SYSDEV either requesting a specific device (identified by its internal system ID), or a type of device if the user is not concerned with which one of several similar devices is assigned. SYSDEV, in turn, selects the appropriate channel manager (of managers if the device has more than one channel), informs it of the ID of the new owner of the device, and passes to the user the process ID of the channel manager(s). Until the owner releases the device, other process may not communicate with it.

BEfore I/O can begin, the user must communicate an open request to the device channel manager. This establishes a path between the user and the device handler to which is sent all subsequent access and transfer requests. The user is passed the ID of a general purpose interface process which receives all I/O requests and passes each to the correspondinding device handler for action.

A write access request is used to specify the type and amount of data for the handler to expect. In return, the user is informed by the nandler the status of the device and the process.ID to be used for data transfer. A buffer is prepared in the interactive services subsystem 252 to receive data from the user.

A read access request instructs the handler to retrieve data from a device for the user by loading a buffer. In response, the handler provides a status report on the read operation, operation complete, error conditions, etc.

A put request follows a write access and initiates data transfer from the user's buffer to the interactive services subsystem 252 butter and eventually to the device itself. The response from the handler provides the header (process ID) to be used during data transfer to the handler.

A get request follows a read access, includes the header (process ID) to be used for data transfer, and intiates transfer by the handler from the buffer (loaded from the device by the read access) to the user.

It is possible to open two devices, prepare one for read and one for write, and then effect transfer of data from one to the other independent of any transfers to, or from the controlling user process. A transfer request can reference any combination of devices and datasets.

This clears a current read, write, get, put, or transfer, and releases buffers for further use. The user returns to the open condition with respect to the device.

The communications path, set up with the open command between the user and the handler, is broken. Any subsequent attempt to access the same handler would be rejected.

When use is no longer required of a device, the user can return it to the system by releasing it back to SYSDEV. It is possible that another job requires the device and has had its request queued awaiting release. In this case, the device will be immediately reassigned to the queued job.

Ownership of a device is via the job number of the owning job, not the process ID of the process that acquired it. This signifies that if a job consists of a network of processes (all with the same job number), then once a device has been acquired by a job, any other process in the same job can also communicate with the device provided it "knows" the appropriate process ID to be used. This is especially useful in allowing backup processes to take over devices when a primary process fails.

The Pascal interface to these steps is via the following matching set of procedures and corresponding functions:

VACQNAME—Acquire from SYSDFV by name (ID), by type, and subtype.
VACQLIST—Acquire from SYSDEV by name (ID), by type, and subtype.
VOPEN—Open communications path.
VREADDEV—Access request.
VREADCRT—Access request.
VWRITEDEV—Access request.
VGET—Data transfer (disk or tape datasets).

VPUT—Data transfer (disk or trape datasets).
VTRANSFER—Data transfer (disk or tape datasets).
VENDIO—Terminate access request.
VCLOSE—Close communications path.
VRLSEDEVICE—Release back to SYSDEV.
VCONTROL—Send control data.

C. Supported Devices

To support a peripheral device on the interactive services subsystem requires two components—a hardware channel controller to physically interface the peripheral's data and control channels to the interactive services subsystem 252, and a device channel handler process in the interactive services subsystem 252 to logically interface the device's channels with the formal I/O protocol described in the previous section. Available controlled include a serial channel controller 254, 255 that allows devices with asynchronous serial duplex RS232 data channels to be attached, and a magnetic tape controller 714 that interfaces the data and control channels of magnetic tape drives. Other channel controllers may be used for synchronous and X.35 channels.

Dumb terminals are simple, byte-at-a-time VDU/keyboard devices used in the system 100 via the interactive services subsystems 252 as program development system terminals. Attachment to the interactive services subsystem 252 is through an asynchronous 9.6Kbps duplex line to a serial channel controller 254. Pressing a previously defined log-on key on an idle dumb terminal results in the initiation of a program development system in a virtual machine which then acquires the terminal to solicit control and interactive communication with the terminal user.

A data message sent to the terminal from an application consists of a variable length string of ASCII control and data bytes, which may write to the screen or perform control functions in the terminal, depending on the individual characters sent. The simplest message is a single character sent to echo a keyboard input. The terminal handler provides an acknowledgement to the user for each message sent to the handler.

Characters from the keyboard are sent individually and directly to the owning process as they are received by the handler. The terminal handler is given the process ID of its owner when acquired and sends each typed character to the owning process in an individual unsolicited notification message. To the user process, the arrival is an unsolicited event which can be waited or checked on. The status of the terminal, as seen by the interactive services subsystem 252 can be verified at any time by the control function available to the user to detect if the terminal is on-line, off-line or suspended by the system operator. To reduce the burden of the application having to echo each character, a local handler level echo option can be chosen.

To send messages to the terminal, standard I/O routines and protocol are used with open, write access, put, end I/O, and close as meaningful for this device. To maintain integrity, the handler times out if gaps in a message string occurs with the timeout value related to the band rate of the serial channel. The read access and get functions have no meaning for this device.

Intelligent terminals 270 are used as consoles for system programmers, system operators, and operator stations. The intelligent terminal is a microprocessor-controlled device which maintains a number of "virtual screens" on the one physical display by partitioning the screen into a number of separately managed areas. Each visible partition is used to provide human interface to a different class of functions allowing for efficient and flexible use of the one device. Non-visible partitions serve as buffers and simplify implementation of categorical lists of operator-selectable functions not actually displayed.

In a telephone answering support system application, this terminal is used as part of a composite device called an operator station 106. This consists of an intelligent terminal 266 augmented with a voice headset 224, separately connected via an audio channel to the real-time subsystem 230.

When the telephone answering support system application attempts to acquire an operator station 106, SYSDEV must jointly allocate the data channel to the terminal and the audio channel to the headset. However, the data channel to the terminal and the voice channel to the headset are independently controlled and operated once they have been acquired and the intelligent terminal, used by the telephone answering support system in the operator station 106, is identical to that used for system consoles in so far as this description is concerned.

Messages sent to an intelligent terminal are similar to those sent ot a dumb terminal, but only to the extent that they concist of a variable length string of bytes. However, intelligent terminal messages have a type-attribute also which is the start-of-message character indicating to the terminal how to interpret the characters that follows. Additionally an end-of-message character is defined, to delineate strings of messages. Messages are used to define message partitions; enable or disable keybaords and function keys; define screen partitions; read, write, and move data in the terminal's buffer; and many other functions.

Messages from the terminal can be either unsolicited resulting from operator keyboard actions, or solicited by a request to read the contents of a partition on the screen. The latter is useful in data-entry environments, where a partition can be set up to contain a data entry form consisting of protected labels and unprotected response fields, with the operator allowed to enter keyboard data directly into the terminal in a local mode. During data-entry to the terminal there is no workload on the system, which can then quickly scan the whole form with a single read access, get I/O sequence. This results from an unsolicited stimulus from the terminal caused by actuation of the send function key.

Before the system permits log-on, the intelligent terminal solicits a personnel ID, password, and function selection code from the user. The log-on information collected is transferred by the handler via an unsolicited notification packet to SYSDLO, which receives all unsolicited inputs from unowned devices. SYSDLO uses the function selection code to effect initiation of a corresponding interactive log-on process. The latter process verifies the identity of the physical terminal, user, and password to assess whether the user will be allowed to proceed or not.

All of the I/O functions can be used with the intelligent terminal with control and timeouts applying as for the dumb terminal.

Printers are connected to the interactive services subsystem 252 via serial asynchronous channels terminating on a serial channel controller 254, 255. The software printer handler in the interactive services subsystem 252 can support any number of printers and in a normal configuration, at least two are attached each to a different serial channel controller 254, 255 for security. The system monitor (SYSMON) acquires printers to produce selective hard-copy of operator interactions and dumps of the system log. To avoid long-term suspension of processes requiring printers when printers have been acquired by SYSMON (and therefore unusable by any other process, even if idel), a print spooler job owns the system printers rather than any individual system or application job. As a result, a user generally sends data to be printed to the publically writeable print spooler dataset, where it is eventually output to a free system printer. In addition, other printers may be attached to the system which are available for general allocation to any job requesting acquisition of a printer for private use. The protocol between a user and printer handler follows the standard sequence outlined earlier, but with read access and get requests being illogical for this particular device.

The printers supported by the interactive services subsystem 252 are the Printronix models 300/600, which have a wide range of advanced print options including variable print spacing, variable line spacing, variable character size, a programmable vertical forms unit and plot mode.

The printer handler manages the attributes of the printer on behalf of the user, who can select the required print characteristics and operational mode using the control functions provided in the I/O protocol.

There are three basic operational modes which the user can adopt when sending output to the printer.

Transpartne Transmission Mode—All characters received by the printer handler are passed to the printer with no code translation or insertion of control codes by the handler. This allows the knowledgeable user complete control of the printer's functions.

Edited Transmission Mode—The user sends the printer handler complete message, with the handler managing the insertion of carriage control characters to produce a correctly-structured printout, as defined by the user in previous control messages.

Line-Oriented Transmission Mode—Data is sent to the printer handler on a line-by-line basis with the first word of the data interpreted by the handler as a format control word. This allows attributes of the printout to be changed on a line basis, rather than on a message basis as occurs with the edit transmission mode, although the facilities offered to both modes are similar.

The printer is equipped with a soft vertical form unit which the user can program via control messages to skpply any desired pattern of vertical carriage movements in response to vertical tab control characters. This greatly simplifies printing out highly structured items such as bills or invoices.

The printer can also be set to plot mode in which the bit-wise contents of the data sent to the printer are printed in a corresponding dot pattern in a left-to-right, top-to-bottom scan. This can be useful in printing super-large character sets, defined in software, for printout labeling. Another application of plot mode is the output of information and statistics in graphical formats such as histograms, charts and graphs.

Datasets critical to both speed of access and data transfer rate are stored on disk drives with each drive or group of drives controlled by an individual disk data processor 934, 936 in the file services subsystem 908. For off-line archive storage or large datasets with low access priority, magnetic tape is a cost-effective media.

The low data rates associated with magnetic tape permit the interactive services subsystem 252 to host the magnetic tape device handler, in addition to the other device handlers. Each magnetic tape controller 714 attached to the interactive services bus 704, 708 can drive two tape drives 718, 720 with up to seven separate magnetic tape controllers permitted per interactive bus 704, 708.

User processes do not directly acquire and use magnetic tape drives as they would a printer. Users are concerned with the datasets supported on the magnetic tape, not in the device as such. The magnetic tape datasets are of the sequential unmapped type with variable length records. To the user, there is no difference whether a disk-based dataset or one contained on a magnetic tape volume is used. Either way the create-open-access-transfer-use protocol is used.

However, in the event a user attempts to open a dataset on magnetic tape, SYSDIR acquires a magnetic tape drive from SYSDEV and ensures that the correct tape reel containing the dataset is mounted. SYSDIR then responds to the user's open request, supplying the interactive services subsystem 252 process ID to provide access to the magnetic tape device handler for all subsequent read/write access and transfer requests. To the user, there is no difference in handling the magnetic tape device handler in an interactive services executive 702, 706 or the disk handler in a disk data processor 934, 936. Each is identified via a similar process ID to which the same requests can be sent.

The tape volumes used conform to ANSI X-3.27, Level 1. This provides for a standard label on a tape header allowing for transportation of tapes between a Delta and other processing systems. Level 1 support limits each tape to one dataset (that is, no directory is supported on the tape), but a single dataset can span across multiple tape volumes. Support for the more sophisticated ANSI X-3.27 levels (Levels 2-4) will be available in the future as needs dictate.

The magnetic tape device handler supports writing and reading of sequential records, the reading of any portion of a record, and a maximum record size of 4096 bytes. The handler also permits the user to send control messages to the tape drive allowing rewind and erase to be activated under control of the user process.

The real-time subsystem 230 switches and processes continuous voice traffic, interfacing to the system 100 as analogue signals at the telephone room subsystem 206, 214, 216. Each voice channel is carried on a separate pair of copper wires attached at a remote point to switching equipment through which the voice signals are routed to the system 100. This equipment could be a common carrier's exchange plant, or a private organization's internal PBX. In certain telephone answering support system applications, the voice lines originate as off premises extensions attached in parallel to the subscriber's own telephone line at the main distribution frame of the telephone company's exchange (secretarial lines).

Two factors must be taken into account in relationship to normal telephone applications: (1) the average utilization of each line is low, and (2) the cost of lines from a central office to a remote site is high.

The remote line concentrator 202 allows a large number of low utilization remote lines to be selectively switched onto a smaller number of high utilization trunks leading to the system 100. The concentrator is located in, or adjacent to, the exchange equipment and connected via the central office main distribution frame to each subscriber line for which service is required. The number of trunk lines necessary between the concentrator and telephone room subsystem 206 is related to both the service levels required, and the traffic patterns that occur. Although variable depending on the nature of the services offered and the particular business environment being serviced, a concentration ratio of 60:1 would be typical in a standard telephone service system application.

For control, the concentrator is connected via redundant low speed serial data links 210 to the interactive services subsystem 252. The data link 210 carries messages in both directions, including:

(1) Detection of rings, status changes and acknowledgment of action requests, together with the identity of the lines or trunks on which the activity is taking place.

(2) Requests to seize a selected subscriber's line and connect it to one of the voice trunks; to release a subscriber's line and disconnect it from the trunk; and to post alarm conditions intended to invoke local service responses from system 100 to the concentrator.

Since the concentrator control lines are attached to serial channels in the interactive services subsystem 252, the concentrator handler is resident in the interactive services subsystem 252 and the concentrator is considered tn interactive services subsystem peripheral device.

The concentrator 202 has a fault-tolerant hardware architecture and each contains two controllers with either controller capable of operating as primary and the other as backup. Five voice trunks and one data channel terminate on a concentrator trunk board. Each trunk board is operated by the primary controller and is installed in pairs. Any single subscriber line can be switched to any of ten trunk positions of a pair of trunk boards. From two to ten real trunks can be installed on a pair of trunk boards, and the pair is treated by the concentrator handler in the interactive services subsystem 252 as a single logical concentrator. However, a single physical concentrator rack at the remote site can contain up to four logical concentrators (four pairs of trunk boards, each paid with two data links and up to ten trunks). Subscriber lines are partitioned into ten groups, and a group can be connected to have access to only one logical concentrator trunk set. In situations of higher traffice density, this allows up to 40 trunks to be configured between one physical concentrator and the system 100. The datasets 208, 212 and link 210 can thus be physically implemented as up to four parallel sets.

Since the concentrator is remote from the interactive services subsystem 252, dataset modems 208, 212 are required at each end of each serial data control line 210. However, since the data rate on the line is low (110 or 300 Baud), simple low cost modems are sufficient.

Although subscribers are terminated on the exchange side of the concentrator, individual subscriber lines are still managed by the system as though they were attached to the telephone room subsystem 206 even though routed through the concentrator over common trunks. A user can send SYSDEV an acquire request for a subscriber line using the concentrator terminated channel ID to represent the normal telephone number of the ringing subscriber line. SYSDEV then requests the concentrator handler to seize the requested line, select a free trunk, and switch the line onto the selected trunk. The concentrator handler passes to SYSDEV the channel ID of the incoming common trunk onto which it has switched the requested line. SYSDEV then sends the real-time subsystem 230 a request to assign the trunk to the original requestor so that it can become the owner of the trunk and perform switching or processing functions with it.

The concentrator handler manages the assignment of trunks from the concentrator, not SYSDEV. These trunks are a resource used by the concentrator handler in fulfilling requests to switch a line to telephone room subsystem 206. SYSDEV manages the ownership of the actual subscriber lines in the remote exchange location as if they were physically terminated on the telephone room subsystem 206. Once a user has acquired and seized a line via a concentrator, the channel ID of the trunk (employed by the concentrator handler in connecting the remote line to the real-time subsystem 230) is used in switching and processing functions, not the actual telephone number of the ringing telephone lines.

Once a line has been acquired via SYSDEV, the only interaction between a user and the concentrator handler is control functions. At any time, the owner can send a status request to the concentrator handler to measure the current state of the remote line. Additionally, a user can acquire a remote line without seizing it, as described previously, with the actual seize performed at a later time. In this case, the seize command is sent in a control message to the concentrator handler, and the trunk assignment is then returned to the owner-user. When a user is finished with the remote line, a release request is sent to SYSDEV which informs the concentrator handler to free the subscriber line at the concentrator and return the trunk used back to the pool of available trunks. SYSDEV also sends a message to the real-time subsystem supervisor informing it that the released trunk is no longer owned by the user.

D. Interactive Services Subsystem Hardware Architecture

An interactive services subsystem 252 consists of three hardware components, as shown in FIG. 7.

Interactive services executives 702, 706 are one of the five types of processors used in a system 100 with each subsystem containing two interactive services executives 702, 706. During normal operation, the workload involved in peripheral I/O is shared between the two interactive services executive processors 702, 706. In the event of a failure of one interactive services executive 702, 706 or the bus 704, 708 it controls, the survivor takes over the full load until the failed member is replaced.

Interactive buses 704, 708 are each controlled by one of the interactive services executive processors 702, 706. The interactive buses 704, 708 known as the U-Bus and the V-Bus respectively. Each bus has sixteen parallel data lines, a parity line, and an associated set of control lines. Data can be transferred along the bus between attached device controllers and the interactive services executive's data memory as follows:

(1) Write—3.478 Mbytes/second.
(2) Read—2.857 Mbytes/second.
(3) Instantaneous—7.5 Mbytes/second.

Each U and V-Bus pair 704, 708 can have attached up to 64 device controllers. Each controller is dual-ported bo both the U and V-Bus, contains internal data buffers and microprogrammed control logic for all channels, and interfaces to device-specific I/O channels.

Requests for I/O services arrive at an interactive services executive 702, 706 as packets on the interprocessor executive bus 912. 914, where they are passed by the interactive services executive's resident executive to the appropriate process. To accomplish an I/O transfer, handler processes load a buffer area in the data memory of interactive services executive 702, 706 with control or data information, and then request the bus control hardware of the interactive services executive 702, 706 to transfer the contents to a specific device controllers' I/O or control channel.

Alternatively, the data from a device controller channel can be requested to be loaded into a data memory buffer using the same microprogrammed DMA hardware that is part of the U and V-Bus control extension unit 726 of an interactive services executive 702, 706 and a device controller are via the particular interactive bus 704, 708 to which that interactive services executive is attached. Data transfers across the bus are asynchronous, with the actual data movement on the channels leading from the controller to the peripheral devices; thus each device controller contains extensive buffering to provide temporary storage for each channel. Device controllers can be accessed from either the U or V-Bus 704, 708, allowing the devices attached to be accessed should one interactive services executive 702, 706 or its associated bus fail.

An interactive services executive 702, 706 is formed by adding, to a standard processor module 724, an interactive processor extension unit 720 which enhances the basic 16-bit standard processor module 724 processor in the following areas as shown in FIG. 8:

(1) Adds extension 808 to the high-speed program memory of the standard processor module to increase capacity from 12K words up to 32K, of which 8K are the extensions 812 to manage the hardware additions to the standard processor module 724.

(2) Adds 64K words of data memory 806 primarily used to define data buffers for passing blocks of information between a user and a device controllers' channel through the interactive services executive 702, 706.

(3) Extends the basic instruction set of the standard processor module by over 30 instructions used by the interactive services executive-resident programs to test and control the hardware additions.

(4) Adds a microprogrammed interactive bus controller 802 which manages, asynchronously to the standard processor module, the transfer of data between buffers in the interactive services executive's data memory 806 and device channel buffers in the device controllers. The controller has two methods of communication with the standard processor module. The first is a 64-word deep interrupt FIFO buffer 804 used to pass to the standard processor module the data memory addresses of full (on input) or empty (on output) data buffers when the microcontroller has completed a requested transfer. The other is a 4K word block of high-speed memory, occupying the top of the standard processor module's data memory address space, containing a list of device controllers to be polled plus a word count/date memory address pair for each buffer associated with the input and output of each device channel for each controller. To effect a transfer, a device handler loads the origin of the buffer and the word count. As the controller for the device channel is polled if the associated channel buffer has input or can accept output data, the bus controller effects the transfer of the data, decrements the word count, and increments the data memory buffer address. When the word count reaches zero, the bus controller posts the final buffer address to the interrupt FIFO, thereby notifying the standard processor module that the transfer is complete.

The serial channel controller 254, 255 is a device controller allowing up to 16 RS232C serial, duplex, asynchronous channels to be connected to the interactive services subsystem 252. Each channel's data rate can be independently selected from between 110 baud to 38.4K baud, and each channel has the following active signals:

serial transmitted data,
serial received data,
data terminal ready, and
ready to send.

A 32-byte input and output buffer is associated with each of the 16 channels and data is transferred between these channel buffers and the universal asynchronout receivers/transmitters that physically drive each channel. Data desinted for or received from a serial channel is passed between these 32-byte buffers and the buffers in the interactive services executive data memory, under control of the microprogram in the interactive services executive bus controller 802. Each channel has associated with a four-bit control register which configures the channel for input, output, or both and assigns the channel to either the U or V-Bus 704, 708 and consequently either the U or V-interactive services executive 702, 706. A process in the interactive services executive 702, 706 sets the contents of these registers via a device controller by writing a command word into any of the top 16 locations in the interactive services executive data memory. The microcontroller in the interactive services executive bus controller 802 detects an attempt to write to these memory loations and transfer the written command word across the U or V-Bus 704, 708 to the particular channel control register, as specified in the low 10 bits of the command. Other device controllers use the same technique to configure their I/O channels, allowing the device controller to respond correctly when the interactive services executive bus controller 802 polls it for input data or attempts to transfer data for output.

The magnetic tape controller 714 is a device controller which interfaces with magnetic tape units through a formatter 716. It contains an 8K word buffer that decouples data transfers between the magnetic tape controller 714 and the magnetic tape on one side, and the interactive services executive 702, 706 on the other. The magnetic tape controller 714 uses a microprogrammed controller to manage the interface to the drives, communicate with the interactive bus controller in the interactive services executive 702, 706, and control accesses to the magnetic tape controller 714 internal buffer and control registers.

A magnetic tape controller 714 has three channels through which a handler process in the interactive services executive 702, 706 communicates:

(1) A control channel used to pass control data to the magnetic tape controller 714. This channel allows buffers in the magnetic tape controller's 8K memory to be defined by loading various magnetic tape controller control registers. One particular control word loads a register which activates the physical control lines to the magnetic tape unit, enabling the magnetic tape handler process in the interactive services executive 702, 706 to select a drive; set read and write thresholds in the formatter; rewind the tape; erase; write file marks, and other similar tape unit control functions.

(2) A bidirectional data channel, along which data can be transferred between a buffer in the interactive services executive's data memory and the magnetic tape controller's buffer. Once data has been transferred to the magnetic tape controller's buffer, it is passed to the selected drive by the magnetic tape controller independent of any activity on the U or V-Bus 704, 708 between the magnetic tape controller 714 and the interactive services executive 702, 706. The magnetic tape controller 714 can read or write data between a tape unit and one area of its 8K memory while the interactive services executive 702, 706 is simultaneously reading or writing to another area in the same buffer memory. This double-buffering allows data transfer operations to be either pipelined to a single drive, or interleaved between drives.

(3) An interrupt channel extends from the magnetic tape controller 714 back to the interactive services executive. Within the magnetic tape controller 714, a one word buffer is used to store the results of a read or write operation to the tape unit 718, 720, containing the termination status of the transfer and the number of data bytes actually transferred. The interrupt channel is used by the magnetic tape device handler to read these results back to the interactive services executive 702, 706. Filling the buffer causes the buffer identity to be stored via the DMA termination FIFO 804, thus resulting in an interactive services executive 702, 706 interrupt.

The three channels to a magnetic tape controller 714 are implemented in the same way as any other channel used to communicate with a device controller: a buffer to send or receive channel data is defined in the interactive services executive data memory, and a description of the buffer is put in the polling list of the interactive services executive bus controller 802, which initiates the requested transfer between the buffer in data memory and the magnetic tape controller 714.

An interactive services executive process can also communicate directly with the magnetic tape controller 714 by writing a command word to any of the top 16 locations of the interactive services executive's data memory. This command word is self-addressed in the lower six bits as to which device controller it is desinted for, and is transferred immediately by the interactive services executive bus controller 802 to the destination magnetic tape board (for example, one of up to 64 controllers on the U and V-Bus 704, 708). In the case of the magnetic tape controller 714, this command word can request the status of the magnetic tape controller's internal registers, assign a magnetic tape controller to either the U or V-Bus 704, 708, clear the magnetic tape controller 714 to power-up state, and enable or disable the control channel in the magnetic tape controller 714.

Data passed to the magnetic tape controller 714 along the control channel from the handler process is used not only to control the tape drive units, but to define how the magnetic tape controller's 8K memory is to be partitioned. Buffers of up to 4K words size can be specified. The size of the data blocks transferred can be chosen to relate to the size of the dataset's logical records contained on the magnetic tape.

Data is transferred between the buffers in the interactive services executives' data memory 806 and the channel buffers in the device controllers under control of the microprogrammed U and V-Bus controller 802 in the interactive services executive 702, 706. Transfers take place one word at a time on a polling basis, rather than as continuous streams of data from one buffer to one channel. Therefore, if a number of data transfers are pending at the same time, all are effectively undertaken in parallel by interleaving individual one word transfers as determined by the sequence in the polling list. This uniformly distributes among all channels the effects of all traffic, thus minimizing the queueing problems that would occur if one channel could occupy the bus solely during transfer of a large block of data.

The transfer sequence is as follows: the microcontroller accesses an entry in the polling list which specifies the individual device controller to be polled on the U or V-Bus 704, 708 depending on which the interactive services executive 702, 706 controls. The controller is polled by the interactive services executive bus control microcontroller 802 and responds with the ID of the next channel for which a data transfer is required or possible together with the direction of transfer. One word of data is transferred between the interactive services executive's data memory buffer indicated in the polling list entry and the specified channel buffer in the device controller. The bus controller then continues to the next device controller specified in the polling list.

If more than one channel on a device controller is active, data is then transferred from each active channel in a round-robin sequence, with one data transfer occurring on each poll cycle. The advantage of this technique is that inactive channels, or those logically removed from the system, take no overhead in the polling process since they are either missing from the list or do not respond to the bus controller's poll. The polling sequence of device controllers is entirely programmable, since the polling list forms part of the data memory space of the interactive services executive processor 702, 706. It is also possible to poll a given controller at a greater frequency by inserting its address more than once in the polling list. This allows for dynamic alteratioms to be made in the servicing of specific device channels.

E. Interactive Services Subsystem Software Architecture

A number of processes are created during the logical initialization of an interactive services executive 702, 706 and divided into two basic categories. The first consists of processes which are not related to any one specific device type bus which provide general management and interface functions. The second encompasses the device handlers, each controlling all the devices of a given type which have been assigned to the host interactive services executive 702, 706.

Management and interface functions include the following processes:

(1) Device management maintains tables which relate devices to their owning job numbers, responds to assign requests from SYSDEV, and communicates with the other interactive services executive of the interactive services subsystem pair 702, 706 for load sharing and backup purposes. Device owners open and close their devices through this function.

(2) Input/output interface receives all requests to access and transfer data from any device. This function interfaces the request to the appropriate device handler.

(3) Buffer managers manage the use of the interactive services executive's data memory for buffered data transfers between the interactive services executive 702, 706 and the inter-processor executive bus 912, 914, and also between the interactive services executive 702, 706 and the device controllers.

(4) Backup/recovery shadows operations in the other interactive services executive of the subsystem and manages takeover in case of a device or bus failure.

When a job needs a device, it sends an acquire request to SYSDEV either specifying a unique device, or requesting any one of a given class of similar devices. SYSDEV identifies one that satisfies the request and sends an assign request to the interactive services subsystem 252 shown as having the device attached. There could be up to four interactive services subsystems 252 and within each, devices are load-shared between the U-interactive services executive 702 and the V-interactive services executive 706 according to a predefined plan dictated to the interactive services subsystem 252 by the system configuration file.

The assign request is sent to the device management function of the primary interactive services executive of the subsystem. The primary interactive services executive is either the one which first completed initialization when the subsystem was powered-up, or alternatively the one which survived an interactive services subsystem failure, becoming and afterwards remaining primary by default.

Primary interactive services executive then determines which of the two interactive services executives 702, 706 is responsible for this request, marks the ownership details in its tables, and passes the request to backup interactive services executive to maintain its tables. The response to SYSDEV includes the process ID of one of the two device management functions, the primary or that in the backup where the owner is to send subsequent requests. This process ID is passed to the requesting process by SYSDEV. The requesting process, or any other process in the same job to which it passes the process ID, can then send requests directly to the interactive services executive 702, 706 with no need to involve any higher-level kernel system functions.

At this stage, the owner can send to device management an open request that checks the status of the device and also puts the user in touch with the interactive services executive's input/output service function. The process ID of this process is returned in response to the open request, and used in all subsequent accesses to the opened device.

The owner can then send to I/O services read and write access requests. Each such request is acknowledged back to the owner with an access PID, which is used in subsequent get and put requests to cause the physical transfer of data between the device's buffers and the owner. A user can build up a number of interleaved transfers by using multiple Read/Write access requests to the same device separated by End I/O (ENDIO) requests after each access. The I/O service function transforms these user level requests into internal calls to the specific device handler, which then performs the physical data transfer to and from the device.

Transfers are terminated by sending an End I/O request to the I/O service function. The device channel is closed with a request to the device management function. Closing the channel invalidates the reference value supplied in the open request response, and any subsequent attempt to call I/O service after a close results in a negative response.

When an owner no longer needs a device, a release request is sent to SYSDEV which deallocates the device in its tables and informs interactive services subsystem device management with a free device request.

The owner can then send to I/O services read and write access requests. Each such request is acknowledged back to the owner with an access PID, which is used in subsequent get and put requests to cause the physical transfer of data between the device's buffers and the owner. A user can build up a number of interleaved transfers by using multiple Read/Write access requests to the same device separated by END I/O (ENDIO) requests after each access. The I/O service function transforms these user level requests into internal calls to the specific device handler, which then performs the physical data transfer to and from the device.

Transfers are terminated by sending an END I/O request to the I/O service function. The device channel is closed with a request to the device management function. Closing the channel invalidates the reference value supplied in the open request response, and any subsequent attempt to call I/O service after a close results in a negative response.

Then an owner no longer needs a device, a release request is sent to SYSDEV which deallocates the device in its tables and informs interactive services subsystem device management with a free device request.

If a failure occurs while an interactive services executive 702, 706 is performing I/O with a device, the data involved in that particular get (input) or put (output) transfer is lost since the data buffers in the failed interactive services executive 702, 706 are no longer available. However, because the device controllers are dual-ported, they can still be accessed from the surviving interactive services executive and I/O restarted by re-initiating the interrupted data transfer request, get or put.

To the owner, this failure is detected either as a time-out to an access or transfer request, or a transfer which completes in error. The owning process must then re-initiated the interrupted get or put. If a transfer was not in process, then action need not be taken by the user.

The next open request will be automatically rerouted to the surviving device manager process using the system bus ID mechanism in the interprocessor communications network.

If a device controller fails, all devices connected to that controller are lost unless the device itself is redundantly connected to the interactive services subsystem 702, 706 via two sets of I/O channels terminating on two different device controllers. This occurs in the case of the concentrator which has internally redundant channels for high availability. Each logical concentrator has two serial data channels connecting it to two different serial channel controllers 254, 255 on the interactive services subsystem 254. Each logical concentrator manages up to ten voice trunks to the telephone room subsystem 206, 214, 216.

SERVICE SYSTEM ACCESS RESPONSE

Figure 12B:
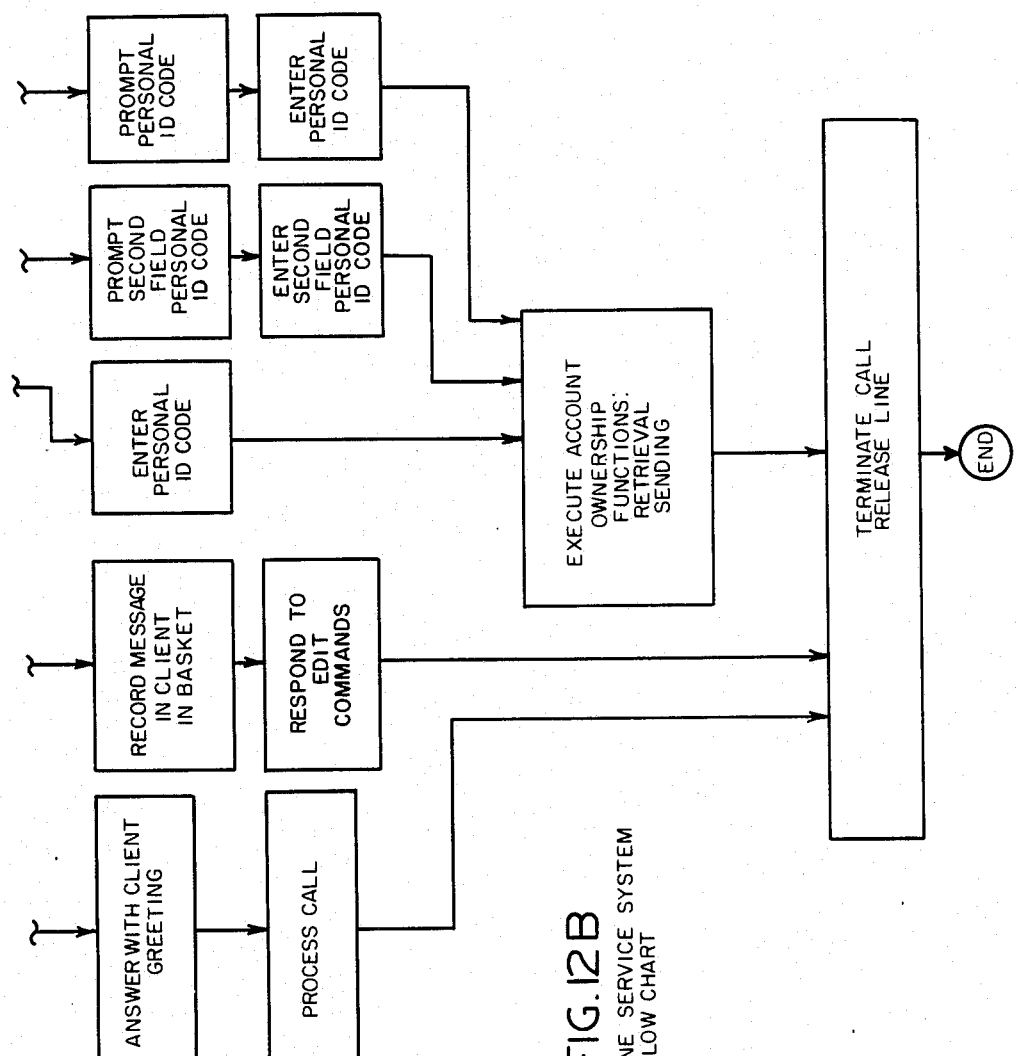
FIG. 12A in conjunction with FIG. 12B is a flow diagram describing the response of the automatic telephone voice service system to a user call.

As illustrated in the telephone service system flow chart shown in FIG. 12, the service system 100 responds to an incoming call by first identifying the type of line upon which the call has been placed and then seizing the line when specified answer conditions have been met. For most types of lines, the answer conditions will specify immediate answering of the call. However, for secretarial lines the client may specify that the line be answered only after a selected number of rings, and the number of rings may vary with time of day and day of week. For example, the client may have a business telephone connected as a secretarial line and wish to have his own secretary answer the line during normal business hours. Therefore he may specify that during his regular business hours the phone will be answered by the system 100 only when his secretary is unable to answer the phone within five rings. Outside of normal business hours he may wish to have the phone answered immediately.

In any event, the line is seized upon satisfaction of the indicated answer conditions and further response then depends upon the type of line involved, the dictates of the caller, and the options selected by the client.

For example, in the case of a secretarial line the client can specify either an operator assisted answering service or a fully automatic answering system service. In the event that operator assisted answering has been selected by the client, upon seizure of a secretarial line, the system 100 identifies and connects to the line an available operator station. Client account data is automatically and immediately sent to the visual display unit at the operator console to assist the operator in responding to the call. This data may include the salutation with which the call is to be answered, instructions for order taking, messages for selected callers, information about the client's schedule or where he can be reached and so forth. Upon terminating the call the line is released and the operator station becomes available for the next operator assisted call.

In the event that the client has selected automatic answering service, the caller is greeted with a client selected greeting and invited to leave a message at the occurrence of a tone. The client may record his own greeting and change it at will, or alternatively, may use a system provided greeting which does not specifically identify the called client. Furthermore, the caller may specify the length of any message which can be recorded and the maximum number of messages which may be stored by the system. In any event, upon generation of the tone, the voice service system receives and records in the inbasket portion of the client message basket any message dictated by the caller. Up to the maximum message time specified by the client. During this recording process the system responds to message editing commands as if the caller were a system client. However, to avoid confusing nonclient callers, no editing prompts are provided and an unsophisticated caller may simply dictate a nonedited message with no knowledge of the system editing feature. Upon receipt of the message, the call is terminated and the line is released.

A direct incall line, like a secretarial line, is associated with a particular message basket. However, unlike the secretarial line, the direct incall line is not available for general use by the client and is dedicated to the receipt of incoming calls for the message basket. Upon seizing a direct incall line, the system proceeds to the automatic answering mode in a manner which is essentially the same as the automatic answering response to a call on a secretarial line.

A general incall line is similar to a direct incall line except that a general incall line is not associated with a particular message basket. Therefore, upon seizing a general incall line the caller is prompted to enter a message basket code. Upon entering the required message basket code, the line becomes dedicated to a particular client message basket and the response proceeds in the same manner as the automatic response to a secretarial line or a direct incall line. Execution of a change command enables a system user to specify a new message basket code at any time and return to the automatic answering step with the line dedicated to a new message basket. This feature enables a caller to access the system on a general incall line and leave messages for several different message baskets with a single call and without having to redial the line for each different message.

A general access line provides all of the functions available on a general incall line and also affords a system user access to count ownership functions. Upon seizing a general access line, the caller is prompted to leave either a message basket code or a personal ID code. If the client leaves a message basket code the system associates the line with the indicated message basket and the call is answered in the automatic answering mode similar to the response to a general incall line.

On the other hand, if the caller enters a personal ID code the caller is granted access to the account ownership functions such as retrieval of messages stored in his inbasket, sending of messages through his outbasket to other inbaskets or telephone numbers, changing of the client greeting and so forth. Through the change function, the caller may at any time change states to leave messages with other selected message baskets or perform other ownership account functions without redialing the call.

A direct recall line is associated with a particular message basket and provides access to only account ownership functions for that message basket. Such a line may be utilized to implement a high security environment by requiring the personal ID code to have a first field which is established when the account is open and a second field which can be changed at will by the caller as an account ownership function. Such an arrangement requires a person accessing the account to know the direct recall line telephone number, the first field of the personal ID code and the second field of the personal ID code. Such an arrangement is thus relatively secure and precludes access by a person entering personal ID codes at random in the hope of accessing an interesting account.

The general recall line is similar to the direct recall line except that it is not dedicated to a particular message basket. The caller is prompted to enter a message basket code and then must enter a personal ID code corresponding to the selected message basket code. This gives the caller access to the account ownership functions.

Referring now to FIG. 13, most user initiated commands which are entered through the DTMF tone signals of a telephone keyboard begin with the asterisk key which interrupts any current activity by initiating a pause and serves as an attention key for the system 100. Virtually any state can be interrupted with a new command sequence although some command sequences will not be valid for certain states. For example, a caller accessing the system 100 through a direct incall line can never exercise account ownership functions.

System 100 responds to the pause command by interrupting any current function such as storage or retrieval and initiating a five second time window during which the system 100 will respond to additional commands. If a further command is not entered within this time window, the system will remain in a pause state and will not respond to additional commands until the asterisk key has been reactuated. The use of the window created by the asterisk key precludes the unintentional generation of command signals which might affect the state of the system. For example, it is known that the voices of some people have tonal characteristics which cause the voice to generate the dual tone signals corresponding to certain keys. Unless the asterisk key has been actuated, these signals are simply ignored by the system 100. At the same time, once a user actuates the asterisk key and places the system in a pause mode, it is unlikely that the user will be speaking to the system or otherwise creating sounds that might be misinterpreted as a keyboard actuation.

Once the user has actuated the asterisk key a specific command may be entered. For example, immediate actuation of the number sign key effects a sign off or termination of activities with respect to the current account. This in effect returns the system to a state in which the user is prompted to enter a message basket number to associate the call with a particular account. In the case of a secretarial line or direct incall line which is associated with a single answering function for a dedicated message basket, the call would simply be terminated.

Actuation of the one key institutes a listen command which enables the user to retrieve messages recorded in the user's inbasket by listening to the playback of previously recorded voice messages. Again, this function would be unavailable for certain states such as for calls received on a secretarial line or a direct or general incall line. The listen key can also be used to listen to a dictated message for editing purposes.

Actuation of key 3 creates a talk command which causes the system 100 to receive and record voice messages. This command would be appropriate for any recording mode such as normal telephone answering mode, recording messages in a client's outbasket for forwarding to other inbaskets or telephone numbers, or recording a client's personal greeting, depending upon the particular recording responsive mod the system 100 is in at the time the talk command is executed.

The 4, 5 and 6 keys provide convenient editing functions. The 4 key causes the recording system to back up five seconds while the 6 key causes the system to go forward by five seconds. The number 5 key is a continuation key which in effect terminates the pause initiated by the asterisk key and continues the system 100 to the state which preceded actuation of the asterisk key.

The 7 and 9 keys provide clear and save functions which may be utilized to preserve or erase user messages stored in an inbasket during a retrieval mode or to edit messages stored in a client's outbasket for delivery elsewhere. Key 8 provides an insert function which enables a voice message to be inserted or deleted between other parts of a message during the recording of a message. For example, were the user to record a message and then wish to insert a sentence between two preceding sentences the user could actuate * 4 for a number of times until the recording point is backed up in five second increments to a point preceding the insertion point. Upon actuating * listen (1) the user may listen to the prerecorded message until the insertion point is reached. At this point the user actuates * insert (8) and may begin dictating the inserted portion of the voice message. Upon completion of the insert, the user merely actuates * listen (1) to listen to the remaining portion of the previously recorded message until the end thereof is reached. Alternatively, the user could use the * forward (6) command to rapidly skip forward in the previously recorded message to the end.

The insert function may also be used to mark the beginning and the end of a voice message segment. The segment can then be deleted with the * clear command.

Actuation of the zero key initiates a help function in which detailed voice message prompts are communicated to the system user to explain the current state of the system and to explain which keyboard combinations should be actuated to obtain a desired objective.

In the event that the system is in a state in which a personal ID code number should be entered, the user is prompted to do so by actuating the asterisk key, the appropriate number keys, and the pound sign key (enter). The enter key is utilized to terminate all number sequences but the system will attempt to validate a previously entered number sequence after a selected (five second) timeout even in the absence of actuation of the enter key.

Actuation of the 2 key creates a change function which must be further defined by actuation of a third key stroke. For example, actuation of the 1 or listen key places the system in a retrieval mode with the system 100 responding by beginning to retrieve and communicate to the user any voice messages stored in the corresponding inbasket Actuation of the 2 key initiates a change account function which enables the system user to enter a new message basket code number terminated by the enter key and thereby gain access to the inbasket of a different message basket. This combination of commands enables a caller to leave a voice message in several different inbaskets with a single call.

Actuation of the number 3 talk key places the user in a recording mode for recording of a message in the user's outbasket (assuming that this mode is authorized). Actuation of the 5 key creates an administrative mode in which the caller may utilize additional function commands to execute selected account ownership administrative functions. For example, actuation of the star 1 or star 3 keys would enable the user to listen to or change the client greeting. Other key combinations may be assigned in the client administration mode to enable selection of various client account options such as the maximum length of an inbasket message, the maximum number of inbasket messages, specification of the second field of a direct recall line personal ID code and so forth.

Execution of the * 2 zero key sequence causes an active operator station to be connected to the line to give the user access to an operator for assistance in executing any command sequence that the user might be having difficulty with or for execution of any account administration commands that might require operator intervention.

While most command functions are initiated with the asterisk key the entry of certain code number sequences such as a message basket number, delivery code, a distribution list, or a telephone number are not preceded by the asterisk key. It will be noted that these entries are in the nature of a data specification and not strictly a command function.

While FIGS. 12 and 13 describe the functional operation of system 100 from the user point of view, FIGS. 14–26, to which reference is now made, describes the functional operation of system 100 in terms of the response of the system 100 itself.

To customize voice message service to the needs of a particular client, the system 100 utilizes client service options and parameters. Client service options make a particular voice messaging features available or unavailable to a client while client service parameters are quantifiers that may be varied within a specified range to suit a client's need (e.g., the number of messages that may be left in a message basket).

To provide these capabilities, voice messaging service is organized into the functions shown in FIG. 14, the voice messaging service functional flow block diagram. The first function, obtain call information, provides the voice messaging service access to the client instructions pertaining to delivery of a message or information concerning the phone line over which the call has been received.

Depending upon the call information, voice messaging performs either the message delivery function or the select account/activity function. As part of the select account/activity function, client information including client service options and parameters is obtained. The principal task of this function, however, is the invocation of the function providing the particular service desired by the client. The select account/activity function determines which specific service is desired based on the call information, information entered by the client or commands entered by a voice messaging service information operator on behalf of the client.

Figure 16:
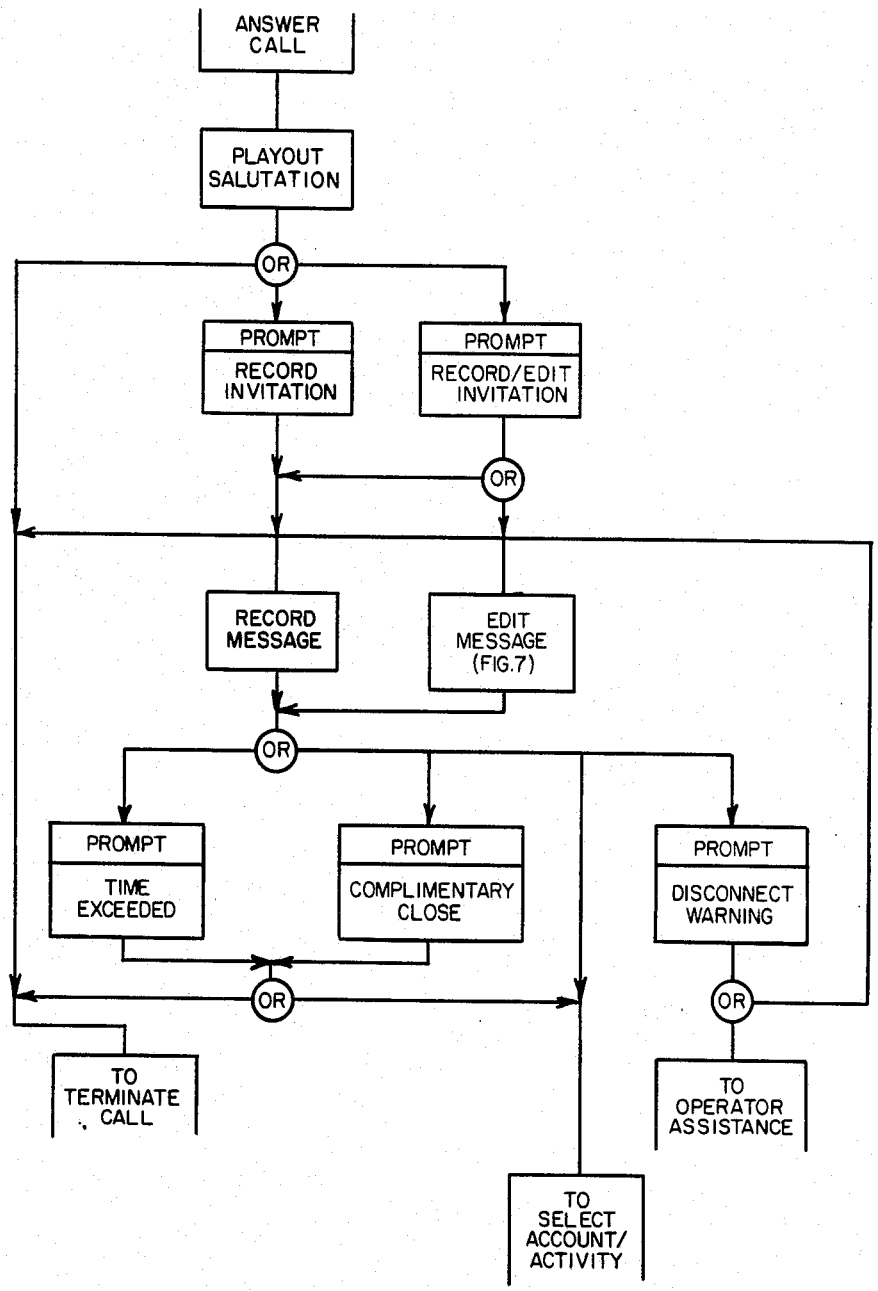
FIG. 16 is an answer call functional flow diagram that is useful in understanding the diagram shown in FIG. 14.

The answer call function, which is shown in greater detail in FIG. 16, plays out a message prepared by the client, usually a salutation. Depending on the client information, the voice message service will then record a single message from the call which may or may not employ the recording control primitive commands, except a single command from the caller again invoking the select account/activity function or perform the terminate call function.

Figure 18:
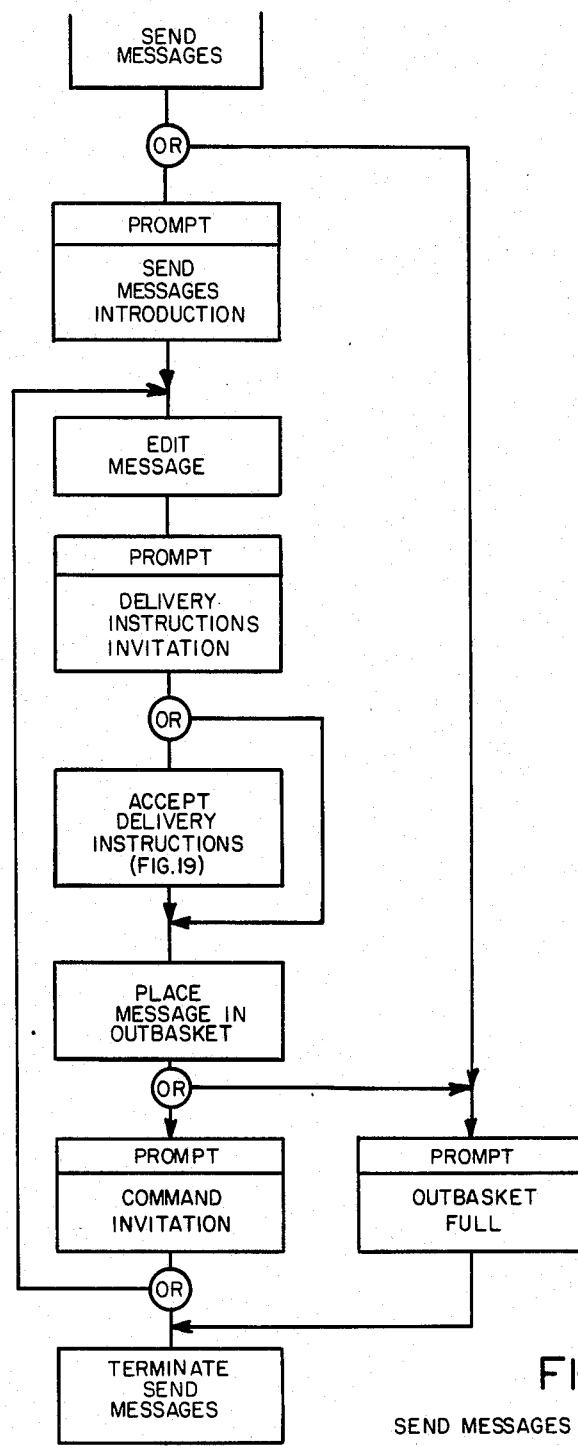
FIG. 18 is a send messages functional flow diagram that is useful in understanding the diagram shown in FIG. 14.

The send messages function is illustrated in greater detail in FIG. 18 and places messages and delivery instructions in the client's outbasket. The retrieved messages function which is illustrated in greater detail in FIG. 20, enables a client to examine the client's message basket. The change administrative data function is shown in greater detail in FIG. 25 and enables a client to change selected call and administrative instructions associated with the client's account. The client may selectively and repeatedly exercise these functions during a call. The message delivery function is illustrated in greater detail in FIG. 26 and enables a client's message to be delivered to the inbasket of any client or any telephone. The attempt to deliver the message commences at the time specified in the delivery instructions and, for telephone delivery, continues in accordance with those instructions.

The terminate call function is the last function performed and handles disconnection of the call and bookkeeping of the activities performed during the call.

The interrupt driven keyboard functions may be commanded by a client at any time and hence are not explicitly shown in FIG. 14. These functions include help, operator assistance, editing, and the change function which is illustrated in FIG. 14 and returns the system operating state to the select account/activity state.

Also not shown in FIG. 14 is a maintain usage data function. This function is embedded throughout the flow process and collects and makes available to the system 100 the data describing the resources used by each call for client billing and system operating purposes.

Extensive prompts are available to a system user to explain use of the system. Any command that can be entered by a client except request operator can be entered by a service system information operator. Each command is preceded by the asterisk symbol. If no command is entered by a user in response to a prompt, the prompt is not repeated and the call is directed to a system operator to provide assistance to the caller. The operator then remains connected until the call is terminated or until the operator executes an end assistance command through the operator terminal. If a user attempts to enter an inappropriate command, an error prompt is communicated to the user which explains the mistake and provides the user with an opportunity to retry the command. After a number of retries specified by a system parameter, error retries, the user is provided with a help prompt. If a correct entry has not been received after the help prompt has been received repeated once, the caller is either disconnected or referred to an operator, depending upon a selected client service option.

The call information needed to control a voice message service operation consists of either line type or delivery information. Line type is provided for calls received at the voice message service facility. Delivery information is provided if message delivery is to be performed. A direct line is an exclusive line associated with one and only one client and is used solely to receive calls. The system 100 does not attempt to use a direct line for telephone delivery and does not attempt dial out on a direct line. A service schedule is always associated with a direct line. A general line is associated with no particular client and may be used for telephone delivery. Delivery information is derived from delivery instructions prepared by the client. It identifies the outbasket holding message and the particular delivery instruction being executed.

Figure 15:
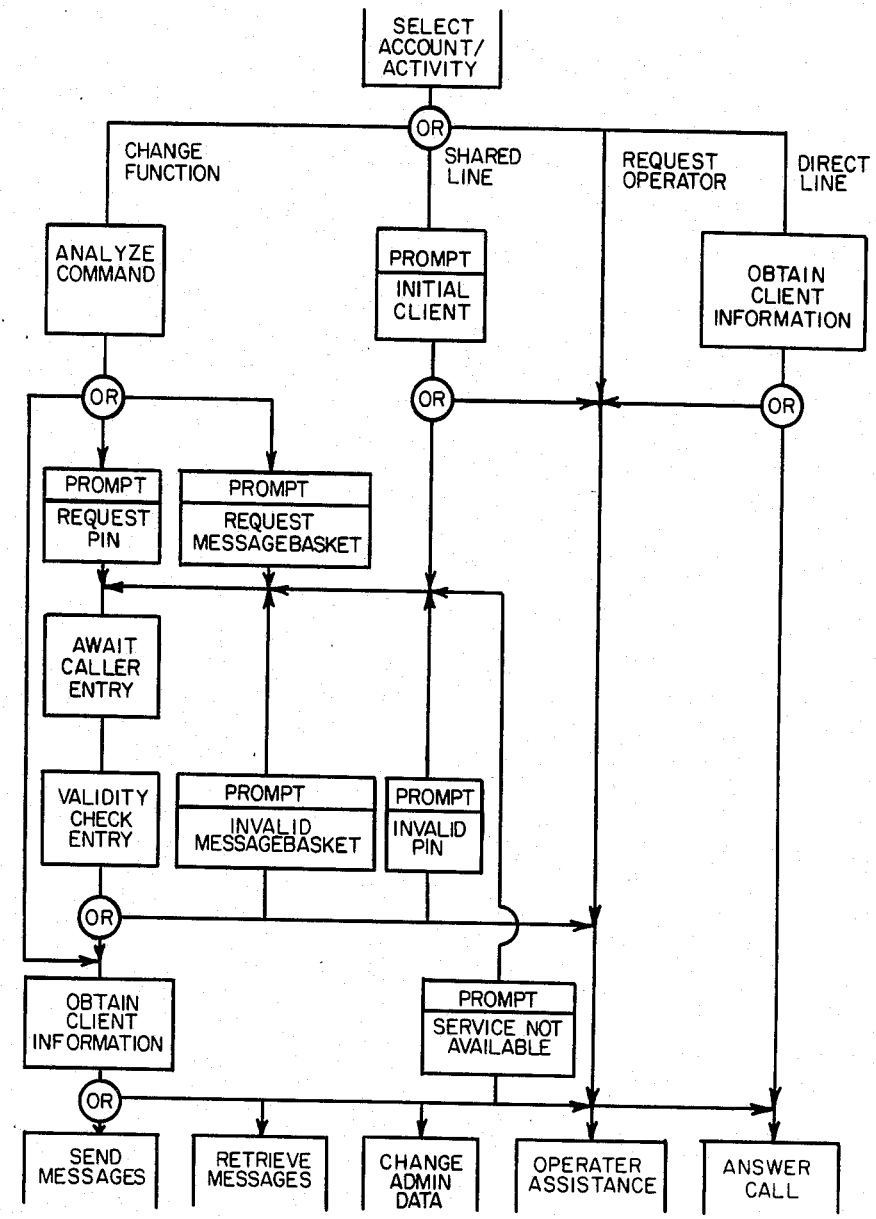
FIG. 15 is a select activity functional flow diagram that is useful in understanding the diagram shown in FIG. 14.

Making reference to FIG. 15, the select account/activity function provides the client access to specific voice messaging services. The function is invoked by one of the following events:

1. A change in function caused by entry of an access send messages, an access retrieve messages, an access administrative or access account client command.

2. Receipt of a call over a shared line.

3. A request operator client command.

4. Receipt of a call over a direct line.

In the first case an analyzed command function determines if additional information is needed. If so, a prompt requesting the needed information is provided and the await caller entry function is invoked. Once the caller has completed his entry, the validity check caller entry function is invoked. If the entry is valid the obtain client information function is invoked. If it is not valid either a prompt is provided to the caller or if repeated attempts at personal identification number code entry have occurred, the call is referred to an operator. Once required client information is available the obtain client information function is invoked to determine if the requested service is available to the client. The function providing the service is invoked if the service is available and the service not available prompt is provided if it is not.

In the event of a shared line call, the initial client prompt is provided. If no DTMF entry is received within the time specified by a system parameter, prompt interval, after the prompt is provided, the operator assistance function is invoked. In the normal situation, a DTMF entry is made and the await caller entry function is invoked and the flow proceeds as in the first case. If an operator has been requested the operator assistance function is invoked.

If a call is received on a direct line, the client information is uniquely associated with a line and the obtain client information function is invoked immediately. If the client information specifies that operator assisted call answering is required the operator assistance function is removed. Otherwise the answer call function is invoked.

The analyze command function shown in FIG. 15 is invoked as the result of an access send messages, and access retrieve messages, an access administrative function, or an access account client command. The access account command cannot be executed until the message basket number of personal identification number code is provided. The access send messages, access retrieve messages, and access administrative functions commands cannot be executed unless the client has entered his personal identification number code. The analyze command function shall determine the data needed, if any, and provides the request identifier message basket prompt to the client.

For the access send messages, access retrieve messages, and access administrative functions commands, no prompt is provided if the client has previously provided his personal identification number code. The obtain client information function is then immediately invoked. Once a prompt has been provided, the await caller entry function is invoked and operates to accept the entry of data by the caller.

If the data entered by the caller uses data syntax, it is assumed to be the message basket number. If it is in command syntax, it is assumed to be the personal identification number. On a shared line allowing entry of partial message basket numbers, (a portion of the number being uniquely associated with the incoming line), the data entered by the client is assumed to be low order digits of the message basket number and is concatenated with the base number to form the message basket number.

The validity check entry function verifies that the data entered designates a valid message basket or personal identification number code. If it does not, the invalid message basket or invalid personal identification number code prompt is provided depending on the syntax of the data entered (with or without asterisk key). If the third attempt at personal identification number code entry is found to be invalid, operator assistance function is invoked. No attempt is made to corrolate the type of data entry with the type requested by the prompt. No attempt is made to cross-corrolate personal identification number and codes and message basket numbers. If the entry is valid, the obtain client information function is invoked.

The obtain client information function accesses and acts upon client information uniquely associated with the line over which a call is received, with the message basket number entered by the client, or with the personal identification number code entered by the client. Client information is created using the customer support system, which is interactive software system used to maintain the data base directing voice message service system operation, to report system performance, and to support administrative activities. The client information includes a client identifier, client service options, the client message basket number, and the client personal identification number code IPIN). The client service options include:
1. Call answering available.
2. Autocall answering provided.
3. Operator assisted call answering provided.
4. Edit controls available (CA).
5. Send messages available.
6. Delivery codes employed.
7. Distribution lists employed.
8. Edit controls available (SM).
9. Retrieve messages available.
10. Message basket status provided.
11. Inbasket review provided.
12. Output basket review provided.
13. Reply/redirect services provided.
14. Message amendment provided.
15. Delivery instructions amendment provided.
16. Telephone delivery available (auto).
17. Telephone delivery available (operator assisted).
18. Auto delivery reply.
19. Operator assisted delivery reply.
20. Reply edit controls available.
21. Call answer enter disconnect employed.
22. Administrative functions available.
23. Multiple salutations employed.
24. Call forwarding available.
25. Message basket forwarding available.
26. Distribution list modification available.
27. Default delivery option.
28. Shared account used.
29. Partial message basket number used.
30. Time of delivery prompt form.

The client service parameters are:
1. Maximum answer message.
2. Maximum message size.
3. Maximum number of messages.
4. Maximum number of addresses.
5. Number of distribution lists.
6. Number of delivery codes.
7. Base message basket number.
8. Number of salutations used.

Delivery instructions consist of addressee information and a delivery code. When placing a message in his outbasket, the client may specify the addressee directly by providing a message basket number or telephone number, or he may specify the addressee indirectly by providing a distribution list number. A client distribution list consists of a set of predefined addresses and delivery codes prepared using the customer support system (CSS).

Each client is invited to preestablish a specified number of single digit delivery codes. This number is specified by the client parameter number of client codes. The voice message service system maintains additional single digit system defined delivery codes which may also be used by the client. The following information is provided for each delivery code:
1. Delivery code number.
2. Time of first attempt and time to stop trying. The time in the delivery code shall be interprinted in terms of the local time at the voice messaging service system installation.
3. Retry interval.
4. Total number of attempts.
5. Automatic telephone delivery.
6. Ready to receive acknowledgement not required.
7. Called party identification required.
8. Delivery acknowledgement required.

9. Called party response permitted.

The principal action of the obtain client information function is the comparison of requested activity with the client service options to determine if the request can be honored. If it cannot, the service not available prompt is provided and the await caller entry function is invoked. If the request can be honored, the function invoked depends upon the event originally invoking the select account/activity function as follows:

1. If invoked by the access send messages, access retrieve messages, or access administrative functions command, the respective function shall be invoked. The client information controlling this action is that associated with the personal identification number code.

2. If invoked by the access account command, the operator assistance or the answer call function is invoked in accordance with the client information associated with the match to each basket specified.

3. If invoked by the receipt of a call over a shared line and if a message basket was entered by the caller, the operator assistance or answer call function shall be invoked in accordance with the line information associated with the message basket specified.

4. If invoked by the receipt of a call over a shared line and a personal identification number was entered by the caller, the default function specified in the client information associated with the personal identification number code shall be invoked.

5. If invoked by receipt of a call over a direct line, the operator assist or answer call function is invoked in accordance with the client information associated with the line.

The answer call function shown in FIG. 14 is described in greater detail in FIG. 16, to which further reference is now made. This function enables callers to directly access the message receiving facilities of a client. The prompts and subordinate functions employed by the voice messaging service system answer call function are illustrated. The operator assisted answer call function is considered part of the operator assistance function. Depending on the client service option, the select account/activity function (FIG. 14) invokes one or the other of these two functions when a call is received over an exclusive line or when a valid change account command is honored.

The answer call function always begins with playout of a salutation selected by the client. If the caller is determined to have gone on-hook during the playout, the terminate call function is invoked. If the playout is completed and the client service option does not allow a caller reply, the terminate call function is invoked.

If the client service option allows a caller reply, a second client service option determines if the caller can leave only a simple telephone answering machine type of reply or if the full range of voice message service edit controls are availabe to him. In the former case, the record invitation prompt is provided and the record message function is invoked. In the latter case, the record/edit invitation prompt is provided and the edit message function is invoked. However, in this case, if no DTMF tone is detected within the time interval specified by the system parameter prompt interval, invocation of the edit message function is cancelled and the record message function is instead invoked. If a prolonged period of silence elapses during recording, the record message function will provide the disconnect warning prompt and may invoke either the terminate call or operator assistance function in accordance with the client service option. At the option of the client, the record/edit invitation prompt is omitted and superseded by the record invitation prompt even if message editing has been selected as a client service option.

The duration of the caller reply is controlled by the client parameter maximum answer message. If the caller message exceeds the value of this parameter, the time exceeded prompt is provided and the terminate call function is invoked. If the reply is completed within this time, the complementary close prompt is provided and the terminate call function is invoked.

Depending on a client's service option, the change account command may be recognized within the answer call function. If this client service option is in effect, a voice message service system 100 delays invocation of the terminate call function for the period of time specified by the system parameter change account delay. If the option is in effect, the command is recognized within the edit message function and during the period of time that the final prompt is being played. It is not recognized during playout of the salutation or initial prompts within the record message function, or once the terminate call function is invoked.

The playout salutation function provides playout of a salutation selected by the client. If multiple salutations are available, the salutation select shall depend upon the time of day and day of the week upon which the call is received and the salutation selected shall be the one whose service schedule matches the time and date. If the caller goes on-hook during the playout, the terminate call function is invoked.

The record function simply records data received over the telephone line for no more than a specified period of time. This period of time is specified by the client parameter maximum answer message. No DTMF tones are recognized by this function. The message is placed directly in the client's inbasket and hence, if the caller exceeds the specified period of time, this function will retain that portion of the message that had been received in the client's message basket.

If a period of silence exceeding the length specified by the system parameter silence interval elapses while recording, the system 100 shall provide the caller with the disconnect warning prompt. The caller may override the imminent disconnection by immediately resuming recording. The voice message service system will either disconnect the call or invoke the operator assistance function in accordance with the client service option when the prompt interval expires if recording is not resumed.

Figure 17:
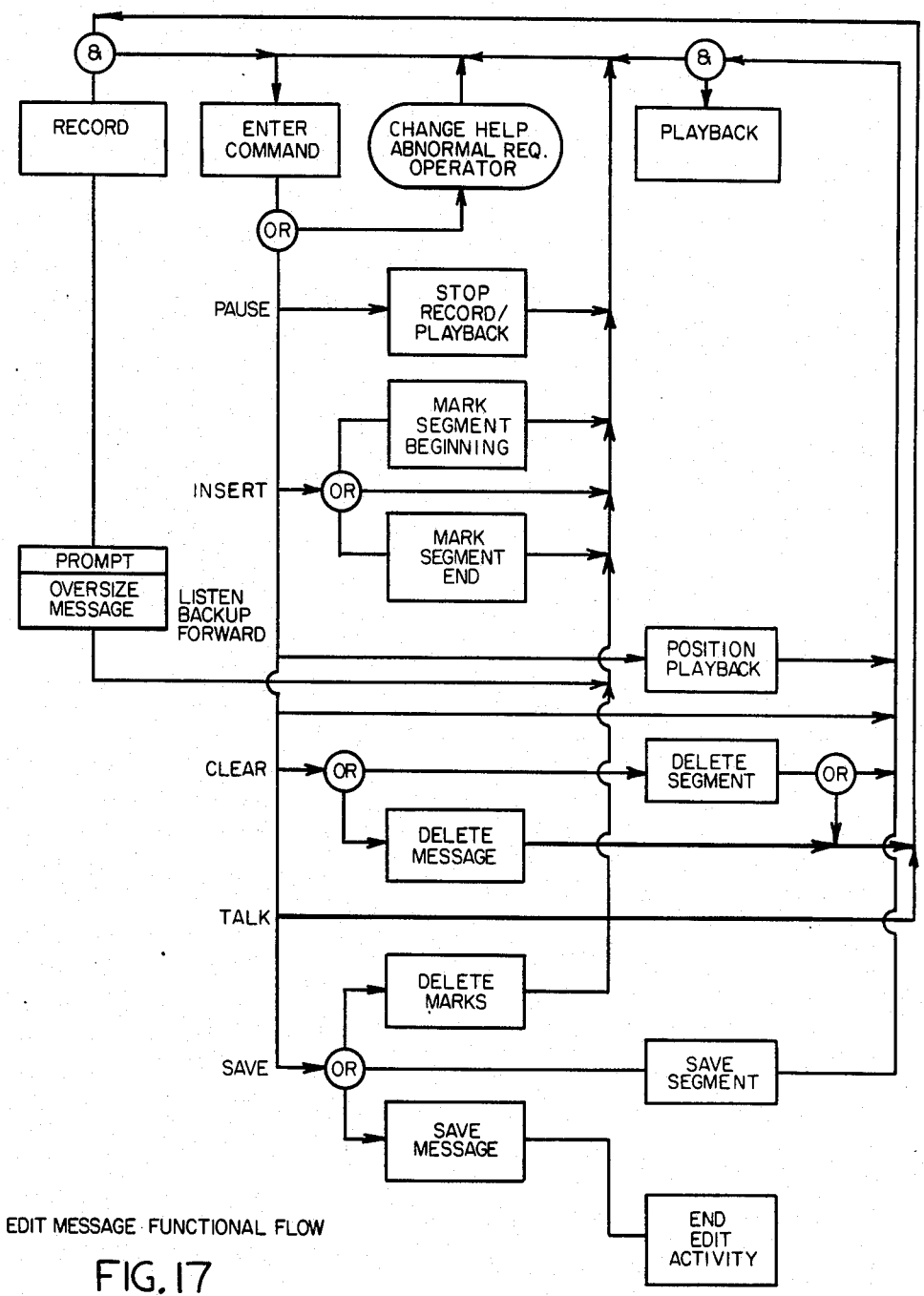
FIG. 17 is an edit message functional flow diagram that is useful in understanding the diagram shown in FIG. 16.

The edit messages function is illustrated in greater detail in FIG. 17 and provides the client or caller with complete voice message editing facilities. Upon invocation, this function records the signals received over the telephone line and simultaneously monitors these signals for DTMF tones representing client commands as shown by the record and enter command functions. Command entry causes one or more of the subsidiary functions shown or one of the keyboard functions to be exercised. If the edit message function has been invoked by the answer call function, only the access account, help and abort options within the interrupt function are available. The commands invoking the other interrupt functions are ignored. The commands invoking the various voice message service system edit controls are shown to the left of the flow line leading to the subsidiary function.

The pause command is embedded in every client command as its first DTMF character. Hence, the stop record/playback functon always performs as any part of any command entry. The record function is invoked as the result of a talk command. The oversize message prompt is issued by this function as a message exceeds the client parameter maximum message size. Under certain conditions, the save command terminates operation of the edit message function. Otherwise, all other commands eventually result in the invocation of the enter command and/or playback function. The action of the insert command depends upon whether it is the first, second, or subsequent entry of this command during a particular client activity. If it is the first entry, the mark segment beginning function is invoked. If it is the second entry, the mark segment end function is invoked. Subsequent entries are ignored. The action of the clear command depends upon the current state of the insert commands. If one command is in effect, the delete segment function is invoked and then the enter command and record functions are invoked. If two insert commands are in effect, the delete segment function is also invoked. In this case, however, the enter command and playback functions are invoked following the deletion. If no insert is in effect, the delete message function is invoked. In any case, no insert command is in effect when the action is completed.

The action of the safe command also depends upon both the current state of the insert command and whether or not anything has actually been recorded since the first insert command was entered. If an insert is in effect and anything has been recorded, the save segment function is invoked. If an insert is in effect and nothing has been recorded, the delete marks function is invoked and if no insert command is in effect, the save message function is invoked. In all cases, no insert command is in effect when the action is completed. Usage data collected within this function includes net amount of storage used.

The record function directs recording of the non-DTMF signal received over the voice channel associated with the call. DTMF tones are not recorded. On each invocation of this function, a tone prompt is provided to indicate that recording is now in progress. The enter command function directs the monitoring of the signal received over voice channel associated with the call for DTMF tones. If a tone is detected, it is analyzed for the DTMF characters received, and if a client command has been entered, it invokes the function appropriate to the command.

The playback function directs playback of the message over the voice channel associated with the call. The stop record/playback function suspends the action of the record or playback functions. The mark segment beginning function notes the current position of the message as a segment beginning. The mark segment end function notes and marks the current position in the message as a segment end.

The position playback function positions the messages for playback in accordance with the command causing invocation. If invoked by the backup command, it positions the message backwards by a factor equivalent to the system parameter positioning precision or to the beginning of the message if application of the factor so dictates. If invoked by the forward command, it positions the message forward by a factor equivalent to the system parameter positioning precision or to the end of the message if application of the factor so dictates. If invoked by the listen command, it positions the message to its beginning. After positioning the message, the playback function is invoked.

The delete segment function deletes the portion of the message between the segment beginning and segment end. If segment end has not been specified, it deletes the portion of the message following the segment beginning. It deletes the notations of segment beginning and segment end. If, after the deletion, the segment end is not also the end of the message, it positions the message to the point immediately following the end of the deleted segment. If the segment end is also the end of the message, it positions the message to a point immediately following the end of the deleted segment.

The delete message function deletes the entirety of the message so far recorded.

The save segment function saves the segment of the message just recorded (i.e., the portion of the message recorded since the first insert command was recognized). The segment is logically entered into the message at the point noted as the segment beginning. If a segment end is in effect, the function deletes the portion of the original message between the segment beginning and segment end. Upon playback, the message, including the segment, is heard as a single continuous message. At the completion of this function either the segment beginning or segment end exist (i.e., the effect of the insert commands will have been cancelled).

The delete marks function deletes the notations of segment beginning and of segment end.

The save message function preserves the message recorded, if any, for disposition by the function that originally invoked the edit message function.

The send message function which is indicated in FIG. 14 and illustrated in greater detail in FIG. 18, provides clients with the capability of recording and sending one or more messages to clients or nonclients at a single session. Upon invocation, the send message function examines the client outbasket. If the total number of messages in the message basket (i.e., the sum of the message in the inbasket plus those in the outbasket) exceeds the client service parameter maximum number of messages, it provides the message basket full prompt and immediately invokes the terminate send messages function. (The client must employ the retrieve messages function to create room in the his message basket.) However, the room created will not be available until the client enters a signoff or a valid access account command or until he hangs up.

If the message basket is not full, the send messages introduction prompt is provided and the edit message function is invoked. The client prepares his message using this function. When the client signifies to the edit message function that the message is complete, the send messages function provides the delivery instruction invitation prompt.

The client may then begin entry of the delivery instruction, in which case the accept delivery instruction function is invoked. Alternatively, the client may elect to defer providing delivery instructions by entering the save command. In either case the next instruction invoked is the place message in outbasket function. After the message has been placed in the outbasket either the command invitation prompt or message basket full prompt is provided. The message basket full prompt is provided if the number of messages currently in the message basket equals or exceeds the client service parameter maximum number of messages. If the message basket full prompt is provided, the terminate send messages function is necessarily invoked. If the command invitation prompt is provided, the client may elect to send another message (by entering the top command), or he may terminate the message sending activity (by entering any of the change function commands or the signoff command or by hanging up). In the latter case, the terminate send messages function is invoked.

Figure 19:
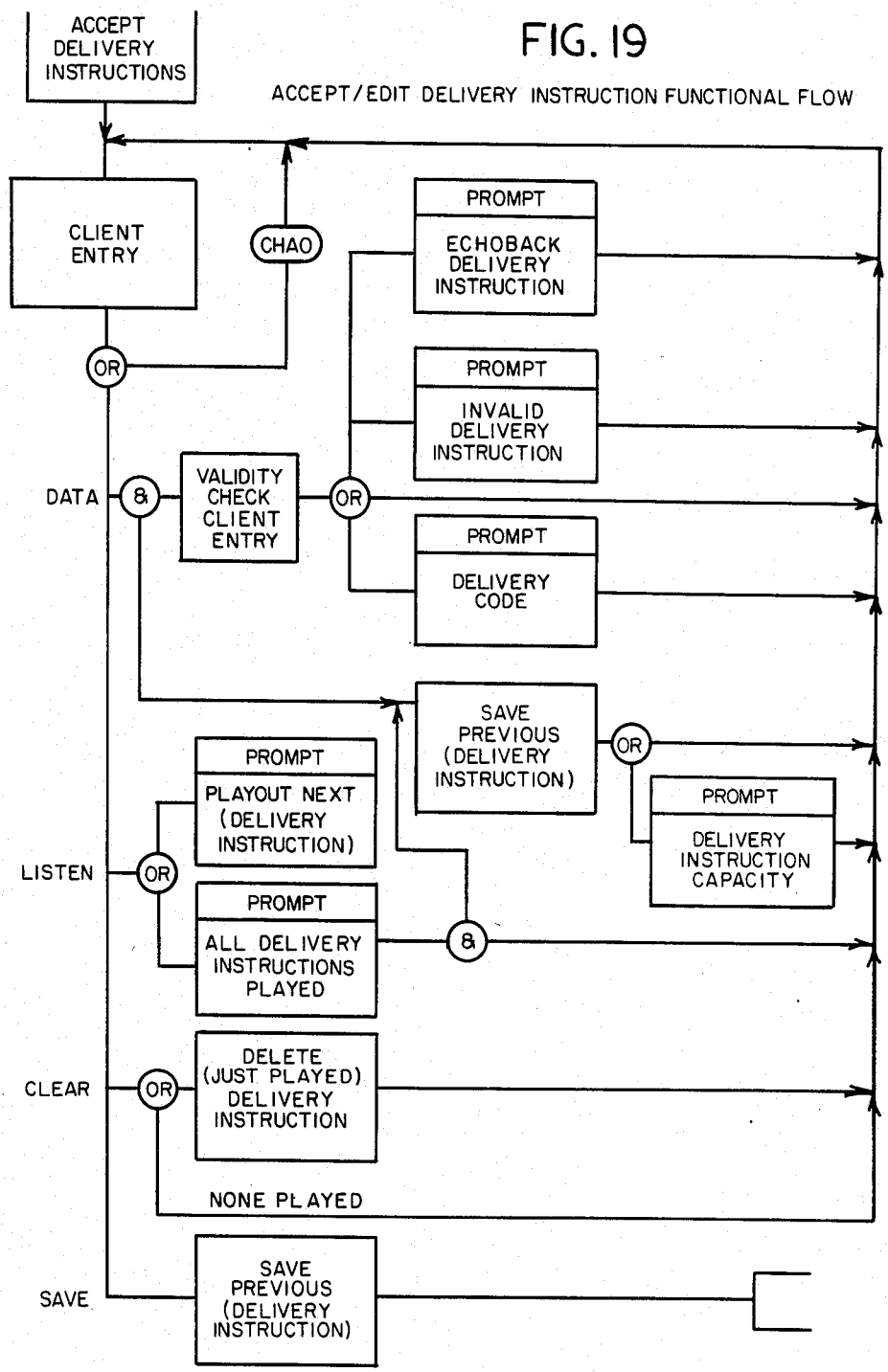
FIG. 19 is an accept/edit delivery instructions functional flow diagram that is useful in understanding the diagram shown in FIG. 18.

The accept/edit delivery instructions function shown in FIG. 18 is illustrated in greater detail in FIG. 19. A delivery instruction consists of a delivery address and a delivery code. The set of delivery instructions associated with the message is a set of delivery address/delivery code pairs ordered by the sequence in which they were entered by the client with the delivery address always preceding the delivery code. In the absence of the accept/edit delivery instructions function, an element is either member of the pair (i.e., a delivery address or a delivery code). An element is entered by the client using the data syntax. To enable the client to enter and verify his delivery instructions, the voice messaging service system enters into a dialog with him. It accepts an input from him, plays out a prompt or element, and accepts an instruction from him. This instruction may direct playout of another element, delete the element display, or may be the next element. When an element has been played out, the next instruction also determines the disposition of the element just played.

The accept/edit delivery instructions function has basically four subsidiary functions which are: client entry, validity check client entry, save element, and delete element. Depending on the client instruction that caused invocation of the save element function, this function may act upon the just played element, the current element or the previous element in the ordered set of delivery instructions. The echo-back element prompt may apply to the just entered, the next, the previous, or the current element. In FIG. 19 this fact is indicated by the parenthetical comment included along with the function representation.

The client entry function accepts entry in both command and data syntax. The commands may cause a prompt to be provided, one or more of the subsidiary functions to be exercised, or one of the change function, help, abnormal terminal request, or operator (CHAO) functions to be exercised. The commands associated with a particular flow line are shown to the left of the line.

The information comprising a delivery instruction is entered using data syntax and such an entry causes both the validity check client entry and save element functions to be invoked. As a result of its operation the validity check client entry function provides the echo-back element prompt, the invalid element prompt, or the next element prompt. The save element function monitors the number of delivery instructions entered. As a result of its operation, it may cause the delivery instructions capacity prompt to be provided.

The various commands entered by the client permit the client to step through the set of delivery instructions, delete elements, and terminate operation of the function. Instruction entered by the client, the save element, function may or may not be invoked.

The forward command causes either the echo-back (next) element prompt to be provided and save (previous) element function to be invoked or all the elements played prompt to be provided. In enables the client to step through the set of elements in a forward direction.

The backup command causes either the echo-back (previous) element prompt to be provided and the save (current) element function to be invoked or has the same effect as the listen command. It enables the client to step through the set of elements in a backward direction.

The listen command causes the first element to be provided and then the echo-back (first) element prompt to be provided. It places the client at the beginning of the set of elements. The continue command causes the echo-back (current) element prompt to be provided. The clear command causes the delete element function to be invoked if an element has just been echoed. The command has no effect otherwise. The save command invokes the save element function if needed and terminates operation of the accept delivery instruction function.

The client entry function directs monitoring of the signal received over the voice channel associated with the call for DTMF tones. If a tone is detected the function determines if the entry is employing data syntax or command syntax. When the entry is complete and if the entry is in need of syntax, the function invokes the validity check client entry in save previous functions.

On a shared line allowing entry of partial message basket numbers, the data entered by the client is assumed to be low order digits of the message basket number and is concatenated with the base number to form the message basket number. If the entry is in command syntax and if it requests one of the CHAO functions, the requested function is invoked.

If the command is forward and there is no next element, the all elements play prompt is invoked. If there is a next element it is echoed. If the command is in response to the echo of an element, the save element function is invoked from the previously echoed element. If the command is not in response to the echo of an element, the save element function is not invoked.

If the command is backup and if there is at least one delivery address in the set of delivery instructions, and if there is no prior element, the first element prompt is provided followed by the echo-back element prompt for the first element in the set of delivery instructions.

If the set of delivery instructions is empty, the backup end is ignored. If there is a prior element it is echoed. If the command is not in response to the echo of an element, there can be no further action and the client entry function is again invoked. If the command is in response to the echo of an element, the save element function is invoked for the previously echoed element. Note that echo of the delivery code precedes the delivery address. If the command is listen and the set of delivery instructions is empty, the listen command is ignored. If the command is listen and if there is at least one delivery address in the set of delivery instructions, the first element prompt is provided followed by the echo-back element prompt for the first element in the set of delivery instructions. If the command is continue and if the command is in response to the echo of an element, the echo-back element prompt is provided using the same element. Otherwise the continue command is ignored.

If the command is clear and if the command is in response to echo of an element, the delete element function is invoked for that element, otherwise, the clear command is ignored.

If the command is save and if the command is in response to the echo of an element, the save element function is invoked for that element. Operation of the accept delivery instructions function is then terminated. All other commands are ignored.

The validity check client entry function shown in FIG. 19 recognizes an entry in data syntax as consisting of a delivery code, a message basket, a telephone number or a distribution list in accordance with the number of digits in the item. Where one digit represents a delivery code, two digits represent a distribution list, three to nine digits represent a message basket number, and ten or more digits represent a telephone number. If the entry is not valid, the invalid element prompt is provided and the client entry function is invoked.

If the entry is valid, it is echoed back to the client and the client entry function is invoked. The save element function is invoked as previously indicated.

If special instructions (those not covered by standard addresses or preestablished delivery codes, e.g., delivery may be made to either John Doe or Mary Smith) are required on an address, then the client obtains a voice message service information operator by entering the request operator command. The save element function is invoked by the client entry function if the entry is in response to the echo-back element prompt and if the entry is not a clear command. This function saves the delivery instructions and monitors the number of addresses to which the message is being sent. In all cases the function saves an element that was echoed back. In certain cases the function saves an additional element or a delivery code as follows:

1. If the client service option delivery codes employed is not in effect, the function also saves a delivery code element for the address just echoed. The delivery code value is immediate.

2. If the client service option delivery code employed is in effect and if the element echoed back was not a delivery code, the function saves a delivery code element for the address just echoed. The delivery code value corresponds to the value established by the client service option default delivery option.

If a distribution list identified was echoed back, the set of delivery addresses and delivery codes comprising the distribution list is explicitly saved. Upon replay of the set of delivery instructions associated with the message, each delivery instruction in the distribution list is explicitly echoed and the distribution list identifier cannot be retrieved. If a number of addresses exceeds the client parameter maximum number of addresses, no further delivery instructions can be saved and the delivery instruction capacity prompt is provided.

The delete element function deletes any element just played back to the client.

The place message in outbasket function illustrated in FIG. 18 is invoked subsequent to the accept delivery instructions function and places the message in the client outbasket and monitors the number of messages in the message basket.

The originator (sending client) retains ownership of a message until it has been received by all addressees. Until received, the originator may cancel the message, edit it, or change delivery instructions using the retrieved messages function if appropriate client service options are in effect.

The terminate send messages function schedules message delivery. If a message is being delivered to a client, it appears in the client's inbasket at the time specified in the delivery instruction. If a message is being delivered to a telephone number, the telephone delivery function is invoked (message delivery FIG. 14) at the time specified in the delivery instruction.

The terminate send messages function prepares a summary of client send messages activity including:
1. Client identification.
2. Message basket identification.
3. Time activity began.
4. Time activity ended.
5. Process time used.
6. Change in disk storage used.

The terminate and send messages function also prepares a detailed record of client retrieved message activity on a message by message basis that includes:
1. Client identification.
2. Message basket identification.
3. Message identification.
4. Time playout began.
5. Time playout ended.
6. Dispostion of message and special services employed (e.g., cleared, saved, replied, amended, redirected, operator assistance functions employed, etc.).
7. Processor time used.
8. Disk accesses used.
9. Change in disk storage used.

Figure 20:
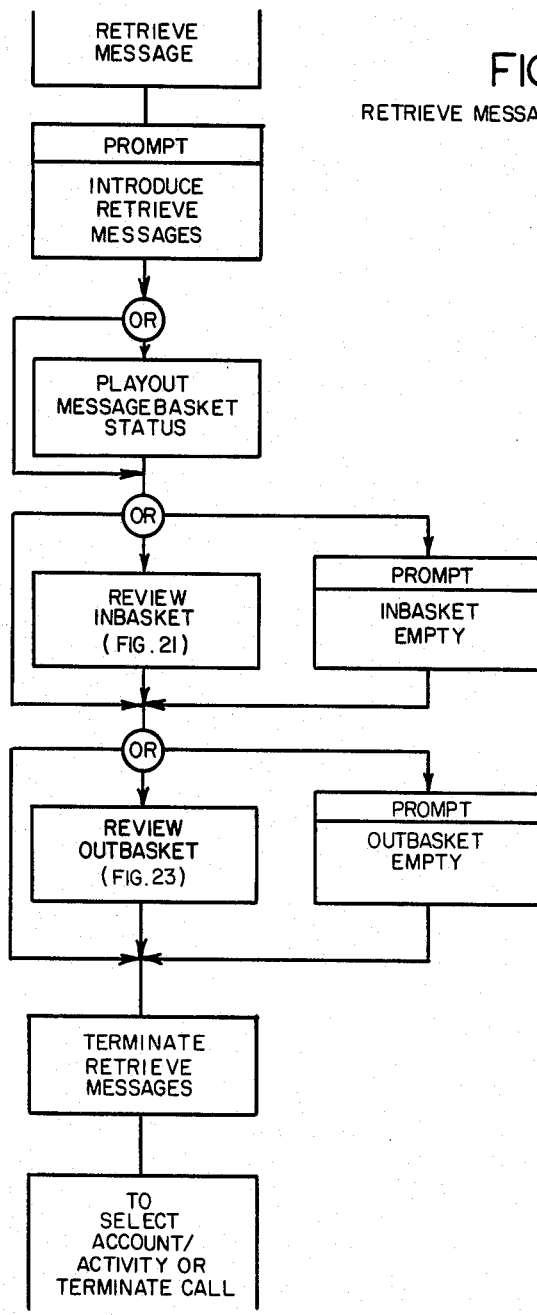
FIG. 20 is a retrieve messages functional flow diagram that is useful in understanding the diagram shown in FIG. 14.

The retrieve messages function shown in FIG. 14 is illustrated in greater detail in FIG. 20. This function provides the capability for a subscriber to retrieve messages within his message basket. When a client enters his PIN code number, voice message service system 100 recognizes the caller as a client and invokes the retrieve messages function. The retrieve messages function begins with the introduce retrieve messages prompt. Following this prompt invocation of the playout message basket status, review inbasket, and review outbasket functions is dependent upon a client's service option. A separate option controls the availability of each of these functions.

Invocation of review inbasket and review outbasket functions is also dependent upon the presence of messages in the inbasket or outbasket. If no messages are present, the function is not invoked. In this case, if the playout message basket status function has not been invoked, the inbasket empty or outbasket empty prompt respectively is provided.

The playout message basket status function begins with a message basket status prompt. This prompt reports the number of received messages, if any, available for retrieval by a client and the number of messages, if any, awaiting delivery, or the fact that the entire message basket is empty. The review inbasket function is shown in greater detail in FIG. 21 and enables the client to listen to the messages in his inbasket. If there are no messages in the inbasket, this function has not been invoked. Consequently, it shall commence playout of the messages and simultaneously await entry of a client command. Client commands invoking the CHAO functions, the delete message function, and the retain message function are always effective if the review inbasket function can be invoked. The commands invoking the remaining functions are effective if the appropriate client service functions are in effect.

Upon completion of message playout, delete message, retain message, or the valid reply redirect sequence, voice message service system 100 plays out the next message in the inbasket, or if all messages have been reviewed, the inbasket review complete prompt. Messages are played in reverse order of receipt (i.e., the last message received is the first message played out). The playout message status function always repositions the current message back to the beginning. The reply function is not invoked if there is no room for reply in the client's message basket. Instead, the message basket full prompt is provided. The await client command function shown in FIG. 21 directs the monitoring of the signal received over the voice channels associated with a call for DTMF tones. If a tone is detected and if the tone is in command syntax, this function suspends playout of the message. If the command requests one of the CHAO functions, the request function is invoked. If the command is continue, playout of the message is reinstated at the point it was suspended. If the command is clear, the delete message function is invoked. If the command is save, the retain message is invoked. If the command is listen and the appropriate client service option is in effect, the provide message status function is invoked. If the command is talk and the client service option allowing reply/redirect is in effect, the reply/redirect function is invoked. If this option is not in effect, the talk command is ignored. All other commands are ignored although the playout is suspended. The playout message function shown in FIG. 21 directs playout of a message over the voice channel associated with a call.

The provide message status function provides the time of receipt prompt, repositions the message to its beginning, and reinstates playout of the message after the time of receipt prompt has been provided. The form of the time of receipt prompt subject to a client service option and may be either precise (e.g., message received at 1:30 p.m. on the 6th of June) or general (e.g., message received this morning). At the time the message was delivered, the time of receipt (TOR) was associated with the message.

If the general form of this prompt is used, it shall use the time at which this in-progress call was begun to compute the length of time the message has been in the inbasket. The precision of this computation shall be one-quarter hour. This duration, D, and the time of receipt (TOR), are, shall be used to select the general time of receipt (GTOR) prompt.

Figure 21:
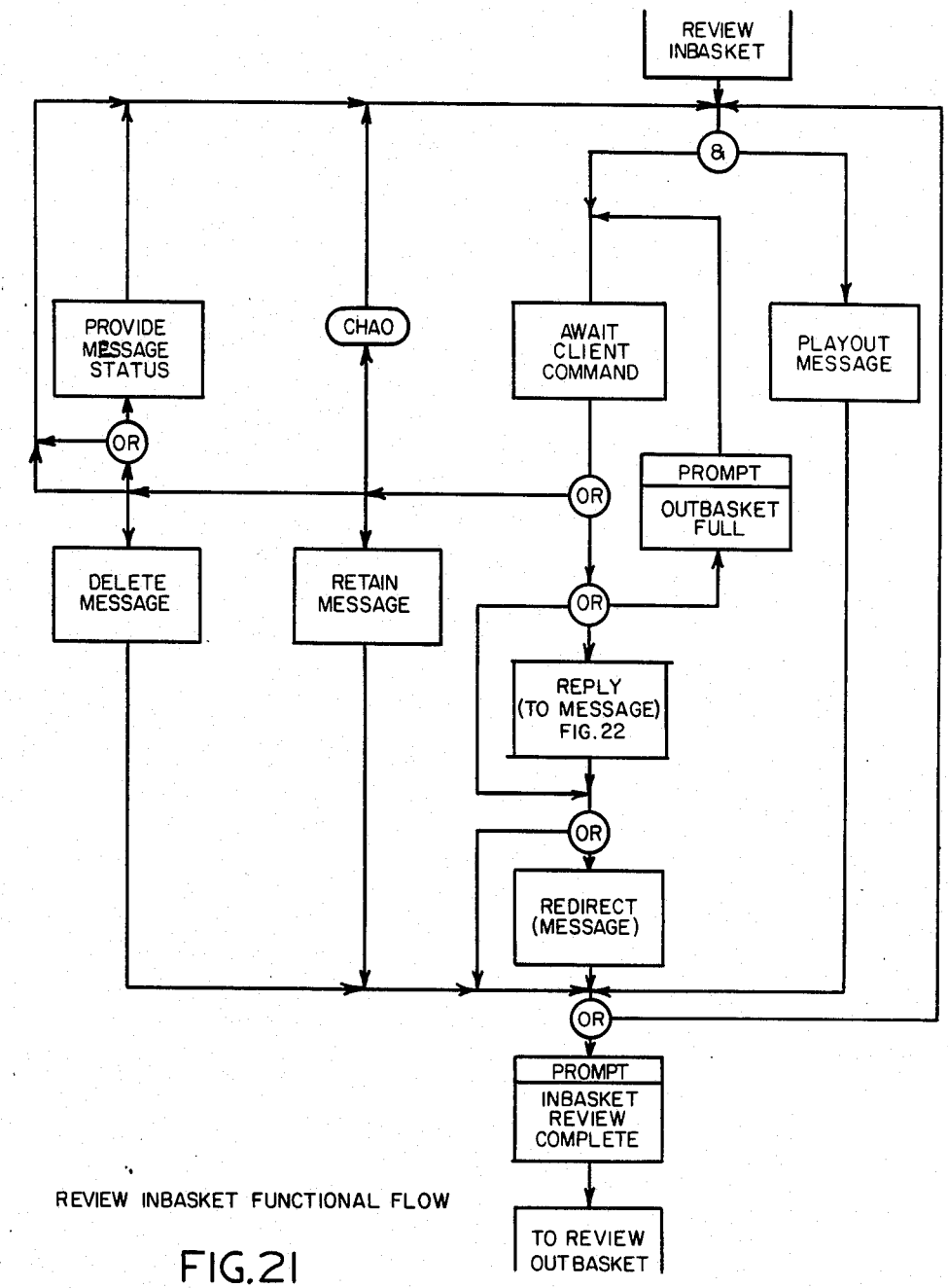
FIG. 21 is a review inbasket functional flow diagram that is useful in understanding the diagram shown in FIG. 20.

The delete message prompt shown in FIG. 21 deletes the entirety of the message and invokes the delete acknowledgement prompt.

The retain message function preserves the recorded message for subsequent use of the client and provides the save acknowledgement prompt. It notes that the message has been played out.

The reply and redirect functions provide the capability to record a commentary to a received message. Depending on a client instructions, the commentary is returned to the originator of the message as reply, or redirected to a set of addresses specified by the client, with or without the original message.

Figure 22:
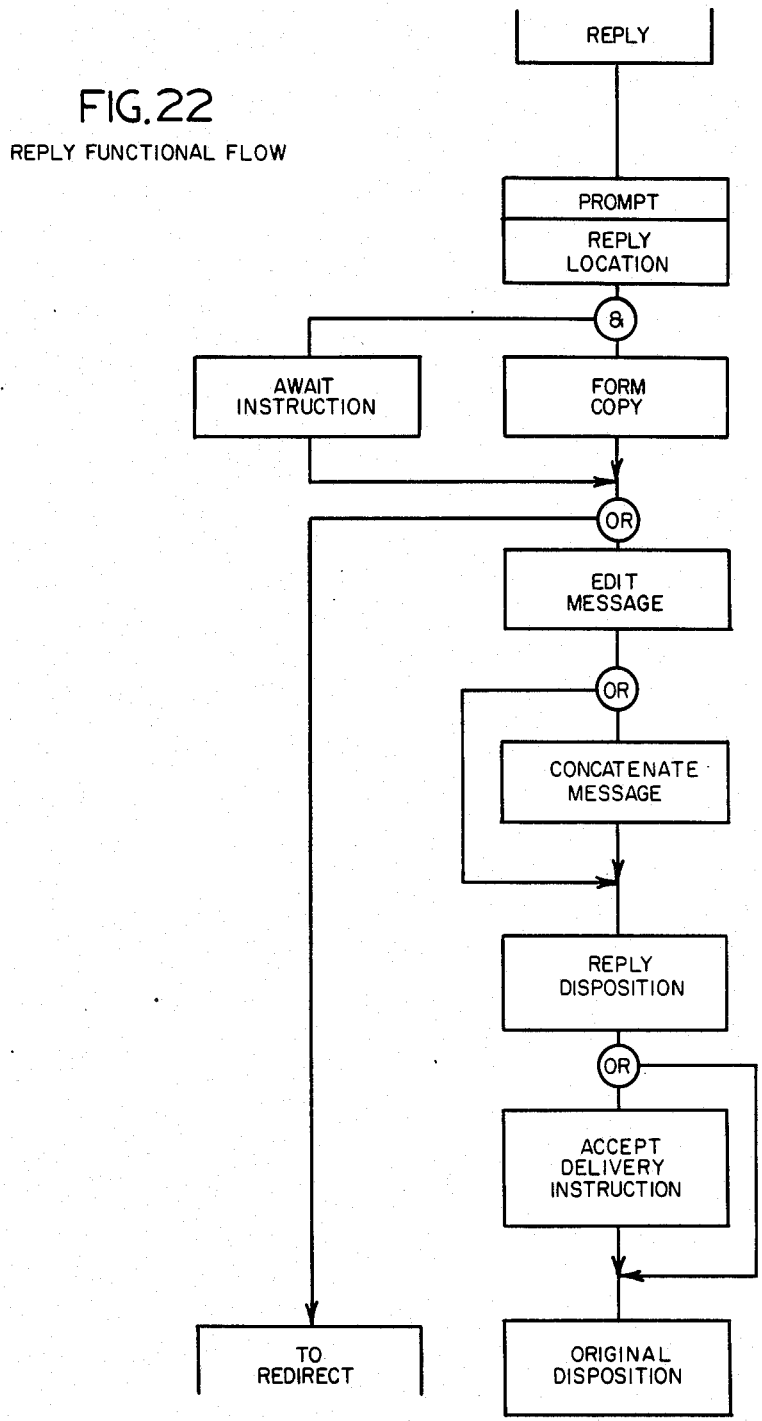
FIG. 22 is a reply functional flow diagram that is useful in understanding the diagram shown in FIG. 21.

The reply functional flow is illustrated in greater detail in FIG. 22 which shows the prompts and subsidiary functions employed by the reply/redirect functions.

These functions are not invoked unless the appropriate client service option is in effect and there is room in the client's message basket for the reply. Upon invocation, the function provides the reply location prompt, invokes the form copy function to place a copy of the client's inbasket message into his outbasket, and invokes the await instruction to obtain the response to the reply location prompt.

The response to this prompt indicates that the reply is to preface the original message, to replace the original message, to be appended to the original message or that the message is merely to be redirected. In the first three cases the message function shall be invoked and in the fourth case accept edit delivery instructions function shall be invoked.

Upon normal completion of the edit message function, the concatenate messages function is invoked if the response to the reply location prompt indicated that the reply was to preface or be appended to the original message. The reply disposition function is then invoked. Client instructions within the reply disposition function may effectively redirect the reply. In this case, the set delivery instruction function is invoked. The reply function concludes by invoking the original disposition function.

The await instruction of FIG. 22 directs monitoring of the signal received over the voice channels associated with a call for DTMF tones. If a tone is detected, the function analyzes the DTMF characters received, and if the client command has been entered, the function invokes the function appropriate to the command. If a command invoking one of the CHAO functions is detected, the requested function is invoked. If a talk command is detected, it is interpreted as an indication that the reply is to be appended to the original message. If a save command is detected, it is interpreted as an indication that no reply is planned and the message is merely being redirected. If a clear command is detected, it is interpreted as an indication that the reply is to replace the original. If an insert command is detected, it is interpreted as an indication that the reply is to preface the original message. All other commands are ignored. The form copy function places a logical copy of the current inbasket message in the outbasket. The edit message function has been previously described. The message being edited is the current outbasket message which was just created by the form copy function.

The concatenate messages function concatenates the current inbasket message with the current outbasket message and places the result in the outbasket. If the response to the reply location prompt was the insert command, the outbasket message precedes the inbasket message. If the response to the reply location prompt was the save command, the inbasket message precedes the outbasket message.

The reply disposition function provides the reply disposition prompt. This prompt identifies the address of the sender of the current inbasket message. In response to this prompt, a command invoking one of the CHAO functions, a save command, a clear command, or an entry in data syntax may be received. If a command invoking one of the CHAO functions is received, the requested function is invoked. If a save command is received, the delivery instruction for the reply consists of the address of the sender of the current inbasket message with a delivery code of immediate. The original disposition function is invoked. If a clear command is received, the sender of the original message is not included in the delivery instructions (i.e., no delivery instructions are now associated with the reply), and the edit/accept delivery instructions function is invoked. If an entry in data syntax is received, the delivery instruction associated with the reply is the same as that provided if the save command had been entered. However, the edit/accept delivery instructions function is invoked before the original disposition function.

The client may redirect a received message entering delivery instructions for the message. This function provides the addressee invitation prompt and invokes the edit/accept delivery instruction function.

The original disposition function provides the original disposition prompt. In this response to this prompt a command invoking one of the CHAO functions, a save command or a clear command may be received and acted upon. All other commands are ignored. If a save command is received, retain message function is invoked. If a clear message is received, the delete message function is invoked.

Returning to FIG. 20, the review outbasket function enables the client to listen to the messages in his outbasket and, especially, the delivery instruction associated with them. It also enables him to complete sending, editing, or addressing of a message whose composition was interrupted. This function is illustrated in greater detail in FIG. 23 to which reference is now made.

If there are no messages in the outbasket the review outbasket function has not been invoked. Consequently, this function commences playout of the messages and simultaneously awaits entry of a client command. Client commands invoking the CHAO functions, the delete message function, and the retain outbasket message function are always effective if the review outbasket function can be invoked. The commands invoking the remaining functions are effective if the appropriate client service options are in effect.

Upon completion of the message playout, delete message, retain message outbasket message, or the valid amendment sequence, the voice message service system 100 either plays out the next message in the outbasket or, if all messages have been reviewed, the no more messages prompt. Messages are played in reverse order of entry. The provide delivery status function always repositions the current message to the end of the message and the beginning of the delivery instructions.

The await outbasket command function directs monitoring of the signal received over the voice channels associated with the call for DTMF tones. If a tone is detected and if the tone is in command syntax, this function suspends playout of the message. If the command requests one of the CHAO functions, the requested function is invoked. If the command is continued, playout of the message is reinstated at the point it was suspended. If the command is clear, the delete message function is invoked. If the command is save, the retain message function is invoked. If the command is listen and the appropriate client service option is in effect, the provide delivery status function is invoked. If the command is talk and the client service option allowing amendment is in effect, the amend message/instructions function is invoked. If the option is not in effect the talk command is ignored. All other commands are ignored although the playout is suspended.

The playout of the message function is followed by playout of the delivery instructions.

The provide delivery status function skips playout of the current message and provides the delivery status prompt. This prompt reports the status of each message awaiting delivery or for which delivery acknowledgement was specified. The delivery status of a message is reported as pending, unaddressed, delivered or undelivered. Additional status information is provided as follows:

1. For pending and undeliverable status in the event of message basket delivery, date/time of availability to the addressee for message retrieval. For pending an undeliverable status in the event of telephone delivery, date/time of most recent attempt and reason (busy, no answer, etc. of other reason as determined by the voice message service system information operator on assisted delivery attempt).

2. For delivered status the delivery date and time. This status exists only for messages with delivery acknowledgement specified in delivery instructions. Until all addressees have received the message, the sender can obtain delivery status from the voice message service information operator.

3. For unaddressed status, none.

The delete message function has been previously discussed.

The skip to delivery function causes a skipping of the playout of the current message and commences playout of its associated delivery instruction. The message remains in the outbasket.

Figure 23:
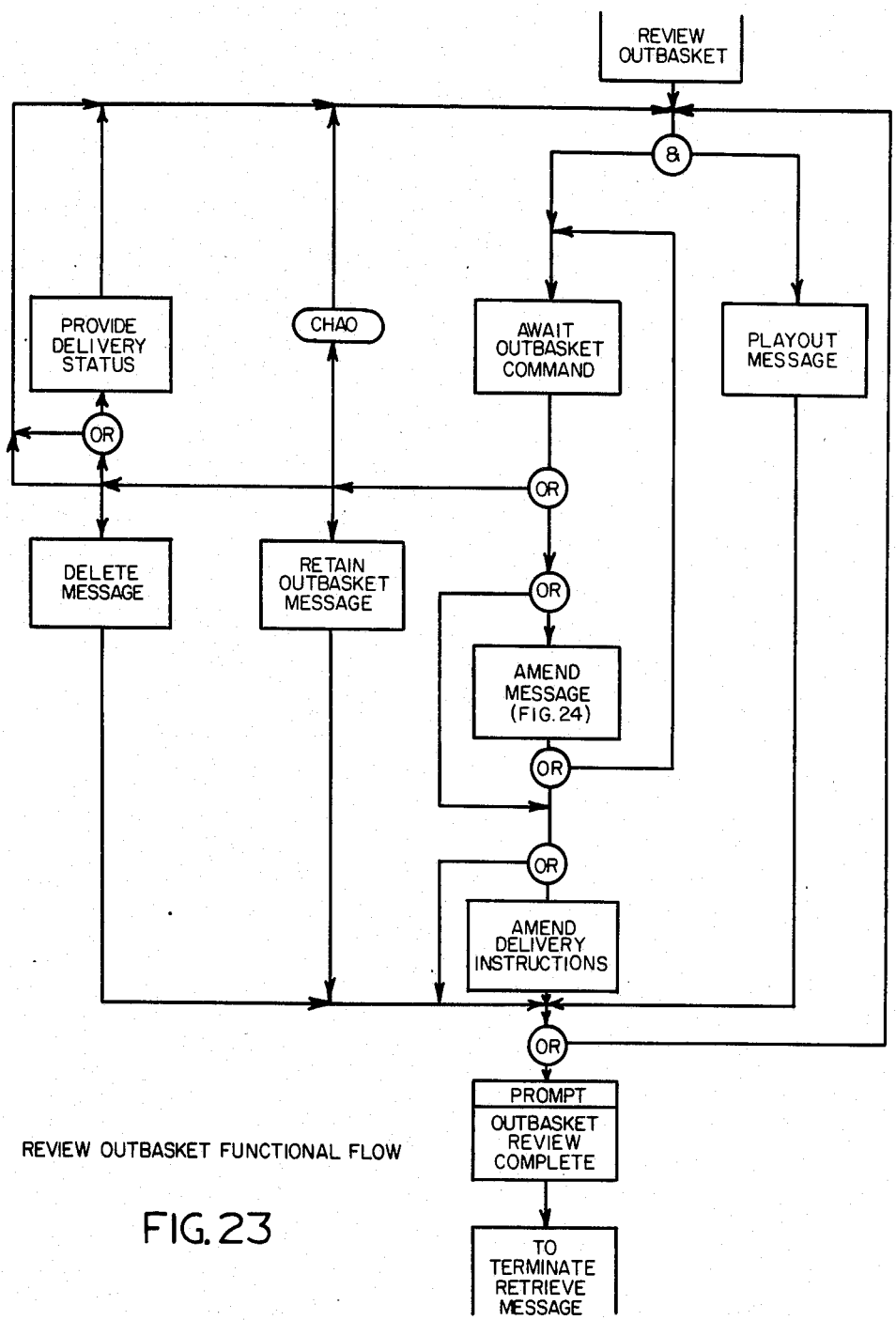
FIG. 23 is a review outbasket functional flow diagram that is useful in understanding the diagram shown in FIG. 20.
Figure 24:
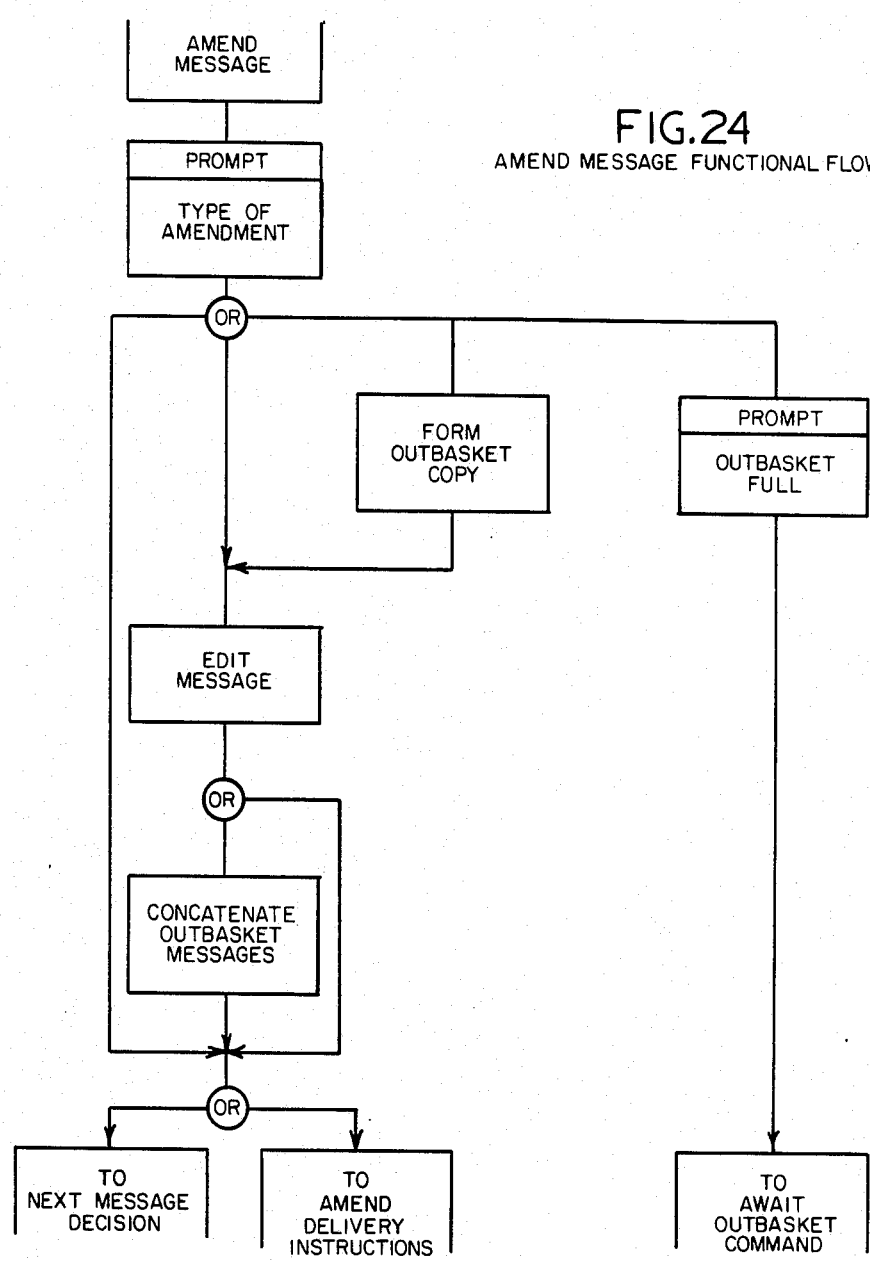
FIG. 24 is an amend message functional flow diagram that is useful in understanding the diagram shown in FIG. 23.

The amend message function shown in FIG. 23 is illustrated in greater detail in FIG. 24. This function provides the capability of amending a message and is not invoked unless the appropriate client service option is in effect. Upon invocation it provides the type of amendment prompt, and waits to obtain the response to this prompt.

Response to this prompt will indicate that the amendment is to preface the current message, to be appended to the current message, to replace the current message or that only addresses are to be amended. In the first two cases, if room is available in the outbasket, the form outbasket copy function is invoked. If room is not available, the outbasket full prompt is provided. If the copy is formed and always in the third case, the edit message function is invoked. In the fourth case, the amended delivery instruction function is invoked if the client service option allows and ignored if it does not.

Upon normal completion of the edit message function, the concatenate messages function is invoked if the response to the type of amendment prompt indicated that the reply was to preface or to be appended to the original message. If the client service option allows, the amendment delivery instructions function is then invoked.

If in response to the type of amendment prompt a command invoking one of the CHAO functions is detected, the request function is invoked. If a talk command is detected, it is interpreted as an indication that the amendment is to be appended to the original message. If a save command is detected, it is interpreted as an indication that only delivery instruction amendment is planned. If a clear command is detected, it is interpreted as an indication that the amendment is to replace the original. If an insert command is detected, it is interpreted as an indication that the amendment is to preface the original message. All other commands are ignored.

The form outbasket copy function places a logical copy of the current outbasket message in the outbasket (i.e., two copies of the message are now in the outbasket).

The edit message function has been explained previously.

The concatenate outbasket messages function concentrates the original message with the original message and places the result in the outbasket. If the response to the type of amendment prompt was the insert command, the amended message precedes the original message. If the response to the type of amendment prompt was the save command, the original message follows the amended message.

The amend instructions function shown in FIG. 23 provides the amendment instructions prompt. In response to this prompt, a command invoking one of the CHAO functions, a list command, a save command, a clear command, or a entry in data syntax may be received. If a command invoking one of the CHAO functions is received, the request function is invoked.

If a listen command is received, the accept delivery instructions function is invoked and playout of the delivery instructions, if any, or the no delivery instruction prompt will occur as described for that function.

If a save command is received the delivery instructions associated with the original message are also associated with the amended message. Playout of the next outbasket message or the no more messages prompt will then occur. If an entry in data syntax is received, the delivery instructions associated with the original message are also associated with the amended message and the accept/edit delivery instructions function is invoked. All other commands are ignored.

The terminate message retrieval function shown in FIG. 20 is invoked to schedule or cancel message delivery as appropriate if an addressed reply to an inbasket message, an amended and addressed outbasket message or amended delivery instructions to an outbasket message exist. This function prepares a summary of client retrieved messages activity including:
1. Client identification.
2. Message basket identification.
3. Time activity began.
4. Time activity ended.
5. Processor time used.
6. Change in disk storage used.

This function prepares a detailed record of client retrieve message activity on a message-by-message basis that includes:
1. Client identification.
2. Message basket identification.
3. Message identification.
4. Time playout began.
5. Time playout ended.
6. Disposition of message and special service employed (e.g., cleared, saved, replied, amended, redirected, operator assistance functions employed, etc.).
7. Processor time used.
8. Disk accesses used.
9. Change in disk storage used.

Figure 25:
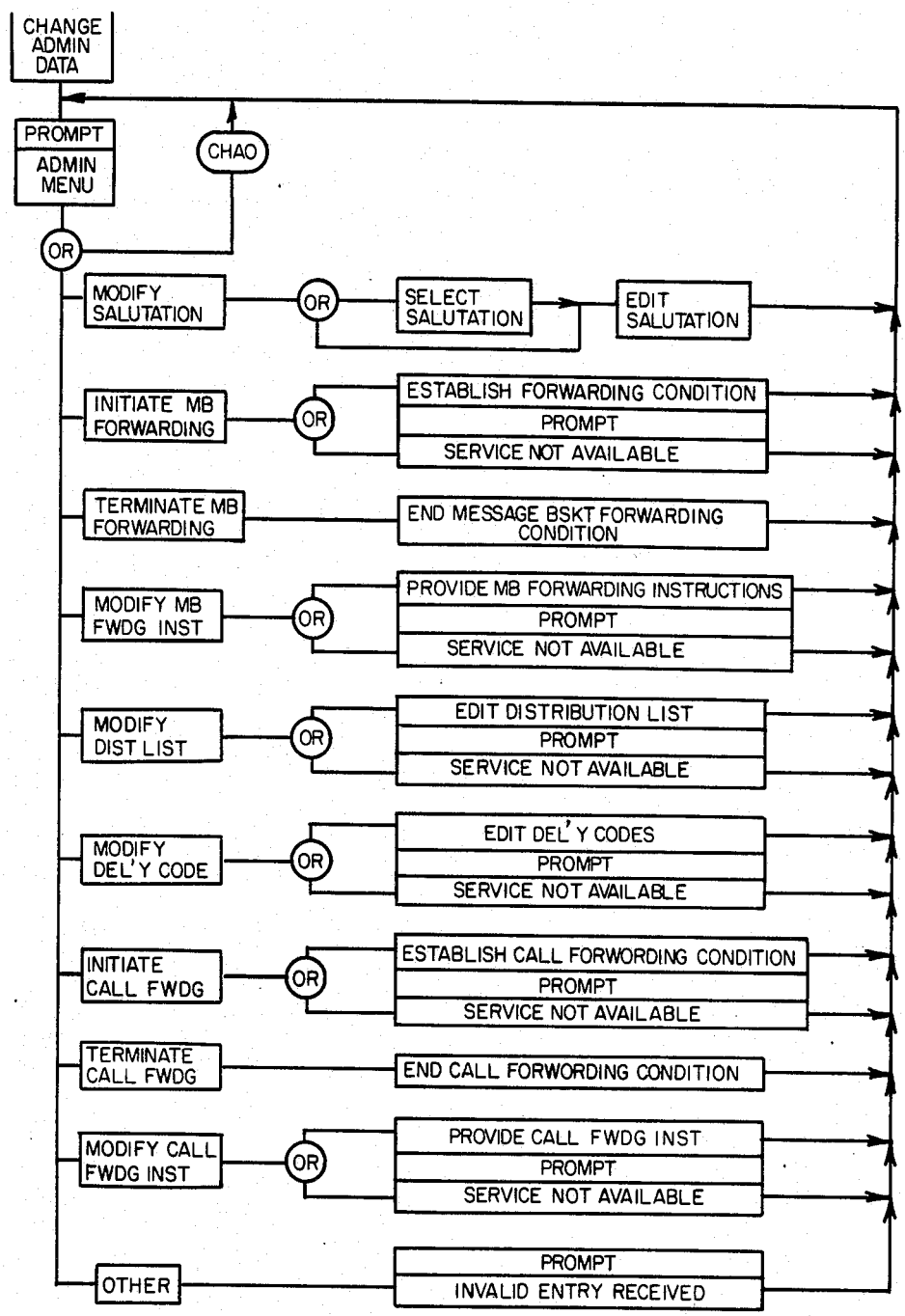
FIG. 25 is an administration functional flow diagram that is useful in understanding the diagram shown in FIG. 14.
Figure 26:
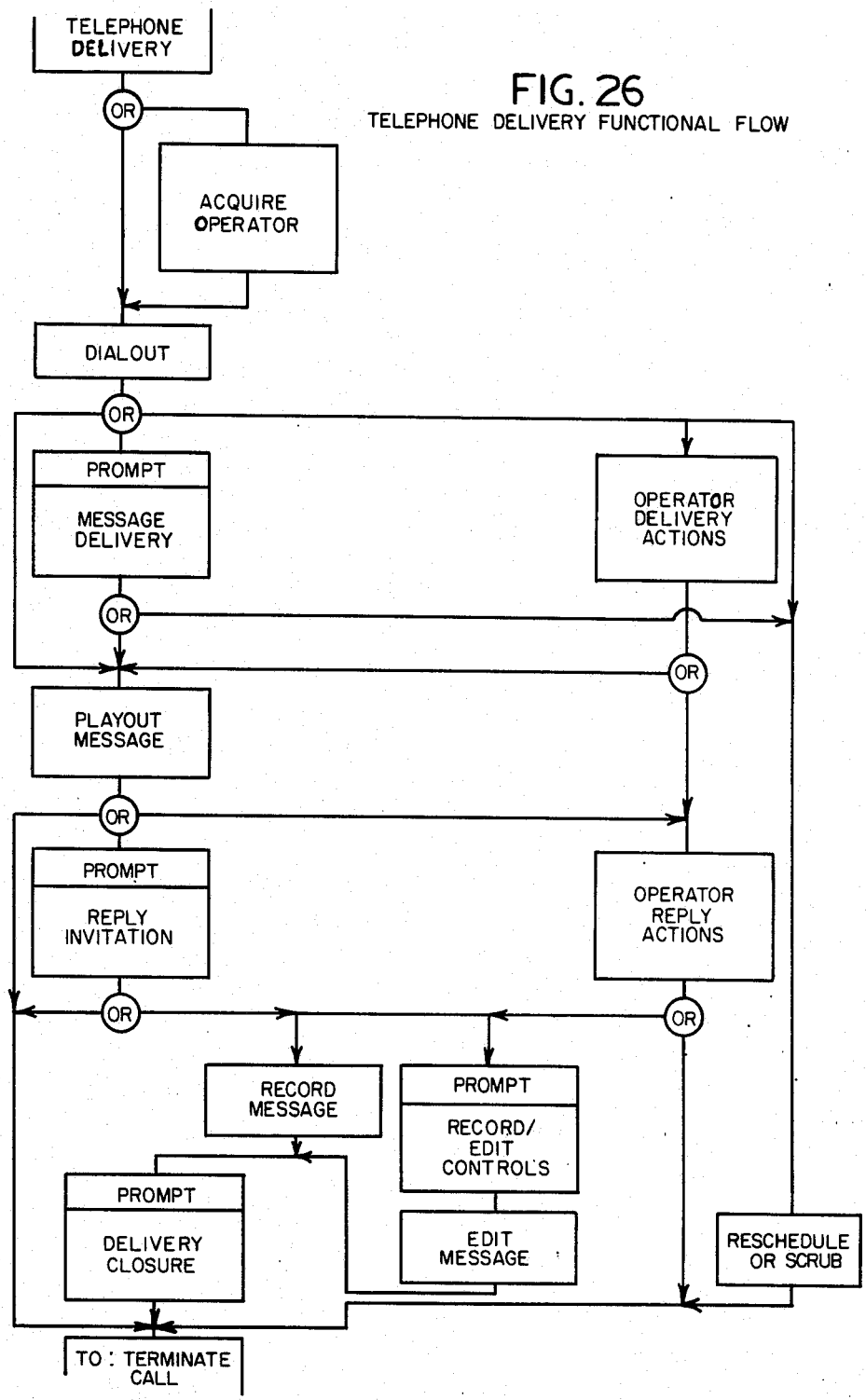
FIG. 26 is a telephone delivery functional flow diagram that is useful in understanding the diagram shown in FIG. 14.

The change administrative data function shown in FIG. 14 is illustrated in greater detail in FIG. 25. This function gives the client control over certain of the administrative and control data associated with his account. This function is invoked by the change administrative data command (*, 2, 5). In response to this command, the administrative menu prompt is provided. Selections from the menu use data syntax, not command syntax (i.e., the selection is not preceded by the asterisk key). The majority of the selections, as the menu shows, are subject to client service options.

The edit salutation function provides a client the capability of recording and altering the telephone answering voice salutation. This function is subject to a client service option. A client service option allows multiple salutations. If this option is in effect, the select salutation function is invoked to obtain identification of the particular salutation to be edited. The client is able to record a new salutation in a manner similar to recording a message as described for the send message function. The principal distinction is that no delivery instructions are required.

Upon completion of a new salutation, the system 100 replaces the current salutation with the newly recorded one. The maximum length of the salutation is specified by the system parameter maximum client salutation size. If multiple salutations are employed, the service schedule for a particular salutation may be changed using CSS.

The message forwarding function enables the client to direct the system 100 to place a telephone call to him when messages are received in his message basket. This call is handled in accord with its delivery instructions and the client service options in effect.

If immediate forwarding is specified, the system 100 attempts to forward the message within the number of minutes specified by the immediate forwarding interval. Otherwise, forwarding of messages that the client has not heard shall only be attempted during forwarding period established through customer service. The system 100 accepts forwarding instructions either directly from the client or from the client via an information operator. The system 100 establishes a forwarding condition for a client upon entry by the client of a forwarding on command. Upon receiving this command, the system 100 responds with a prompt giving either:
1. The previously established forwarding telephone number or message basket number and request confirmation of the number or
2. Requesting the forwarding number.

The client either confirms the existing number by entering the save command or enter the number using a data syntax as described for edit/accept delivery instructions. If the client enters a number, the system 100 will respond with a prompt that repeats the number for his confirmation. The system 100 deactivates a forwarding condition for a client upon the client's entry of a forwarding command. The daily start/stop time, if any, and the number of attempts and retry interval associated with the client controlled forwarding is established through CSS. CSS provides a client the capability to specify a maximum of five sets of message forwarding instructions to the system 100. An instruction contains the forwarding phone number, start date and time, end date and time of retry interval and number of retries.

The message delivery function shown in FIG. 14 delivers a message to a message basket or telephone number. As illustrated in greater detail in FIG. 26, delivery to a telephone number may be done either automatically or by operator assistance. Delivery is accomplished with operator assistance unless automatic delivery is intentionally selected by the client. If verification or identification of the called party is required, then operator assisted delivery is required.

For deliveries requiring operator assistance, the system brings an operator on-line and automatically dials the telephone number selected by the operator. When the call is answered, the system 100 information operator verifies the identity of the called party, initiates the message playout, and executes any special instructions which have been directed by the client.

For automatic delivery, system 100 dials the addressee. At the time system 100 determines that the call has been answered, the delivery prompt is played to the called party. This prompt states that there is a recorded message for delivery and requests an acknowledgement from the called party before beginning playout of the message. The message is played to the answering party upon receipt of this acknowledgement from the answering party. If this command is not received within a prompt interval, the system 100 directs connection to an information operator for assistance. The system 100 provide a client option allowing automatic delivery without acknowledgement.

In cases where a called telephone number is not answered on the first attempt, the system 100 continues to attempt delivery at intervals and for the number of retries established in delivery instructions. In addition, most delivery attempts resulting in a "busy" are retried in the number of minutes specified in the busy retry interval to the maximum specified by busy retry count. The client has the option to allow the called party to respond to a message at the time of delivery. In this case, the system 100 plays the reply invitation prompt. The called party is able to record a single message. The reply message is left in the client's message basket. The capability for called party response is selectable for each addressee in the subscriber's delivery instructions for either operator assisted or automatic telephone delivery.

Messages which are undeliverable are flagged within the sending subscriber's message basket. These messages and their status are played out by the retrieve message function. For automatic delivery that does not require or does not result in information operator assistance, a message a considered as delivered when the system 100 has determined that the call has been answered or acknowledgement received.

INTERFACE ROUTINES

The following interface routine functional specification is useful in helping a skilled programmer to understand and utilize the program listings set forth in Table I.

Process management in the virtual machine consists of a set of interface routines to REX process management. The use of function codes and their associated jump tables have been defined to fit in a Pascal environment and some of the options available to REX callers have been combined or eliminated for this release at the Pascal level process management.

The process management procedures and functions which the virtual machine provides include:
(1) VCREATE—create a new subprocess.
(2) VCRNODE—create a node of a job.
(3) VQUIT—terminate the calling process.
(4) VCREATOR_PID—return the PID of the creator of the calling process.
(5) VDECLARE_FC—declare the valid packet function codes for the calling process.
(6) VSELF_PID—return the PID of the calling process.

VCREATE—create a new subprocess is system privileged and has the following procedure definition: function VCREATE (var SPID: vspidrange; PRTYCLASS: vclassrange; PRTYRANK: vrankrange; PGMID: vprogid; PGMNONSHARE: boolean): vbit 16.

Among the inputs to VCREATE, SPID is the specific subprocess ID to create or zero if the system should assign one. PRTYCLASS is the priority class, from 1 to 4, that will be assigned to the created process. PRTYRANK is the priority rank within the class, from 1 to 255, that will be assigned to the created process. PGMID is the system program ID of the Pascal program to run in the created process. PGMNONSHARE is a boolean flag indicating whether the code specified in PGMID is shareable or not. A true value indicates nonshareable code. Among the outputs, SPID contains the subprocess ID of the new subprocess.

VCREATE returns as VCOMPOK if the create was successful; VMEMUNAVAIL if sufficient extended memory to create the process was not available; VSPIDUNAVAIL if a REX subprocess was not available; or a REX event completion code if a REX system error occurred.

If a nonzero SPID is specified, that SPID must be available; if zero is specified, some SPID must be available.

It should be noted that:
(1) This function calls the REX routine CREATE#.
(2) All virtual machine subprocesses require the assignment of a data segment. There are 255 such segments in any one GPP, some of which are used by the virtual machine and some are used for code. This leaves a practical limit of 250 processes running programs in a GPP.
(3) The named program will be loaded if it does not already exist in memory and its user count will be incremented if it already has been loaded.
(4) Execution of the process starts at the main entry point of the program.

VCRNODE creates a node of a job by sending a create node request packet to JSAM and access is system privileged. The procedure definition is procedure VCRNODE (var PKT: vpacket; var CRNRESULT: vcomplcode; var RPKT: vpacket). PKT is the create node request packet to be sent to JSAM. Ihe header will be filled in by this procedure which will also wait for a response. CRNRESULT is the event completion code from the create node. A value other than VCOMPOK is considered an error. RPKT is the response packet from JSAM for the create node request. All requirements applicable to creation of a node of a job, as stated in the JSAM documentation, apply to this procedure.

VQUIT terminates the calling process and is system privileged. The procedure definition is procedure VQUIT (PDSCLEANUP:boolean). PDSCLEANUP is true if the procedure has been called by PDS to cleanup resources between commands. There are no outputs. This function has requirements similar to the QUIT function. This procedure is intended to be called by SYS.PDS and SYS.DRVR to end the execution of a program. In the case of SYS.DRVR, PDSCLEANUP is false which calls for a full process quit. In the case of SYS.PDS, when the user segment completes execution, PDSCLEANUP is set true to cause the resources for the user program to be released so the next user program can be run. This procedure calls the REX routine QUIT.

VCREATORPID returns the PID of the creator of the calling process and is system privileged. Procedure definition is VCREATORPID (var PID: vpidrec). There are no inputs and PID identifies the creator of the calling process. This procedure calls the REX routine CREATORIPID.

VDECLAREFC declares the valid packet function codes for the calling process and is system privileged. The procedure definition is VDECLAREFC (FCMASK: vfcset). FCMASK is a set with the valid function codes from 0 to 15 set. There are no outputs. Note that DECLAREFC calls the REX routines SETFCMASK and RESTFCMASK. This procedure declares the valid packet function codes that will be returned to the Pascal program. The program then has to handle the functions itself through a case statement or similar construct.

VSELFPID returns the PID of the calling process and is system privileged. The procedure definition is VSELFPID (var PID: vpidrec). It outputs the PID of the calling process returned in PID.

Event management in the virtual machine consists of a set of interface routines to the higher level REX event management routines. Event management deals solely with the detection of events and not the allocation or deallocation of event control blocks (ECBs). To the user of the virtual machine, ECBs are an internal structure used totally by the system to maintain events for the user. The event management procedures and functions which the virtual machine provides include:

(1) VCHECK_EVENT—check for the occurrence of an event and return true if the event has occurred, otherwise return false.

(2) VWAIT—make the calling process nondispatchable until an associate event occurs.

VCHECK_EVENT checks for the occurrence of an event and return true if the event has occurred; otherwise, return false. It is unprivileged. The procedure definition is VCHECK_EVENT (EVENTIDTYPE: vchecktype; var USERREFID: vuserrefval; RESPONSEID: vecbid; var EVENTCODE: vcomplcode; var CHECKPKT: vpacket): boolean. As inputs EVENTIDTYPE specifies whether any event or a specific event by user reference value or response ID is being checked. The following are valid values for this parameter:

(1) VCHKANY—check for any event for this process.

(2) VCHKUSERREF—check for a specific event with a user reference value specified in USERREFID.

(3) VCHKRESPONSEID—check for a specific event with a response ID value specified in RESPONSEID.

USERREFID is the user reference value of a specific user event to be checked. RESPONSEID is the ECBID of a specific event to be checked. If USERREFID is used, then RESPONSEID is not necessary. As outputs USERREFID is returned with the user reference value (this does not apply to pure timers). EVENTCODE is the event completion code as defined in the appendices.

CHECKPKT is a 16-word packet that is returned if the associated event returns a packet. This function calls the REX routines CHECKEDB#3, CHECKEDB$E#3, or CHECKECB$U#3 depending on the options that are selected. The user reference value returned is that which was specified when the event was defined. Packets returned to unprivileged processes will have the PID fields of the header zeroed.

VWAIT makes the calling process nondispatchable until an associate event occurs and is unprivileged. The procedure defintion is VWAIT (WAITTYPE: vwaittype; var USERREFID: vuserrefval; RESPONSEID: vecbid; var EVENTCODE: vcomplcode; var WAITPKT: vpacket). For inputs WAITTYPE specifies whether a VWAITANY, for waiting on any event, or a VWAITSPECIFIC, to wait on a specific event, is required. RESPONSEID is the ID associated with a specific user event that is being waited on. This is ignored for VWAITANY. For outputs WAITPKT is a 16-word packet that is returned if the associate event returns a packet, EVENTCODE is the event completion code as defined in the appendices, and USERREFID is the ID of a specific user event that is being returned. This procedure calls the REX routines WAIT or WAIT$E depending on the options that were selected. If the specified event (or any) has already occurred, the process remains dispatchable. Control is not returned, however, until the associated PCB again comes to the head of the dispatchable queue.

Time management in the virtual machine is a set of procedures offered to interface with the system time management. For details on the system time management, refer to the REX subsystem specification.

The time management procedures and functions which the virtual machine provides include:

(1) VSTART_TIMER—Start a REX timer for the current running process.

(2) VCANCEL_TIMER—Cancel a timer that was set for this process.

(3) VDATETIME—Return the current date and time to the caller.

VSTART_TIMER starts a REX timer for the current running process and is unprivileged. The procedure definition is VSTART_TIMER (var RESPONSEID: vecbid; UREFID: vuserrefid; TIMELTH: integer; TIMEUNIT: vmmtimeunits; TIMEWAIT: boolean). For inputs UREFID is the user reference value that is established by the user and may be used to identify the expiration of the timer. If TIMEWAIT is true, this field is not used. TIMELTH is the timer interval expressed in milliseconds or seconds. TIMEUNIT specifies the interval type as mSEC or SEC. TIMEWAIT is a boolean requesting suspension of the process until the timer expires if true and immediate return if false. For outputs RESPONSEID is a REX event ID that is returned if wait was not requested. This ID is used when calling CHECKEVENT or WAIT. This procedure calls the REX routines STARTTIMER or STARTTIMER$S, depending on the value of TIMEUNIT. If the timer interval is expressed in milliseconds, the largest interval is 65,535 milliseconds or 1 minute, 5 seconds, 535 ms. When expressed in seconds, the largest interval is 18 hours, 12 minutes, 15 seconds. A timer may only be started for the active process.

VCANCEL_TIMER cancels a timer that was set for this process and is unprivileged. The procedure definition is VCANCEL_TIMER (RESPONSEID: vecbid). RESPONSEID is input as the REX event ID associated with the timer being cancelled. This procedure calls the REX routine CANCELTIMER. A timer may be cancelled only if it is associated with the active process.

VDATETIME returns the current date/time to the caller and is unprivileged. The procedure definition is VDATETIME (CDATETIME: vdtrectype): boolean. The function VDATETIME returns true as an output if the current date is set in the processor; otherwise, it returns false. CDATETIME is set to the current date/time as a packed record of the following definition if the current date is set in the processor.

```
vdtrectype=packed record
   YEAR: 0..99;
   MONTH: 1..12;
   DAY: 1..31; (*Day of Month*)
   DOY: 1..366; (*Day of Year*)
   DOW: 1..7; (*Day of Week*)
   HOUR: 0..23;
   MIN: 0..59;
```

SEC: 0..59;
HSEC: 0..99; (*Hundreths of Seconds*)
This routine refers to the date maintained by REX in page zero.

Job management in the virtual machine handles all communication with JSAM for creation and deletion of processes that exist as nodes of a job in the JSAM sense. The levels of interface between the virtual machine subsystem and JSAM include:

1. Processing in GPEXREX for handling incoming packets from JSAM to control main processes that are implemented as virtual machines; and 2. Processing in the VMM for handling requests from JSAM to control subprocesses that run as virtual machines in the GPP.

All processes in the GPP that are implemented as virtual machines are managed by REX/GPEXREX and are identified as virtual machines to allow the special handling necessary to control them. Internally, in the GPP, and externally they are referred to as "special processes" to distinguish them from processes that are controlled strictly by REX. All requests to create special processes are rounted to GPEXREX which decides whether the request is for a system process to be run as a main process or a nonsystem process to be run as a subprocess of a VM controlling process. For the first release, nonsystem processes will include TASS and PDS application whereas system processes will include SYSDLO, SYSDEV, and SYSMON.

The processing involved in processing these packets includes:

1. Create process request packet. Sent by JSAM to request the creation of a virtual machine process.

2. Create process response packet. Sent by VMM to JSAM to report on the status of a create request.

3. Delete process request packet. Sent by JSAM to request the deletion of a virtual machine process.

4. Delete process report packet. Sent by VMM to JSAM to report the completion normally or abnormally of a virtual machine process.

I/O control in the virtual machine is performed by a number of input/output services routines (IOSRs), each of which interfaces with a REX IOSR to perform a prescribed I/O operation. The IOSRs operate as an extension of the user program and establish control and data paths between the user and the rest of the system 100.

In general, an I/O operation proceeds as follows. A user requests that an I/O function be performed by invoking the appropriate IOSR with a set of parameters that define the request. The IOSR formats the parameters into REX IOSR calling arguments and calls the appropriate REX IOSR. At that point the user's process is suspended until the operation is complete. Upon return from the request, VM IOSRs either return with a successful completion or return the appropriate status to indicate why the operation was unsuccessful.

In this sequence, all I/O is performed on behalf of the user's process and the associated environment. Suspension of the process takes place if sufficient resources are not currently available for REX to initiate the operation. Then, the process waits for completion of the I/O operation before being redispatched for return to VM IOSRs and the user. The following paragraphs describe the VM IOSR procedures in general as they apply to all device and data set handlers.

The VM IOSRs support the acquiring and releasing of devices through various procedures. When a device is acquired, an acquire response packet is returned which contains the information that is required to open and access the device. To accommodate this, the VM IOSR maintains these packets in its environment with an associated unique identifier. This identifier is then placed in the user's file information block (FIB) for future reference when required by VM IOSRs, but the actual packet is not made available to the user at any time.

All devices that are acquired and all data sets that are open must have a unique FIB associated with them. The FIB resides in the user's data space and contains descriptive information about the device or data set. This information is used by the VM IOSRs to interface with system functions when executing I/O procedures for the user and must exist from acquire to release for devices and open to close for data sets.

It is defined as follows:
Vfib = packed record
  VCHANREF1: vbit 8;
  VCHANREF2: vbit 8;
  VDEVNAME1: vdevname;
  VDEVNAME2: vdevname;
  VSYSCOMPL: vcomplcode;
  VDEVCOMPL: vdevcompcode;
  VACQPKTID: vbit 16;
  VTIMEOUT: vbit 8;
  VPRIORITY: vbit 8;
end (Vfib);
where:

1. VCHANREF1 is the reference number of the primary channel on a multichannel device or the reference number of the only channel on a single channel device.

2. VCHANREF2 is the channel number of the second channel on a multichannel device.

3. VDEVNAME1 is the device name associated with VCHANREF1 for the device being accessed.

4. VDEVNAME2 is the device name associated with VCHANREF2 for the device being accessed.

5. VSYSCOMPL is the REX event completion code.

6. VDEVCOMPL is the device completion code which is made up of the device error code and the device error group.

7. VACQPKTID is the internal ID of the acquire packet which is maintained by VM IOSRs. This ID is established when a device is acquired and must remain intact until the device is released.

8. VTIMEOUT is the time (in seconds) to be added to the system timeout value to arrive at the timeout interval for the operation.

9. VPRIORITY is the priority to be assigned to the associated operation and is required only if it is implemented by the target handler.

The access control block (ACB) is used to maintain information relevant to a particular access of a device or data set. As such, at any given time, a unique ACB must exist for each active access. An access is established by the execution of one of the access-type verbs (e.g., VREAD, VWRITE ...) and remains active until the access is completed (usually by a VENDIO operation).

The ACB is defined as follows:
vacb = packed record
  VACCESSREF: vbit 16;
  VACBCOMPL: vcomplcode;
  VACBRESP: vioreturnpacket;
  VTIMEOUT: vbits 8;
  VPRIORITY: vbit 8 end (vacb);
where:
1. VACCESSREF is a unique reference ID assigned and used by VM IOSRs to associate the various functions executed as part of the specific access. Modification of this field by the user will cause the access to be aborted.
2. VACBCOMPL is the REX event completion code related to the last operation performed on this access.
3. VACBRESP is a 10-word area where the last 10 words of the response packet, related to the last operation for this access is returned.
4. VTIMEOUT is the time (in seconds) to be added to the system timeout value to arrive at the timeout interval for the operation.
5. VPRIORITY is the priority to be assigned to the associated operation and is required only if it is implemented by the target handler.

VACQNAME acquires ownership of a system device by its iternal name and is unprivileged. The procedure definition is VACQNAME (var VMFIB: vfib; DEVNAME: vdevicename; VMIOFLAGS: vioflags; USNFUNCCODE: vfcrange). For inputs:
1. VMFIB will have the following fields set:
   a. VTIMEOUT is the time to be added to the system timeout value to arrive at the timeout interval for the operation.
   b. VPRIORITY is the priority value to be assigned to the acquire operation.
2. DEVNAME is the internal device name of the device being acquired.
3. VMIOFLAGS is a set of flags that specify the selected acquire options as follows:
   a. VACQQUEUE is set if SYSDEV is permitted to queue the acquire.
   b. VACQSEIZE is set if one of the device channels is to be seized during the acquire processing.
4. USNFUNCCODE is the function code to be used by the system for unsolicited notification packets. For outputs:

VMFIB will have its fields set as follows:
VCHANCNT will contain the number of channels that the acquired device has.
VCHANINFO[I].VCHANREF contains channel reference values (1-255) that will be used by the VM IOSRs in all subsequent I/O operations for the associated channel. Note that I ranges from 0 to VCHANCNT.
VCHANINTO[I].VFDEVNAM contains the internal device names of the device for the associated channel and will be used by the VM IOSRs in all subsequent I/O operations.
VSYSCMPL contains the REX event completion code.
VDEVCMPL contains the acquire completion code.
VACQPKTID contains the ID of the acquire response packet received from SYSDEV if the device has been successfully acquired. The ID will be used by the VM IOSRs to access the acquire response packet when an I/O operation requires information contained in the packet.
VDEVSTATUS will be set to VAQUIRED if the operation was successful.

Upon calling VACQNAME, the user process is suspended until successful or unsuccessful completion of the acquire function. VSYSCOMPL and VDEVCOMPL fields in the FIB indicate the result of the acquire function. The user process must not alter any of the values returned in the FIB. This procedure sends an acquire request packet to SYSDEV.

VACQLIST acquires ownerhip of a system device by type and subtype and is unprivileged. The procedure definition is VACQLIST (var VMFIB: vfib; DTYPE: vdevtype; SUBTYPE: vstypelist; VMIOFLAGS: vioflags; USNFUNCCODE: vfcrange). For inputs:
1. VMFIB will have the following fields set:
   a. VTIMEOUT is the time to be added to the system timeout value to arrive at the timeout interval for the operation.
   b. VPRIORITY is the priority value to be assigned to the acquire operation.
2. DTYPE is the system device type of the device being acquired.
3. SUBTYPE is a list of acceptable system subtypes for the specific device type being acquired.
4. VMIOFLAGS is a set of flags specifying the selected acquire options as follows:
   a. VACQQUEUE is set if SYSDEV is permitted to queue the acquire.
   b. VACQSEIZE is set if one of the device channels is to be seized during the acquire processing.
5. USNFUNCCODE is the function coce to be used by the system for unsolicited notification packets.

For outputs VMFIB has its field set as follows:
1. VCHANINFO[I].VCHANREF contains channel reference values (1-255) which the VM IOSRs use in all subsequent I/O operations for the associated channel. Note that I ranges from 0 to VCHANCNT.
2. VCHANINTO[I].VFDEVNAM contains the internal device names of the device, and the VM IOSRs use it in all subsequent I/O operations on channel one.
3. VSYSCOMPL contains the REX event completion code.
4. VDEVCMPL contains the acquire completion code.
5. VACQPKTID contains the ID of the acquire response packet received from SYSDEV if the device has been successfully acquired. The VM IOSRs use the ID to access the acquire response packet when an I/O operation requires information contained in the packet.
6. VDEVSTATUS will be set to VACQUIRED.

Upon calling VACQLIST, the user process is suspended until successful or unsuccessful completion of the acquire function. VSYSCOMPL and VDEVCOMPL fields in the FIB indicate the result of the acquire function. The user process must not alter any of the values returned in the FIB. This procedure sends an acquire request packet to SYSDEV.

VOPEN opens a logical path to a device and is unprivileged. The procedure definition is VOPEN (var VMFIB: vfib; VMIOFLAGS: vioflags).

For inputs VMFIB will have the following fields set:
1. VCHANINFO as set by the VM IOSR acquire ownership operation.
2. VACQPKTID as set by the VM IOSR acquire ownership operation.
3. TIMEOUT is the time to be added to the system timeout value to arrive at the timeout interval for the operation.

VMIOFLAGS will have the following set:
VCHANNO is the number of the channel to be opened for multiple channel devices. It should be zero for devices with only one channel.

For outputs VMFIB will have the following fields returned:
1. VSYSCOMPL is the REX event completion code.

2. VDEVCOMPL is the open device completion code.

3. VDEVSTATUS will be set to VOPENED if the operation was successful.

The FIB must contain the values returned from the acquire of the device being opened. This procedure calls the REX routine OPEN#.

VOPEN DSET opens a logical path to a data set and is unprivileged. The procedure defintion is VOPENDSET (var VMFIB: vfib; DSNAMLEN: vbit 8; DSNAMPTR: vaddr; var DSINFO: vdatasetinfo).

For inputs:
1. VMFIB will have the following fields set:
   a. VTIMEOUT is the time to be added to the system timeout value to arrive at the timeout interval for the operation.
   b. VPRIORITY is the priority value to be assigned to the operation.
2. DSNAMLEN is the length (in bytes) of the data set name.
3. DSINFO is a packed record whose fields specify access restrictions and default operational characteristics.
4. DSINFO will have the following fields set:
   a. VDSEXCL is set if this open is for exclusive access. If the flag is rest, this open is for shared access.
   b. VDSRDWR is set if READ/WRITE is allowed for the data set; otherwise, (flag is reset) open is for read only.
   c. VDSUTIL is set for utility open and is reset for open without utility privileges.
   d. VDSUNCAT is set if catalog is not to be used to locate data set. If the flag is reset, catalog is used to locate data set.
   e. VDSUP is set if data set is duplicated; otherwise, (flag is reset) data set is singular.
   f. VUSER is packed array of 5 bytes, specifying user code of requestor. (This field is currently unused.)
   g. VOLID1, VOLID2 are packed arrays of six chars, specifying volume ID of the volume on which data set resides.

For outputs
VMFIB will have its fields set as follows:
1. VCHAINFO[0].VCHANRF contains a channel reference value (1-255) that the VM IOSRs use in all subsequent I/O operations on the opened data set.
2. VSYSCOMPL contains the REX event completion code.
3. VOPENRESP contains the open response packet itself.

If the catalog is to be used to locate the data set (VDSUNCAT=1) the volume ID of the volume on which the data set resides is required (VOLID1). Otherwise, this field can be omitted. (If the data set is duplicated [VDSUP=1], this field must specify the volume ID of the volume on which the primary copy of the data set resides.) If the data set is duplicated (VDSUP=1) and the catalog is not to be used to locate the data set (VDSUNCAT=1), this field must specify the volume ID of the volume on which the secondary copy of the data set resides (VOLID2). Otherwise, this field can be omitted.

VREADCRT builds an access path to a logical data record in a CRT to permit transfer of data from the CRT handler to the user and is unprivileged. The procedure definition is VREADCRT (var VMFIB: vfib; var VMACB: vacb; CRTCNTL: vcrtdctrl); VMIOFLAGS: vioflags).

For inputs VMFIB will have the following field set:
1. VCHANINFO as set by the VM IOSR acquire ownership operation.

CRTCNTL is a record that will have the following fields set:
1. VSOM is a start-of-message character that specifies the type of read.
2. VPARTNO is a character that specifies the CRT partition number from which data will be read.
3. VLINEITEM is a character that specifies the line number with the partition number from which data will be read.
4. VEOM is a character that specifies the end-of-message character.

VMIOFLAGS will have the following field set:
1. VCHANNO is the number of the channel to be accessed for multiple channel devices. It should be zero for single channel devices.

For outputs VMACB will have its fields set as follows:
1. VACCESSREF contains an access reference value (1-255) that the VM IOSRs use in all subsequent I/O operations related to this access path.
2. VACBCOMPL contains the REX event completion code.
3. VACBRESP is the response returned from the device handler that will have its fields set as follows:
   a. VDEVCC contains the status returned from the device handler.
   b. VDATALEN contains the size (in bytes) of the record being accessed.

The FIB must contain the values returned by the procedure OPEN for the device being read. Multiple accesses to a single CRT are supported. If the handler cannot support this, it is the handler's responsibility to reject the request. The user process must not alter any of the values returned in the ACB. This procedure calls the REX routine ACCESS#.

VREAD DIRECT builds an access path to a logical record in a direct data set to permit transfer of data between the user and the data set handler and is unprivileged. The procedure definition is VREADDIRECT (var VMFIB: vfib; var VMACB: vacb; VMIOFLAGS: vioflags; ELEMNO: vlonginteger).

For inputs:
VMFIB will have the following field set:
1. CHANINFO[O].VCHANRF as set by the procedure VOPENDSET.

VMACB will have the following field sets:
1. VTIMEOUT is the time to be added to the system timeout value to arrive at the timeout interval for the operation.
2. VPRIORITY is the priority value to be assigned to the operation.

VMIOFLAGS is a set of flags that specify the selected VREADDIRECT options as follows:
1. VUPDATE is set if this is an updating read. The record element will be locked against other accesses until released with an End I/O request.

ELEMNO is the record element of the record to be accessed.

For outputs:
VMACB will have its field set as follows:
1. VACCESSREF contains an access reference value (1-255) that the VM IOSRs use in all subsequent I/O 0 operations related to this access path.

2. VACBCOMPL contains the REX event completion code.

3. VACBRESP is the response packet returned by the data set handler that will have its fields set as follows:
   a. VDEVCC contains the error/code group.
   b. Other fields in this packet are unnamed, but may be accessed by VPKTINIT[N], where N is the word number (1–16) of the packet.

The FIB must contain the values returned from the procedure OPENDSET for the data set being read. The user process must not alter any of the values returned in the ACB. This procedure calls the REX routine ACCESS#.

VREADKEY builds an access path to a logical record in an indexed data set to permit transfer of data between the user and the data set handler and is unprivileged. The procedure definition is VREADKEY (var VMFIB: vfib; var VMACB: vacb; VMIOFLAGS: vioflags; KEYLENGTH: vbit8; KEYPTR: vaddr).

For inputs:
VMFIB will have the following field set:
1. VCHANINFO[O].VCHANRF as set by the procedure VOPENDSET.

VMACB will have the following fields set:
1. VTIMEOUT is the time to be added to the system timeout value to arrive at the timeout interval for the operations.
2. VPRIORITY is the priority value to be assigned to the operation.

VMIOFLAGS is a set of flags that specify the selected VREADKEY options as follows:
1. VUPDATE is set if this is an updating read. The record will be locked against other accesses until released with an End I/O request.
2. VGREATER is applicable when the flag VKAPPROX is set. If VGREATER is set, the retrieval key will be the first key strictly greater than the user key. If VGREATER is not set, the retrieval will be that record whose key is the first key in the index lexically greater than or equal to the key supplied by the user.
3. VDATAREC is set if the data record is not to be retrieved. If the flag is rest, the data record is retrieved.
4. VKAPPROX is set if the read is an approximate read. (See VGREATER flag definition).

KEYLEN is the length (in bytes) of the record key.
KEYPTR is a pointer to a packed array of characters that contains the name of the record key.

For outputs:
VMACB will have its fields set as follows:
1. VACCESSREF contains an access reference value (1–255) the VM IOSRs use in all subsequent I/O operations related to this access path.
2. VACBCOMPL contains the REX event completion code.
3. VACBRESP is the response packet returned by the data set handler that will have its fields set as follows:
   a. VDEVCC contains the error code/error group.
   b. Other fields in this packet are unnamed but may be accessed by VPKINIT[N], where N is the word number (1–16) of the packet.

The FIB must contain the values returned by the procedure VOPENDSET. The user process must not alter any of the values returned in the ACB. This procedure calls the REX routine ACCESS#.

VREADNEXT builds an access path to a logical record in an indexed data set. The record will be retrieved whose key is lexically next greater than the most recent previously completed access on this channel and is unprivileged. The procedure definition is VREADNEXT (var VMFIB: vfib; var VMACB: vacb; VMIOFLAGS: vioflags).

For inputs:
VMFIB will have the following field set:
1. VCHANINFO[O].VCHANRF as set by the procedure VOPENDSET.

VMACB will have the following fields set:
1. VTIMEOUT is the time to be added to the systems timeout value to arrive at the timeout interval for the operation.
2. VPRIORITY is the priority value to be assigned to the operation.

VMIOFLAGS is a set of flags that specify the selected VREADNEXT options as follows:
1. VUPDATE is set if this is an updating read. The record will be locked against other accesses until released with an End I/O request.
2. VNODATA is set if the data record is not to be retrieved. If the flag is reset, the data record is retrieved.
3. VSAMREC is set if the access is to remain on the same record. If the flag is reset, access the next record.
4. VNULL is set for null continue; otherwise, (flag is reset) normal continue.

For outputs:
VMACB will have its fields set as follows:
1. VACCESSREF contains an access reference value (1–255) that the VM IOSRs use in all subsequent I/O operations related to this access path.
2. VACBRESP is the response returned by the data set handler that will have its fields set as follows:
   a. VDEVCC contains the error code/error group.
   b. Other fields in this packet are unnamed, but may be accessed by VPKTINIT[N], where N is the word number (1–16) of the packet.

The FIB must contain the values returned by the procedure VOPENDSET. The user process must not alter any of the values returned in the ACB. This procedure calls the REX routine ACCESS#.

VCONTINUE releases the current record and prepare to read, write or update the next record in a block data set and is unprivileged. The procedure definition is VCONTINUE (var VMFIB: vfib; var VMACB: vacb).

For inputs:
VMFIB will have the following field set:
1. VCHANINFO[O].VCHANRF as set by the procedure VOPENDSET.

VMACB will have the following fields set:
1. VTIMEOUT is the time to be added to the system timeout value to arrive at the timeout interval for the operation.
2. VPRIORITY is the priority value to be assigned to the operation.

For outputs:
VMACB will have its fields set as follows:
1. VACBCOMPL contains the REX event completion code.
2. VACBRESP is the response packet returned by the data set handler that will have its fields set as follows:
   a. VDEVCC contains the status returned from the device or data set handler.
   b. Other fields in this packet are unnamed, but may be accessed by VPKTINIT[N], where N is the word number (1–16) of the packet.

The FIB must contain the values returned by the procedure VOPENDSET. The user process must not alter any of the values returned by the procedure VOPENDSET. This procedure calls the REX routine ACCESS#.

VWRITEDEV builds a write access path to a logical data record to permit transfer of data from a user to a device and is unprivileged. The procedure definition is VWRITEDEV (var VMFIB: vfib; var VMACB: vacb; NBYTES: integer; VMIOFLAGS: vioflag).

For inputs:
VMFIB will have the following fields set:
1. VCHANINFO as set by the VM IOSR acquire ownership operation.
VMACB will have the following fields set:
1. VTIMEOUT is the time to be added to the system timeout value to arrive at the timeout interval for the operation.
2. VPRIORITY is the priority value to be assigned to the read operation.
NBYTES is the number of bytes to be set up for this write device access.
VIOFLAGS will have the following field set:
1. VCHANNO is the number of the channel to be accessed for multiple channel devices. It should be zero for single channel devices.
For outputs:
VMACB will have the following fields set on return:
1. VACCESSREF is a unique value assigned by VM IOSRs to be used throughout the life of the write access sequence.
2. VACBCOMPL is the event completion code returned by REX.
3. VACBRESP is the response returned by the device handler that will have its fields set as follows:
 a. VDEVCC contains the status returned from the device handler.
The FIB must contain the values returned by the procedure OPEN for the device being written to. This procedure calls the REX routine ACCESS#. Before any data can be transferred from the user to the device handler, both parties must be made ready for the transfer by a VWRITEDEV operation. If the device being written to is a Zentec, only one access may be active at a time.

VWRITEDIRECT builds an access path to a logical record in a direct data set to permit transfer of data from the user to the data set handler and is unprivileged. The procedure definition is VWRITEDIRECT (var VMFIB: vfib; var VMACB: vacb; ELEMNO: vlonginteger).

For inputs:
VMFIB will have the following field set:
1. VCHANINFO[O].VCHANRF as set by the procedure VOPENDSET.
VMACB will have the following fields set:
1. VTIMEOUT is the time to be added to the system timeout value to arrive at the timeout interval for the operation.
2. VPRIORITY is the priority value to be assigned to the operation.
ELEMNO is the record element number (also relative to the start of the dataset) of the record to be written. This parameter applies to disk data sets only.
For outputs:
VACCESSREF contains an access reference value (1-255) the VM IOSRS use in all subsequent I/O operations related to this access path.

VACBCOMPL contains the REX event completion code.
VACBRESP is the response returned by the data set handler that will have its fields set as follows:
1. VDEVCC contains the error code/group code.
2. Other fields in this packet are unnamed, but may be accessed by VPKTINIT[N], where N is the word number (1-16) of the packet.
The FIB must contain the values returned by the procedure VOPENDSET. The user process must not alter any of the values returned in the ACB. This procedure calls the REX routine ACCESS#.

VWRITEKEY builds access path to a logical record in an indexed data set to permit transfer of data from the used to the data set handler and is unprivileged. The procedure definition is VWRITEKEY (var VMFIB: vfib; var VMACB: vacb; VMIOFLAGS: vioflags; KENLENGTH: vbit8; KEYPTR: vaddr).

For inputs:
VMFIB will have the following field set:
1. VCHANINFO[O].VCHANRF as set by the procedure VOPENDSET.
VMACB will have the following fields set:
1. VTIMEOUT is the time to be added to the system timeout value to arrive at the timeout interval for the operation.
2. VPRIORITY is the priority value to be assigned to the operation.
VMIOFLAGS is a set of flags that specify the selected VWRITEKEY options as follows:
1. VREPLACE is set if this Write is meant to replace an existing record, and an error is implied if the record does not exist. If the flag is reset, the Write is meant to create a new record, and the presence of an existing record with the same key implies an error.
KEYLEN is the length (in bytes) of the record key.
KEYPTR is a pointer to the record key.
For outputs:
VMACB will have its fields set as follows:
1. VACCESSREF contains an access reference value (1-255) the VM IOSRs use in all subsequent I/O operations related to this access path.
2. VACBCOMPL contains the REX event completion code.
3. VACBRESP is the response packet returned by the data set handler that will have its fields set as follows:
 a. VDEVCC contains the error code/group code.
 b. Other fields in this packet are unnamed, but may be accessed VPKTINIT[N], where N is the word number (1-16) of the packet.
The FIB must contain the values returned by the procedure VOPENDSET. The user process must not alter any of the values returned in the ACB. This procedure calls the REX routine ACCESS#.

VGET transfers data from a device or data set handler buffer to a user buffer and is unprivileged. The procedure defintion is VGET (var VMFIB: vfib; var VMACB: vacb; BUFFPTR: vaddr; SOURCEOFFSET: integer; DESTOFFSET: integer; NBYTES: integer).

For inputs:
VMFIB will have the following fields set:
1. VCHANINFO[O].VCHANRF as set by the or Open data set operation.
VMACB will have the following fields set:

1. VACCESSREF is the value assigned by VM IOSRs to uniquely identify the access path that was set up by the previous Read.

2. VTIMEOUT is the time to be added to the system timeout value to arrive at the timeout interval for this operation.

3. VPRIORITY is the priority value to be assigned to the get operation.

BUFFPTR is the address of the buffer, in the user's space, where the get will return data.

SOURCEOFFSET is the byte offset into the record from which point the data is to be read.

DESTOFFSET is the byte offset into the user's buffer where the data is to be transferred.

NBYTES is the number of bytes to be transferred.

For outputs:

VMACB will have the following fields set on return:

1. VACBCOMPL is the event completion code returned by REX.

2. VACBRESP is the response returned by the device or data set handler that will have its fields set as follows:
   a. VDEVCC contains the status returned from the device or data set handler.
   b. Other fields in this packet are unnamed, but may be accessed by VPKTINIT[N], where N is the word number (1-16) of the packet.

The VMFIB must contain the values returned by the procedure VOPEN or VOPENDSET. The access path specified by the VACCESSREF must exist, i.e., the user must have previously called one of the VREAD procedures. The only range checking that will be performed on the get operation is to ensure that the entire buffer will fit in the user's address space. Therefore, a specification to get more bytes of data into a variable than the size of the variable will result in overwriting an area outside the variable. This will most often cause the program to malfunction. This procedure calls the REX routine GET#.

VWGET transfers data from a DSR buffer to a user's local buffer. (This function is applicable for indexed data sets.) The function is unprivileged. The procedure defintion is VWGET (var VMFIB: vfib; var VMACB: vacb; BUFFPTR: vaddr; SOURCEOFFSET: integer; DESTOFFSET: integer; NBYTES: integer; VMWHERE: vbit2).

For inputs:

The VMWHERE field can be set to the following:
1. VDATAFLD (=0): get user data record;
2. VMEMOFLD (=1): get memo record;
3. VKEYFLD (=2): get key.

VMFIB will have the following fields set:

1. VCHANINFO[O].VCHANRF as set by the VM IOSRs to uniquely identify the access path that was set up by the previous Read.

VMACB will have the following fields set:

1. VACCESSREF is the value assigned by VM ISORs to uniquely identify the access path that was set up by the previous Read.

2. VTIMEOUT is the time to be added to the system timeout value to arrive at the timeout interval for this operation.

3. VPRIORITY is the priority value to be assigned to the get operation.

BUFFPTR is the address of the buffer, in the user's space, where the get will return data.

SOURCEOFFSET is the byte offset into the record from which point the data is to be read.

DESTOFFSET is the byte offset into the user's buffer where the data is to be transferred.

NBYTES is the number of bytes to be transferred.

For outputs:

VMACB will have the following fields set on return:

1. VACBCOMPL is the event completion code returned by REX.

2. VACBRESP is the response packet returned by the source device or data set handler that will have its fields set as follows:
   a. VDEVCC contains the status returned from the device or data set handler.
   b. Other fields in this packet are unnamed, but may be accessed by VPKTINIT[N], where N is the word number (1-16) of this packet.

The VMFIB must contain the values returned by the procedure VOPEN or VOPENDSET. The access path specified by the VACCESSREF must exist, i.e., the user must have previously called one of the VREAD procedures. The only range checking that will be performed on the get operation is to ensure that the entire buffer will fit in the user's address space. Therefore, a specification to get more bytes of data into a variable than the size of the variable will result in overwriting an area outside the variable. This will most often cause the program to malfunction. This procedure will call the REX routine GET#.

VPUT transfers data from a user's buffer to a device or data set handler buffer and is unprivileged. The procedure definition is VPUT (var VMFIB: vfib; var VMACB: vacb; BUFFPTR: vaddr; SOURCEOFFSET: integer; DESTOFFSET: integer; NBYTES: integer).

For inputs:

VMFIB will have the following fields set:

1. VCHANINFO[O].VCHANRF as set by the Open device or Open data set operation.

VMACB will have the following fields set:

1. VACCESSREF is the value assigned by VM ISORs to uniquely identify the access path that was set up by the previous write.

2. VTIMEOUT is the time to be added to the system timeout value to arrive at the timeout interval for this oeration.

3. VPRIORITY is the priority value to be assigned to the put operation.

BUFFPTR is the address of the buffer, in the user's space, where the put will get its data.

SOURCEOFFSET is the byte offset, into the user's buffer, where the effected data starts.

DESTOFFSET is the byte offset, into the handler's record or record element where the data is to be transferred.

NBYTES is the number of bytes to be transferred.

For outputs:

VMACB will have the following fields set on return:

1. VACBCOMPL is the event completion code returned by REX.

2. VACBRESP is the response returned by the device or data set handler that will have its field set as follows:
   a. VDEVCC contains the status returned from the device or data set handler.
   b. Other fields in this packet are unnamed, but may be accessed by VPKTINIT[N], where N is the word number (1-16) of the packet.

The FIB must contain the values returned by the procedure VOPEN on VOPENDSET. The access path specified by the VACCESSREF must exist, i.e., the user must have previously called on the write procedure. This procedure calls the REX routine PUT#.

VWPUT transfers data from a user's buffer to a DSR buffer. (This function is applicable for indexed data sets.) This function is unprivileged. The procedure definition is VWGET (var SMFIB: vfib; var VMACB: vacb; BUFFPTR: vaddr; SOURCEOFFSET: integer; DESTPFFSET: integer; NBYTES: integer; VMWHERE: vbit2).

For inputs:
The VMWHERE field can be set to the following:
1. VDATAFLD (=0): put user data record;
2. VMEMOFLD (=1): put memo record;
3. VKEYFLD (=2): put key.
VMFIB will have the following field sets:
1. VCHANINFO[O].VCHANRF as set by the VM ISORs to uniquely identify the access path that was set up by the previous Write.

VMACB will have the following fields set:
1. VACCESSREF is the value assigned by VM ISORs to uniquely identify the access path that was set up by the previous Write.
2. VTIMEOUT is the time to be added to the system timeout value to arrive at the timeout interval for this operation.
3. VPRIORITY is the priority value to be assigned to the put operation.

BUFFPTR is the address of the buffer, in the user's space, where the put will get its data.

SOURCEOFFSET is the byte offset, into the user's buffer, where the effected data starts.

DESTOFFSET is the byte offset into the handler's record or record element, where the data is to be transferred.

NBYTES is the number of bytes to be transferred.
For outputs:
VMACB will have the following fields set on return:
1. VACBCOMPL is the event completion code returned by REX.
2. VACBRESP is the response packet returned by the source device or data set handler that will have its fields set as follows:
   a. FDEVCC contains the status returned from the device or data set handler.
   b. Other fields in this packet are unnamed, but may be accessed by VPKINIT[N], where N is the word number (1-16) of this packet.

The VMFIB must contain the values returned by the procedure VOPEN or VOPENDSET. The access path specified by the VACCESSREF must exist, i.e., the user must have previously called one of the VREAD procedure. This procedure will call the REX routine PUT#.

VTRANSFER transfers data from a source device or data set to a destination device or data set and is unprivileged. The procedure definition is VTRANSFER (var VMFIBS: vfib; var VMACBS: vacb; var VMFIBD: vfib; var VMACBD: vacb; NBYTES: integer; SRCEOFFSET: integer; DESTOFFSET: integer).

For inputs:
VMFIBS is the FIB for the source device or data set that has the following fields set:
1. VCHANINFO as set by the VM ISOR acquire ownership or open data set operation.

VMACBS is the ACB for the source device or data set that was referenced by a previous READ operation and has its fields set as follows:
1. VACCESSREF is the value assigned by VM ISORs to uniquely identify the access path that was set up by the previous READ.
2. VTIMEOUT is the time to be added to the system timeout value for the total transfer operation.

VMFIBD is the FIB for the destination device or data set that has the following fields set:
1. VCHANINFO as set by the VM IOSR acquire ownership or open data set operation.

VMACBD is the ACB for the destination device or data set that was referenced by a previous WRITE operation and has its fields set as follows:
1. VACCESSREF is the value assigned by VM IOSRs to uniquely identify the access path that was set up by the previous Write.

NBYTES is the number of bytes to be transferred.
SRCEOFFSET is the byte offset, into the record that was accessed by a previous READ, where the source data starts.
DESTOFFSET is the byte offset, into the record that was accessed by a previous WRITE, where the destination data starts.

For outputs:
VMACBS will have the following fields set on return:
1. VACBCOMPL is the event completion code returned by REX.
2. VACBRESP is the response returned by the source device or data set handler that will have its fields set as follows:
   a. VDEVCC contains the status returned from the device or data set handler.

The FIBs associated with the devices or data sets involved in the transfer must contain the values returned by the preceding VOPEN or VOPENDSET operations. A READ access path must exist for the source and a WRITE access path must exist for the destination. This procedure will call the REX routine TRANSFER#. The Transfer procedure allows a user, in one processor, to move data from a second processor to a third processor without having to bring the data into his own processor.

VCONTROL communicates control information to a device handler and is unprivileged. The procedure definition is VCONTROL (var VMFIB: vfib; CTRLBUFF: vctrlinfo; VMIOFLAGS: vioflags).

For inputs:
VMFIB will have the following fields set:
1. VCHANINFO as set by the procedure that acquired the device.
2. VACQPKTID as set by the procedure that acquired the device.

CTRLBUFF is a record to be included in the control packet being sent to the device. The record contains device-specific control fields to be defined by the target device.

VMIOFLAGS is a set of flags that specify the selected CONTROL options as follows:
1. VCHANNO is the number of the channel to be used for multiple channel devices. It should be zero for devices with only one channel.

For outputs:
VMFIB will have its fields set as follows:
1. VSYSCOMPL contains the REX event completion code.

2. VDEVCOMPL contains the completion code returned by the device handler.

The FIB must contain the values returned by the procedure that acquired the device. This procedure calls the REX routine CONTROL#.

VSETSUBTYPE alters the subtype of a specific device and is system privileged. The procedure definition is VCONTROL (var VMFIB: vfib; SUBTYPE: vbit16; OPRATRID: vbit16).

For inputs:

VMFIB is the FIB for the device whose subtype is to be altered, it has the following fields set:

1. VCHANINFO as set by the VM ISOR acquire ownership operation.

2. VTIMEOUT is the time to be added to the system timeout value to arrive at the timeout interval for the operation.

SUBTYPE is the subtype to be associated with the device.

OPRATRID is the CRT operator's ID if SUBTYPE is non-zero; otherwise, OPRATRID is zero.

For outputs:

VMFIB will have its fields set as follows:

1. VSYSCOMPL contains the REX event completion code.

2. VDEVCOMPL contains the completion code returned by the device handler.

Upon calling VSETSUBTYPE, the user process will be suspended until a response is received. VSYSCMPL and VDEVCMPL will indicate the result. This procedure sends a set device subtype request packet to SYSDEV.

VDELETEKEY builds an access path to a logical record in an indexed data set to permit deletion of the record and is unprivileged. The procedure definition is VDELETEKEY (var VMFIB: vfib; KEYLENGTH: vbit8; KEYPTR: vaddr).

For inputs:

VMFIB will have the following field set:

1. VCHANINFO[O].VCHANRF as set by the procedure OPENDSET.

KEYLENGTH is the length (in bytes) of the record key.

KEYPTR is a pointer to a packed array of characters that contains the name of the record key.

For outputs:

VMFIB will have its fields set as follows:

1. VSYSCMPL contains the REX event completion code.

2. VDEVCMPL contains the completion code returned by the device handler.

The FIB must contain the values returned by the procedure VOPEN_DSET. This procedure calls the REX routine CONTROL#.

VRENAME changes the identity of a logical record in an indexed data set by substituting a new key for its current key. The record itself is not disturbed. The function is unprivileged. The procedure definition is VRENAME (var VMFIB: vfib; var VMACB: vacb; OLDKEYLEN: vbit8; NEWKEYLEN: vbit8; OLDKEYPTR: vaddr; NEWKEYPTR: vaddr).

For inputs:

VMFIB will have the following field set:

1. VCHANINFO[O].VCHANRF as set by the procedure OPENDSET.

VMACB will have the following fields set:

1. VTIMEOUT is the time to be added to the system timeout value to arrive at the timeout interval for the operation.

2. VPRIORITY is the priority value to be assigned to the operation.

OLDKEYLEN is the length (in bytes) of the record current key.

NEWKEYLEN is the length (in bytes) of the new key.

OLDKEYPTR is a pointer to a packed array of characters that contains the name of the current key.

NEWKEYPTR is a pointer to a packed array of characters that contains the name of the new key.

For outputs:

VMACB will have its fields set as follows:

1. VACCESSREF contains an access reference value (1-255) that will be used by the VM IOSRs in all subsequent I/O operations related to this access path.

2. VACBCOMPL contains the REX event completion code.

3. VACBRESP is the response packet returned by the data set handler that will have its fields set as follows:

a. VDEVCC contains the error code/group code.

b. Other fields in this packet are unnamed, but may be accessed by VPKTINIT[N], where N is the word number (1-16) of this packet.

The FIB must contain the values returned by the procedure VOPENDSET. The user process must not alter any of the values returned in the ACB.

VMOVEWINDOW terminates access to the element currently on view in an indexed subfile or CHAIN data set, writing it to disk if necessary. It also moves the window to permit access of a specified element in the current logical record and is unprivileged. The procedure definition is VMOVEWINDOW (var VMFIB: vfib; var VMACB: vacb; VMIOFLAGS: vioflags).

For inputs:

VMFIB will have the following field set:

1. VCHANINFO[O].VCHANRF as set by the procedure OPENDSET.

VMACB will have the following fields set:

1. VACCESSREF as set by the procedure that built the access path to the logical record.

2. VTIMEOUT is the time to be added to the system timeout value to arrive at the timeout interval for the operation.

3. VPRIORITY is the priority value to be assigned to the operation.

VMIOFLAGS is a set of flags that specify the selected VMOVEWINDOW options as follows:

1. VMARK is a flag that specifies the units of motion. If the flag is reset, the units of motion are record elements. If the flag is set, the units of motion are marks (applicable to string data sets only).

2. VABSOLUTE is the relative access flag that specifies window motion relative to a specific element (c) which is currently on view in the currently accessed logical record. If the flag is set, motion is relative to the first element of the logical record. If the flag is reset, motion is relative to the current element on view.

3. VNULL is set for null continue (MOVEWINDOW), and is reset for normal MOVEWINDOW operation.

4. VDESTINATION.VDEST is the mark or element number to go to (D).

The window will move to C+D if VMARK, VABSOLUTE equal 0,0; to D if VMARK, VABSOLUTE equal 0,1, to the Dth mark after C if VMARK, VABSOLUTE equal 1,0 and to the Dth mark if VMARK, VABSOLUTE equal 1,1 where VMARK equal 1 is applicable to chained data sets only. C is the number of the record element which is currently on view in the window, relative to the beginning of the logical record and D is an array [1 . . . 2] of vbit16, representing the mark or element number to go to.

For outputs:

VMACB will have its fields set as follows:

1. VACBCOMPL contains the REX event completion code.

2. VACBRESP is the response returned by the data set handler that will have its fields set as follows:
   a. VDEVCC contains the error code/group code.
   b. Other fields in this packet are unnamed, but may be accessed by VPKTINIT[N], where N is the word number (1-16) of this packet.

The FIB must contain the values returned by the procedure VOPENDSET. The ACB must contain the values returned by the procedure that built the access path to the logical record.

VINSERTELEM terminates access to the current element in a logical record of an indexed subfile data set, writing it to disk if necessary. It creates a new element in the subfile and places it in a specified position relative to the current element. It makes the new element the current element on view. It is unprivileged. The procedure definition is VINSERTELEM (var VMFIB: vfib; var VMACB: vacb; VMIOFLAGS: vioflags).

For inputs:

VMFIB will have the following field set:

1. VCHANINFO[O].VCHANRF as set by the procedure VOPENDSET.

VMACB will have the following fields set:

1. VACCESSREF as set by the procedure that built the access path to the logical record.

2. VTIMEOUT is the time to be added to the system timeout value to arrive at the timeout interval for the operation.

3. VPRIORITY is the priority value to be assigned to the operation.

VMIOFLAGS is a set of flags that specify the selected VINSERTELEM options as follows:

1. VBEFORE is the flag that specifies the position in the logical record to insert the element. If the flag is set, the, new element will be logically inserted before the current element. If the flag is reset, the new element will be logically inserted after the current element.

For outputs:

VMACB will have its fields set as follows:

1. VACBCOMPL contains the REX event completion code.

2. VACBRESP is the response returned by the data set handler that will have its fields set as follows:
   a. VIOSTAT contains the error code/group code.

The FIB must contain the values returned by the procedure OPENDSET. The ACB must contain the values returned by the procedure that built the access path to the current logical record.

VDELETELEM terminates access to the current element in a logical record of an indexed subfile data set. It removes from the subfile a logically contiguous run of elements beginning with the current element. The element on view after the remove operation will be the element immediately before the removed run of elements. The function is unprivileged. The procedure definition is VDELETELEM (var VMFIB: vfib; var VCACB: vacd; VMIOFLAGS: vioflags).

For inputs:

VMFIB will have the following field set:

1. VCHANINFO[O].VCHANRF as set by the procedure VOPENDSET.

VMACB will have the following fields set:

1. VACCESSREF as set by the procedure that built the access path to the logical record.

2. VTIMEOUT is the time to be added to the system timeout value to arrive at the timeout interval for the operation.

3. VPRIORITY is the priority value to be assigned to the operation.

VMIOFLAGS will have the following fields set:

1. ELEMNO is the element number (zero relative to the start of the subfile) of the first element in the run of contiguous elements to be removed.

2. NELEMENTS is the count of the number of contiguous elements to be removed.

For outputs:

VMACB will have its fields set as follows:

1. VACBCOMPL contains the REX event completion code.

2. VACBRESP is the response returned by the data set handler that will have its fields set up as follows:
   a. VIOSTAT contains the error code/group code.

The FIB must contain the values returned by the procedure VOPENDSET. The ACB must contain the values returned by the procedure that built the access path to the current logical record.

VMOVELEM move a logically contiguous run of elements in a logical record of an indexed subfile data set to a specified position relative to the current element on view. The function is unprivileged. The procedure definition is VMOVELEM (var VMFIB: vfib; var VMACB: vacb; VMIOFLAGS: vioflags).

For inputs:

VMFIB will have the following field set:

1. VCHANINFO[O].VCHANRF as set by the procedure VPENDSET.

VMACB will have the following fields set:

1. VACCESSREF as set by the procedure that built the access path to the logical record.

2. VTIMEOUT is the time to be added to the system timeout value to arrive at the timeout interval for the operation.

3. VPRIORITY is the priority value to be assigned to the operation.

VMIOFLAGS is a set of flags that specify the selected VMOVELEM options as follows:

1. VBEFORE is the flag that specifies the position in the logical record to move the run of elements. If the flag is set, the run of elements is move to immediately before the current element on view. If the flag is reset, the run of elements is moved to immediately after the current element on view. The window remains over the same logical element number whick will either be the element that was on view before the move (if VBEFORE is reset) or the former element as specified by VELEMNO (if VBEFORE is set).

ELEMNO is the element number (zero relative to the start of the subfile) of the first element in the run of contiguous elements to be moved.

NELEMENTS is the count of the number of elements to be moved.

For outputs:

VMACB will have its fields set as follows:

1. VACBCOMPL contains the REX event completion code.

2. VACBRESP is the response returned by the data set handler that will have its fields set as follows:
  1. VIOSTAT contains the error code/group code.

The FIB must contain the values returned by the procedure VOPENDSET. The ACB must contain the values returned by the procedure that built the access path to the current logical record.

VENDIO terminates a data transfer operation (get, put, or transfer) and tear down the associated access path to a logical data record and is unprivileged. The procedure definition is VENDIO (var VMFIB: vfib; var VMACB: vacb; VMIOFLAGS: vioflags).

For inputs:
VMFIB will have the following fields set:
1. VCHANREF 1 as set by the VM IOSR acquire ownership or OPEN data set operation.

VMACB will have the following fields set:
1. VACCESSREF is the value assigned by VM IOSRs to uniquely identify the access path that is related to this access.
2. VTIMEOUT is the time to be added to the system value to arrive at the timeout interval for the operation.
3. VPRIORITY is the priority value to be assigned to the endio operation.
4. VMIOFLAGS is a set of flags that specify the selected ENDIO options as follows:
  a. VABORTACCESS is set when the request is to abort the current access.

For outputs:
VMACB will have the following fields set on return:
1. VACBCOMPL is the event completion code returned by REX.
2. VACBRESP is the response returned by the device or data set handler that will have its fields set as follows:
  a. VIOSTAT contains the status returned from the device or data set handler.

The device or data set specified by the FIB must be open. The access path specified by the VACCESSREF must exist, i.e., the user must have previously called one of the access procedures. This procedure calls the REX routine ENDIO#.

VCLOSE closes a logical path to a device or data set and is unprivileged. The procedure definition VCLOSE (var VMFIB: vfib; VMIOFLAGS: vioflags).

For inputs:
VMFIB must have the following fields set:
1. VCHANRF as set by the VM IOSR open.
2. VFDEVNAM as set by the VM IOSR open.
3. VACQPKTID, if applicable, as used by the VM IOSR open.
4. VTIMEOUT is the time (in seconds) to be added to the system timeout value to arrive at the timeout interval for the operation.
5. VPRIORITY is the priority value to be assigned to the close operation.

VMIOFLAGS is set as follows:
1. VCHANNO is the channel number to be closed. This is always zero for noncomplex devices.

For outputs:
VMFIB will have the following fields returned:
1. VSYSCOMPL is the REX event completion code.
2. VDEVCOMPL is the close device or data set completion code.
3. VDEVSTATUS is set to VAQUIRED.
4. VCHANRF for this device is set to zero.

The device or data set specified by the FIB must be open. All accesses to the device or data set must have been terminated. After the device is closed, it must be released. This procedure calls the REX routine CLOSE#. A device or data set is considered closed even if the request completes with errors.

VRLSEDEVICE releases ownership of a system device and is unprivileged. The procedure definition is VRLSEDEVICE (var VMFIB: vfib; VMIOFLAGS: vioflags; APPERRCNT: vbit8).

For inputs:
VMFIB will have the following fields set:
1. VCHANINFO contains the system device name that was established at acquire time and uniquely identifies the device being released.
2. VTIMEOUT is the time to be added to the system timeout value to arrive at the timeout interval for the operation.

VMIOFLAGS is a set of flags that specify the options to the release request as follows:
1. VDOWN set if the release is to include maring the device as "down".

APPERRCNT is the count of the number of device errors detected by the application.

For outputs:
VMFIB will have the following fields set:
1. VSYCOMPL is the REX event completion code.
2. VDEVCOMPL is the release completion code.
3. VDEVSTATUS is set to VRLSED if the operation was successful.

No further communication is possible between the device and the old owner unless the device is required. This procedure sends a release device request packet to SYSDEV.

A set of utility procedures and functions offered by the virtual machine monitor are defined below. The utility procedures and functions which the virtual machine provides include:
1. VLOG_IT print the contents of a packet on the local AEB console.
2. VGET_CREATE PKT return the create packet to the caller.

VLOG_IT transfers a log packet to the system log processes and is unprivileged. The procedure definition is VLOG_IT (LOGFMT: VLOGFORMAT, LOGPKT: VPACKET).

For inputs:
LOGFMT is a record specifying the format of the packet to be logged. LOGFMT must be set as follows:
1. USERFORMAT—user formatted.
2. ASCII—ASCII.
3. BADPKT—bad packet.
4. HEXPKT—HEX. LOGPKT is a 16-word packet to be logged.

If the packet is user formatted, the following fields in the packet must be set:
1. LGUSERFLAG is the user flags (currently unused).
2. LGMSGTYPE is the log message type number that is used by SYSMON for display control.
3. LGMSGNO is the system error group/error code for this packet.
4. LGDATA is the user data to be logged.

If the packet is ASCII or HEX, the packet field VPKTINIT[3] through VPKTINIT[16] contains the user data to be logged.

If the packet is a bad packet, the user should not alter the packet headers. Other fields may be altered at the option of the user.

This procedure calls the REX routine LOGIT, LOGIS$A, LOGIT$B OR LOGIT$H, depending on the value of LOGFMT.

VGETCREATEPKT returns the create process request packet to the caller and is unprivileged. The procedure definition is VGETCREATEPKT (var CREATEPKT: vpacket).

For outputs:

CREATEPKT is returned with the contents of the packet that was sent to cause creation of the calling process.

The following files give a standard Pascal interface to VMM system routines. They are named as follows:

1. VM.CONST—this file contains the constant declarations as well as the keyword CONST. Therefore, it should be included in front of the programs' constant declarations.

2. VM.TYPE—this file contains the type declarations as well as the keyword TYPE. Therefore, it should be included in front of the programs' type declarations.

3. VM.SERVICE—this file contains the code necessary to interface with the VMM procedures. It should be included before any references to VMM procedures.

The REX event completion codes are:

| | | |
|---|---|---|
| VCOMPOK | = X'0'; | (* OK *) |
| VINOUNSOL | = X'1'; | (* Unsolicited packet received. *) |
| VIOSOL | = X'2'; | (* Solicited packet received. *) |
| VSIGUNSOL | = X'3'; | (* Unsolicited signal received. *) |
| VSIGSOL | = X'4'; | (* Solicited signal received. *) |
| VTMOUTP | = X'5'; | (* Pure timer timed out. *) |
| VDELETE | = X'F'; | (* Delete process request from JSAM. *) |
| VMAXGOODREXCC | = X'FF'; | |
| VHDR1REJ | = X'101'; | |
| VHDR2REJ | = X'102'; | (* Transfer, complete, header rejected. *) |
| VABORTREJ | = X'103'; | (* Transfer aborted, header rejected. *) |
| VOUTOFSEQ | = X'104'; | (Data packet transfer-packet out of sequence. *) |
| VSPACEERR | = X'105'; | (* Data packet transfer-out of buffer space. *) |
| VMOVEFAIL | = X'106'; | (* Data packet transfer-byte count error. *) |
| VTIMEOUT | = X'107'; | (* Timeout occurred on I/O, SIGNAL. *) |
| VECBINVALID | = X'108'; | (* Invalid ECB address specified. *) |
| VNORESOURCES | = X'109'; | |
| VCANTACCESS | = X'10A'; | (* Access path already active; previous I/O function not yet completed (IOSRs). *) |
| VCALLINVALID | = X'10B'; | |

The VMM event completion codes are defined by HEX, (decimal) and group as follows:

| | | |
|---|---|---|
| 60 | (24576) | VMM good event codes |
| 61 | (24832) | General VMM error codes |
| 62 | (25088) | Memory file error codes |
| 63 | (25344) | Resource manager error codes |
| 64 | (25600) | P-code errors |
| 65 | (25856) | PDS error codes |
| 66 | (26112) | VMM utility error codes |

The general constants are:

| | | |
|---|---|---|
| VIOOK | = 0; | |
| VMAXCHAN | = 1; | (* Maximum channel for complex device, 0 or 1 *) |
| VMAXDSNAMLEN | = 32; | (* Maximum name length for data sets *) |
| VMAXREFELEMENT | = 255; | |
| VMEMFILELIMIT | = 10; | (* Maximum number of memory files per process *) |
| VPMINDSLTH | = 8; | (* Data set length that fits in a standard parameter list *) |
| VPLMINMOV | = 19; | (* Minimum amount to be moved for an IOCB *) |
| VPLMINKEY | = 8; | (* Key length that fits in a standard parameter list *) |
| VIOCBHDRSIZE | = 3; | (* The header size of the |

-continued

|  |  |  |
|---|---|---|
|  | IOCB down to the parameter list *) |  |

The IOSR option codes are:
"WHERE" options of GET/PUT:

| VDATAFLD | = 0; | (* Data-field of record *) |
|---|---|---|
| VMEMFLD | = 1; | (* Memo-field of record *) |
| VKEYFLD | = 2; | (* Key-field of record *) |

Utility data areas: VREADDIRECT/VWRITEDIRECT:

| UDAAREA | = 0; | (* Utility data area *) |
|---|---|---|
| PCAREA | = 2; | (* Primary control area *) |
| SCAAREA | = 3; | (* Secondary control area *) |

DSR function codes:

| VDSRCONTINUE | = 6; | (* Continue function code *) |
|---|---|---|
| VDSRDELETE | = 7; | (* Delete function code *) |
| VDSRRENAME | = 8; | (* Rename function code *) |
| VDSRUNLOCK | = 9; | (* Unlock function code *) |
| VDSRMARK | = 13; | (* Mark function code *) |

The memory management constants are:

| VMAXMAP | = 253; | (* Maximum map segment number *) |
|---|---|---|

TYPE:

| vbit1 | = 0..1; |  |
|---|---|---|
| vbit2 | = 0..3; |  |
| vbit3 | = 0..7; |  |
| vbit4 | = 0..15; |  |
| vbit5 | = 0..31; |  |
| vbit6 | = 0..63; |  |
| vbit7 | = 0..127; |  |
| vbit8 | = 0..255; |  |
| vbit9 | = 0..511; |  |
| vbit10 | = 0..1023; |  |
| vbit11 | = 0..2047; |  |
| vbit12 | = 0..4095; |  |
| vbit13 | = 0..8191; |  |
| vbit14 | = 0..16383; |  |
| vbit15 | = 0..32767; |  |
| vbit16 | = integer; | (* −32768..32767 *) |

The general types are:

| vaddr | = | pointer (integer); |  |
|---|---|---|---|
| vappclasses | = | (vspmcode, vpsodemain, vpcodesub); |  |
| vchanrange | = | 0..vmaxchan; |  |
| vclassrange | = | vbit3; |  |
| vcomplcode | = | packed record<br>case integer of<br>  1 : (ver-       : vbit8;<br>        group<br>        verrcode : vbit8);<br>  2 : (verrword : vbit16) |  |
| end (* vcomplcode *); |  |  |  |
| vdevcompcode | = | packed record<br>  vioerrgroup  : vbit8;<br>  vioerrcode   : vbit8; |  |
| end (* vdevcompcode *); |  |  |  |
| vecbid | = | vbit16; |  |
| vfcrange | = | vbit4; |  |
| vlogformat | = | (userformat, ascii, badpkt, hexpkt); |  |
| vlonginteger | = | array [1..2] of vbit16; |  |
| vmaprange | = | 0 .. vmaxmap; | (* number of segment maps in GPP *) |
| vmfrname | = | packed array | [1..8] of char; |
| vpageindexrange | = | 1..6; | (* number of pages per segment map *) |
| vprogid | = | packed record<br>  fil11   : vbit16;<br>  progno : vbit16;<br>  fil12   : vbit16; |  |
| end (* vprogid *); |  |  |  |
| vprogramname | = | packed array [1 .. 12] of char;<br>(* .CODE is added by CXP *) |  |
| vrankrange | = | vbit8; |  |
| vpriority | = | packed record<br>  class : vclassrange;<br>  fill  : vbit1;<br>  rank : vrankrange; |  |
| end (* vpriority *); |  |  |  |
| vsdtype | = | (vacq, vopid, vrls, vssub);<br>(* type of call to SYSDEV *) |  |

-continued

| | | | |
|---|---|---|---|
| vstypelist | = | packed array [1..14] of vbit8;<br>(* subtype list for acquire *) | |
| vuserrefval | = | vbit16; | |

The declarefc definitions are:
| | | | |
|---|---|---|---|
| vfcs | = | (VFC1,VFC1,VFC2,VFC3,VFC4,VFC5,VFC6,<br>VFC7,VFC8,VFC9,VFCA,VFCB,VFCC,VFCD,<br>VFCE,VFCF); | |
| vfcset | = | set pf vfcs' | |

The packet definitions are:
| | | | |
|---|---|---|---|
| vbidrange | = | vbit7; | |
| vcxidrange | = | vbit5; | |
| vcxsizerange | = | vbit4; | |
| vjobnorange | = | vbit16; (* 0..65535 *) | |
| vmemrange | = | vbit15; (* 0..65535 *) | |
| vprtyrange | = | vbit12; | |
| vspidrange | = | vbit8; | |
| vipidrange | = | vbit13; (* vcxid = 5 bits,<br>vspid = 8 bits *) | |
| vpid | = | packed record | |
| | | fil0 | : vbit4; |
| | | cxid | : vcxidrange; |
| | | bid | : vbidrange; |
| | | fil1 | : vbit8; |
| | | spid | : vspidrange; |
| end (* vpid *); | | | |
| vloadstates | = | (load, loading, loaded); | |
| vpgmreqmap | = | packed array [1..14] of vbit4; | |
| vpgmrspmap | = | packed array [1..14] of vmaprange; | |
| vpacket | = | packed record | |
| case integer of | | | |
| 1: (vfcode | : | vfrange; | |
| vcxid | : | vcxidrange; | |
| vbid | : | vbidrange; | |
| vrspid | : | vspidrange; | |
| vspid | : | vspidrange; | |
| vrcode | : | vfcrange; | |
| vrbid | : | vbidrange; | |
| vipkt | : | array [1..13] of vbit16); | |
| 2: (vpktinit | : | array [1..16] of vbit16); | |
| 3: ((* I/O return packet definitions *) | | | |
| fil1 | : | array [1..5] of vbit16; | |
| vdevcc | : | vcomplcode; | |
| fil2 | : | array [1..3]3] of vbit16; | |
| vdatalen | : | vbit16 ); | |
| 4: ((* CR = Create Process request packet *) | | | |
| crfil0 | : | array [1..3] of vbit16; | (* words 0-2 *) |
| crjobno | : | vbit16; | (* word 3 *) |
| crfil7 | : | boolean; | (* word 4 *) |
| crbypass | : | boolean; | |
| crspecial | : | boolean; | |
| crfil4 | : | vbit1; | |
| crclass | : | vclassrnage; | |
| crfil6 | : | vbit1; | |
| crrank | : | vrankrange; | |
| crprogid | : | vprogid; | (* words 5-7 *) |
| crfil1 | : | vbit3; | (* word 8 *) |
| crcxno | : | vcxidrange; | |
| crfil2 | : | vbit4; | |
| crcxsize | : | vbit4; | |
| crfil3 | : | vbit13; | (* word 9 *) |
| crnonshare | : | boolean; | |
| crappclass | : | vappclasses; | |
| crfil5 | : | array [1..2] of vbit16; | (* words A&B *) |
| crjobparms | : | array [1..4] of vbit16) | (* words C&F *) |
| 5: ((* CRM | = | create packet sent by resource manager<br>to virtual machine monitor for new<br>process. Also sent back to resource<br>manager to give load status and sent<br>from process to resource manager on<br>deallocation. *) | |
| crmfil0 | : | array [1..3] of vbit16; | (* word 0-2 *) |
| crmprogname | : | vprogramname; | (* word 3-8 *) |
| crmfil1 | : | vbit8; | (* word 9 *) |
| crmdataseg | : | vmaprange; | |
| crmfil2 | : | integer; | (* word A *) |
| cmrfil3 | : | vbit2; | (* word B *) |
| crmpds | : | boolean; | (* 0 = Delphi.<br>driver *)<br>(* 1 = Delphi.<br>pascal *) |

-continued

|   |   |   |   |
|---|---|---|---|
| | crmmemavail | : | boolean; |
| | crmjsamcreated | : | boolean; |
| | crmrpttocreator | : | boolean (* True if process was created thru FC 'B' *) |
| | crmprogid | : | vprogid; (* word C-E : program ID from create packet *) |
| | crmabortchr | : | integer); (* word F : the abort character from PSS *) |
| 6: | ((* MF0 | = | Memory File Open request packet, also used for extended memory files *) |
| | mfofil0 | : | array [1..3] of vbit16; (* word 0-2 *) |
| | mfoname | : | vmfrname; (* word 3-6 *) |
| | mfoinitrcdcnt | : | integer; (* word 7 *) |
| | mfomaxrcdcnt | : | integer; (* word 8 *) |
| | mfopagesperrcd | : | integer; (* word 9 *) |
| | mfodatasegno | : | vmaprange; (* word A *) |
| | mforelpgidx | : | vpageindexrange; (* word B *) |
| | mfextendrcucnt | : | integer; (* word C *) |
| 7: | ((* MFR | = | Memory File Response packet and Memory File Close Request packet *) |
| | mfrfil0 | : | array [1..3] of vbit16; (*word 0-2 *) |
| | mfrstatus | : | vcomplcode; (* word 3 *) |
| | mfrno | : | vbit16; (* word 4 *) |
| | mfrfil1 | : | array [1..2] of integer; (* word 5-6 *) |
| | mfrcrntrcdcnt | : | vbit16 (* word 7 *) |
| | mfrfil2 | : | array [1..4] of integer; (*word 8-B *) |
| | mfrcdno | : | integer); (* word C *) |
| 8: | ((* CRN | = | Create Node Request packet *) |
| | crnfil0 | : | array [1..3] of vbit16; (* word 0-2 *) |
| | crnjobno | : | vbit16; (* word 3 *) |
| | crnfil1 | : | vbit16; (* word 4 *) |
| | crnnid | : | boolean; (* word 5 *) |
| | crnprim | : | boolean; |
| | crnrecov | : | boolean; |
| | crnfil2 | : | boolean; |
| | crnloss | : | vbit4; |
| | crnfil3 | : | vbit6; |
| | crnct | : | vbit2; |
| | crnpgm1 | : | vprogid; (* word 608 *) |
| | crnpgm2 | : | vprogid; (* word 9-B *) |
| | crnpgm3 | : | vprogid; (* word C-E *) |
| | crnfil4 | : | vbit9; (* word F *) |
| | crnuserbid | : | vbidrange); |
| 9: | ((* CNR | = | Create Node Response packet *) |
| | cnrfil0 | ; | array [1..3] of vbit16; (*word 0-2 *) |
| | cnrjobno | : | vbit16; (* word 3 *) |
| | cnrpgm | : | vbit16; (* word 4 *) |
| | cnrfil1 | : | vbit15; (* word 5 *) |
| | cnrnakflag | : | boolean; |
| | cnrnpid1 | : | vpid; (* word 6-7 *) |
| | cnrnpid2 | : | vpid; (* word 8-9 *) |
| | cnrnpid3 | : | vpid; (* word A-B *) |
| | cnrnpid4 | : | vpid; (* word C-D *) |
| | cnrnpid5 | : | vpid); (* word E-F *) |
| 10: | ((* LG = Log packet *) | | |
| | lgfil1 | : | integer; (* word 0 *) |
| | lgfil2 | : | vbit13; (* word 1 *) |
| | lguserflag | : | vbit3; |
| | lgmsgtype | : | vbit15; (* word 2 *) |
| | lgfil3 | : | packed array (3..7] of vbit16; (*word 307 *) |
| | lgmsgno | : | integer; (* word 8 *) |
| | lgdata | : | packed array [1..7] of vbit16); (* word 9-F *) |
| 11: | ((* CPR | = | Create Process Response packet *) |
| | cprhdr | : | packed array [0..2] of vbit16; (* word 0-2 *) |
| | cprjobno | : | integer; (* word 3 *) |
| | cprfil4 | : | vbit15; (* word 4 *) |
| | cprpgmload | : | boolean; |
| | cprerrno | : | vcomplcode; (* word 5 *) |
| | cprpgm | : | vprogid; (* word 6-8 *) |
| | cprfil | : | packed array [9..15] of vbit16); (* word 9-F *) |
| 12: | ((* LRS | = | Program Load Response packet *) |
| | lrshdr | : | array [0..2] of vbit16: (* word 0-2 *) |
| | lrstatus | : | vloadstates; (* word 3 *) |
| | lrserror | : | boolean; |
| | lrsmap | : | vpgmrspmap); (* word 4-A *) |
| 13: | ((* LRQ | = | Program Load Request packet *) |
| | lrqhdr | : | array [0..2] of vbit16; (* word 0-2 *) |
| | lrqfil0 | : | vbit2; (* word 3 *) |
| | lrq | : | (vloaded, vres, vnotifyl, vnotifyd); |

-continued

```
        lrqnumofmaps          :   vbit4;
        lrqdseg               :   vmaprange;
        lrqdsnum              :   integer;              (* word 4 *)
    case integer of
      1: (lrqpgmid            :   vprogramname;         (* word 5-A *)
          lrqprogno           :   integer);             (* word B *)
      2: (lrqmap              :   vpgmreqmap;           (* word 5-8 *)
          lrqsegjmap          :   vpgmreqmap));         (* word 9-C *)
    end (* vpacket *);
```

The packet definition for the acquire, release and set subtype packets sent to SYSDEV are:

```
vaqupacket               =   packed record
    case integer of
      1: (vpkt              :   vpacket);
      2: (fil1              :   packed array [1..3] of vbit16;
                                                        (* acquire *)
          vjobno            :   vbit16;
          vusrref           :   vbit16;
          vqopt             :   vbit1;
          vacqtype          :   vbit1;
          fil2              :   vbit2;
          vprior            :   vbit4;
          vopcode           :   vbit8;
          vintnm            :   vbit16;
          vusnfc            :   vfcrange;
          vusncx            :   vcxidrange;
          vusnbid           :   vbidrange;
          vdevtype          :   vbit8;
          vusnspid          :   vbit8;
          vstypelst         :   bstypelist);
      3: (fil3              :   array [1..5] of vbit16;  (* release *)
          vapperrcnt        :   vbit8);
      4: (fil4              :   array 1..7] of vbit16;   (* set sub-
                                                            type *)
          vsubtype          :   vbit16;
          vzenopid          :   vbit16);
    end (* vacqpacket *);
```

The VCOM definition is:

```
vmfrcd                   =   packed record             (* Each entry in the array of
                                                          memory files *)
    mfname               :   vmfrname;
    mfno                 :   integer;                  (* Internal number assigned to
                                                          file *)
    mfcurrcd             :   vbit11;                   (* Current record that is
                                                          installed *)
    mfrelmempy           :   vbit5;                    (* Relative page in this seg-
                                                          ment where the file starts
                                                          (1..16) *)
    end (* vmfrcd *);
vcomrec                  =   record                    (* Record kept in VCOM to
                                                          describe the process for
                                                          VMM. *)
    vccrpkt              :   vpacket;                  (* The create process request
                                                          packet sent by the resource
                                                          manager to the virtual
                                                          machine monitor to create the
                                                          process *)
    vcrmpkt              :   vpacket;                  (* The create request communi-
                                                          cation packet for this pro-
                                                          cess as defined by the re-
                                                          source manager. *)
    vmftable             ;   array [1..vememfilelimit]
                             of fmvrcd;
    end (* vcomrex *);
vcomrptr                 =   pointer (vcomrec);
```

The SELFPID definition is:

```
vipidrec                 =   packed record
    vfiller3             :   vbit3;
    vpidcx               :   vcxidrange;
    vpidspid             :   vspidrange
    end (* vipidrec *);
vpidrec                  =   packed record
    vpidbid              :   vbidrange;
    vipid                :   vipidrec
    end (* vpidrec *);
```

The time management types are:

```
vmmtimeunits             =   (vtmnull, vsecs, vmills);
vdtrectype               =   packed record
```

-continued

```
year                    : 0..99;
month                   : 1..12;
day                     : 1..31;
doy                     : 1..366;
dow                     : 1..7;
hour                    : 0..23;
min                     : 0..59;
sec                     : 0..59;
hsec                    : 0..99;
end (* vdtrectype *);
```

The send / signal definitions are:

```
vcsfselements       =    (vcwf0,fcwf1,vdwf2,fcwf3,fcwf4,fcwfT,
                          vcwf6,fcwf7,fcwfL,vcwfF,vdwfH,vdwfA,
                          vcwfE,vcwfS,vcwfR,vcwfN);
vmemtypes           =    (VSCRATCHPAD, VMNULL, VDATAMEN);
vaglist             =    packed record
case integer of
    1: ((* Actual definition of SEND argument list *)
        VALRESECBADR    :   vbit16;             (* =0 *)
        VALUSERREFVAL   :   vbit16;             (* response *)
    2: ((* Definition to initialize argument list
        to zero *)
        VALFINIT        :   array [0..7] of vbit16);
    3: ((* Definition of STARTTIMER argument list *)
        C1              :   vbit5:
        PUNITS          :   vmmtimeunits;       (*minutes or seconds *)
        C2              :   vbit4;
        PECBCODE        :   vbit5;              (* greater than or =
                                                to 16 *)
        PUREFID         :   vuserrefval;        (* user reference value *)
        PEXADDR         :   integer;            (* SPM set *)
        PTMIPID         :   vipidrec;           (* SELFPID *)
        PTIMELEN        :   integer);           (* number of units *)
    4: ((* Definition of DATETIME argument list *)
        PYEAR           :   integer;            (* year *) (*word 0 *)
        F1              :   vbit4;              (* filler *) (* word 1 *)
        PMONTH          :   1..12;              (* month - 4 bits *)
        F2              :   vbit3;.             (* filler *)
        PDAY            :   1..31;              (* day of month-5 bits*)
        F3              :   vbit4;              (* filler *) (* Word 2 *)
        PDOY            :   1..366;             (* day of year-9 bits *)
        PDOW            :   1..7;               (* day of week-3 bits *)
        F4              :   vbit3;              (* filler *) (* word 3 *)
        PHOUR           :   0..23;              (* hour (military) -
                                                5 bits *)
        F5              :   vbit2;              (* filler *)
        PMIN            :   0..59;              (* minute of hour - 6
                                                bits *)
        F6              :   vbit2;              (* filler *) (* word 4 *)
        PSEC            :   0..59;              (* second of minute -
                                                6 bits *)
        F7              :   vbit1;              (* filler *)
        PCSEC           :   0..99;              (* hundredths of seconds -
                                                7 bits *)
end (* varglist *);
VCRTLWRD            =    packed record
Case integer of
    1: ((* Actual Definition of SEND / SIGNAL Control
        Word *)
        VCWN            :   boolean;            (* Formatted ECB for
                                                notify supplied *)
        VCWR            :   boolean;            (* Formatted ECB for resp.
                                                supplied *)
        VCWS            :   boolean             (* Switch header before
                                                transfer *)
        VCWE            :   boolean;            (* 1=wait specific;
                                                U=wait any *)
        VCWA            :   boolean;            (* 0=default to L & L+1;
                                                1=don't *)
        VCWH            :   boolean;            (* Create return header *)
        VCWF            :   boolean;            (* Free packet to avail-
                                                able space *)
        VCWL            :   boolean;            (* 1=long format; 0=short
                                                format *)
        VCWM            :   vmemtypes;          (* 0=scratchpad; 10=data
                                                memory *)
        VCWT            :   boolean;            (* Time response *)
        VCW4            :   boolean;
        VCWC            :   vfcrange);          (* function code for return
                                                hdr/resp *)
    2: P ((* Definition to initialize Control Word to
```

-continued

```
      zero *)
    VCWFINIT              :   vbit16);
  3: ((* Definition to act on Ctron word as a set *)
    VCWFSET               :   set of vcwfselements)
end (* vctrlwrd *);
```

The wait / check_event definitions are:
```
vchecktype              = ( VCHKANY, VCHKUSERREF, VCHKRESPONSEID );
vwaittype               = ( VWAITANY, VWAITSPECIFIC );
```

The I/O definitions are:
```
chanreft                = 0..255;
volid                   = packed record
case integer of
  1: (volidmov          :   array [i..3] of Vbit16;
  2: (volidinit         :   packed array [1..6] of char)
end (* volid *);
vdatasetinfo            = packed record case integer of
  1: ((* used to move DSINFO into REXPARMLIST *)
    vdsimov             :   array [1..30] of integer;
  2: (
    vdsexcl             :   boolean;               (* 1= exclusive open,
                                                      0= shared open *)
    vdsrdwr             :   boolean;               (* 1= write, 0= read *)
    vdsutil             :   boolean;               (* 1= utility open,
                                                      0= normal open *)
    fil1                :   vbit13;
    vdsuncat            :   boolean;               (* 1= uncatalogued,
                                                      0= catalogued *)
    vdsup               :   boolean;               (* 1= duplicated,
                                                      0= not duped *)
    fil2                :   vbit14;
    fil3                :   vbit16;
    fil4                :   vbit8;
    vparmlth            :   vbit8;                 (* parameter list length *)
    vuser               :   packed array [1..5] of vbit8;
                                                   (* requester ID *)
    vpart               :   vbit8;                 (* part number (tape
                                                      reel) *)
    vdsnamlen           :   vbit8;                 (* data set name length *)
    vdsnam              :   packed array [1..32] of char;
                                                   (* data set name *)
    volid1              :   volid;                 (* first volume ID *)
    volid2              :   volid;                 (* second volume ID *)
end (* vdatasetinfo *);
vdevname                = vbit16;
viofunccodes            = (vfcopen, vfcclose, vfccontrol,
                           vfcaccess, vfcendio, vfcget, vfcput,
                           vfctransfer, vfcopendev, vfcaccdev,
                           vfccontinue, vfccntrlds, vfcgdata);
vrefrange               = 1..255;
vrefset                 = set of vrefrange;
vreftype                = (vrefaccess, vrefchan);
vdvstatcode             = (vaquired, vopened, vrlsed)
vrecordidtype           = array [1..3] of vbit16;
(* Access conrrol block definition *)
vacb                    = packed record
  VACCESSREF            :   vbit8;                 (* VM IOSR assigned
                                                      reference value. *)
  VACBCOMPL             :   vcomplcode;            (* REX event completion
                                                      code. *)
  VACBRESP              :   vpacket;               (* Rtn packet from opera-
                                                      tion (13 wds) *)
  VTIMEOUT              :   vbit8;                 (* User defined *)
  VPRIORITY             :   vbit8;                 (* User defined *)
  VACCHANNO             :   vchanrange;            (* Index into FIB table
                                                      of channels *)
end (* vacb *);

The file information block definition is:
vfig                    = packed record
  VCHANCNT              :   vbit8;                 (* No. of channels sup-
                                                      ported for FIB *)
  VCHANINFO             :   array [vchanrange] of
                            packed record
  VCHANRF               :   vchanreft;             (* VIOSR assigned channel
                                                      reference value *)
  VFDEVNAM              :   vdename;               (* Device name for
                                                      channel *)
  VCQSBID               :   vbidrange;             (* BID of channel *)
```

-continued

| | | |
|---|---|---|
| VCHDEVTYP | : vbit8; | (* Device type of device for this channel *) |
| end; | | |
| VOPID | : vbit16; | (* Operator ID from acquire response *) |
| VSYSCMPL | : vcomplcode; | (* REX event completion code. *) |
| VDEVCMPL | : vcomplcode; | (* DEvice/ data set completion code. *) |
| VACQPKTID | : vbit16; | (* Acquire Packet ID *) |
| VOPENRESP | : vpacket; | (* Open response packet for use in record and playback *) |
| VTIMEOUT | : vbit8; | (* User defined. *) |
| VPRIORITY | : vbit8; | (* User defined. *) |
| VDEVSTATUS | : vdvstatcode; | (* Device status - ACQUIRED or OPENED *) |
| end (* vfib *); | | |

The I/O flag definitions are:

| | | |
|---|---|---|
| vioflags | = packed record | |
| VACQQUEUE | : boolean; | (* SEt if SYSDEV permitted to queue acquire *) |
| VACQSEIZE | : boolean; | (* Set if dev chanl to be seized during acq *) |
| VDOWN | : boolean; | (* True if release and down required *) |
| VDIALOUT | : boolean; | (* True if zeize is for dialout *) |
| (* VREADDIRECT, VWRITEDIRECT, VREADKEY *) | | |
| VUPDATE | : boolean; | (* Set if updating read (i.e. read w/lock *) |
| (* VREADKEY *) | | |
| VGREATER | : boolean; | (* Used on keyed rcds to find next grtr key *) |
| VMEMOREC | : boolean; | (* Set if memo rcd is not to be retrieved *) |
| VDATAREC | : boolean; | (* Set if data rcd is not to be retrieved *) |
| VKAPPROX | : boolean; | (* Set if read is approx, used w/VGREATER *) |
| (* VWRITEKEY *) | | |
| VREPLACE | : boolean; | (* Set if write is update of existing rcd *) |
| VELEMSELECT | : boolean; | (* Used by VALLOCATE - see spec *) |
| VUNITS | : boolean; | (* United of motion for VMOVEWINDOW *) |
| VRELATIVE | : boolean; | (* Window motion relative to current record *) |
| (* VCONTINUE *) | | |
| VNULL | : boolean; | |
| (* VCONTINUE: indexed record *) | | |
| VSAMREC | : boolean; | |
| VNODATA | : boolean; | |
| (* VMARK, VUNMARK, VCONTINUE: string *) | | |
| VMARK | : boolean; | |
| (* VCONTINUE: subfile *) | | |
| VBEFORE | : boolean; | (* Position in logical rcd to insert element *) |
| (* VENDIO *) | | |
| VLOCK | : boolean; | |
| VABORTACCESS | : boolean; | (* Abort current access *) |
| (* VWGET, VWPUT *) | | |
| VPGWHERE | : vbit2; | |
| (* VWPUT *) | | |
| VFIELD | : boolean; | |
| VCHANNO | : vchanrange; | (* Set to chanl no. of multi-chanl device *) |
| (* VCONTINUE: string/subfile *) | | |
| VABSOLUTE | : boolean; | |
| VDESTINATION | packed record | |
| case integer of | | |
| 1: ( VDESTINIT | : array [1..3] of vbit16); | |
| 2: ( VDEST | : array [1..2] of vbit16 | |
| VELEMENT | : vbit16) | |
| end (* VDESTINATION *) | | |
| (* VCONTROL *) | | |

-continued

| | | |
|---|---|---|
| VFCSPECIFIED | : boolean; | (* True if VCNTRLFC is specified *) |
| VCNTRLFC | : vfcrange; | (* Function code to use in VCONTROL if VFCSPECIFIED is true *) |

The REX I/O control word definitions are:

| | | |
|---|---|---|
| VIOWSELEMENTS | = | (VIOCWS0, VIOCWS1, VIOCWS2, VIOCWS3, VIOCWSQ, VIOCWST, VIOCWSM, VIOCWSA, VIOCWSW, VIOCWSR, VIOCWS0, VIOCWSF, VIOCW12, VIOCW13, VIOCW14, VIOCW15 ); |
| VIOCWTYPES | = | (VOICWDETAIL, VIOCWINIT, VIOCWSET); |
| VIOCTRLWRD | = | packed record |
| case viocwtypes of | | |
| VIOCWDETAIL | : | ((* Actual definition of REX I/O control word *) |
| VIOCWED | : vfcrange; | (* REX I/O event code *) |
| VIOCWF | : boolean; | (* 1 = Use FC specified in VIOCWFC 0 = Use REX defaults *) |
| VIOCWO | : boolean; | (* 1 = I/O running as caller's routine *) |
| VIOCWR | : boolean; | (* 0 = Do not return input parameter list *) |
| VIOCWW | : boolean; | (* 1 = WAIT$E *) |
| VIOCWA | : boolean; | (* 0 = Do not invoke ENDIO; pertains to ACCESS, CONTINUE, GET, PUT, TRANSFER; on CONTROL & OPEN: 0 = chanl 0 & 1 = chanl 1 *) |
| VIOCWM | : boolean; | (* For OPEN & CONTROL, loc of acquire resp packet: 0=scratchpad, 1=data memory. For ACCESS & CONTINUE, 0=input, 1=output *) |
| VIOCWT | : boolean; | (* 1 = Time response *) |
| VIOCWQ | : boolean; | (* 1 = End of sequence *) |
| VIOCWFC | : vfcrange); | (* REX I/O function code *) |
| VIOCWINIT | : | ((* Definition to initialize I/O control word to zero *) |
| VIOCWINIT | : vbit16; | |
| VIOWSET | : | ((* Definition to act on I/O control word as a set *) |
| VCWFSET | : set of viocwselements) | |
| end (* vioctrlwrd *); | | |

The IOSR REX parameter list control word formats are:

| | | |
|---|---|---|
| VIODCRTL | = | packed record |
| case integer of | | |
| 1: ( | | (* VOPEN DSET *) |
| VIODINIT | : vbit16); | |
| 2: ( | | (* VREADDIRECT, VREDMAPPED *) |
| FIL2 | : vbit13; | |
| VIODUTIL | : vbit2; | |
| VIODUPD | : boolean); | |
| 3: ( | | (* VWGET, VWPUT *) |
| FIL3 | : vbit3; | |
| VIODFLD | : vbit2; | |
| FIL4 | : vbit10; | |
| FIELD | : boolean); | |
| 4: ( | | (* VREADKEY *) |
| FIL5 | : vbit11; | |
| NODATA | : boolean; | |
| FIL55 | : vbit1; | |
| APPROX | : boolean | |
| GREATER | : boolean; | |
| UPDATE | : boolean); | |
| 5: ( | | (* VENDIO *) |
| FIL6 | : vbit1; | |
| ABORT | : boolean; | |
| LOCK | : boolean; | |

```
         FIL7            :   vbit13;
  6: (                       (* VMARK, VUNMARK *)
         FIL8            :   vbit15;
         UNMARK          :   boolean);
  7: (                       (* VLOCK, VUNLOCK *)
         FIL9            :   vbit15;
         VUNLOCKALL      :   boolean);
  8: (                       (* VCONTINUE *)
         FIL10           :   vbit1;
         ISTRING         :   boolean;
         FIL11           :   vbit7;
         INULL           :   boolean;
         SAMEREC         :   boolean;
         INODATA         :   boolean;
         FIL13           :   vbit4;
  9: (                       (* VPCONTIUE, VMOVEWINDOW,
                              VINSERTELEM, VDELETELEM,
                              VMOVELEM *)
         FIL14           :   vbit1;
         STRING          :   boolean;
         FIL15           :   vbit7;
         NULL            :   boolean;
         MARK            :   boolean;
         ABSOLUTE        :   boolean;
         BEFORE          :   boolean;
         FIL16           :   vb1';
         OPERATION       :   vbit2);
 10: (                       (* WRITEKEY *)
         FIL17           :   vbit9;
         REWRITE         :   boolean;
         FIL18           :   vbit6);
end (* viodcrtl *);

The VNM IOCB definition is:
VCRTRDCRTL        =   packed record
VSOM              :   vbit8;               (* start of message
                                              character *)
VPARTNO           :   vbit8;               (* partition number *)
VLINEITEM         :   vbit8;               (* line number *)
VEOM              :   vbit8;               (* end of message
                                              character *)
end (* vcrtrdcrtl *);
VCRTLINFO         =   packed array        [1..18' of vbit8;
                                              (* control information *)
VDEVTYPE          =   vbit8;               (* device type for
                                              acquire *)
(* SP *)

The REX I/O parameter list is:
VREXIOPARMLIST    =   packed record
case integer of
  1: ((* Actual definition of REX I/O parameter
        list *)
      FIL1            :   array ('..2]     of vbit16; (* word 0-1 *)
                                              (* Primary & secondary
                                              rtn address *)
      VPLPARMID       :   vbit16;          (* Acquire packet address
                                              or I/O list address *)
                                              (* word 2 *)
      VPLCHANREF      :   vchanreft;       (* Chanl no. for access *)
                                              (* word 3 *)
      VPLACCESSREF    :   vbit8;           (* Access reference
                                              value *)
      VPLOPCTRL       :   viodctrl;        (* Operation control *)
                                              (* word 4 *)
      FIL2            :   vbit8;           (* word 5 *)
      VPLPRIORITY     :   vbit8;           (* Priority *)
      FIL3            :   vbit16;          (* word 6 *)
      FIL4            :   vbit8;           (* word 7 *)
      VPLPSTLTH       :   vbit8;           (* Access key or para-
                                              meter list lth *)
      VPLPLSTPTR      :   vaddr);          (* Ptr to data key *)
                                              (* word 8 *)
  2: ((* Initialization definition of REX I/O para-
        meter list *)
      VPLINIT         :   array [;..16] of integer:
                                              (* word 0-F *)
  3: ((* Definition for disk direct access *)
      FIL6            :   array [1..4] of vbit16;  (* word 0-3 *)
      FIL7            :   vbit15;          (* word 4 *)
      VPLUFLAG        :   boolean;         (* Update flag *)
      FIL8            :   array [1..3] of vbit16;  (* word 5-7 *)
```

-continued

```
           VPLELEMNO        :   vlonginteger;          (* word 8 *)
           VNUMBLKS         :   vbit16);               (* Anticipate buffering *)
                                                       (* word 9 *)
    35:  ((* Definition for VMARK & VUNMARK *)
           FIL9             :   array [1..8] of vbit16;
           VMARK            :   vbit16;                (* Mark number *)
                                                       (* word 8 *)
           VOFFSET          :   vbit16;                (* Mark offset in elem. *)
                                                       (* word 9 *)
           VREFVAL          :   vbit16;                (* User reference value *)
                                                       (* word A *)
    4:   ((* Definitions for VTRANSFER, VCONTROL, VREADCRT,
         & VWRITEDEV *)
           FILA             :   array [1..6] of vbit16;   (* word 0-5 *)
           VPPDEVIN         :   vdevname;                  (* Internal device name *)
                                                          (* word 6 *)
    case integer of
    1:  (FILB               :   array [1..2] of vbit15;    (* word 7-8 *)
         VCNTRL             :   vcrtrdctl);                (* word 9 *)
                                                          (* SOM. partition number,
                                                          line item, and EOM for
                                                          VREADCRT *)
    2:  (FILC               :   array of 1..2] of vbit16;
                                                          (* word 7-8 *)
         VPPWRTBYTCT        :   vbit16);
                                                          (* # bytes for VWRITEDEV *)
                                                          (* word 9 *)
    3:  (VCNTRLBUF          :   vcrtlinfo):                (* for VCONTROL *)
                                                          (* word 7 *)
    4:  (VPLCHAND           :   vchanreft;                 (* word 7 *)
         VPLACCD            :   vbit8; (* Chanl & access ref for
                                 VTRANSFER *)
    end (* vrexioparmlist *);
    VIOLST                  =   array [1..100] of integer;
    VIOCB                   =   record
    VIOCBSIZE               :   integer;
    VMOVSIZE                :   integer;
    VREXIOTIMEOUT           :   vbit8;
    VREXPARMLIST            :   vresioparmlist;
    VIOLIST                 :   violst;
    end (* viocb *);
```

A listing of various programs and subroutines for implementing a specific embodiment of the invention was included in the original application for this patent. This listing was deleted from the application prior to publication but remains in the Patent and Trademark Office file of the application for this patent.

What is claimed is:

1. An automated telephone voice service system comprising:

a store having defined therein a plurality of individually addressable message baskets which each include an inbasket portion and an outbasket portion coupled to store and retrieve digital representation of voice messages at each of the plurality of individually addressable message baskets therein; and a control system providing a selective coupling between the store and each of a predetermined plurality of telephone lines of a telephone network, the control system being responsive to different data signals received over a particular one of the telephone lines to associate the particular telephone line with a particular message basket, to store in the particular message basket a representation of a voice message received over the particular telephone line, and to forward a representation of a voice message stored in the particular message basket to at least one other of the individually addressable message baskets, the control system responding to receipt of data signals over the particular telephone line including a personal identification number associated with an owner of the particular message basket by enabling account activities including retrieval of voice messages from the inbasket of the particular message basket and storage of messages to be forwarded in the outbasket of the particular message basket and blocking account activities until a personal identification number has been received.

2. The automated telephone voice service system according to claim 1 wherein the store stores a representation of a voice prompting message explaining which combinations of data signals actuate particular services provided by the service system and wherein the control system responds to activation of a particular telephone line by retrieving the voice prompting message from the store and communicating the voice prompting message over the particular telephone line.

3. An automated telephone voice service system comprising:

a store having defined therein a plurality of individually addressable message baskets which each have an inbasket portion and an outbasket portion, the store being coupled to store and retrieve representations of voice messages at each of the plurality of individually addressable message baskets therein; and a control system providing a selective coupling between the store and each of a predetermined plurality of telephone lines of a telephone network, the control system being responsive to different data signals received over a particular one of the telephone lines to associate the particular telephone line with a particular message basket, to store in the particular message basket a representation of a voice message received over the particular telephone line, and to forward a representation of a voice message stored in the particular message basket to at least one other of the individually addressable message baskets, the control system storing in the inbasket portion of the particular message basket representations of voice messages directed to the particular message basket, storing in the outbasket portion of the particular message basket a representation of a voice message that is to be forwarded, and storing in the inbasket of each message basket to which a representation of a voice message is to be forwarded a vector pointer identifying the particular message outbasket and the voice message representation which is to be forwarded thereto.

4. The automated telephone voice service system according to claim 3 wherein the control system returns to a state of a newly activated telephone line upon receipt of data signals over the particular telephone line indicating a change function command.

5. The automated telephone voice service system according to claim 1 wherein at least a subplurality of the predetermined plurality of telephone lines are direct inward dial telephone lines including first and second groups of lines having respectively first and second groups of mutually exclusive telephone numbers associated therewith, with each first and second group of lines being associated with a different common account and with each telephone line of the subplurality having a message basket associated therewith which message basket has an address including a group field identifying the group of telephone lines to which the message basket is associated and an individual field uniquely identifying the message basket within a group of message baskets which are associated with the group of telephone lines.

6. The telephone voice service system according to claim 5 wherein the particular telephone line is one of the subplurality of telephone lines and wherein the particular message basket associated by the control system with the particular telephone line is, in response to data signals defining only an individual field, a message basket identified thereby within the same group as the particular telephone line, and in response to data signals defining both a group field and an individual field, a message basket indicated by the defined individual field within a group indicated by the defined group field.

7. An automated telephone voice service system comprising:
  a store having defined therein a plurality of individually addressable message baskets, the store being coupled to store and retrieve representations of voice messages at each of the plurality of individually addressable message baskets therein, the store further storing a representation of a voice prompting message explaining which combinations of data signals actuate particular services provided by the service system; and
  a control system providing a selective coupling between the store and each of a predetermined plurality of telephone lines of a telephone network, the control system being responsive to different data signals received over a particular one of the telephone lines to associate the particular telephone line with a particular message basket, to store in the particular message basket a representation of a voice message received over the particular telephone line, and to forward a representation of a voice message stored in the particular message basket to at least one other of the individually addressable message baskets, the control system responding to activation of a particular telephone line by retrieving the voice prompting message representation from the store and communicating the voice prompting message over the particular telephone line, the control system operating in an absence of data signals received over the particular line to select as the particular message basket a message basket having a predetermined association with the line, to retrieve from the store and communicate over the line a voice prompting message indicating that a voice message may be received and stored and to store in the particular message basket a representation of any voice message subsequently received over the particular line.

8. The automated telephone voice service system according to claim 1 wherein the data signals are telephone keyboard activated signals defining predetermined commands and data groups and wherein the control system responds to a command only if it is preceded by an ATTENTION signal.

9. The automated telephone voice service system according to claim 8 wherein the control system responds to a data group upon entry of a TERMINATION signal.

10. The automated telephone voice service system according to claim 9 wherein the ATTENTION signal is a tone signal generated by actuating a star key on a standard telephone keyboard and the TERMINATION signal is a tone signal generated by actuating a number sign key on a standard telephone keyboard.

11. The automated telephone voice service system according to claim 10 wherein the control system operates to initiate a predetermined time period upon receipt of the ATTENTION signal from a particular telephone line and responds to a subsequently received command only if a first data signal of the command is received within the predetermined time period.

12. An automated telephone voice service system comprising:
  a store having defined therein a plurality of individually addressable message baskets, the store being coupled to store and retrieve representations of voice messages at each of the plurality of individually addressable message baskets therein;
  a control system providing a selective coupling between the store and each of a predetermined plurality of telephone lines of a telephone network, the control system being responsive to different data signals received over a particular one of the telephone lines to associate the particular telephone line with a particular message basket, to store in the particular message basket a representation of a voice message received over the particular telephone line, and to forward a voice message representation stored in the particular message basket to at least one other of the individually addressable message baskets;
  an operator console for providing communication with a human operator and generating operator initiated data signals which are coupled to the control system; and
  wherein the control system responds to data signals received over the particular telephone line indicating that a telephone calling the particular telephone line is a dial type of telephone by coupling the particular telephone line to the operator console and responding to data signals generated by the operator console as if the console generated data signals had been received over the particular telephone line.

13. The automated telephone voice service system according to claim 1 wherein the control system includes a plurality of line interface circuits which are selectively coupled to activated ones of the plurality of telephone lines and include codecs converting analog voice signals received over an activated telephone line to corresponding digital voice signals and converting digital voice signals generated by the voice service system to corresponding analog voice signals for communication over an activated line and the control system includes a digital switch coupled for communication with the line interface circuits and the store and selectively intercoupling digital representations of voice signals being communicated over different ones of the plurality of telephone lines with corresponding message baskets stored by the store.

14. The automated telephone voice service system according to claim 1 above wherein the control system responds to data signals appearing on the particular telephone line defining a CHANGE command by suspending a current operating mode thereof and enabling response to data signals appearing on the particular telephone line which define a new operating mode.

15. The automated telephone voice service system according to claim 14 above wherein the control system responds to a CHANGE MESSAGE BASKET command and a message basket identification received over the particular telephone line following receipt of a CHANGE command over the particular telephone line by disassociating the particular message basket from the particular telephone line and associating the particular telephone line with a second particular message basket indicated by the message basket identification.

16. An automated telephone voice service system comprising:
a store having defined therein a plurality of individually addressable message baskets, the store being coupled to store and retrieve representations of voice messages at each of the plurality of individually addressable message baskets therein;
a control system providing a selective coupling between the store and each of a predetermined plurality of telephone lines of a telephone network, with the telephone lines including at least on direct incall line, the control system being responsive to different data signals received over a particular one of the telephone lines to associate the particular telephone line with a particular message basket, to store in the particular message basket a representation of a voice message received over the particular telephone line, and to forward a voice message representation stored in the particular message basket to at least one other of the individually addressable message baskets; and
the control system including means for detecting when the particular telephone line is a direct incall line and responding to such detection by association the particular telephone line with a predetermined particular message basket and precluding association of the particular telephone line with any other message basket, the control system being operable to enable only the message basket activity of recording a voice message received over the particular telephone line when the particular telephone line is a direct incall line.

17. An automated telephone voice service system comprising:
a store having defined therein a plurality of individually addressable message baskets, the store being coupled to store and retrieve representations of voice messages at each of the plurality of individually addressable message baskets therein; and
a control system providing a selective coupling between the store and each of a predetermined plurality of telephone lines of a telephone network, with the telephone lines including a direct incall line, the control system being responsive to different data signals received over a particular one of the telephone lines to associate the particular telephone line with a particular message basket, to store in the particular message basket a representation of a voice message received over the particular telephone line, and to forward a voice message representation stored in the particular message basket to at least one other of the individually addressable message baskets, and
the control system including means for detecting when the particular telephone line is a direct recall line and responding to such detection by associating the particular telephone line with a predetermined particular message basket and precluding association of the particular telephone line with any other message basket, the control system being operable to enable an activity affecting the particular message basket only upon receipt over the particular telephone line of a predetermined personal identification code associated with the particular message basket when the particular telephone line is a direct recall line.

18. The automated telephone voice service system according to claim 17 above, wherein the predetermined personal identification code includes a first portion which cannot be changed in response to data signals received over the particular telephone line and a second portion which can be changed in response to data signals received over the particular telephone line.

19. The automated telephone voice service system according to claim 1 wherein the predetermined plurality of telephone lines includes a general access line with the control system including means for detecting that the particular telephone line is a general access line and responding to such detection by associating the particular telephone line with a particular message basket indicated by a message basket indication received over the particular telephone line as a data signal.

20. The automated telephone voice service system according to claim 19 wherein the message basket indication is alternatively a message basket code or a personal identification code having a predetermined association with the particular message basket and wherein the control system responds to the message basket code by enabling a voice message recording with respect to the particular message basket or responds to the personal identification code by enabling account ownership activities with respect to the particular message basket and further responds to commands received as data signals over the particular telephone line by executing any activity commanded thereby.

21. The automated telephone voice service system according to claim 20 wherein the account ownership activities include voice message retrieval and voice message sending.

22. The automated telephone voice service system according to claim 1 wherein the control system responds to a LISTEN command received over the particular telephone line by retrieving from the particular message basket and communicating over the particular telephone line any voice message whose representation is contained within the message basket and to a LISTEN command followed by a TALK command received over the particular telephone line by forwarding to any message basket from which a voice message representation retrieved in response to the LISTEN command has been forwarded a representation of a voice message received over the particular telephone line following the TALK command.

23. The automated telephone voice service system according to claim 1 wherein commands defined by the data signals received over the particular telephone line include an ATTENTION command and wherein the control system responds to an ATTENTION command received over the particular telephone line by entering a pause mode and enabling a response to additional commands received over the particular telephone line for a predetermined period of time following receipt of each ATTENTION command.

24. The automated telephone voice service system according to claim 1 wherein the store stores a client voice greeting that is uniquely associated with the particular message basket and wherein the control system responds to at least one type of access to the message basket by retrieving from the store and communicating over the particular telephone line the client voice greeting.

25. The automated telephone voice service system according to claim 24 wherein the data signals include a CHANGE GREETING command and wherein the control system responds to a CHANGE GREETING command received over the particular telephone line by storing in the store in place of any previously stored client voice greeting a new client voice greeting subsequently received over the particular telephone line.

26. The automated telephone voice service system according to claim 1 wherein the control system responds to data signals received over a particular telephone line commanding modification of a voice message which has previously been received by forwarding a representation of the received voice message to another message basket or attempting to forward the received voice message to another telephone line until the voice message has actually been communicated over a telephone line.

27. The automated telephone voice service system according to claim 1 above, wherein the control system forwards a representation of a voice message to at least one other message basket by retaining in the particular message basket a single copy of the voice message representation and storing in at least one of said other message baskets a pointer identifying the particular message basket and the voice message representation therein which is to be forwarded.

28. The automated telephone voice service system according to claim 2 wherein the store stores a plurality of different voice prompting messages which provide detailed explanations of voice service system usage for different status conditions of the voice service system and wherein the control system responds to data signals defining a PROMPT command by determining a current status condition of the voice service system and retrieving from the store and communicating over the particular telephone line a voice prompting message that is appropriate for the current status condition of the voice service system.

29. An automated telephone voice service system comprising:
a store having defined therein a plurality of individually addressable message baskets, the store being coupled to store and retrieve representations of voice messages at each of the plurality of individually addressable message baskets therein;
a control system providing a selective coupling between the store and each of a predetermined plurality of telephone lines of a telephone network, the control system being responsive to different data signals received over a particular one of the telephone lines to associate the particular telephone line with a particular message basket, to store in the particular message basket a representation of a voice message received over the particular telephone line, and to forward a voice message representation stored in the particular message basket to at least one other of the individual addressable message baskets;
an operator console coupled for communication with the control system; and
wherein the control system stores in the store each data signal received over the particular telephone line to provide a stored data signal audit trail and responds to data signals defining an OPERATOR ASSISTANCE command by providing to the particular telephone line a voice connection to the operator console and retrieving from the store and communicating to the console for display thereby the stored data signal audit trail.

30. The automated telephone voice service system according to claim 1 wherein the control system is further responsive to data signals received over the particular one of the telephone lines to forward a voice message whose representation is stored in the particular message basket to at least one telephone line different from the particular line.

31. An automated telephone voice service system comprising:
a store coupled to store and retrieve representations of voice messages at each of a plurality of individually addressable message baskets therein; and
a control system providing a selective coupling between the store and each of a given plurality of telephone lines of a telephone network, with a particular message basket being coupled to a particular telephone line in response to a set of message basket control signals received over the particular telephone line for storing in the particular message basket representations of a voice message received over the particular telephone line, responsive to a second set of message basket control signals for retrieving from the particular message basket and communicating over the particular telephone line a voice message whose representation has been previously stored in the particular message basket, responsive to a third set of message basket control signals which include an address of a forwarding message basket for forwarding a representation of a voice message that has been previously stored in the particular message basket to a forwarding message basket, and responsive to a fourth set of message basket control signals for forwarding a voice message whose representation has been previously stored in the particular message basket to a telephone line selected by the fourth set of message basket control signals.

32. The automated voice service system according to claim 31 above further comprising a voice prompting system coupled to communicate a voice message prompt explaining how to use the automated telephone voice service system upon activation of selected ones of the given plurality of telephone lines.

33. The method of providing a telephone voice service system response to an incoming telephone call from a caller on a telephone line comprising the steps of:
communicating over the telephone line a prerecorded voice message prompting the caller to enter alternatively a message basket code or a personal identification code;
determining the type of code entered by the caller;
if a message basket code is entered, prompting the caller to communicate a voice message whose representation is forwarded to a message basket identified by the code and storing in a message basket portion of a store indicated by the message basket code a representation of any voice message communicated by the caller;
if a personal identification code is entered, enabling account ownership functions for an account associated with the personal identification code including retrieval of messages from a message basket associated with the account and forwarding of message representations from the associated message basket to another message basket identified by signals communicated over the telephone line in accordance with a predetermined code.

34. In a voice message service system having means for storing a plurality of telephone voice messages and making such messages available to a plurality of calling parties on a real time basis, the combination comprising:
means providing a plurality of telephone lines for carrying voice data and command data;
means for processing data including means for storing digital representations of a plurality of voice messages with each message being addressably retrievable in response to an account identifier code corresponding thereto, including means responsive to a first command indicated by said command data for selectively retrieving a voice message identified by the command data and communicating the retrieved voice message over a telephone line from which the command data is received, including means responsive to a second command indicated by said command data for selectively retrieving a voice message identified by the command data and communicating the retrieved message over a telephone line indicated by the command data, which telephone line is not the telephone line from which the command data is received, including means for providing routine prestored prompting messages to a calling party, means for storing numeric data and command sequences in response to calls received over the telephone lines, means for recognizing invalid and inappropriate command sequences, means for initiating an operator assisted mode on the occurrence of an invalid or inappropriate command sequence, and means for generating data describing the status of messages pertaining to a given telephone number; and
at least one operator station responsive to the message status data from the data processing means and the initiation of the operator assisted mode for providing informed intervention in response to an occurrence of an invalid or inappropriate command sequence.

35. A system for storing and forwarding telephone calls comprising:
first interconnect means for subscribers, the first interconnect means being accessible in response to a number in a first group of numbers, each of which identifies a subscriber;
second interconnect means for non-subscribers, the second interconnect means being accessible in response to a number in a second group of numbers, each of which identifies a subscriber;
a central station including inbasket means for storing representations of voice messages intended for subscribers and outbasket means for storing representations of subscriber originated voice messages intended for conversion and transmission from the outbasket means to a telephone;
and means at the central station responsive to the first and second interconnect means and coupled to control the inbasket means and outbasket means to permit subscribers to access the inbasket means and control the outbasket means through the first interconnect means while permitting non-subscribers access only to the inbasket means through the second interconnect means for the purpose of recording a voice message for later retrieval by a particular subscriber identified by a number in the second group which is used to access the second interconnect means.

36. A voice message service system comprising:
data processing means for monitoring the status of subscriber messages and subscriber dialing operations, said date processing means including means for providing routine prestored prompting messages to a party calling the system, means for storing representations of voice messages, numeric data and command sequences in response to calls, means for recognizing invalid and inappropriate command sequences, means for initiating an operator assisted mode on the occurrence of an invalid or inappropriate command sequence and means for generating data describing the status of messages pertaining to a given telephone number; and
at least one operator station including display means responsive to the message status data from the data processing means and the initiation of the operator assisted mode for providing informed intervention on the occurrence of an invalid or inappropriate command sequence.

37. The voice message service system as set forth in claim 36 above, wherein the data processing means includes means responsive to a direct operator request command from a subscriber for providing message status data to the operator station and switching the call to the operator station.

38. The voice message service system as set forth in claim 37 above, wherein the data processing means comprises means for communicating to the display means for displaying thereon, data indicating a command sequence entered by a subscriber.

39. A telephone subscriber service system comprising:
- a telephone line concentrator connected at a central office of a telephone network to a line of each service system subscriber and operable upon the occurrence of a predetermined condition on a subscriber line to connect the subscriber line to a trunk line;
- at least one trunk line connected between the concentrator and a trunk interface circuit;
- a trunk interface circuit connected between the at least one trunk line and a computer and communications system, the trunk interface circuit being operable to couple to the computer and communications system digital data representative of analog signals appearing on the trunk line and to couple to the trunk line analog signals representative of digital data received from the computer and communications system;
- a line interface circuit coupled between a telephone company telephone line and the computer and communications system, the line interface circuit being operable to couple to the computer and communications system digital data representative of analog signals appearing on the telephone line and to couple to the telephone line analog signals representative of digital data received from the computer and communications system;
- the computer and communications system coupled for bidirectional communication with the trunk interface circuit and line interface circuit, the computer and communications system having established therein means for storing providing an inbasket and an outbasket associated with and controlled by each service system subscriber, with each inbasket providing storage for representations of messages received from a calling party for the associated subscriber and each outbasket proving storage for representations of messages received from the associated subscriber for delivery to another party.

40. The telephone subscriber service system according to claim 39 above, wherein the computer and communications system includes means for controlling coupled to control the communication of voice messages between the storing means and a telephone network user, the controlling means including means for detecting the occurrence of tone signals indicative of the actuation of corresponding keyboard keys and means responsive to detection of a tone signal corresponding to actuation of a predetermined keyboard key for enabling the controlling means to control the operation of the subscriber service system in response to the detection of at least one additional tone signal corresponding to actuation of a keyboard key.

41. The telephone subscriber service system according to claim 39 above, wherein the computer and communcations system includes means for controlling coupled to control the communication of voice messages between the storing means and a telephone within the telephone network, the controlling means including means for detecting the occurrence of tone signals indicative of the actuation of corresponding keyboard keys and means responsive to a predetermined combination of a plurality of different ones of said tone signals including a combination of tone signals identifying a user of the telephone as a particular system subscriber and including at least one tone signal indicating a talk command, for storing in an outbasket associated with said particular system subscriber a representation of a voice message received from said telephone.

42. A telephone subscriber service system comprising:
- an interface circuit coupled to provide bidirectional communication between a telephone network including tone signal producing keyboard telephones and a digital data processing system, with information being communicated between the interface circuit and the data processing system in digital form and between the interface circuit and the telephone network in a form compatible with the operation of the telephone network;
- the digital data processing system coupled to the interface circuit and including:
- means for providing communication of voice messages with telephone system users,
- means for storing voice messages in digital form for each different subscriber to the subscriber service system, and
- means for controlling coupled to control the communication of voice messages between the storing means and a telephone network user, the controlling means including means for detecting the occurrence of tone signals indicative of the actuation of corresponding keyboard keys and means responsive to detection of a tone signal corresponding to actuation of a predetermined keyboard key for enabling the controlling means to control the operation of the subscriber service system in response to the detection of at least one additional tone signal corresponding to actuation of a keyboard key, means for limiting all functions by a non-account caller to the storage of a voice message and editing of a voice message being stored during the course of a single call, and means responsive to receipt of a data code over a telephone line of the telephone network identifying a caller as an account owner for enabling access by the caller to and execution of account ownership functions including (1) retrieval of account messages, (2) digital recording of account messages for delivery to one or more other accounts and (3) automatic storage and delivery of a voice reply to a caller originating a message in response to an ATTENTION, TALK command sequence during operation in a message retrieval mode in which a message from another account is retrieved.

43. An automated telephone voice service system comprising a data processing system coupled to receive, store and retrieve representations of voice messages received over a telephone line and to respond to tone commands received over the telephone line, the data processing system being operative to limit call functions by a non-account owner caller to the storage of representations of a voice message and editing of the voice message during the course of a single call and including means operative in response to a data code received over the telephone line identifying a caller as an account owner for executing account ownership functions including retrieval of account messages, recording of account messages for delivery to one or more other accounts, and in a message retrieval mode in which a message from another account owner is retrieved, automatic storage and delivery of a voice message reply in response to an ATTENTION, TALK command sequence.

44. The automated telephone voice service system according to claim 43 above wherein the data processing system includes means for executing account ownership functions which include in a message retrieval mode, the saving of a current message for later recall in response to an ATTENTION, SAVE command sequence.

45. The automated telephone voice service system according to claim 43 above, wherein the data processing system includes means for granting a caller having access to a given account access to another account in response to a command sequence ATTENTION, CHANGE, CHANGE.

46. The automated telephone voice service system according to claim 43 above, wherein the data processing system includes means for processing an account address either in the form of an account number identifying a third party account, or a code identifying a preestablished address list having at least the third party account identified thereon.

47. The automated telephone voice service system according to claim 43 above, wherein the data processing system includes means for processing a received data code which includes a first code identifying the owned account and a second, personal identification, code preceded by an ATTENTION command identifying the caller as the owner of the owned account.

48. The automated telephone voice service system according to claim 43 above, wherein the data processing system includes means operable in any mode in any mode for enabling a caller to leave a voice message with another account in response to a command sequence including ATTENTION, CHANGE, TALK, ACCOUNT NUMBER of the account which is to receive the message.

49. An automated telephone voice service system comprising:
a store coupled to store and retrieve representations of voice messages at each of a plurality of individually addressable message baskets therein; and
a control system providing selective coupling between the store and each of a plurality of telephone lines of a telephone network with at least one of the lines being a general access line over which a plurality of different message baskets may be accessed for either message storing or account ownership functions, with a message storing function being enabled in response to entry of a code identifying one of the plurality of message baskets and account ownership functions being enabled in response to entry of a code identifying one of the plurality of message baskets and a personal identification code identifying the owner of the one message basket.

50. The automated telephone voice service system according to claim 49 above, wherein the control system is operative to respond to a command series ATTENTION, CHANGE, CHANGE by enabling receipt of a different message basket identification code identifying a message basket different from a currently accessed message basket and granting access to the different message basket in response to the different code.

51. The automated telephone voice service system according to claim 49 above, wherein the control system includes means for receiving and responding to account ownership administrative commands after said administrative commands are enabled by a command sequence including ATTENTION, CHANGE, ADMINISTRATION.

52. The automated telephone voice service system according to claim 51 above wherein the control system includes means for distinguishing a given code for at least one administrative command which may be entered after administrative commands are enabled from the same given code for a nonadministrative command which may be entered when administrative commands are not enabled.

53. An automated telephone voice service system comprising:
a store coupled to store and retrieve representations of voice messages at each of a plurality of individually addressable voice message baskets therein, the message baskets being arranged in at least first and second groups with each message basket address having first and second fields, the message baskets of the first group having a first group first field address and mutually exclusive second field addresses, and the message baskets of the second group having a second group first field address and mutually exclusive second field addresses; and
a control system providing a selective coupling between the store and each of a plurality of telephone lines which provide a signal at the beginning of each incoming call which identifies a telephone number of a telephone from which the call is being placed, the control system being operative to associate a first group of telephone numbers with the first group of message baskets and upon receiving a second field message basket address from a telephone having a first group telephone number to couple the call to the addressed message basket within the first group of message baskets and upon receiving a second field message basket address from a telephone having a second group telephone number to couple the call to the addressed message basket within the second group of message baskets, the control system being further operative to store and retrieve voice messages communicated between a coupled message basket and a calling telephone.

54. The automated telephone voice service system according to claim 53 above, wherein the control system is further responsive to a message basket address received from a telephone line, which message basket address contains both a first field address and a second field address, by coupling the telephone line to a message basket indicated thereby.

55. A telephone voice message service system comprising:
an information processing system operative to receive, store and retrieve digital samples representing voice messages and to command the selective interconnection of channels carrying sequences of digital samples which each represent a voice message; and
a real time subsystem coupled for communication with a plurality of bidirectional voice communication channels carrying sequences of digital samples with each sequence representing a voice messages, the real time subsystem being responsive to information processing system commands to selectively couple data samples received from any channel or from the information processing system to any channel or from any channel to the information processing system to provide commanded interconnection of the voice communication channels.

56. The telephone voice message service system according to claim 55 above, wherein the real time subsystem includes a time division multiplexed real time bus and selectively interconnects the bidirectional voice communication channels and the information processing system by placing incoming digital samples on the bus at commanded periodic sample data time intervals for each channel and taking outgoing digital samples off the bus at commanded periodic sample data time intervals for each channel.

57. The telephone voice message service system according to claim 56 above, wherein the real time subsystem further includes at least one real time processor coupled between and communicating digital samples between the real time bus and the information processing system, the real time processor being operative to process the digital samples communicated thereby to provide at least one real time processing function including silence detection and compression.

58. The method of telephone voice message communication comprising the steps of:
answering a telephone line;
receiving over the answered telephone line an identification code which identifies the caller as a subscriber having a subscriber message basket for storing data which includes representations of voice messages, the message basket having an inbasket portion and an outbasket portion;
receiving over the answered telephone line a first signal indicating at least one command including a talk command;
receiving over the answered telephone line and storing in the outbasket portion of the subscriber message basket in response to the talk command a representation of a voice message generated by the caller;
receiving over the answered telephone line a second signal including information identifying at least one designated recipient of the voice message; and
for each designated recipient:
calling the designated recipient by dialing a designated recipient telephone line corresponding to the designated recipient,
when the designated recipient telephone line is answered, communicating over the designated recipient telephone line a voice message delivery greeting including an explanation that a recorded voice message is being delivered,
retrieving from the outbasket portion of the subscriber message basket and communicating over the recipient telephone line the voice message, and
terminating the call to the designated recipient.

59. The method of telephone voice message communication according to claim 58 above, further comprising between the step of retrieving and communicating and the step of terminating, the step of receiving a reply message to the communicated voice message.

60. The method of telephone voice message communication according to claim 59 above, wherein the step of receiving a reply message includes the steps of:
communicating over the designated recipient telephone line a reply invitation voice message;
storing in the voice message store a representation of a voice reply message received over the designated recipient telephone line; and
communicating over the designated recipient telephone lines a voice delivery closure message.

61. The method of telephone voice message communication according to claim 60 above, wherein the step of receiving and storing includes the step of receiving editing commands communicated over the designated recipient telephone line and editing the voice reply message in accordance with received editing commands.

62. The method of telephone voice message communication according to claim 61 above, wherein the reply invitation voice message includes an indication that editing commands may be used in creating the reply voice message.

63. The method of telephone voice message communication according to claim 58 above, wherein the voice message delivery greeting is a voice message having a representation thereof previously stored and is automatically retrieved and automatically communicated over the designated recipient telephone line without human intervention.

64. The method of telephone voice message communication according to claim 63 above, wherein the second signal includes information identifying at least one predetermined list of designated recipients and a predetermined set of delivery instructions.

65. The method of telephone voice message communication according to claim 64 above, wherein the predetermined set of delivery instructions includes information indicating at least one period of time during which a designated recipient telephone line is to be dialed and wherein the step of calling includes the steps of automatically dialing without human intervention the designated recipient telephone line during a period of time indicated by the predetermined set of delivery instructions.

66. The method of telephone voice message communication according to claim 65 above, wherein the predetermined set of delivery instructions includes information indicating a retry time interval and a maximum number of retry attempts when a dialed call is not completed and further comprising a step of automatically redialing the designated recipient telephone line in accordance with the set of delivery instructions when a dialed call is not completed.

67. The method of telephone voice message communication according to claim 58 wherein the at least one designated recipient includes a subscriber having an identification code and an associated message basket having an inbasket portion and an outbasket portion and further comprising the step of storing in the inbasket portion of the message basket of the designated recipient subscriber information identifying the voice message and the location at which a representation of the voice message is stored.

68. The method of providing a telephone voice service comprising the steps of:
answering incoming calls and accepting and responding to caller originated commands for voice message operation including commands to record or retrieve voice messages or in the absence of receiving a caller originated command within a predetermined time period,
generating a voice message salutation which invites the caller to leave a voice message following a tone signal;
pausing after generating the saluation;
generating a tone after pausing; and
recording a representation of any voice message communicated after the tone is generated.

69. The method of providing a telephone voice service according to claim 68 above wherein a caller originated command is recognized as a conmand only when preceded by a predetermined ATTENTION code signal.

70. The method of providing a telephone voice service according to claim 68 above, further comprising the step of interrupting any current voice service activity related to a given call upon receipt of an ATTENTION code signal from the caller and awaiting receipt of a further command signal from the caller.

71. The method of providing a telephone voice messaging service through a telephone voice service system comprising the steps of:
    providing for each client a message basket for storing client related information including representations of voice messages that may be edited by the client while being stored in a client message basket, each message basket having an inbasket portion and an outbasket portion;
    receiving and recording in a sending client outbasket portion of the client message basket, a single copy of a representation of a voice message;
    receiving and storing an indication of a plurality of destinations to which the voice message is to be delivered;
    delivering the voice message to each indicated destination by retrieving the single copy of the representation of the voice message from the outbasket portion of the client message basket for each delivery and communicating the voice message to one of the plurality of indicated destinations.

72. The method of providing a telephone voice messaging service according to claim 71 above, wherein the delivering step includes, when the voice message is to be delivered to a system inbasket of a recipient person who is a system client, the steps of placing in the inbasket of the recipient person a cross reference address to the storage location of the single voice message representation copy in the outbasket, and accessing the single voice message representation copy using the address cross reference to retrieve the voice message representation for delivery of the voice message to the system client recipient person.

73. The method of providing a telephone voice messaging service according to claim 71 above further comprising the steps of maintaining for each recipient person an indication of whether or not the voice message has been delivered to the recipient person and enabling a sending client to edit the voice message at any time until the voice message has been delivered to every recipient person.

74. The method of providing a telephone voice messaging service through a telephone voice service system comprising the steps of:
    providing for each client a message basket for storing client related messages, each message basket including an addressable outbasket;
    receiving and recording in a sending client outbasket a single copy of a representation of a voice message;
    receiving and storing an indication of a plurality of destinations to which the voice message is to be delivered;
    delivering the voice message to each indicated destination by retrieving the single copy of the representation of the voice message from the outbasket of the client message basket for each delivery and communicating the voice message to one of the plurality of indicated destinations; and
    temporarily spacing the delivery of the voice message to each different recipient person by a predetermined time interval to avoid congestion of the telephone voice service system.

* * * * *